US012590469B2

(12) United States Patent
Zhou et al.

(10) Patent No.: US 12,590,469 B2
(45) Date of Patent: Mar. 31, 2026

(54) CARPORT PERGOLA

(71) Applicant: ZHEJIANG ZHENGTE CO., LTD., Linhai (CN)

(72) Inventors: Long Zhou, Shanghai (CN); Shuai Gao, Zhejiang (CN); Jian Zhou, Zhejiang (CN)

(73) Assignee: ZHEJIANG ZHENGTE CO., LTD., Linhai (CN)

( * ) Notice: Subject to any disclaimer, the term of this patent is extended or adjusted under 35 U.S.C. 154(b) by 258 days.

(21) Appl. No.: 18/424,534

(22) Filed: Jan. 26, 2024

(65) Prior Publication Data

US 2024/0309666 A1 Sep. 19, 2024

Related U.S. Application Data

(60) Provisional application No. 63/441,784, filed on Jan. 28, 2023.

(51) Int. Cl.
*E04H 6/02* (2006.01)
*F21V 33/00* (2006.01)
(Continued)

(52) U.S. Cl.
CPC ........... *E04H 6/025* (2013.01); *F21V 33/006* (2013.01); *F21W 2131/10* (2013.01); (Continued)

(58) Field of Classification Search
CPC ........ E04H 6/025; E04D 13/064; E04F 10/08; E04F 10/005; E04B 1/003
See application file for complete search history.

(56) References Cited

U.S. PATENT DOCUMENTS 6,185,889 B1 2/2001 Gilgan et al.
6,370,830 B1 * 4/2002 Bjorkman ............ E06B 3/4609 52/234

(Continued)

FOREIGN PATENT DOCUMENTS

CN 1152064 A 6/1997
CN 202913719 U 5/2013

(Continued)

OTHER PUBLICATIONS

WO, PCT/CN2024/074151 ISR and Written Opinion, Apr. 23, 2024.

*Primary Examiner* — Adriana Figueroa
(74) *Attorney, Agent, or Firm* — ONE LLP

(57) ABSTRACT

Disclosed are example embodiments of a five-device-in-one double-stacked internal-gutters, which is economical to produce, is easy to ship, and can be quickly and easily assembled and disassembled. Particularly, the present invention relates to five-device-in-one anti-leaking noise-canceling anti-twisting anti-warping anti-vibrating double-locking double-core double-deck double-stacked internal-gutters (for being adapted to pergola, RV, house, solar panel, and concert stage), which comprise: Anti-leaking noise-canceling rainwater-shedding rainwater-guiding clamp-shield roof system, anti-twisting anti-warping anti-vibrating double-locking double-core double-deck double-stacked-internal-gutter systems, Double-gutter-supporting-and-locking corner parapet-post systems, Double-gutter-supporting-and-locking center parapet-post systems, and 6 expandable foot-locking sleeve-bolt systems.

20 Claims, 250 Drawing Sheets

(51) Int. Cl.

| | |
|---|---|
| *F21W 131/10* | (2006.01) |
| *F21Y 103/10* | (2016.01) |
| *F21Y 113/00* | (2016.01) |
| *F21Y 115/10* | (2016.01) |

(52) U.S. Cl.

CPC ....... *F21Y 2103/10* (2016.08); *F21Y 2113/00* (2013.01); *F21Y 2115/10* (2016.08)

(56) References Cited

U.S. PATENT DOCUMENTS

| | | | | |
|---|---|---|---|---|
| 7,007,429 | B2 | 3/2006 | Kim | |
| 7,308,901 | B2 | 12/2007 | Meyer | |
| 7,721,746 | B2 | 5/2010 | Yul et al. | |
| 8,061,106 | B2 * | 11/2011 | Clark | E04F 10/08 52/650.1 |
| 8,132,583 | B2 | 3/2012 | Mowatt | |
| 8,256,486 | B1 | 9/2012 | Thomas | |
| 8,341,892 | B2 | 1/2013 | Tugnoli | |
| 8,528,262 | B2 | 9/2013 | Horton et al. | |
| 9,422,715 | B1 * | 8/2016 | Selzer | E04D 11/00 |
| 9,644,374 | B2 | 5/2017 | Ivic | |
| 9,765,805 | B2 | 9/2017 | Pond | |
| 9,976,298 | B2 | 5/2018 | Bergman | |
| 9,988,818 | B1 | 6/2018 | Tanghongs | |
| 10,368,639 | B1 | 8/2019 | Lai et al. | |
| 10,392,821 | B2 | 8/2019 | Violin | |
| 10,428,529 | B1 | 10/2019 | Tanghongs | |
| 10,626,594 | B2 | 4/2020 | Yu et al. | |
| 10,641,003 | B2 | 5/2020 | Macias | |
| 10,689,848 | B2 | 6/2020 | Castel | |
| 10,724,236 | B2 | 7/2020 | Weaver et al. | |
| 10,781,584 | B2 | 9/2020 | Jackson et al. | |
| 10,851,544 | B1 * | 12/2020 | Volin | E04F 10/10 |
| 10,920,424 | B2 | 2/2021 | Jones et al. | |
| 10,988,936 | B2 | 4/2021 | Soetanto | |
| 11,085,196 | B1 * | 8/2021 | Volin | F21S 9/032 |
| 11,091,914 | B2 | 8/2021 | Shan et al. | |
| 11,149,438 | B2 | 10/2021 | Torman et al. | |
| 11,168,481 | B2 * | 11/2021 | Rieber | E04B 1/0046 |
| 11,371,251 | B1 | 6/2022 | Koolmeister | |
| 11,421,422 | B2 * | 8/2022 | Zhao | E04F 10/10 |
| 11,486,139 | B2 * | 11/2022 | Geriavenko | E04B 7/163 |
| 2004/0148899 | A1 | 8/2004 | Pertile | |
| 2011/0072736 | A1 | 3/2011 | Gullett et al. | |
| 2011/0179741 | A1 | 7/2011 | Yen | |
| 2013/0291438 | A1 * | 11/2013 | Selzer | E04B 7/163 49/82.1 |
| 2019/0100933 | A1 | 4/2019 | Volin | |
| 2021/0262237 | A1 * | 8/2021 | Vanthournout | E04F 10/08 |

FOREIGN PATENT DOCUMENTS

| | | | | | |
|---|---|---|---|---|---|
| CN | 202945823 | U | | 5/2013 | |
| CN | 205617895 | U | * | 10/2016 | E04F 10/10 |
| CN | 206581641 | U | | 10/2017 | |
| CN | 218061637 | U | * | 12/2022 | |
| DE | 19921188 | A1 | * | 5/2000 | E04H 6/025 |
| EP | 2 372 049 | A1 | | 10/2011 | |
| EP | 3511489 | A1 | * | 7/2019 | E04F 10/02 |

* cited by examiner

136

118

CARPORT PERGOLA

CROSS-REFERENCE TO RELATED APPLICATIONS

The present application claims priority to U.S. Provisional Patent Application No. 63/441,784, filed Jan. 28, 2023, which is incorporated herein by reference in its entirety.

TECHNICAL FIELD

The disclosure relates generally to the field of patio equipment, and specifically and not by way of limitation, some embodiments are related to pergolas or pergola components.

BACKGROUND

A number of gutters, e.g., on pergolas, have been introduced. Some examples are provided below.

EP U.S. Pat. No. 2,372,049, issued 2011 Oct. 5, to Rolf Guido Tepel describes a pavilion with several supporting elements (102) carrying a roof (100) comprising a rain spout (108). A gutter (112) is arranged at the spout. A transverse bracing (106) is arranged between the supporting elements and receives rainwater flowing from the roof. One of the supporting elements comprises rainwater drainage (120) for draining the received rainwater to ground via the gutter. A sealing lip comprises an open hollow section profile with an aperture referring the gutter, where the lip forms a watertight bridging of the gutter to form pavilion.

U.S. Pat. No. 6,185,889, issued 2001 Feb. 13, to Dan P. Gilgan describes a flat roof drainage system which utilizes a low point column head which allows the roof to be drained at the center of a structural member located at the low point of the roof. More specifically, the low point column head is a structural extension of a building column and is adapted to permit the attachment of support beams at the column head as well as the placement of a roof drain at the center of the column head so that the roof drain can be place directly at the lowest area of the roof to eliminate standing water.

U.S. Pat. No. 7,007,429, issued 2006 Mar. 7, to Jay Kim describes downspouts attached to the building by flanges extending from the downspout. The downspouts are attachable to standard gutters and elbows. At the corner of a building, downspouts are attachable to each wall forming the corner and an insert extends between the two downspouts to create a seamless appearance. Siding, brick, or other wall covering for the building extends from the downspouts. Downspouts also can be used in a corner or building, the inside corner of a building having a pair of flanges attachable to the building. Also, the downspouts can be attachable to a post, such as on a porch. The downspout may also contain a right-angle turn. In a right-angle turn, a trap is provided for the easy cleaning of the vertical downspout.

U.S. Pat. No. 7,308,901, issued 2007 Dec. 18, to Ted H. Meyer describes a canopy system including a canopy frame and a canopy cover supported by the canopy frame. The canopy cover includes an inner solid portion, an outer solid portion, and a meshed portion disposed between the inner and outer solid portions and disposed proximately to an outer periphery of the canopy cover.

U.S. Pat. No. 7,721,746, issued 2010 May 25, to Lee Pil Yul describes a moisture diversion system for a collapsible structure including a collapsible frame assembly and an outer structure coupled to the collapsible frame assembly.

The moisture diversion system includes a guide strip coupled at each of a first edge and an opposing second edge to the outer structure. The guide strip defines a channel between the first edge and the second edge for facilitating diverting moisture from the outer structure.

U.S. Pat. No. 8,132,583, issued 2012 Mar. 13, to James Stewart Mowatt describes a rain trough support clip includes a generally cylindrical main body made from an elastically resilient material, and having a circumferential gap to facilitate mounting of the main body around the awning reel of a recreation vehicle awning assembly of the type having a flexible valance sheet extending downward from the outer edge of the awning reel. The rain trough support clip also has an outrigger member extending outwardly from a lower region of the main body, with an upturned portion forming a generally U-shaped space between the outrigger and the main body. When a suitable number of the rain trough support clips are mounted along the length of the awning reel, the valance sheet may be readily deformed to form a rainwater drainage trough for receiving runoff from the awning. The drainage trough thus formed will carry runoff to one or both ends of the awning reel, thereby preventing the runoff from falling over the awning reel and forming a runoff curtain there below.

U.S. Pat. No. 8,256,486, issued 2012 Sep. 4, to Robert B. Thomas describes a bow system for coupling between a pair of arm members of an awning structure in a mounting region located beneath an area corresponding to a leading portion of an awning sheet thereof. A bow member of the bow system is aligned generally parallel to a lead member of the awning structure and is configured to flex upwardly to elevate a portion of the awning sheet when the awning is in a deployed configuration to prevent the accumulation of water or debris thereon. The bow member may automatically flex as the awning structure moves from a retracted configuration toward the deployed configuration. Other prop devices and methods of preventing the accumulation of water or debris on awning structures using bow systems and other prop devices are also provided.

U.S. Pat. No. 8,341,892, issued 2013 Jan. 1, to Michele Tugnoli describes a structure for awnings and arbors, comprising a supporting frame, provided with respective front columns, which are designed to support guide beams for a covering canopy and for at least one movable crosspiece, which is in turn associated with an end flap of the covering canopy. At least one collection duct for rainwater being provided with at least one sealing element, in order to prevent the penetration of water, and is also provided with at least one outlet for draining the water, which extends externally from the duct and is substantially faced towards at least one respective hole, which is defined in at least one respective tubular body, which is substantially vertical and is associated with a corresponding front column. The outlet is substantially accommodated within the hole when the crosspiece is in the configuration of maximum advancement towards the front columns and the covering canopy is completely extended.

U.S. Pat. No. 8,528,262, issued 2013 Sep. 10, to James W. Horton describes a system, device, and method for providing screened protection to gutters from clogging debris. Protection is provided by using a panel that includes rain siphoning louvered technology. The louvers may be covered by a filter or screen. If the openings of the louvers are closed to a certain degree, a screen may be dispensed with. The panel is sloped such that debris rolls off a surface of the panel. Additionally, the louvered portion may be domed. The panel ends on one side in a locking mechanism that locks to an outer lip of the gutter and on the other side in a corrugated edge that fits under the overhang of the roof such that it need not be inserted under the shingles.

U.S. Pat. No. 9,644,374, issued 2017 May 9, to Michael Ivic describes a louver cover for a pergola, arbor and the like with pivotal elongated slat assemblies that move between an open upright position and a closed position covering the pergola. The cover is secured between upright supports and cross beams of the pergola. Each slat assembly has a pivotal shaft mounted for pivotal movement between parallel cross beams. The pivotal shaft carries at least one slat member, which is movable between an upright position when the cover is open and a closed position when the slat assemblies extend in covering relationship over the pergola. In one embodiment, each slat assembly has a slat member with S-shaped profile, and in another embodiment the slat assembly has two mirror image slat members of J-shaped profile.

U.S. Pat. No. 9,765,805, issued 2017 Sep. 19, to Gary J. Pond describes a bracket assembly for use in constructing a support frame. The bracket assembly has an inner support sleeve section and at least one support arm that is attached to the inner sleeve support section, wherein the support arm is attached to the inner support sleeve section without the use of additional fasteners. The invention also is directed towards kits and methods that include the bracket assembly.

U.S. Pat. No. 9,976,298, issued 2018 May 22, to Richard Bergman describes a post fastening device for mounting a post to a construction surface, the device comprising a base having a planar top surface and a threaded rod extending from the top surface, a tubular member for insertion into a longitudinal axial bore on the bottom end of the post, the tubular member having an upper end and a lower end with internal threads complementary to the threads of the rod, and a dowel rod for insertion into a transverse bore extending through a portion of the post and the tubular member when the tubular member is in the longitudinal bore, the dowel rod being sized to pass through the tubular member and a portion of the post on both sides of the tubular member.

U.S. Pat. Nos. 9,988,818, and 10,428,529 issued 2018 Jun. 5, and 2019-10-01 to James Tanghongs both describe a rooftop rainwater drainage assembly that is at least partially concealed from view from an exterior of a dwelling. In particular, the rooftop drainage assembly can include an opening spout secured to a roof deck region of a dwelling, and an elongated downspout having a first region disposed between an exterior wall and an interior wall of the dwelling and secured to the opening spout, thereby at least partially concealing the downspout from view from both the interior wall and exterior wall of the dwelling.

U.S. Pat. No. 10,368,639, issued 2019 Aug. 6, to Ming-Hsiao Lai describes a structure including two abutted vertical bars having a rectangular tube shape; a plurality of hook hole groups on the side wall thereof; the side walls of the vertical bars are provided with first and second locking through holes, respectively, at the place adjacent to the butt-joining opening thereof; a hook hole group is arranged between one butt-joining opening and the first or second locking through hole; a bidirectional plug-in butt-joining member is assembled between the two butt-joining openings at the opposite ends of the two vertical bars, and the bidirectional plug-in butt-joining member further includes recess portions that are aligned with the hook hole groups arranged on the vertical bar adjacent to the butt-joining opening; and first and second positioning holes arranged on the side wall of the bidirectional plug-in butt-joining member and aligned with the respective locking through holes for locking through the respective locking member.

U.S. Pat. No. 10,392,821, issued 2019 Aug. 27, to Dee Volin describes a four-device-in-one splash-and-drip-eliminating gazebo comprising: a top roof, top-roof columns, top-roof mosquito-mesh panels respectively screwed to the top-roof columns, a bottom roof, respectively screwed to the top-roof columns, rain-water gutters molded to the rain-water gutters as one unit for functioning as gutters and top rails at the same time for collecting rain water to be used for irrigation, splash-drip-eliminating caves respectively formed at the bottom-roof end of the bottom roof for extending downward into the gutter inside to direct water downward into the gutter inside to eliminate water splash and water drip.

U.S. Pat. No. 10,626,594, issued 2020 Apr. 21, to De Ming Derry Yu describes a prefabricated structural system and an assembly method thereof. The prefabricated structural system may be applied to steel structures, reinforced concrete structures and timber structures. When applied to the steel structures, the prefabricated structural system includes a plurality of steel structure joints and related members. The steel structure joints and related members further comprise: a beam-column connecting sleeve, comprising a first box-shaped steel tube and first C-shaped sleeves extending from and perpendicular to outer surfaces of the first box-shaped steel tube, wherein the first C-shaped sleeve is provided with first wedge shaped recesses at ends of upper and lower flanges thereof; columns, having a column connecting end inserted into the first box-shaped steel tube; main beams, having a main beam connecting end inserted into the first C-shaped sleeve; and main beam fixing steel plates, provided with first wedge shaped protrusions that are tenon-mortise-jointed with first wedge shaped recesses at both sides of the first C-shaped sleeve.

U.S. Pat. No. 10,641,003, issued 2020 May 5, to Phillip Andrew Macias describes a canopy gutter system including a rainwater collection slot disposed on the top side of a canopy for collecting rainwater from the top side of the canopy, thereby preventing the rainwater from cascading over the sides of the canopy. The canopy gutter system further includes a rainwater gutter disposed underneath the rainwater collection slot for receiving the collected rainwater and channeling the collected rainwater away from a side of the canopy, toward a corner of the canopy. The canopy gutter system further includes a spout for transporting the channeled water from the rainwater gutter downward toward the ground along a leg of the canopy.

U.S. Pat. No. 10,689,848, issued 2020 Jun. 23, to Jean-Louis Castel describes a device for collecting rainwater in a pergola including posts, a frame with beams and slats, arranged transversely, parallel to each other, the slats being articulated about a substantially median axis and being capable of assuming a substantially vertical position and a substantially horizontal position, manual or motorized unit ensuring the coordinated movements of the slats. The device includes a movable unit, rigidly connected to the slats Ln, including longitudinal deflectors.

U.S. Pat. No. 10,724,236, issued 2020 Jul. 28, to David G. Weaver describes a louvered roof system with one or more louvers. Such louvers can be combined in an assembly that is movable between an open condition and a closed condition. In the closed condition, louvers in the assembly engage one another. In such engagement, a leg extending generally transversely from one louver may include a wing that extends generally transversely to the leg and that abuts a surface of an adjacent louver. Additionally, or alternatively, in such engagement, a leg extending transversely from one louver may be received in a notch in an adjacent louver.

U.S. Pat. No. 10,781,584, issued 2020 Sep. 22, to Sheldon Grant Jackson describes a framing system for constructing at least a portion of a building. The framing system comprising beams, cross beams, corner posts, and inline posts. The beams including flanges and a wall arranged between the flanges. The cross beams including a flange and a wall attached to the flange. The corner posts including walls and flanges. The inline posts including flanges and a wall arranged between the flanges. The flanges include slots, and the walls include open areas. Panels may attach to the slots. Decorative patterns may be integrally formed in the open areas.

U.S. Pat. No. 10,920,424, issued 2021 Feb. 16, to Benjamin Robert Jones describes apparatuses, systems and methods of water management and icicle prevention for solar carports, and are designed to catch drips between rows of, and water run-off from, the low side of inclined photovoltaic modules arranged to form the roof of the solar carport or canopy.

U.S. Pat. No. 10,988,936, issued 2021 Apr. 27, to Johanes Soctanto describes a pergola louver tilt system has a crossbeam with a track with a track groove. The system also has a post mounted on the crossbeam. A louver clip is pivotally mounted to post at a post joint. A louver is mounted to the louver clip. A pivot link is pivotally mounted to the louver clip. A stem is mounted to slide on the track groove. The pivot link is pivotally mounted to the stem at a stem connection pivot formed on the stem. A link connecting the stem to an adjacent stem, wherein the link includes a first link connection and a second link connection, wherein the first link connection connects to an adjacent stem, and wherein the second link connection connects to a subsequent stem.

U.S. Pat. No. 11,085,196, issued 2021 Aug. 10, to Dee Volin describes a four-device-in-one skybox dehydrator sauna wind-redirecting bungalow comprises: adjustable louver blades attached to side gutter beams for preventing rainwater from getting into the bungalow and adjustably controlling amount of sunlight that shines into the bungalow, chutes formed to the side gutter beams and end gutter beams, drain openings formed into the corner-posts, corner-post-base-plate covers slidably attached onto the corner-posts, corner-post base-plates secured to the corner-posts, sliding-door track attached to the corner-post base-plates, the panel frames interchangeably and slidably placed into the sliding-door track, anchoring-screw holes drilled into the corner-post base-plates, and tube-screws screwed into the anchoring-screw holes for leveling bungalow when installed on an uneven ground surface and securing the corner-post base-plate to a ground surface and providing adjustment points for each corner-post base-plate, and anchoring bolts screwed through the tube-screws and the anchoring-screw holes.

U.S. Pat. No. 11,091,914, issued 2021 Aug. 17, to Caihua Shan describes a louver canopy comprising a frame with a top disposed with parallel rafters; a plurality of louvers rotationally connected between the rafters and sequentially arranged along a length direction of the rafters, the louvers are disposed at intervals and parallel to each other, each of the louvers includes an elongated flashing; a baffle connected to a first long side of the flashing; an elongated first guide groove formed between the baffle and the flashing; When the louvers rotate to a closed state, an opening of the first guide groove faces upward, and a second long side of the flashing passes over a top of the baffle of an adjacent louver of the louvers and positions above the first guide groove of the adjacent louver.

U.S. Pat. No. 11,149,438, issued 2021 Oct. 19, to Hal Torman describes an improved louvered panel assembly having a louver panel with at least a first louver and a second louver and a pivot bar that extends therebetween. A control arm is secured between the pivot bar and an operator to rotate the louver panel between open and closed positions. The first and second louvers include a central receiver that receives a first bearing surface to rotate the louvers about a rotational axis extending therethrough. A leading projection extends from the first louver and is rotated downward as the first louver operates between open and a closed position. A trailing projection extends from the second louver and is rotated upward as the second louver operates between open and a closed position. An elongated track is positioned below the louver panel and is spaced from the louver panel by a flap structure having a sealing membrane.

U.S. Pat. No. 11,168,481, issued 2021 Nov. 9, to Frederick Rieber describes a louver system including a louver assembly mounted to a frame. The louver assembly includes first and second side members mounted to respective side elements of the frame, and a number of slat subassemblies with respective slat bodies that are rotatable about respective axes of rotation thereof. The slat bodies are rotatably held between the first and second side members by pivot pins. The pivot pins include one or more extended pivot pins, for securing the louver assembly to the side elements of the frame. Each extended pivot pin extends between inner and outer ends thereof. The outer end is formed to be partially positioned in a selected one of the side elements, and to engage an outer side of the selected side element. The inner end is formed for location in a selected one of the slat bodies, to rotatably secure the selected slat body between the side elements.

U.S. Pat. No. 11,371,251, issued 2022 Jun. 28, to Miles Koolmeister describes a climate shelter with a cover defining a valence and a moisture diverter proximate to a horizontal support. A side panel is releasably secured to the cover under the valence. The side panel includes a slot passage interior relative to the valence. The moisture diverter has an opening, a plurality of downwardly converging passage walls, and a moisture chute extending downwardly and outwardly relative to the walls. At least a portion of the moisture chute extends outwardly through the slot passage. Moisture contacting the cover enters the opening and is directed downwardly and outwardly by the walls into the moisture chute, and then outwardly for discharge exterior to a side panel. A portion of the discharge chute is disposed between the side panel and the valence.

U.S. Publication No. US2004/0148899, issued 2004 Aug. 5, to Lawrence Pertile describes a roof assembly, comprised of a frame and a plurality of louvers rotatably mounted within the frame, each louver having a channel running along its longitudinal axis. The assembly may also include a gutter located at one end of the frame below the louvers and running perpendicular to the longitudinal axes of the louvers. Also, the assembly further includes a mechanism for rotating the louvers from an open position to a closed position. The result is that liquid can flow along the channels in the louvers and into the gutter.

U.S. Publication No. US2011/0072736, issued 2011 Mar. 31, to John Flynn Gullett describes processes of making slightly sloped roofing members/products (30, 130) for drainage of essentially flat roofs and the products (e.g., sloped roofing members) produced thereby are provided. Some of the processes comprise feeding a series of mold members (50, 150) in a conveyance direction (26) toward a laminator (22) wherein the sloped roofing members are cured. In various embodiments such processes comprise feeding a bottom facer (42) in the conveyance direction toward the laminator (22); depositing a foam-forming mixture (46) on the bottom facer (42); feeding a top facer (44) in the conveyance direction toward the laminator whereby the foam-forming mixture is interposed between the bottom facer (42) and the top facer (44); feeding the series of mold members (50, 150) in the conveyance direction toward the laminator (22) and beneath the bottom facer (44); and curing the foam-forming mixture in the laminator to form a solidified web comprising the sloped roofing member (28, 128). Each of the mold members (50, 150) is configured to impart at least one non-orthogonally sloped surface to a corresponding sloped roofing member.

U.S. Publication No. US2011/0179741, issued 2011 Jul. 28, to Chih-Cheng YEN describes a modular building system. The modular building includes a plurality of prefabricated joints having open-ended hollow arms extending orthogonally along at least two directional axes, as defined by a 3-dimensional rectangular coordinate system. The system further includes a plurality of pre-fabricated beams detachably insertable into the open-ends of the hollow arms of the joints and connectors removably securing the beams in the hollow arms of the joints. The joints and beams are assembled to build a variety of modular grid-frame structures in accordance with pre-determined assembly plans.

SUMMARY

Disclosed are example embodiments of a five-device-in-one double-stacked internal-gutters, which is economical to produce, is easy to ship, and can be quickly and easily assembled and disassembled. Particularly, the present invention relates to five-device-in-one anti-leaking noise-canceling anti-twisting anti-warping anti-vibrating double-locking double-core double-deck double-stacked internal-gutters (for being adapted to pergola, RV, house, solar panel, and concert stage), which comprise: Anti-leaking noise-canceling rainwater-shedding rainwater-guiding clamp-shield roof system, anti-twisting anti-warping anti-vibrating double-locking double-core double-deck double-stacked-internal-gutter systems, Double-gutter-supporting-and-locking corner parapet-post systems, Double-gutter-supporting-and-locking center parapet-post systems, and 6 expandable foot-locking sleeve-bolt systems.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Disadvantages of the Prior Art

Figure 3:
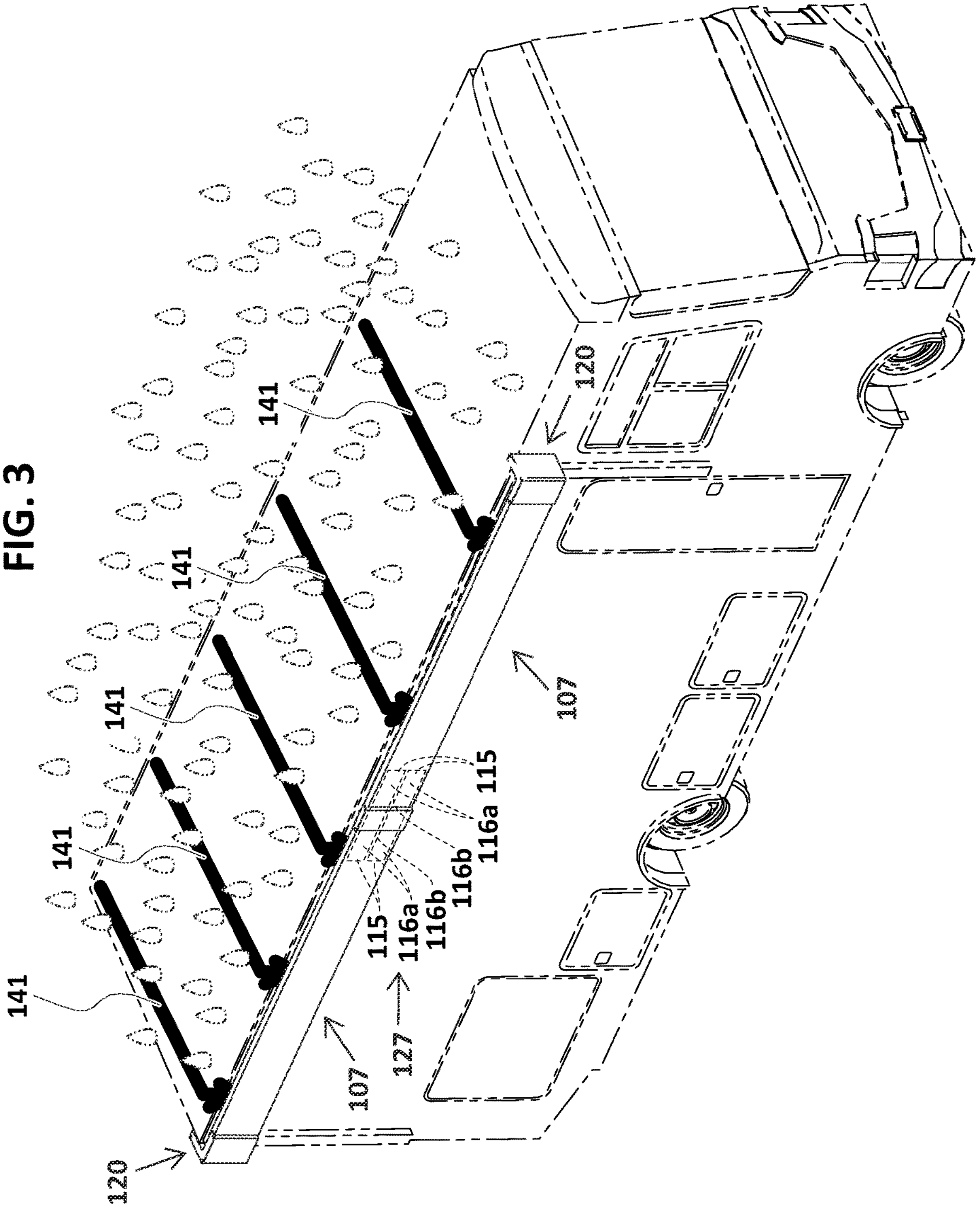
FIG. 3-FIG. 7 illustrate perspective views demonstrating additional applications of the five-device-in-one anti-leaking noise-canceling anti-twisting anti-warping anti-vibrating double-locking double-core double-deck double-stacked internal-gutters being used to reinforce, to connect, and to support horizontal posts, vertical posts, and gutters to shed rainwater and leaves from a pergola, an RV, stage, house, solar array, and an awning, respectively.
Figure 4:
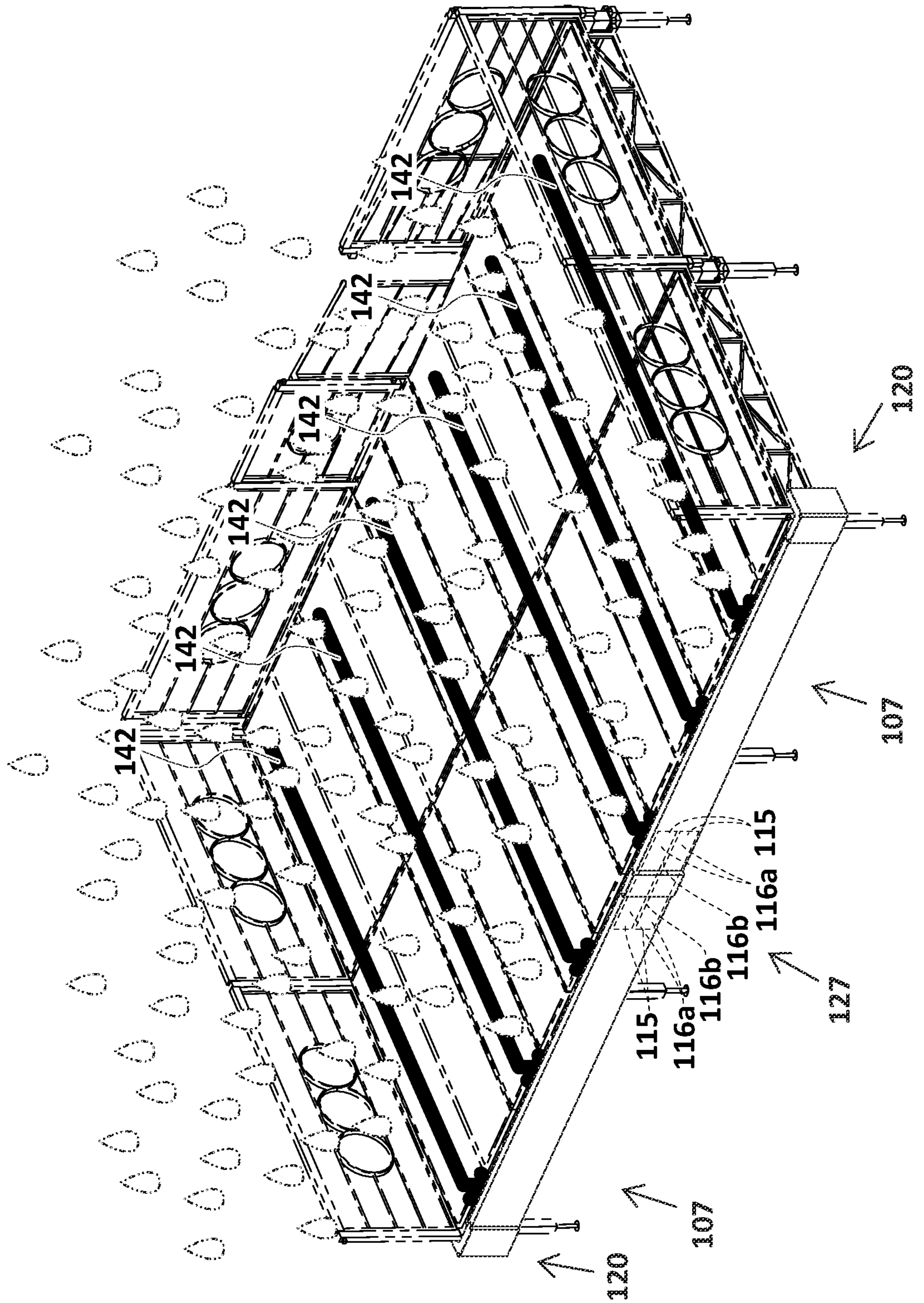
Figure 5:
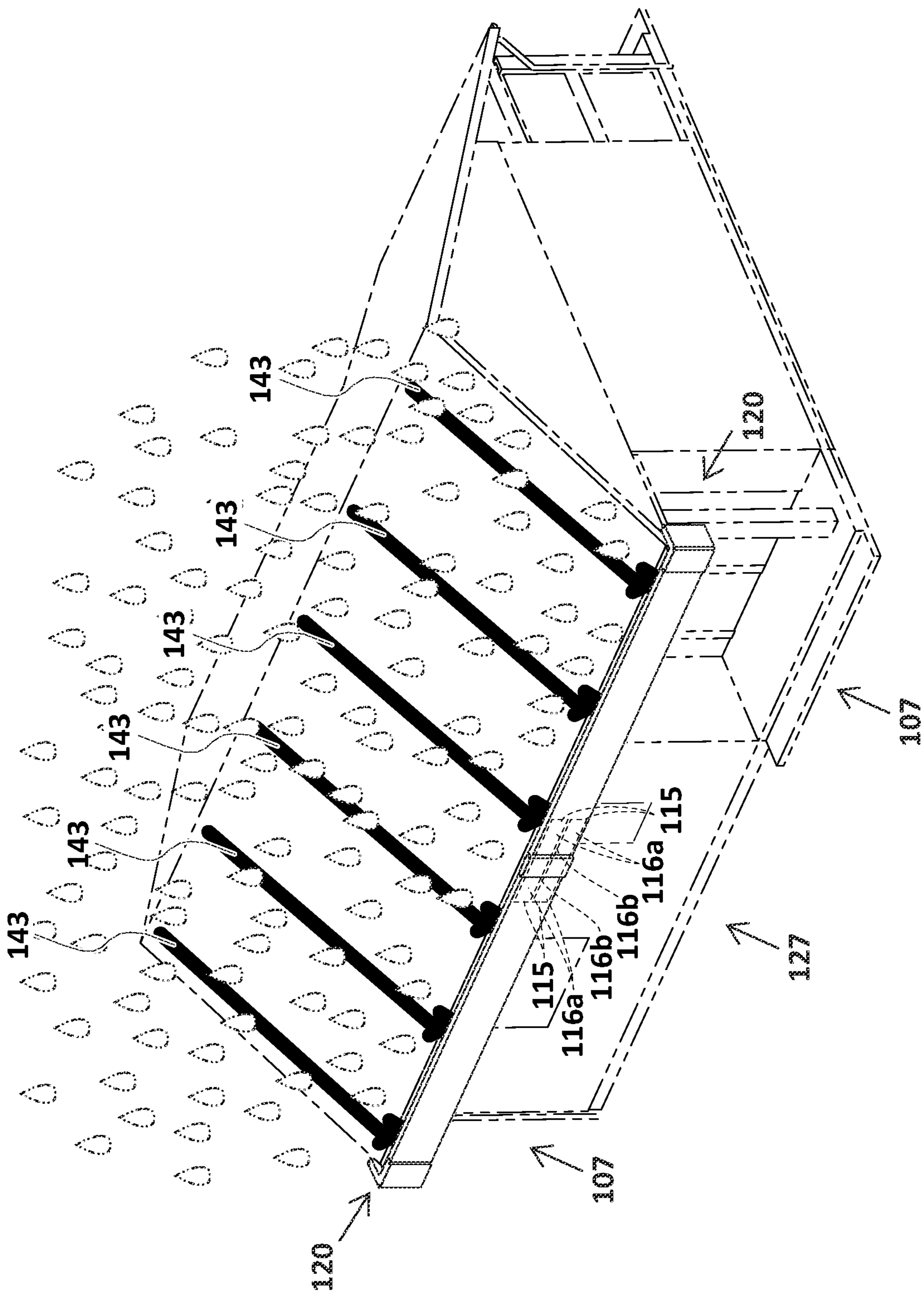
Figure 6:
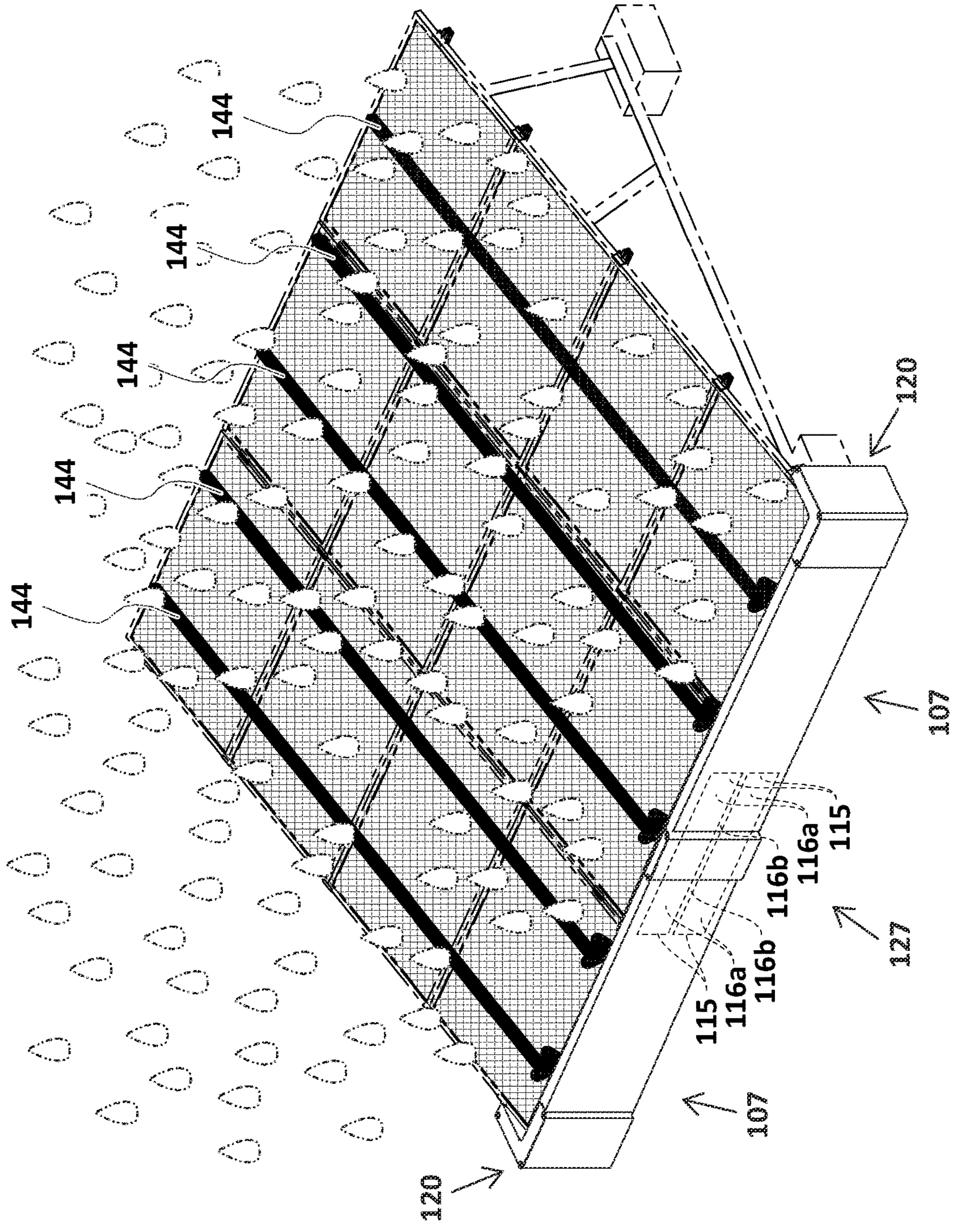
Figure 7:
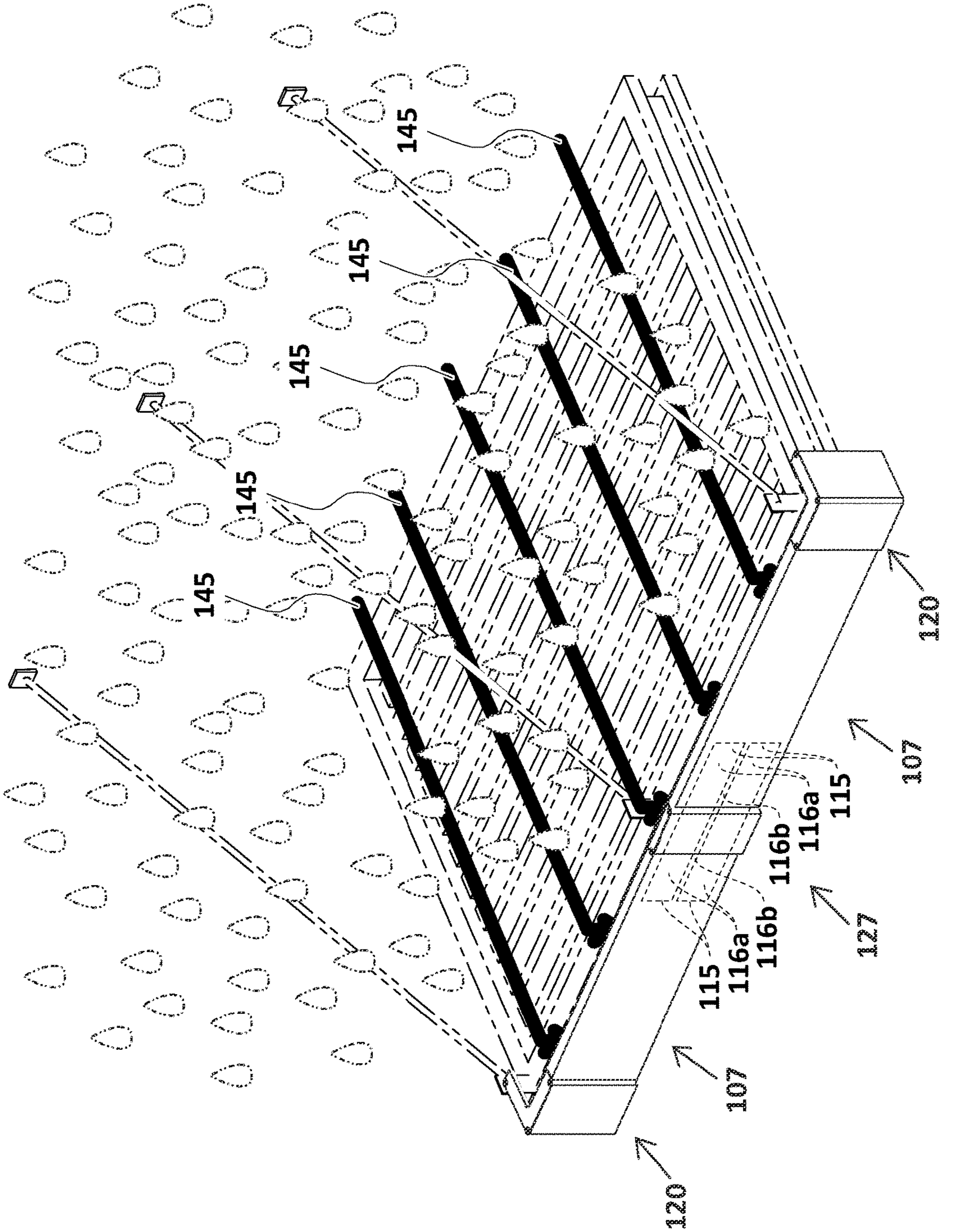
Figure 8:
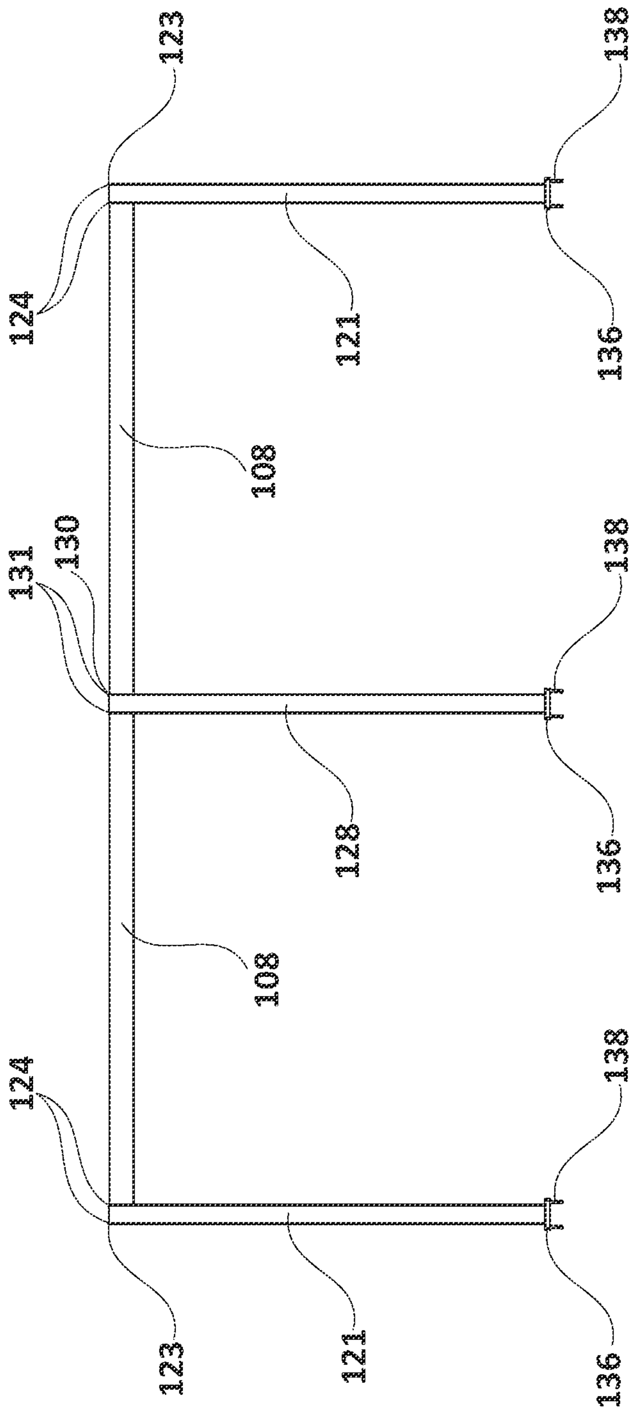
FIG. 8-FIG. 11 illustrate perspective, top, side, and side-exploded views demonstrating assembly of the five-device-in-one anti-leaking noise-canceling anti-twisting anti-warping anti-vibrating double-locking double-core double-deck double-stacked internal-gutters.
Figure 9:
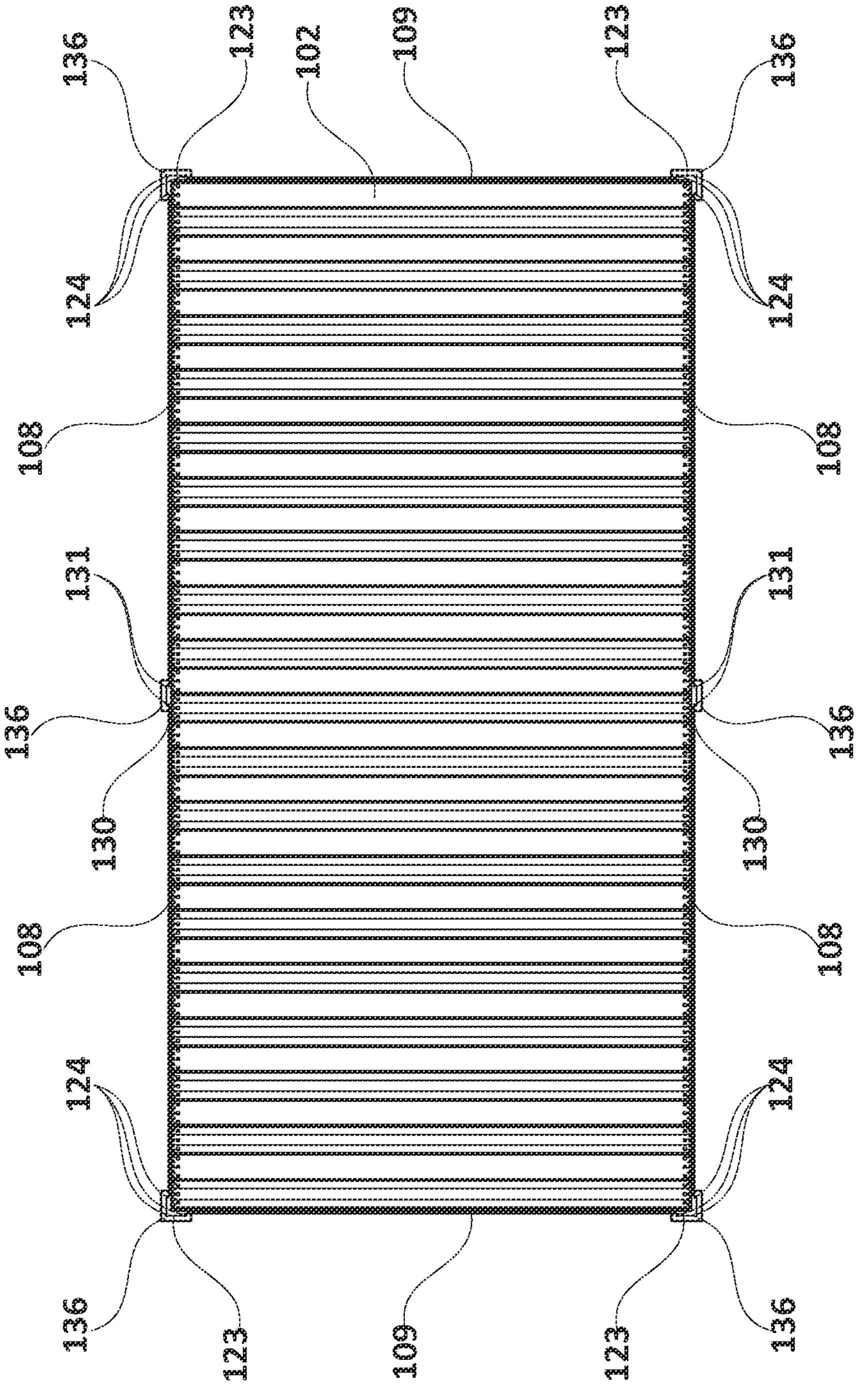
Figure 10:
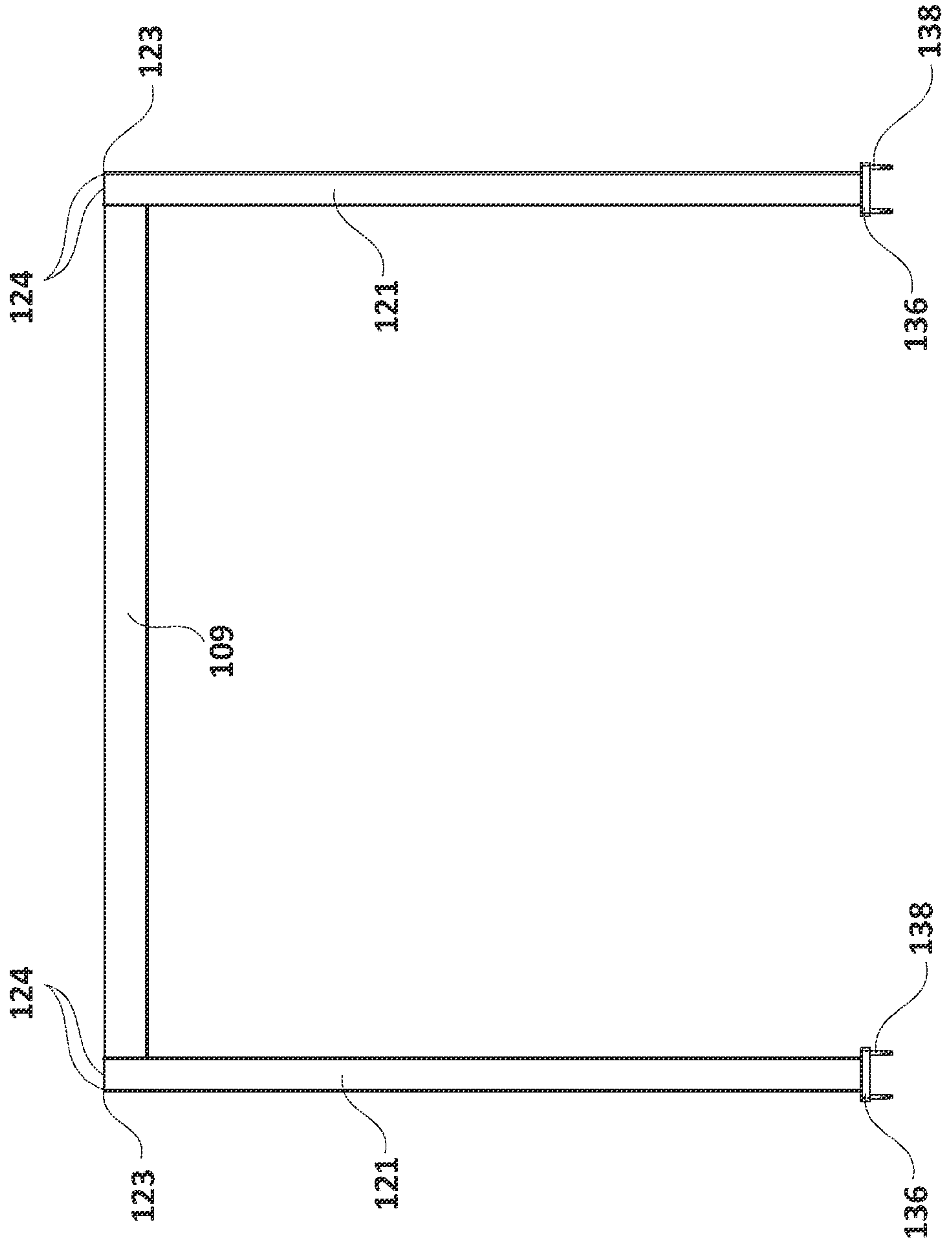
Figure 11:
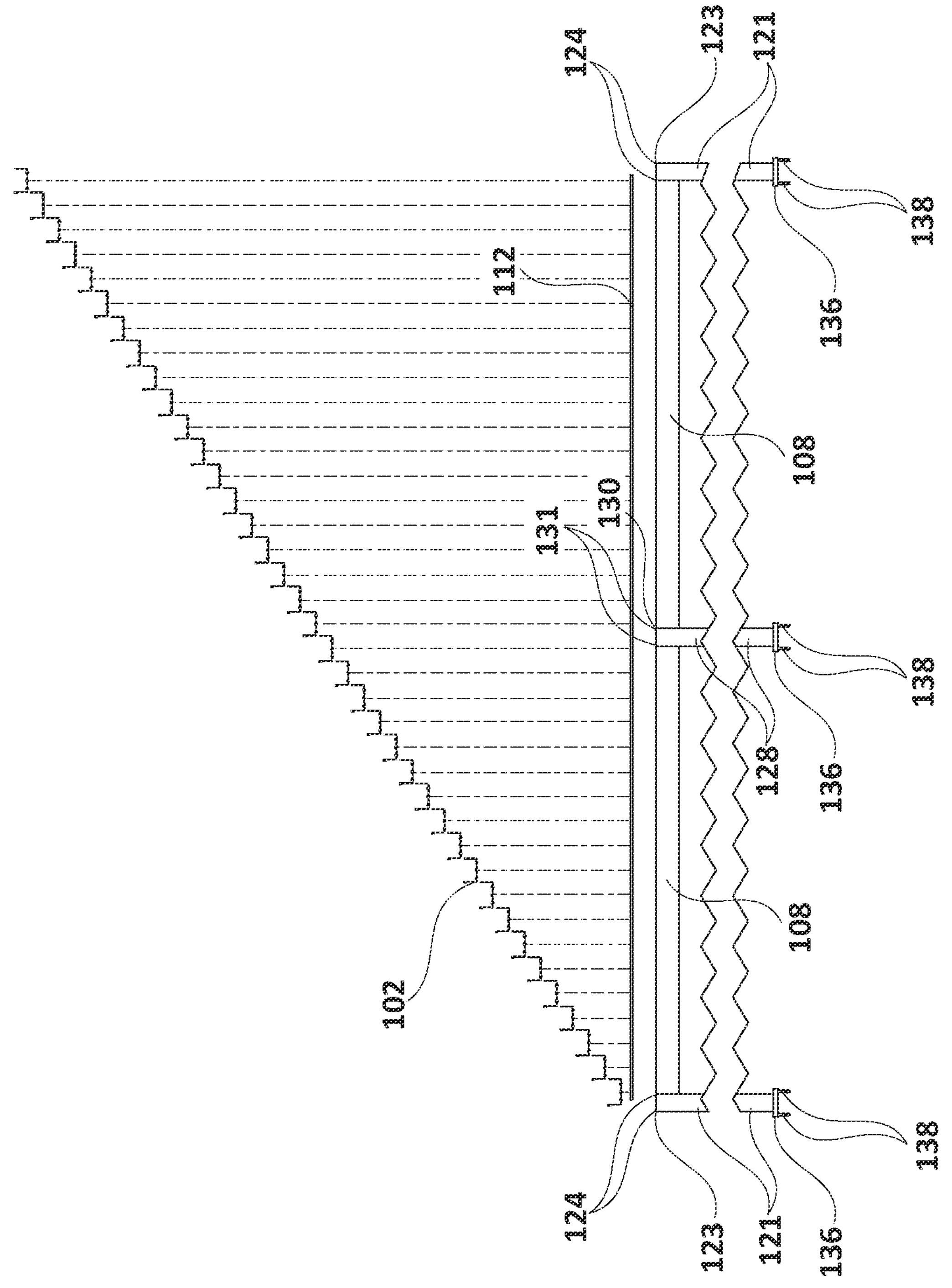
Figure 12:
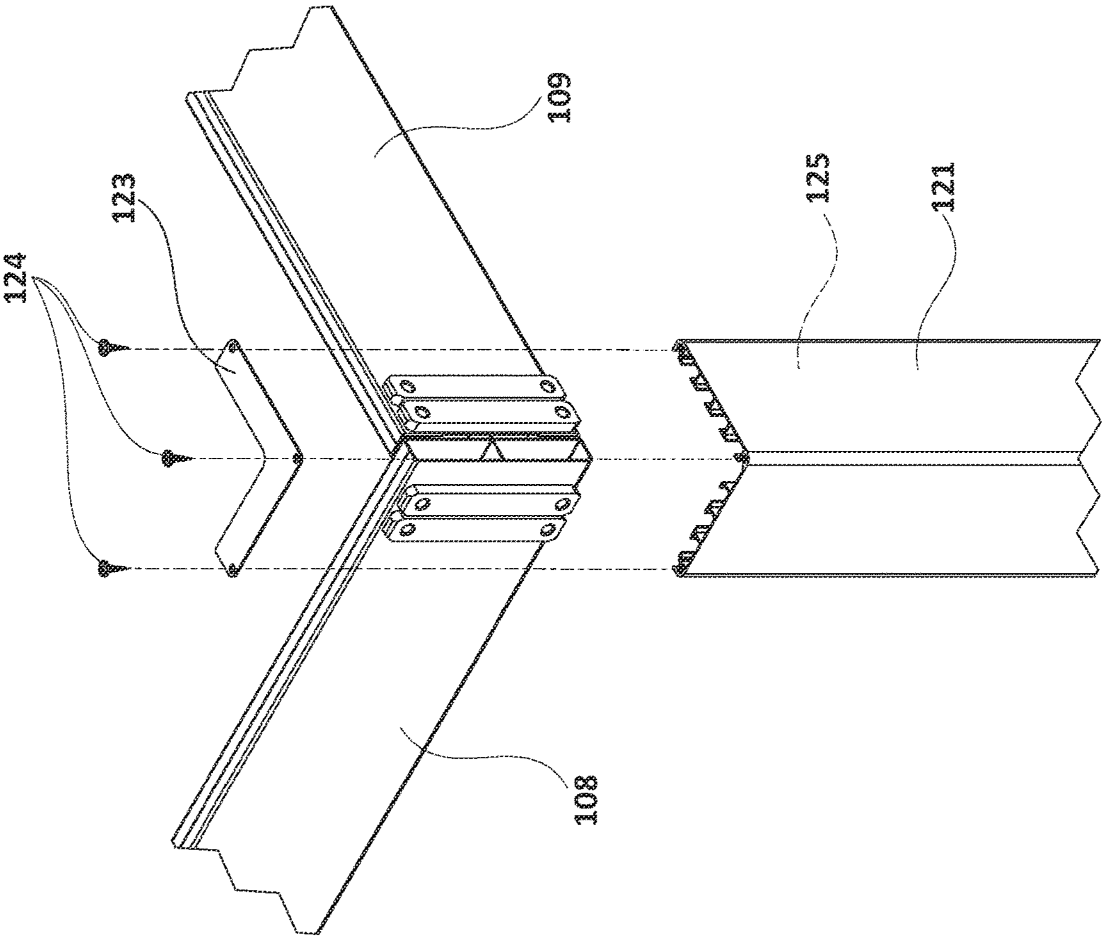
FIG. 12-FIG. 92 illustrate perspective, side, front, back, and top views demonstrating components and assembly of the five-device-in-one anti-leaking noise-canceling anti-twisting anti-warping anti-vibrating double-locking double-core double-deck double-stacked internal-gutters.
Figure 13:
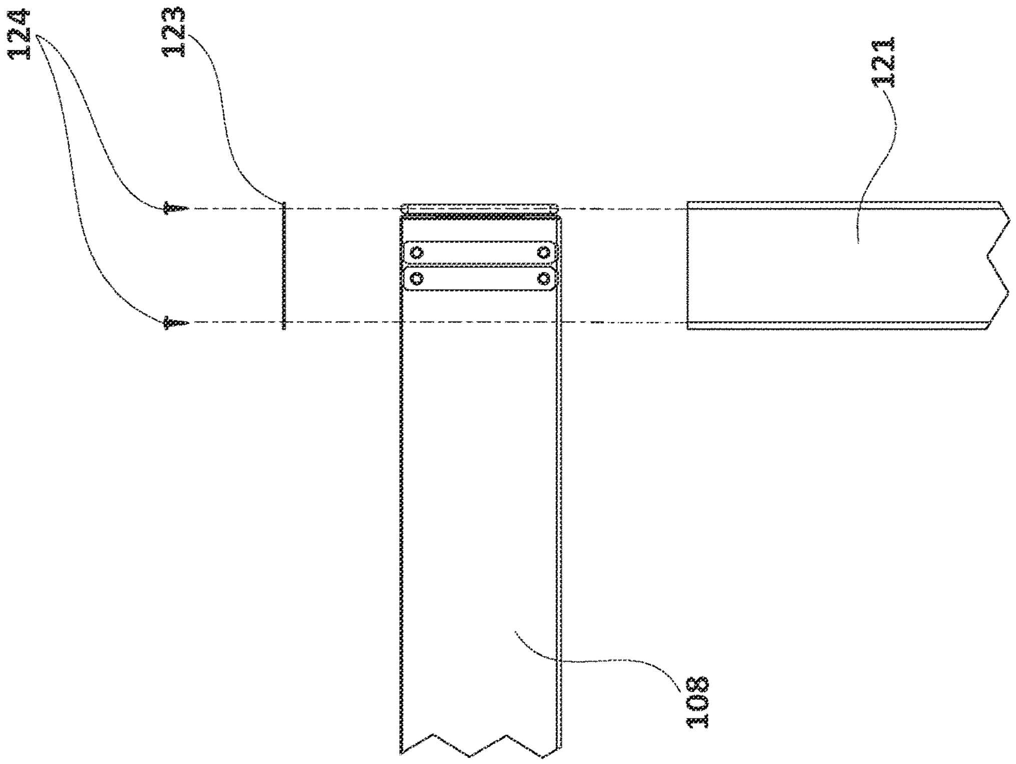
Figure 14:
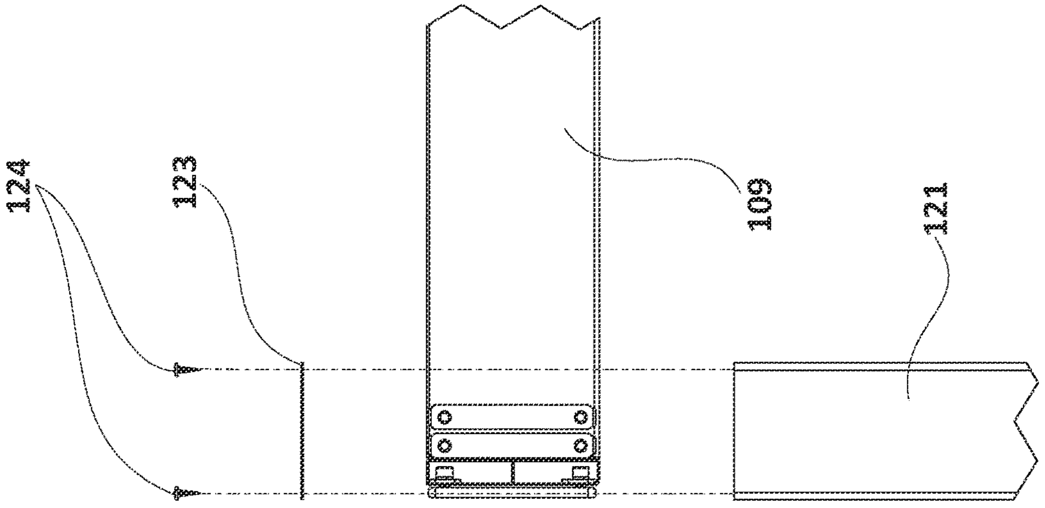
Figure 15:
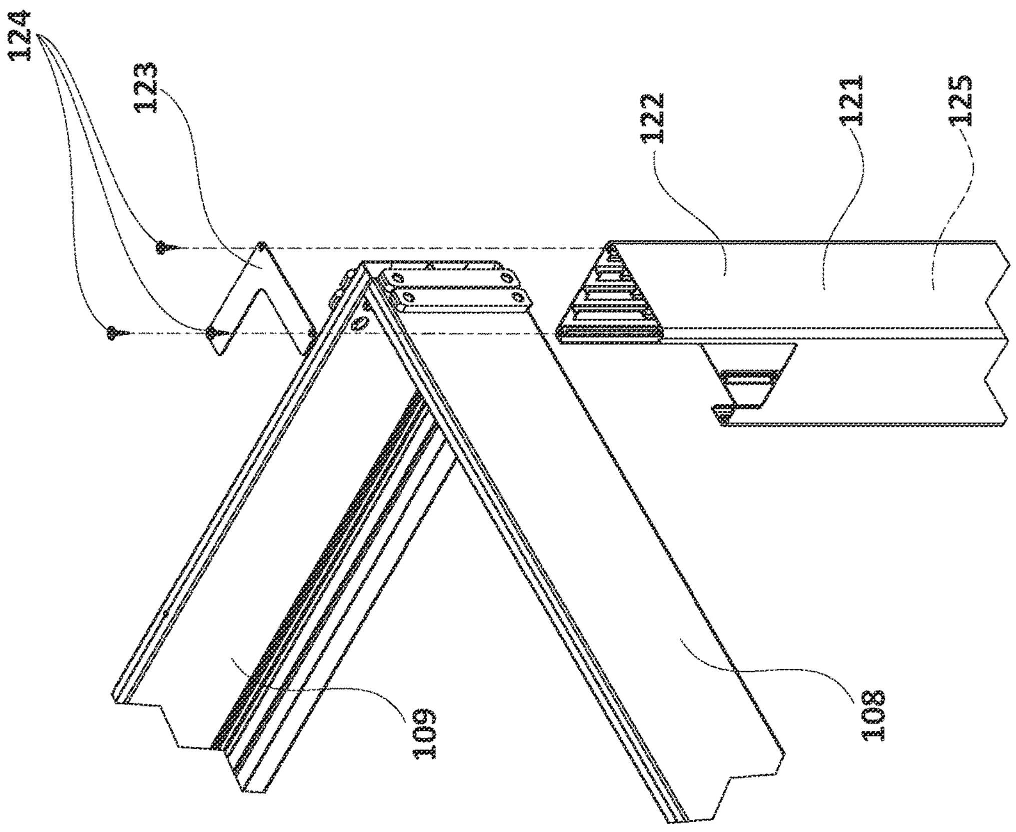
Figure 16:
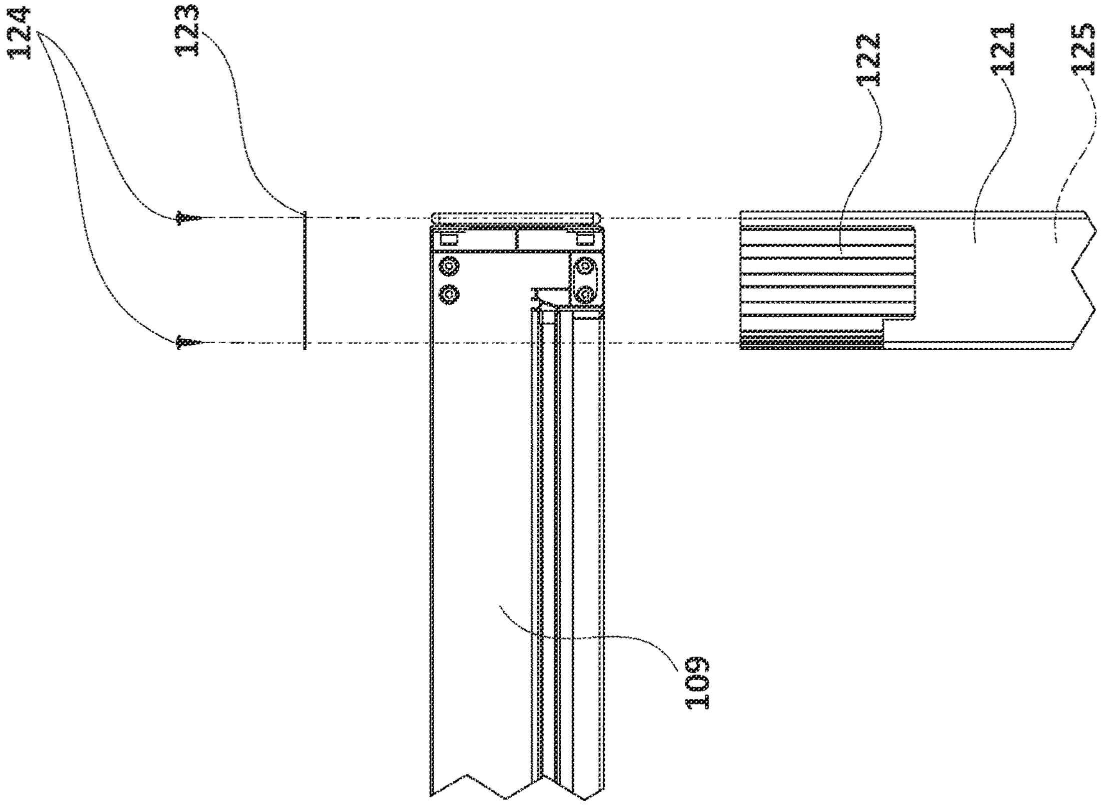
Figure 17:
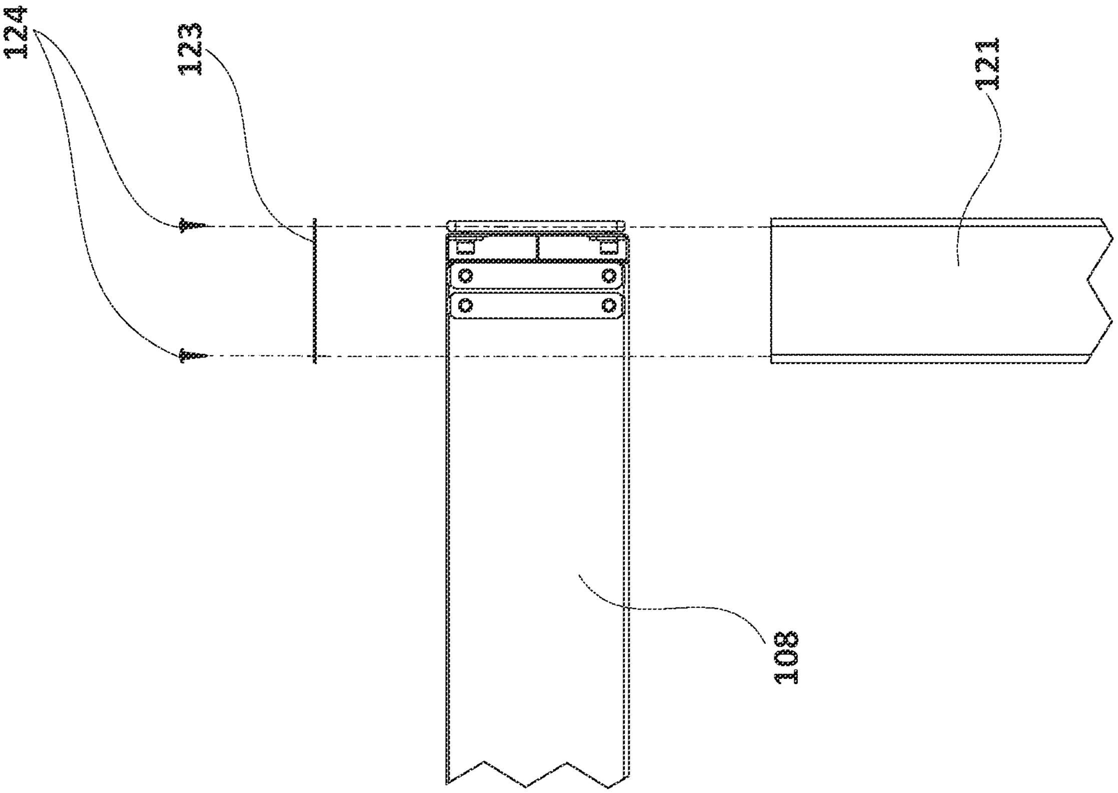
Figure 18:
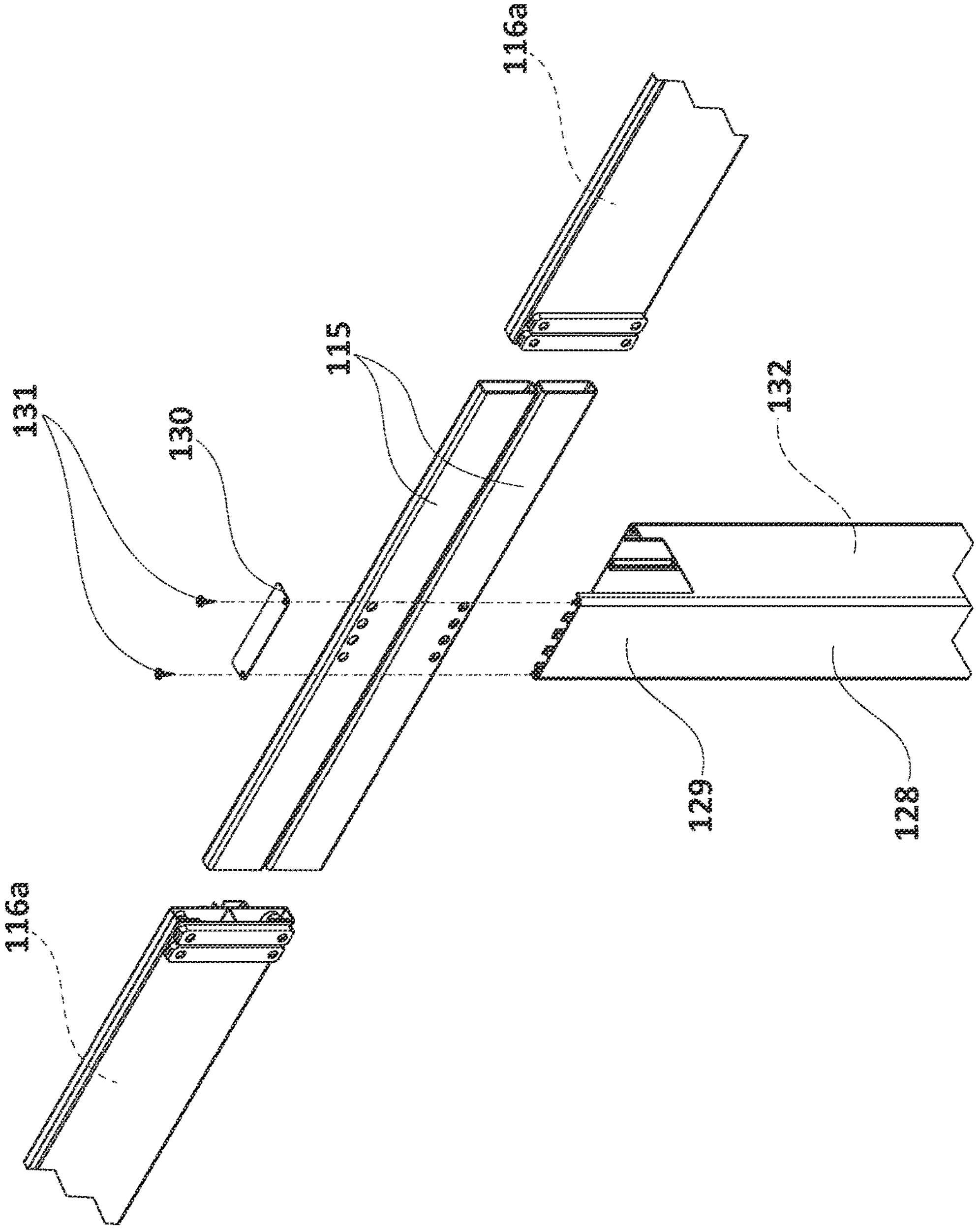
Figure 19:
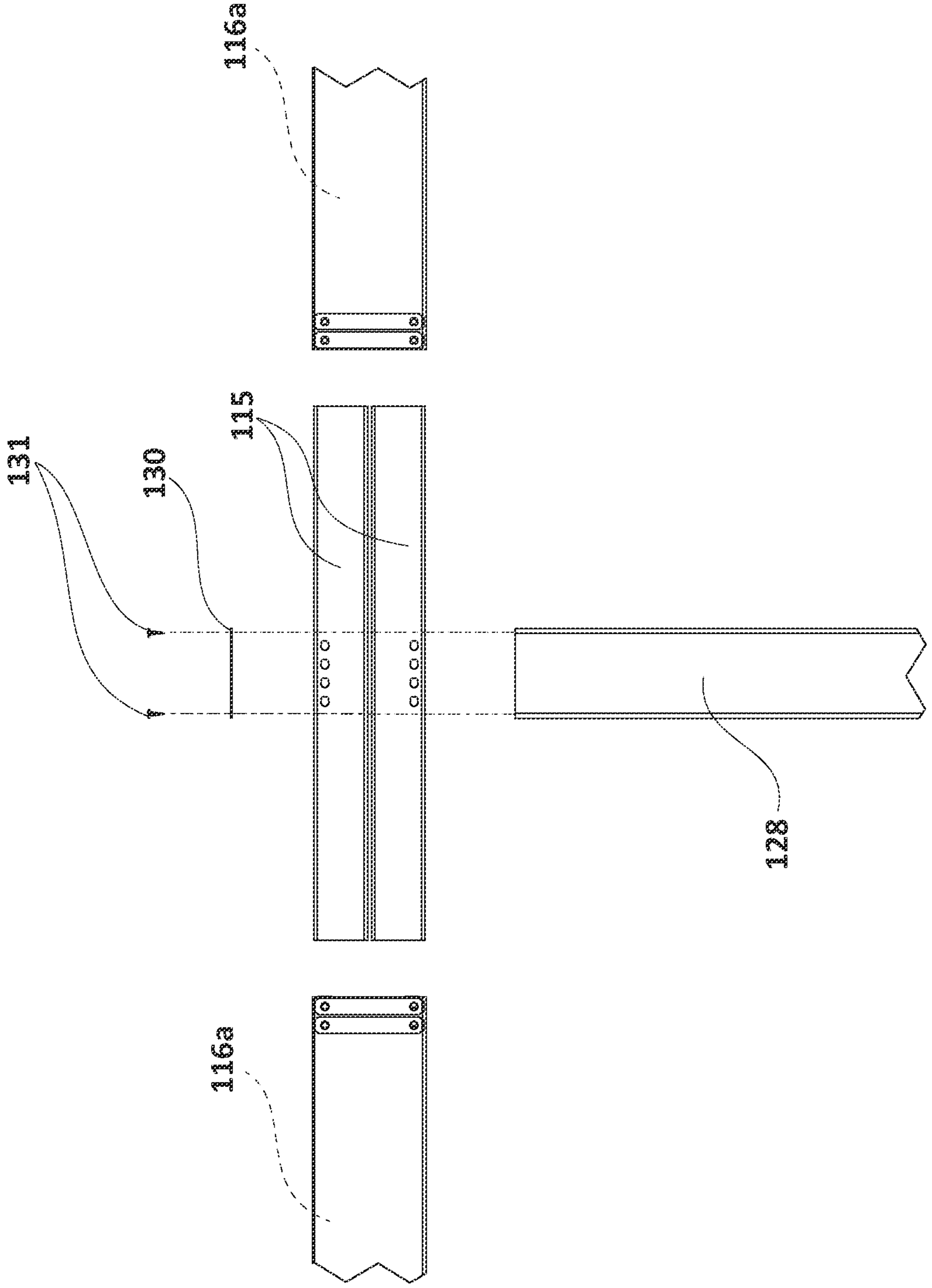
Figure 20:
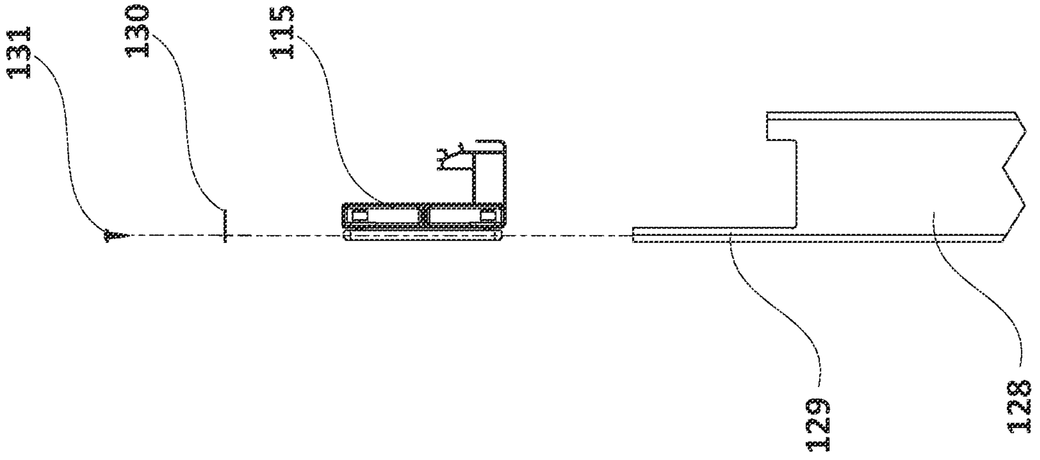
Figure 21:
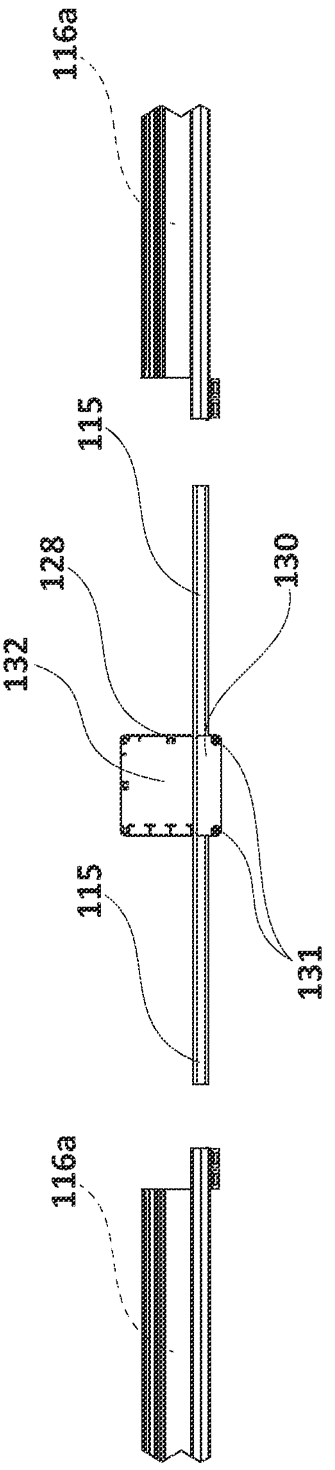
Figure 22:
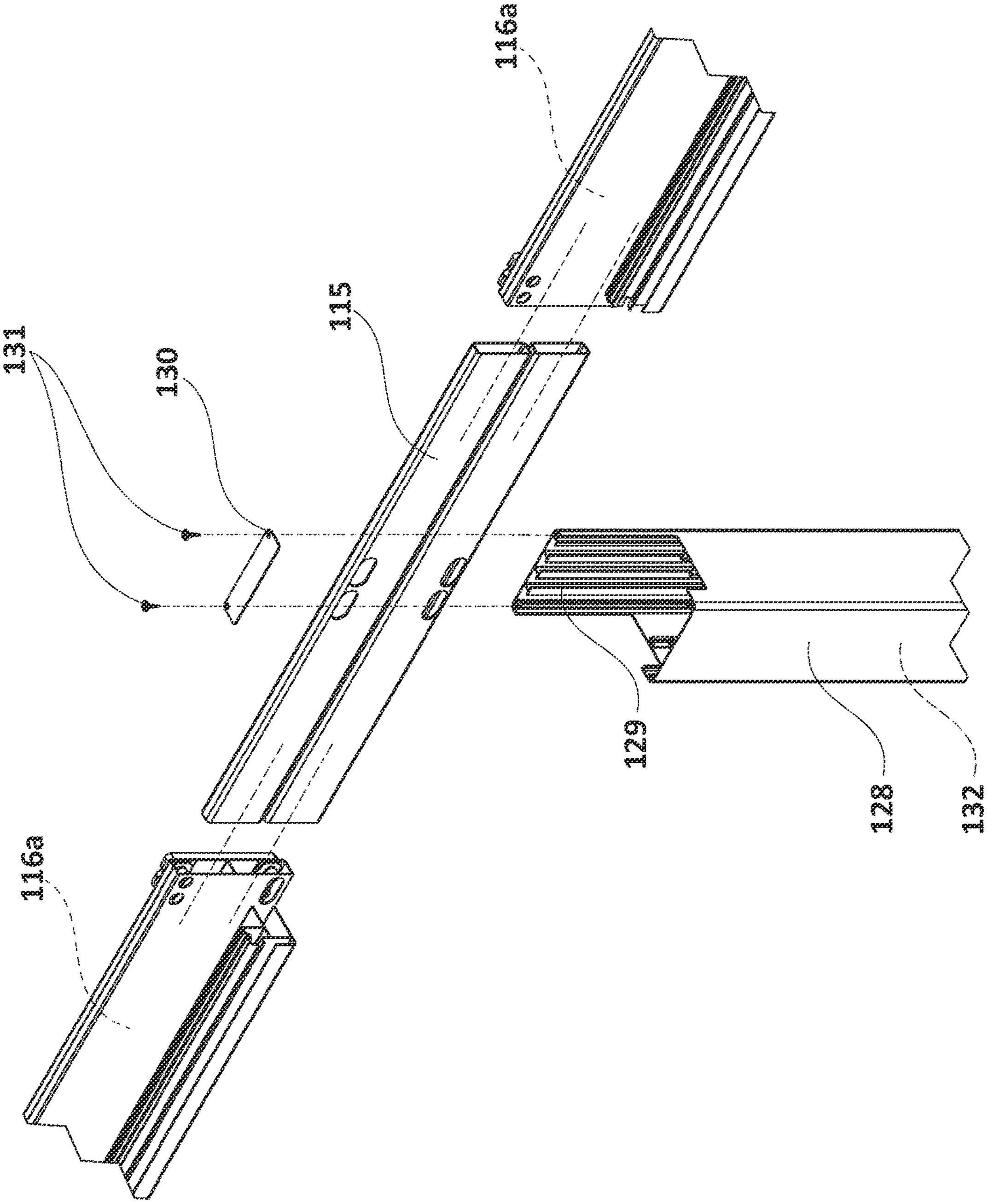
Figure 23:
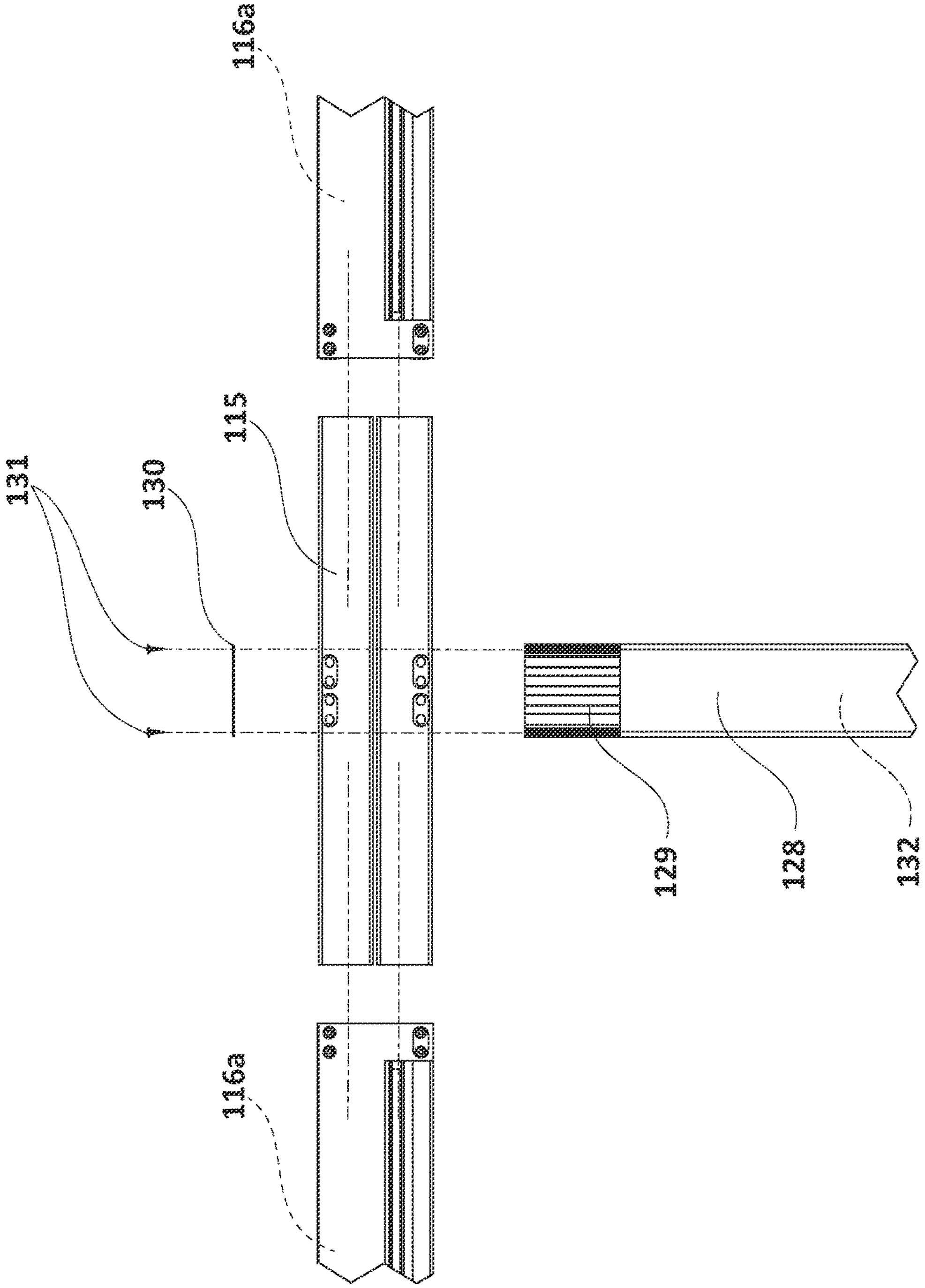
Figure 24:
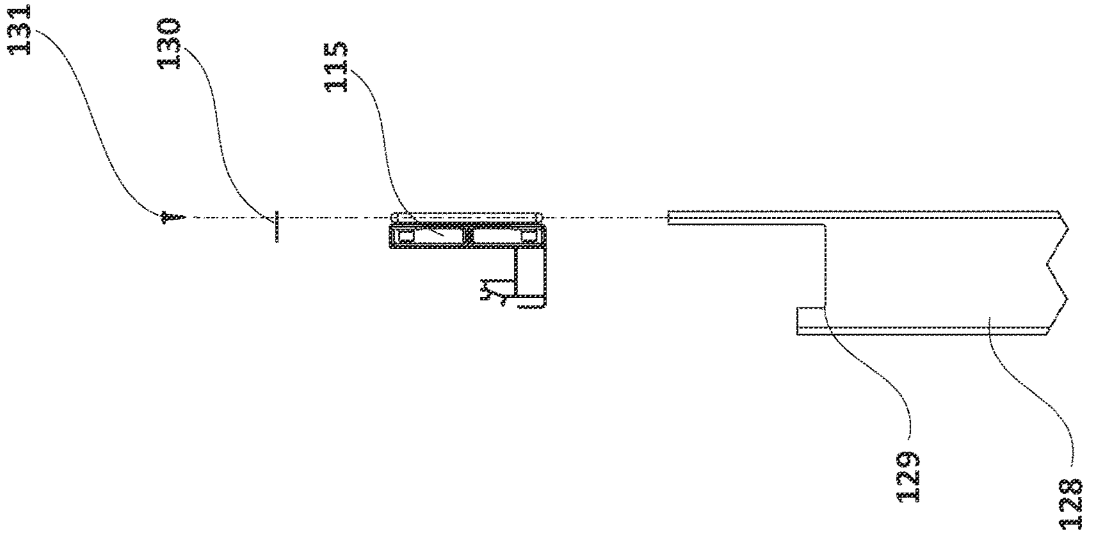
Figure 25:
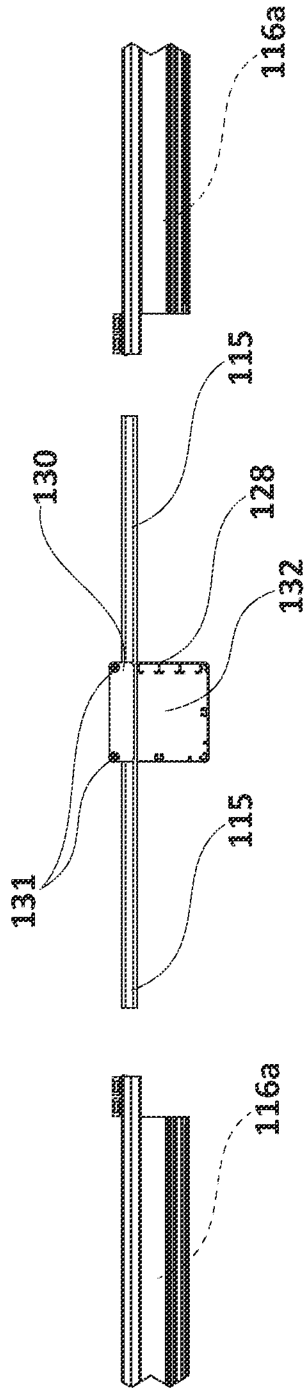
Figure 26:
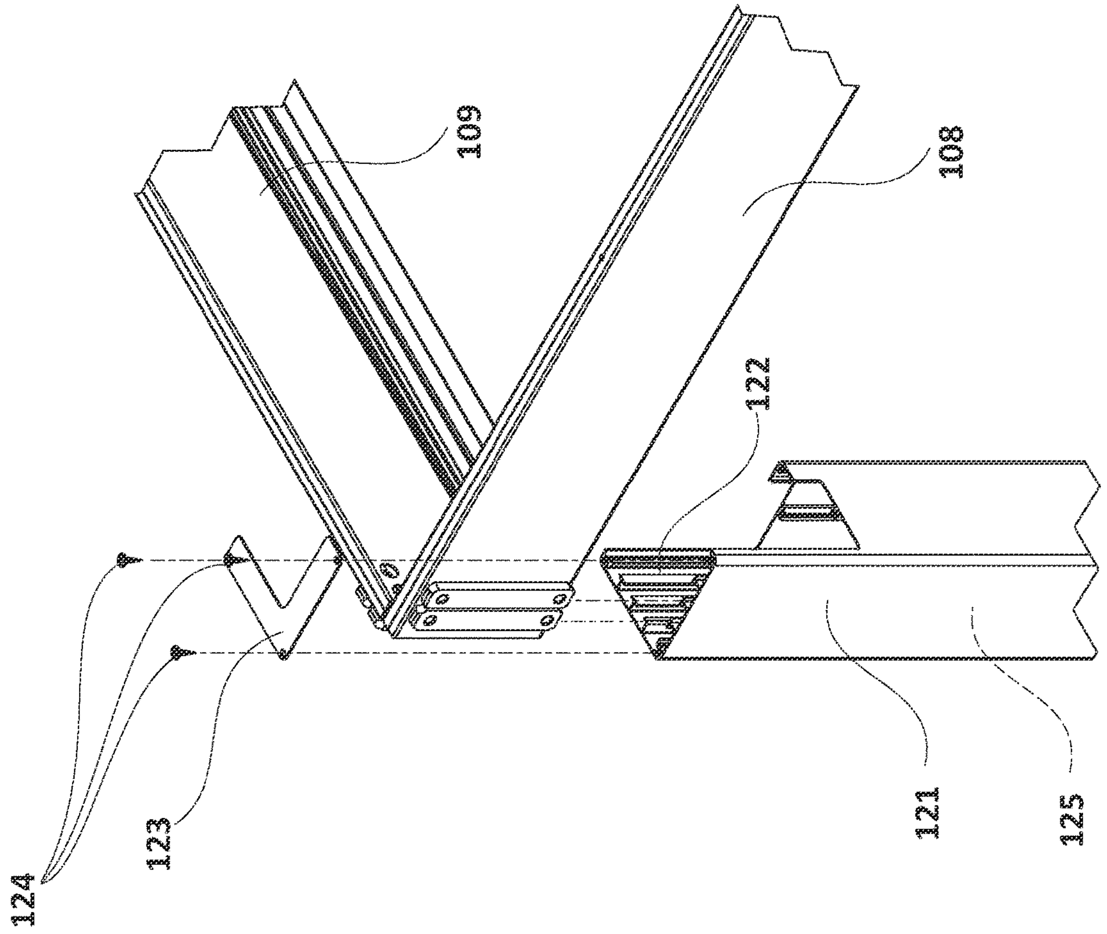
Figure 27:
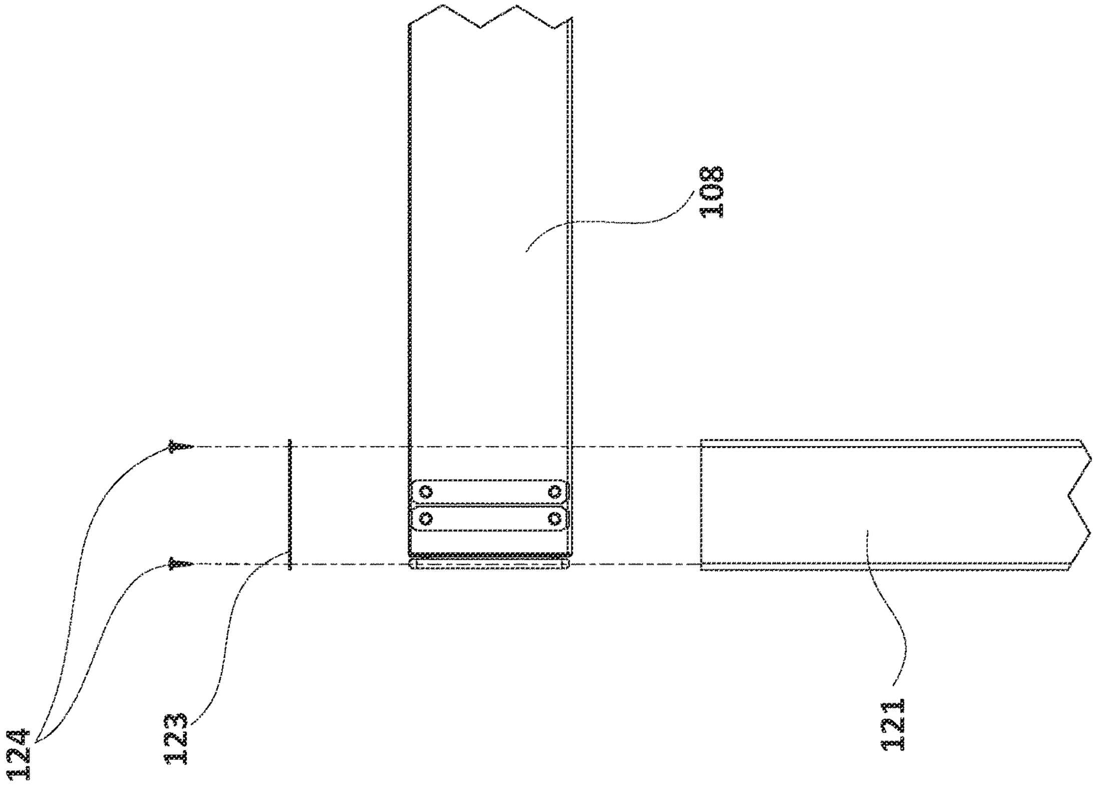
Figure 28:
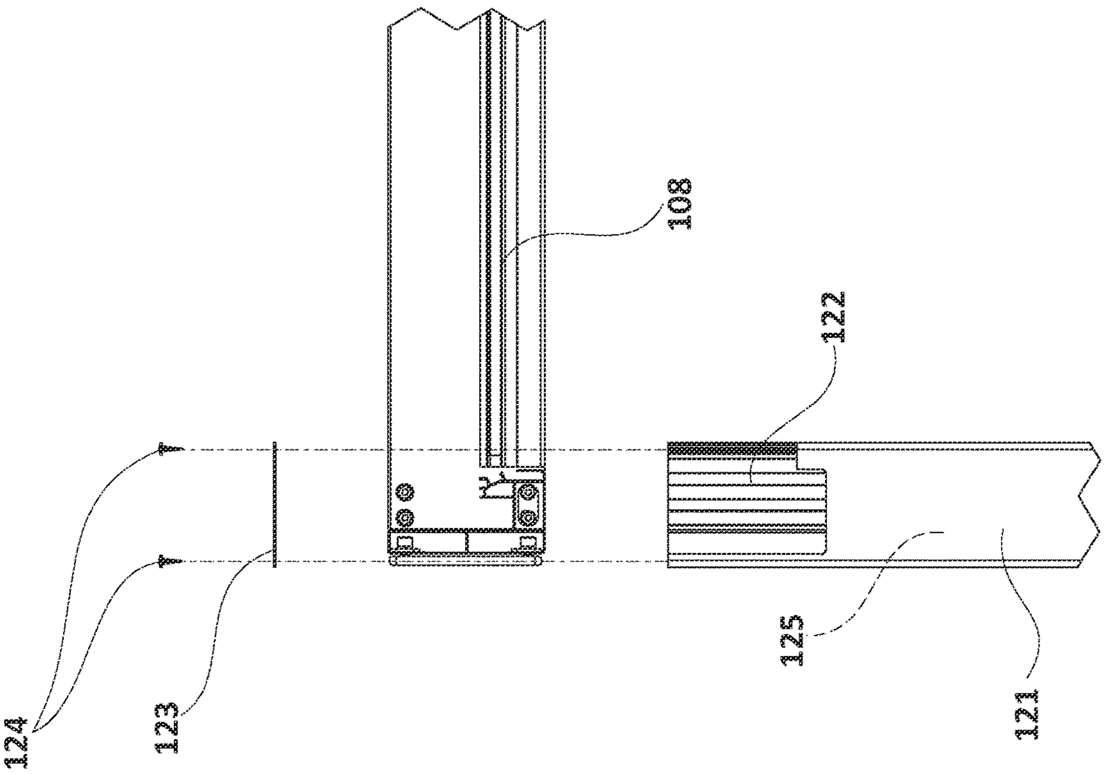
Figure 29:
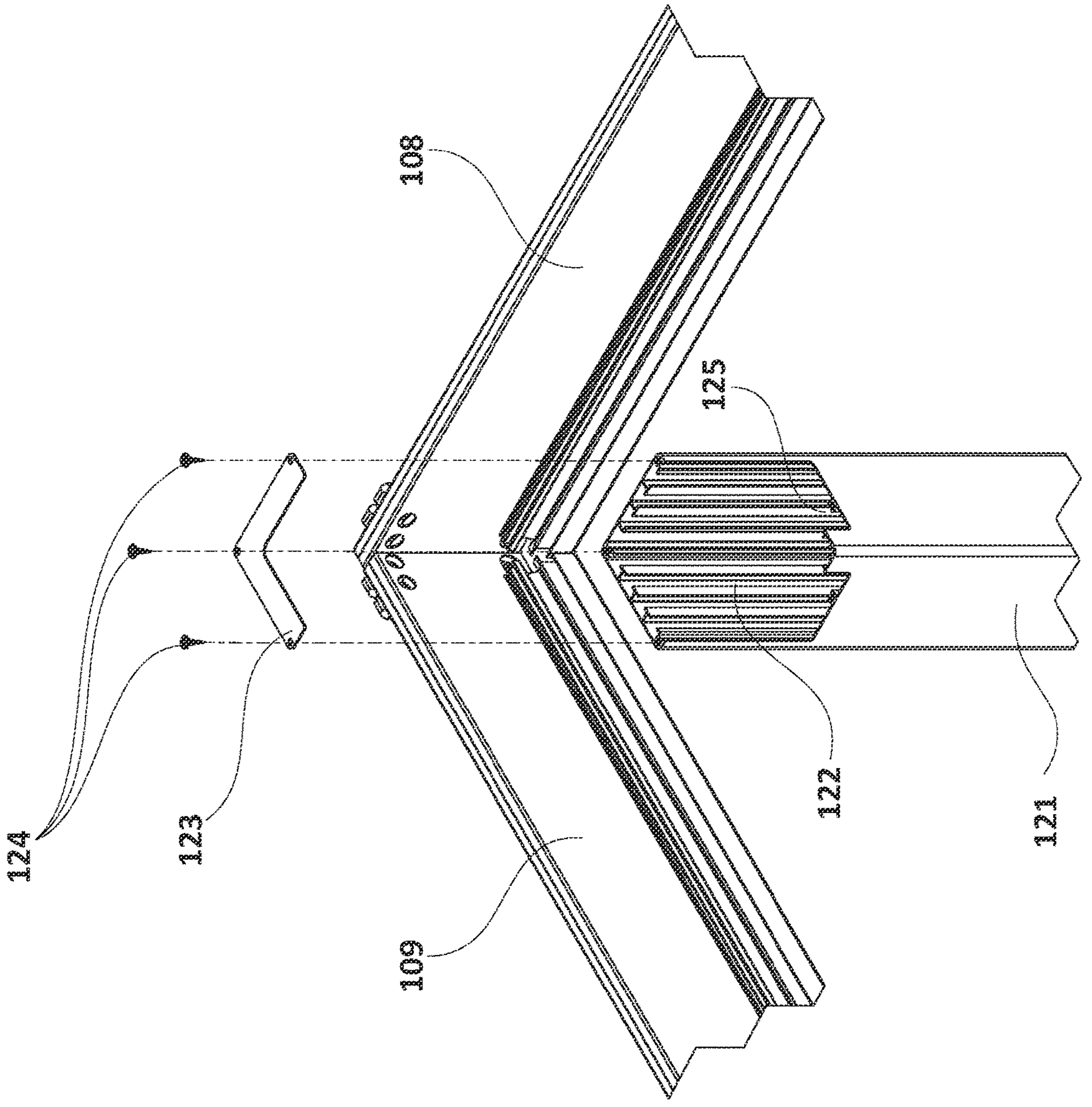
Figure 30:
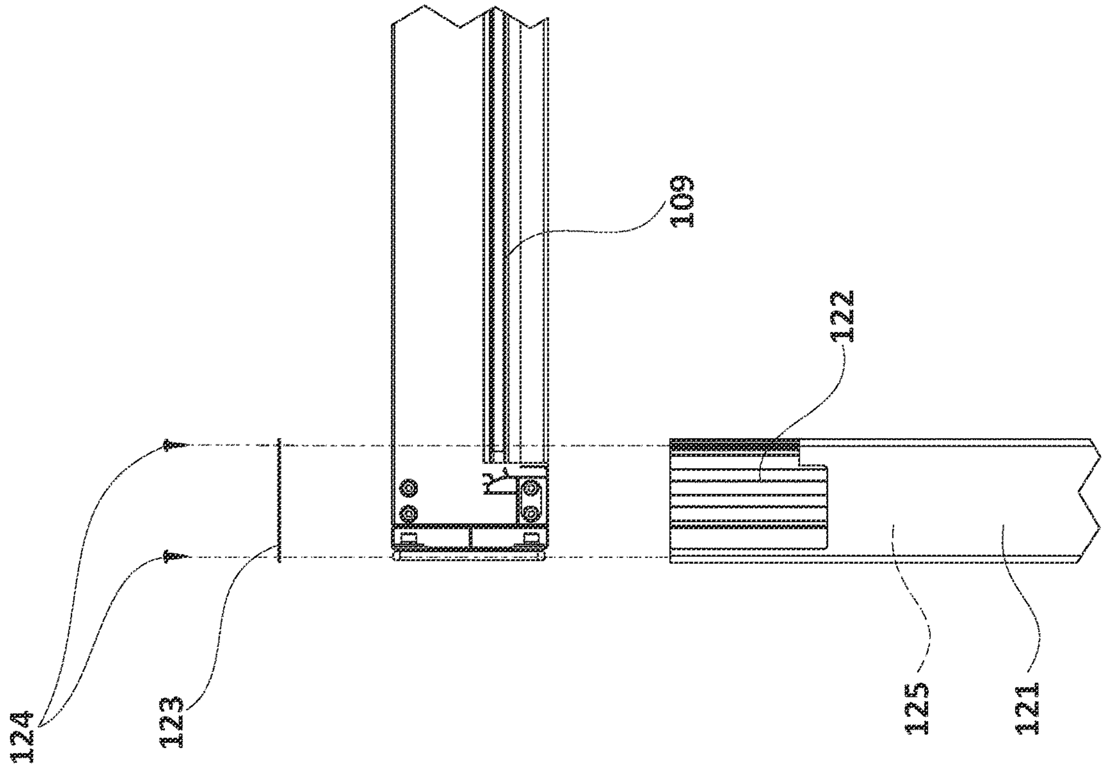
Figure 31:
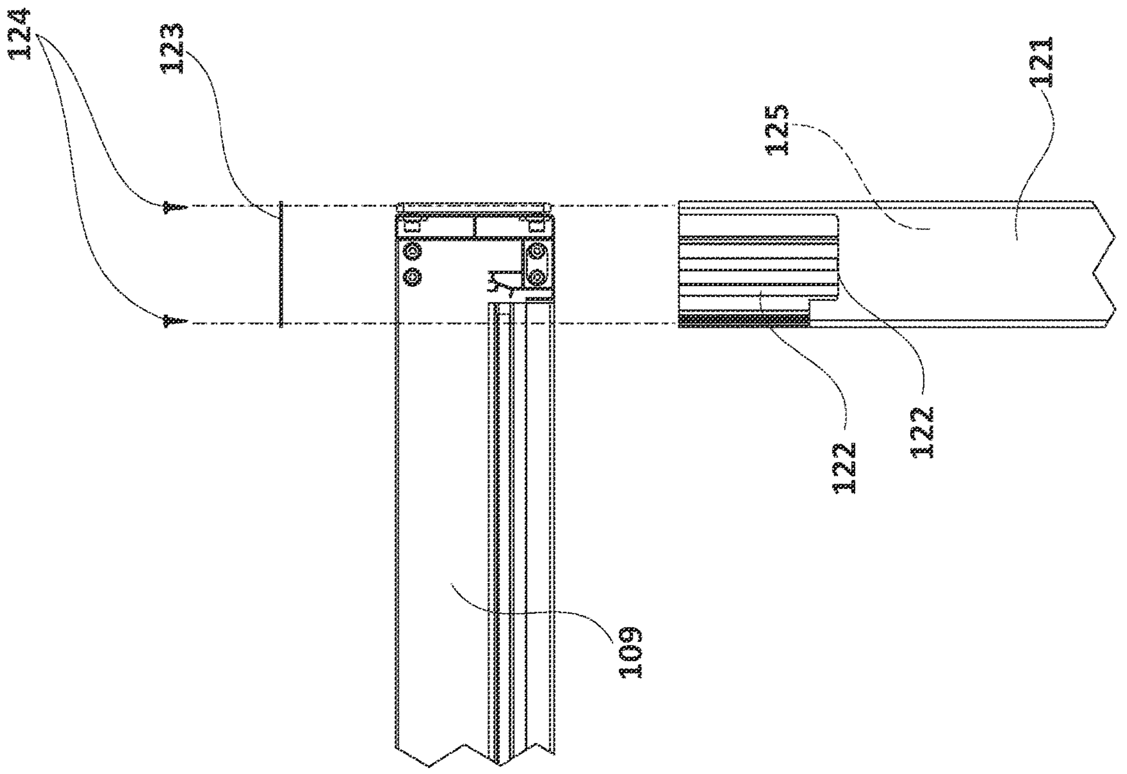
Figure 32:
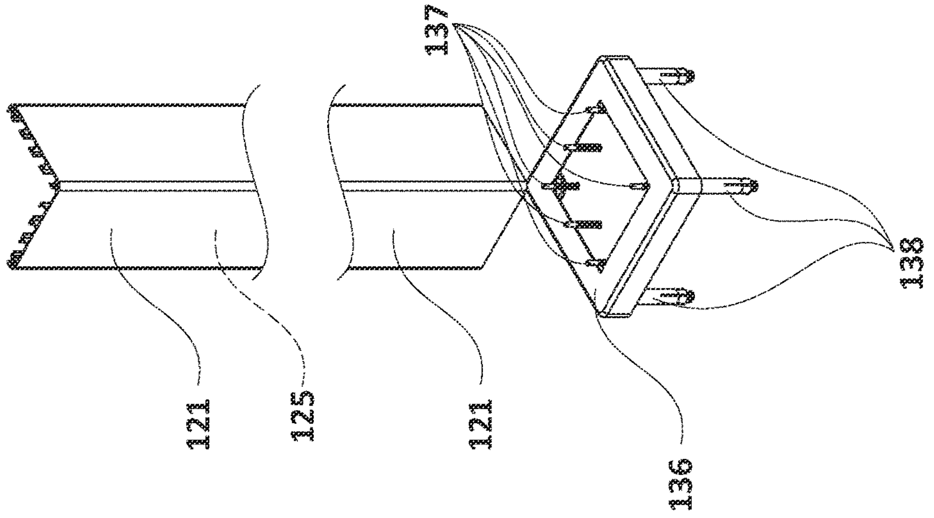
Figure 33:
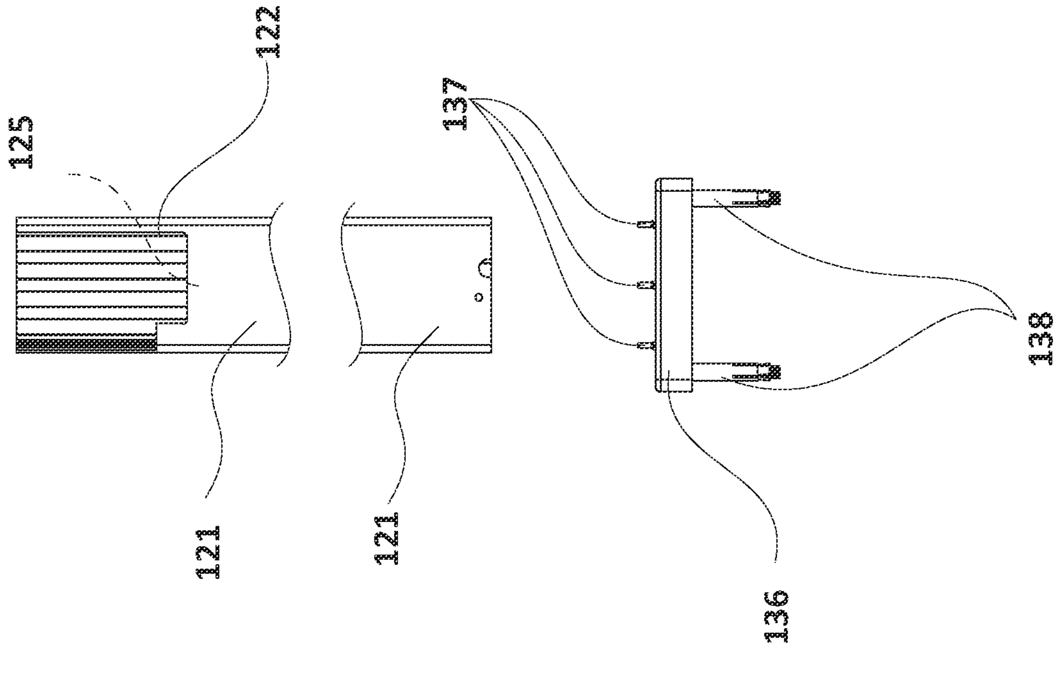
Figure 34:
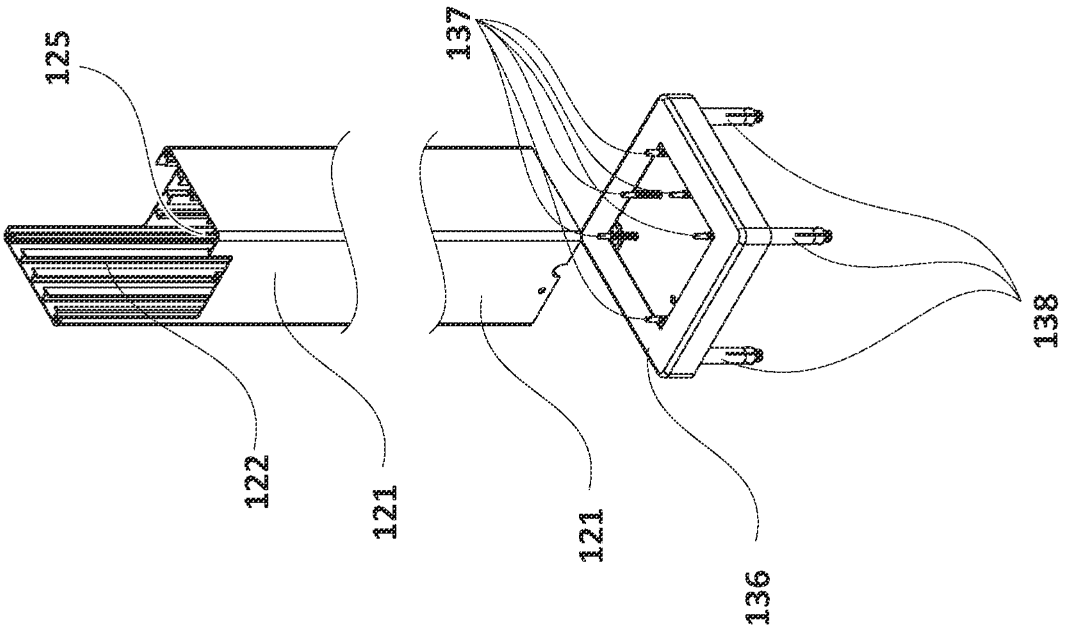
Figure 35:
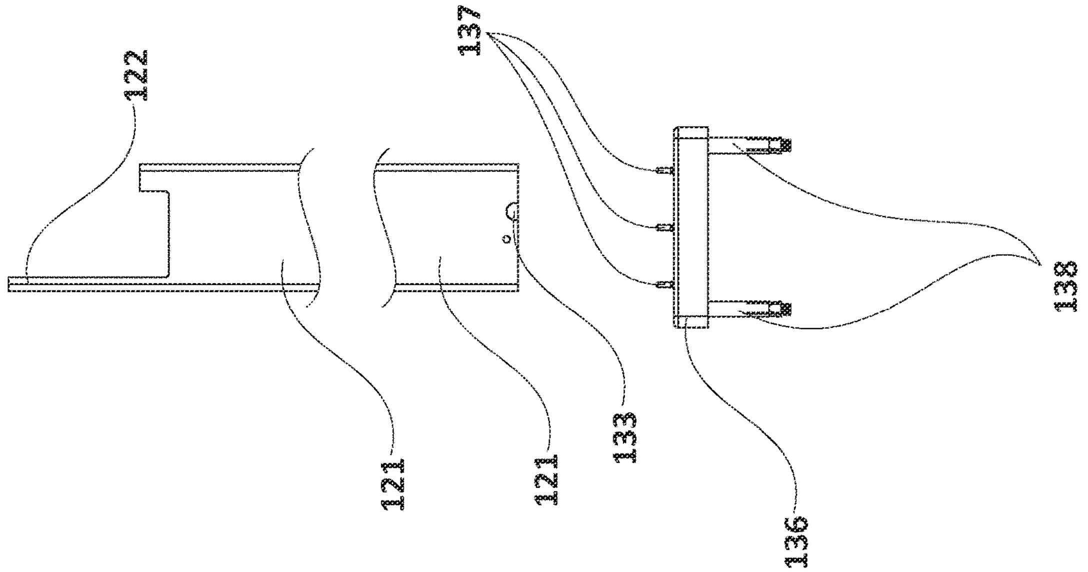
Figure 36:
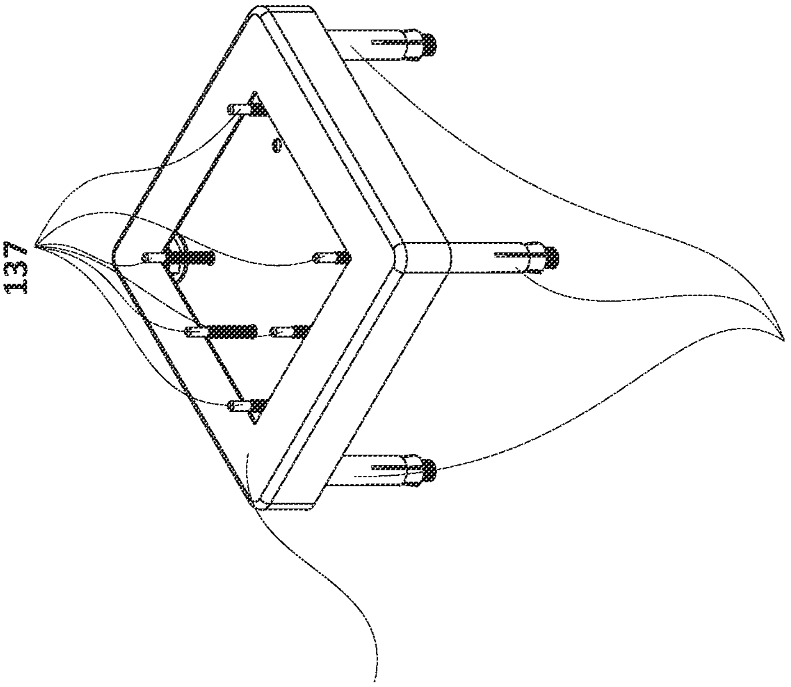
Figure 37:
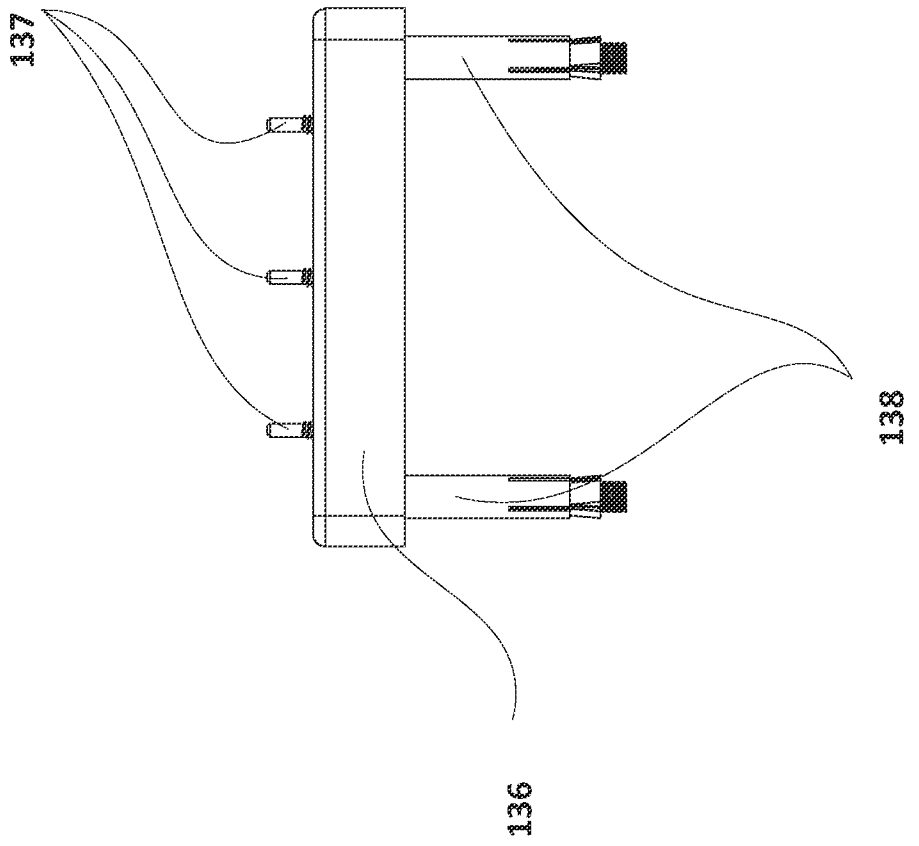
Figure 38:
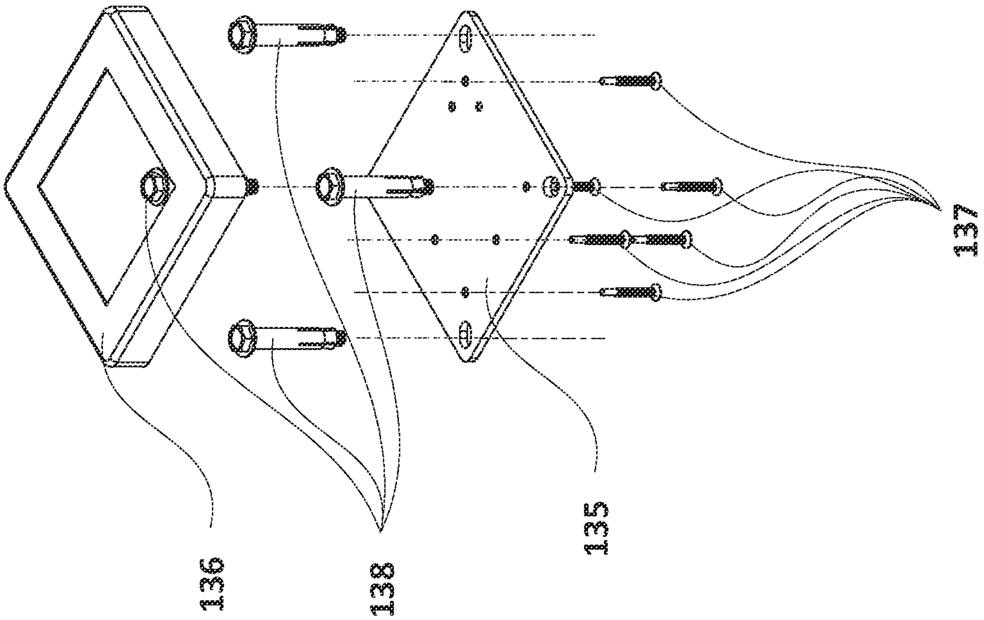
Figure 39:
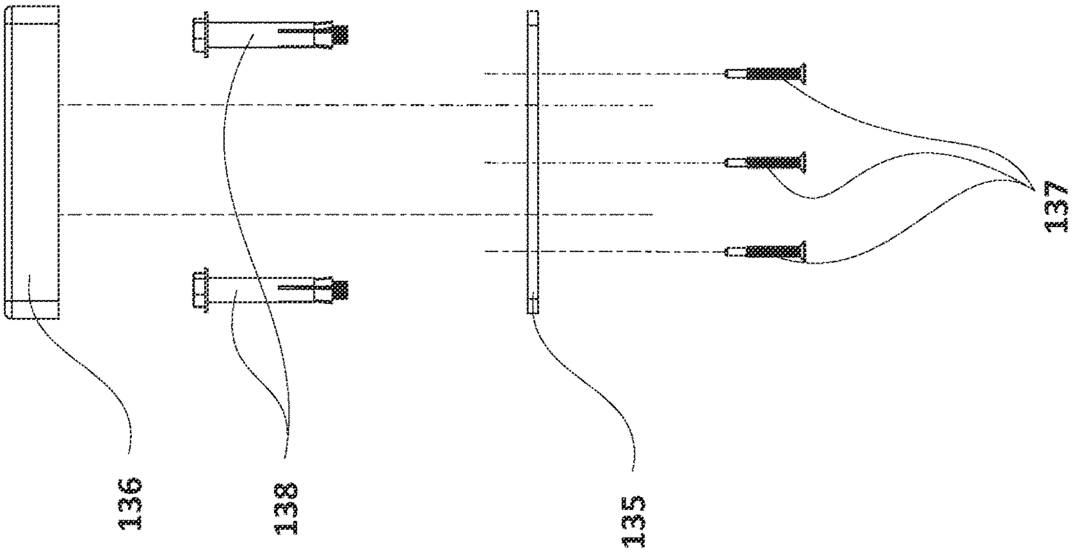
Figure 40:
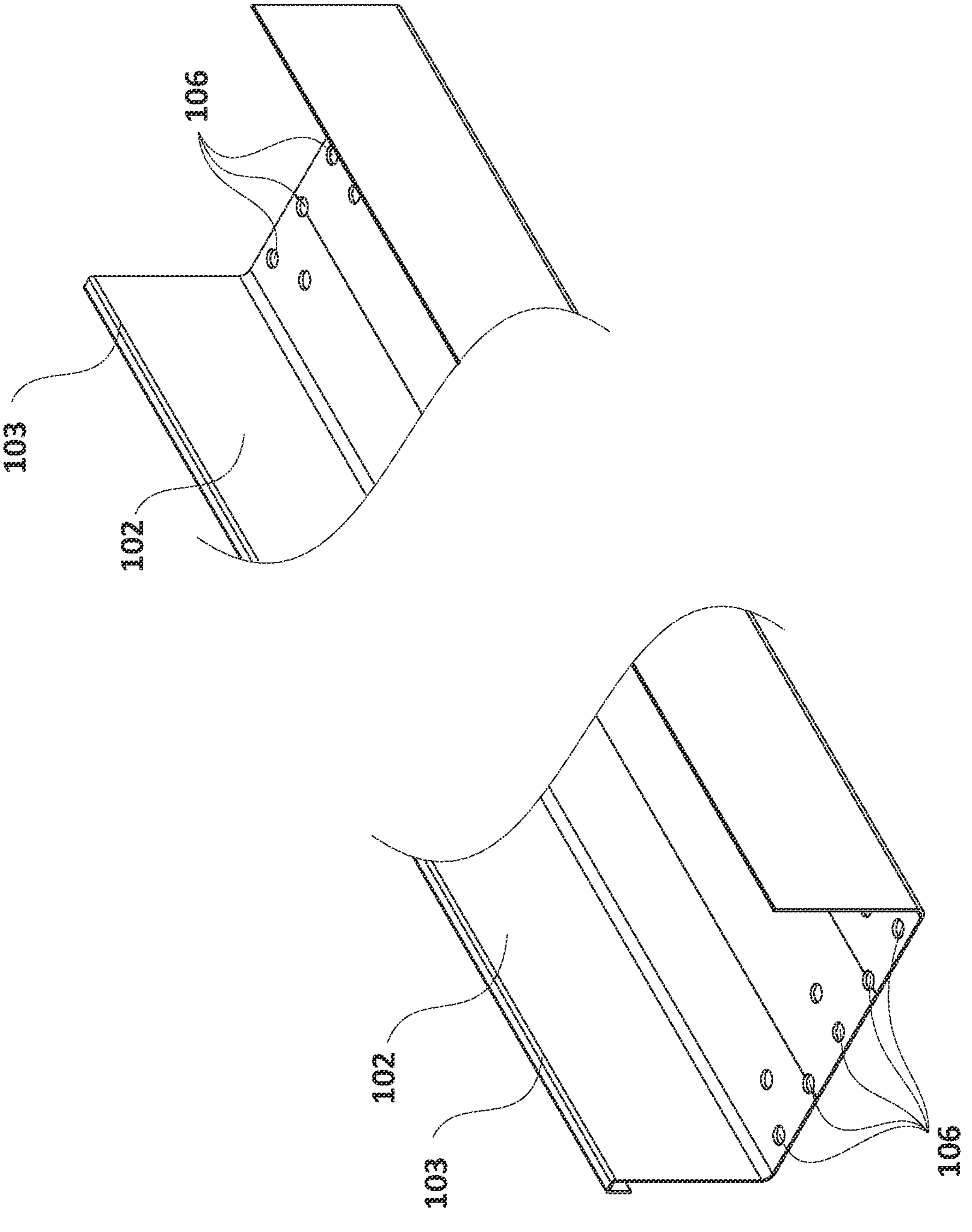
Figure 41:
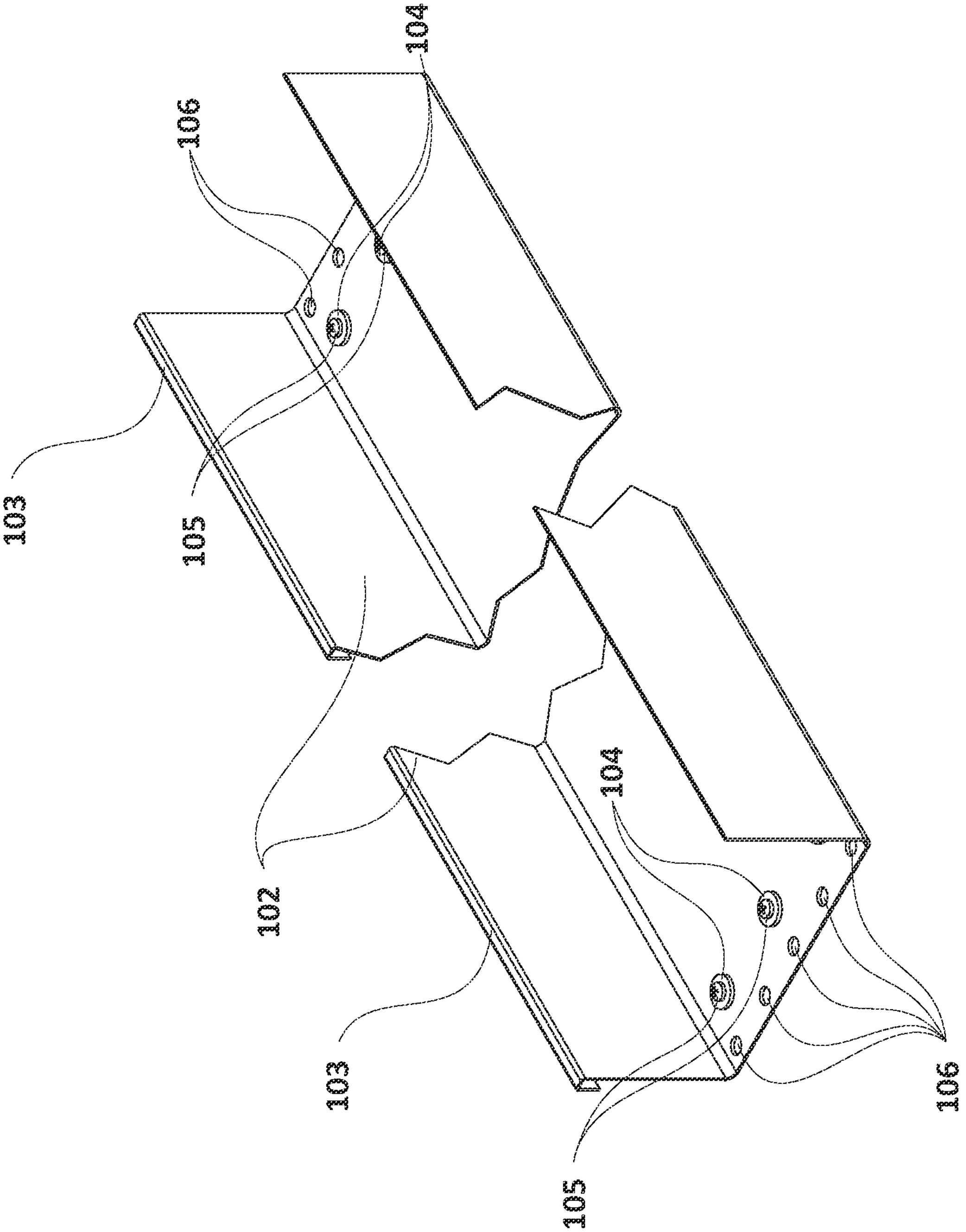
Figure 42:
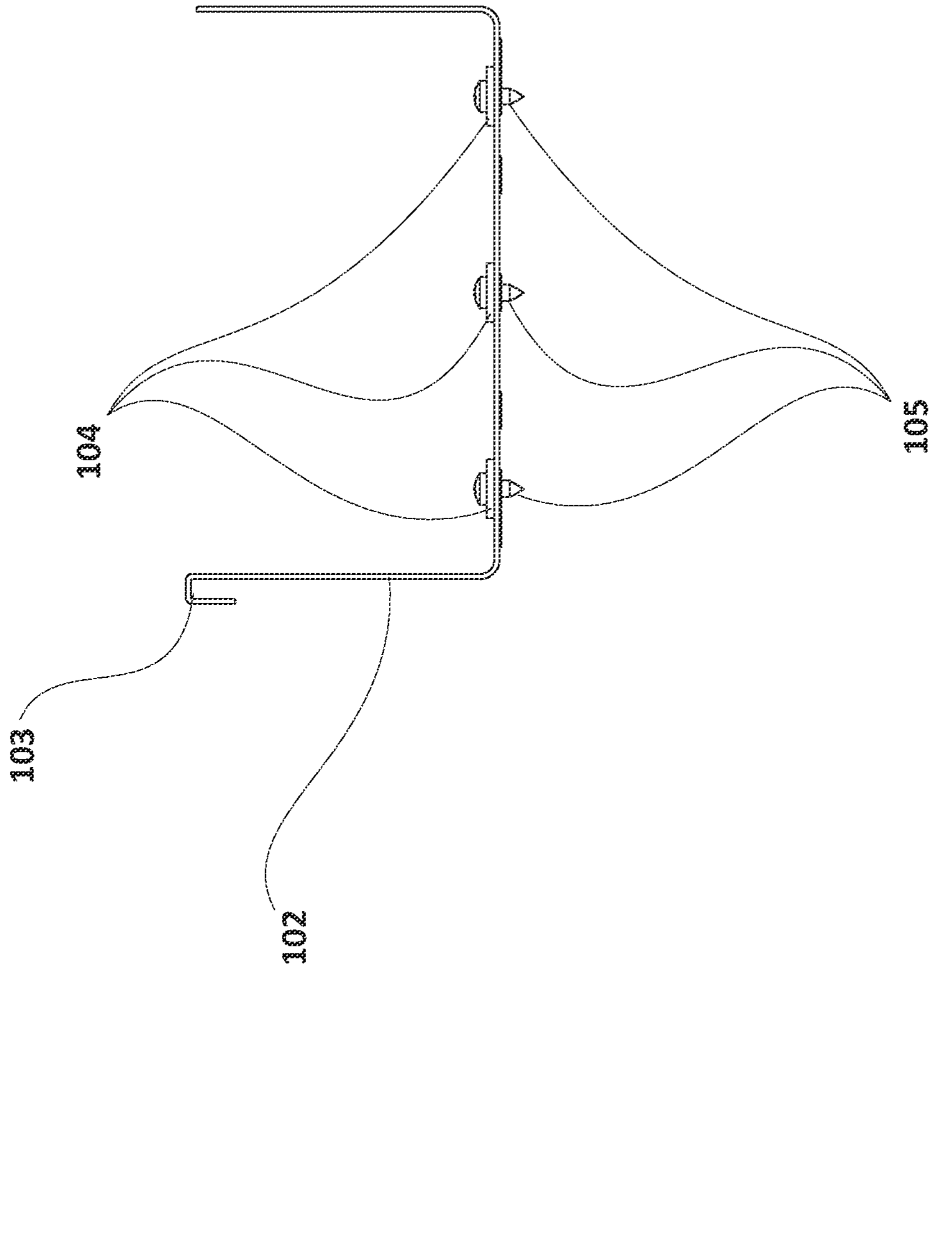
Figure 43:
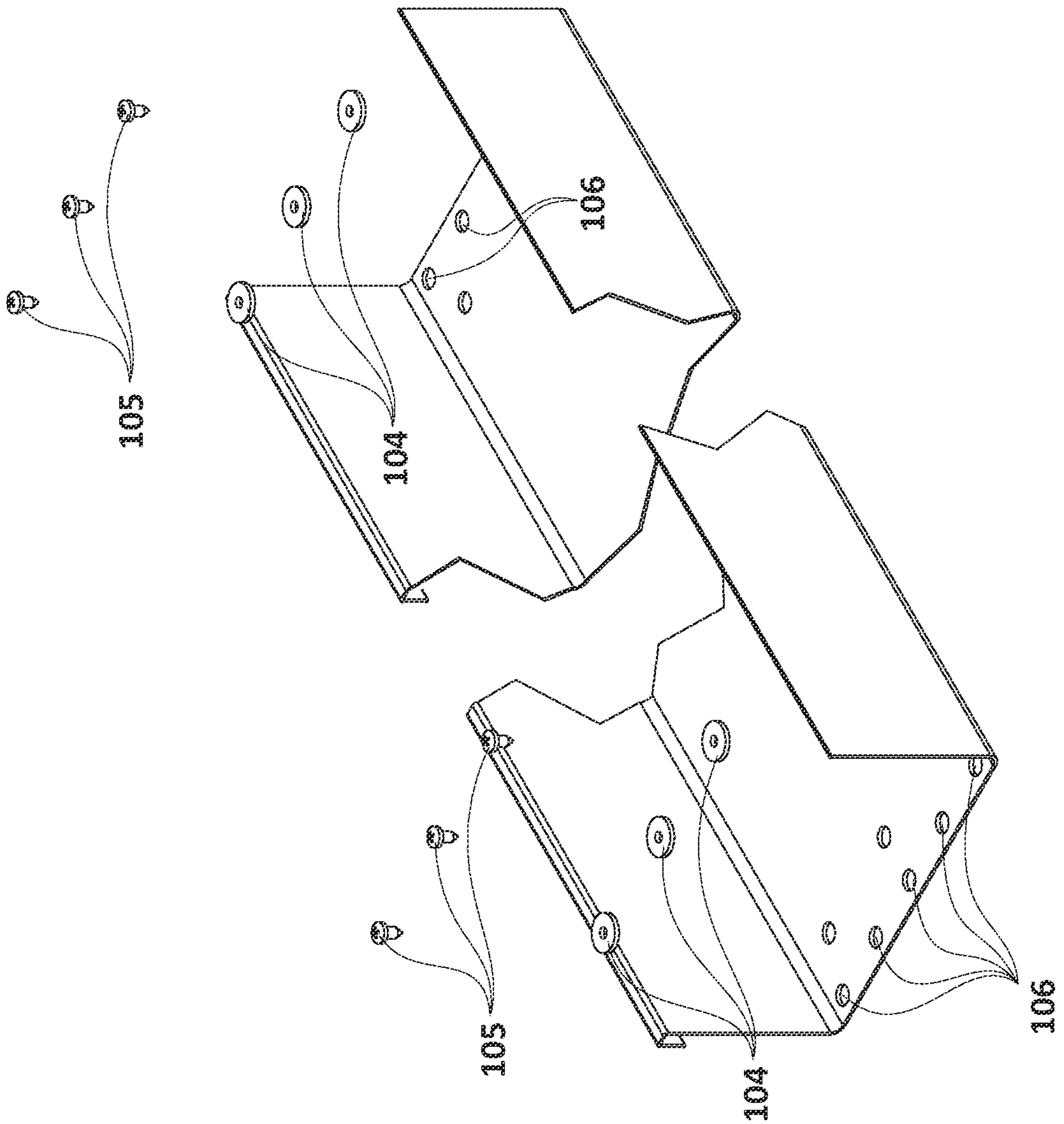
Figure 44:
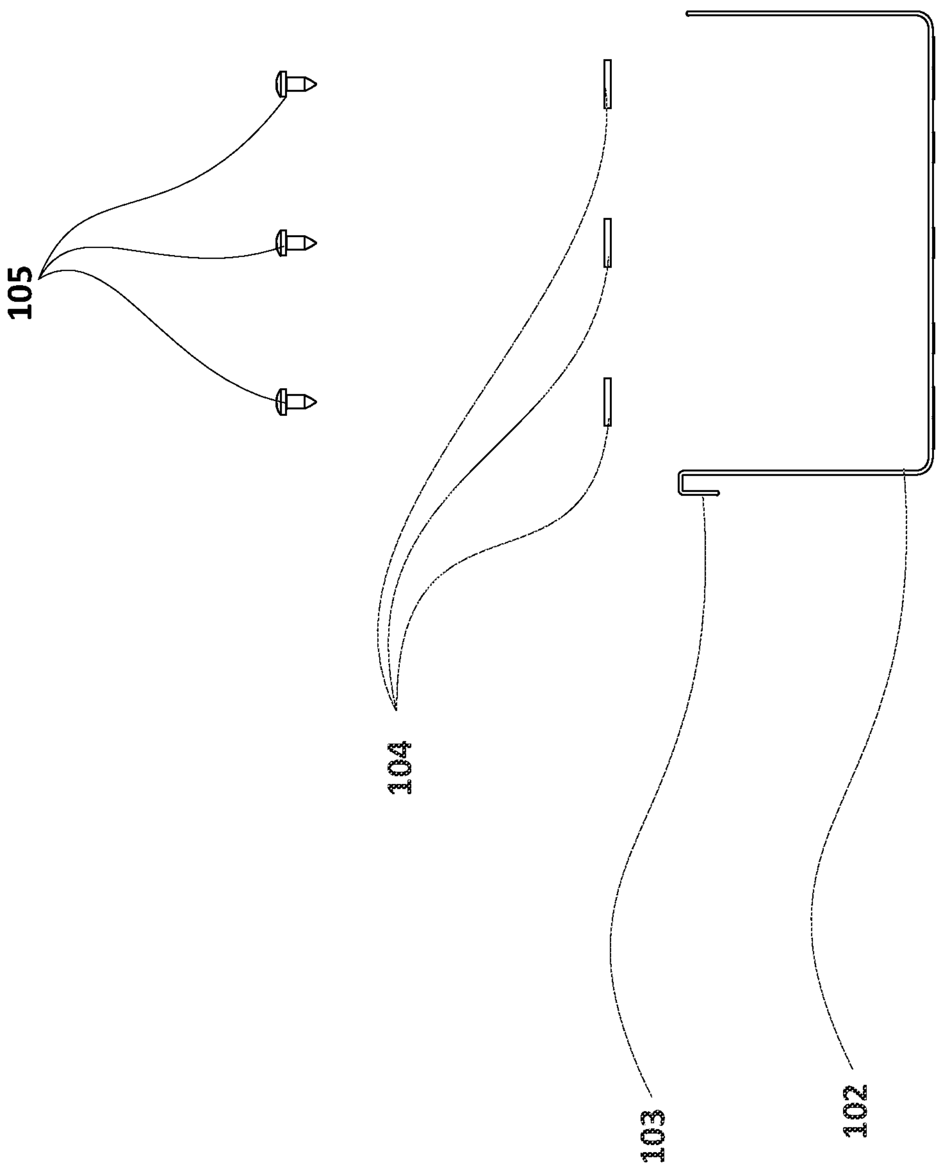
Figure 45:
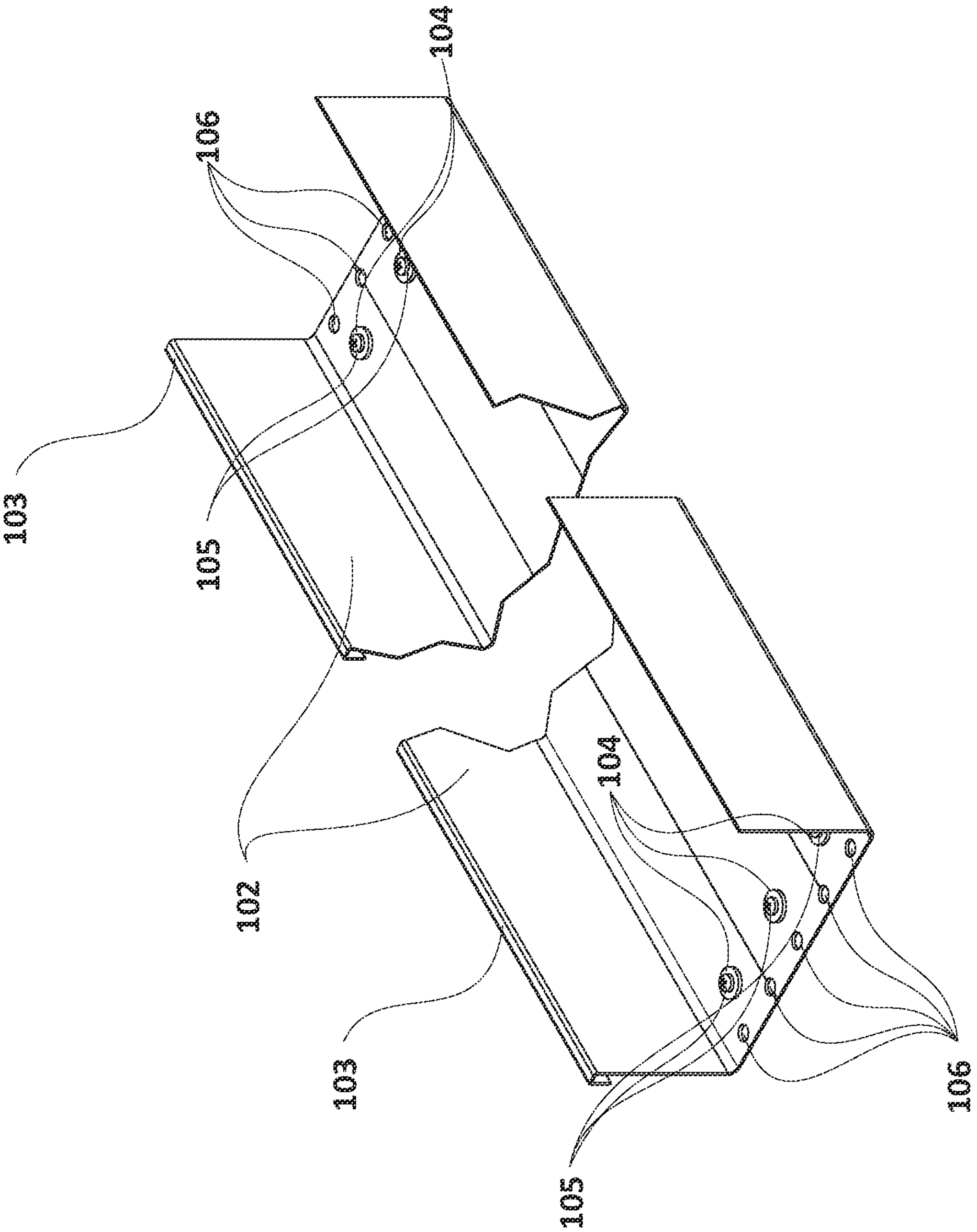
Figure 46:
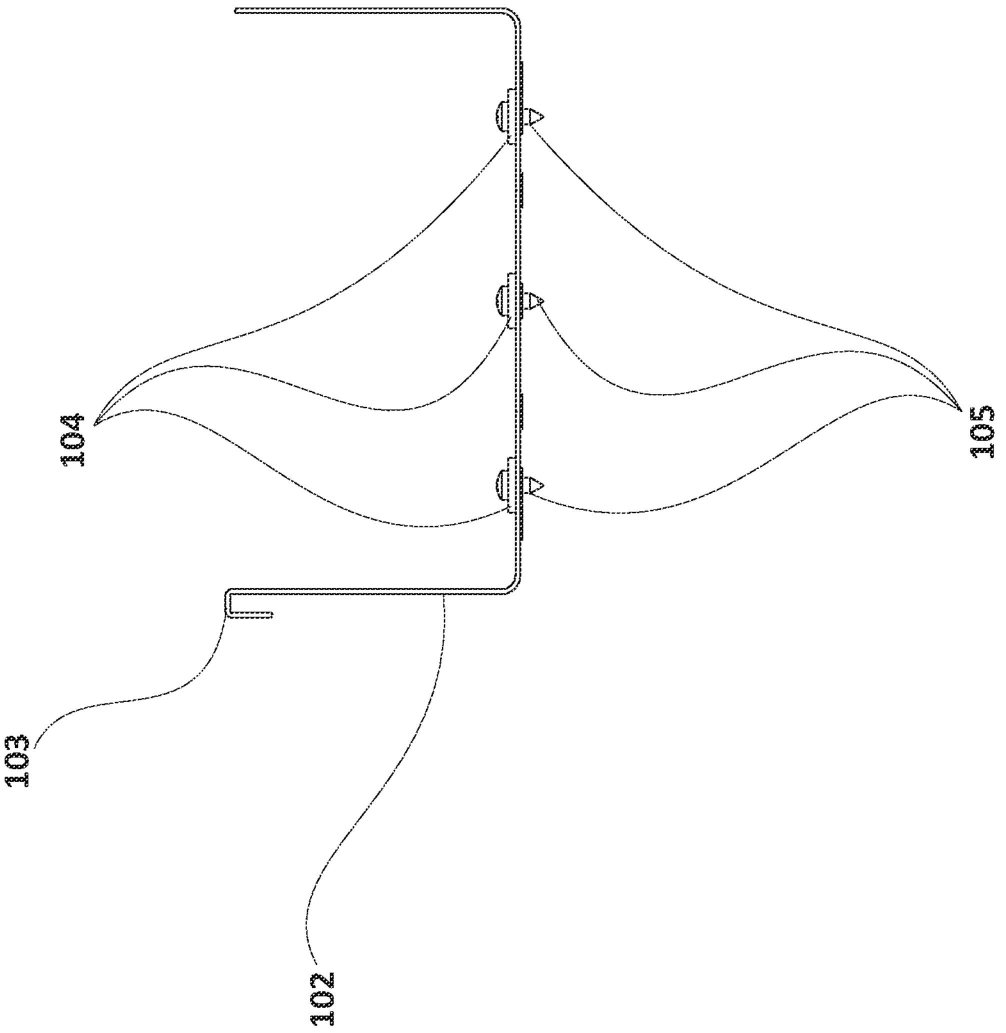
Figure 47:
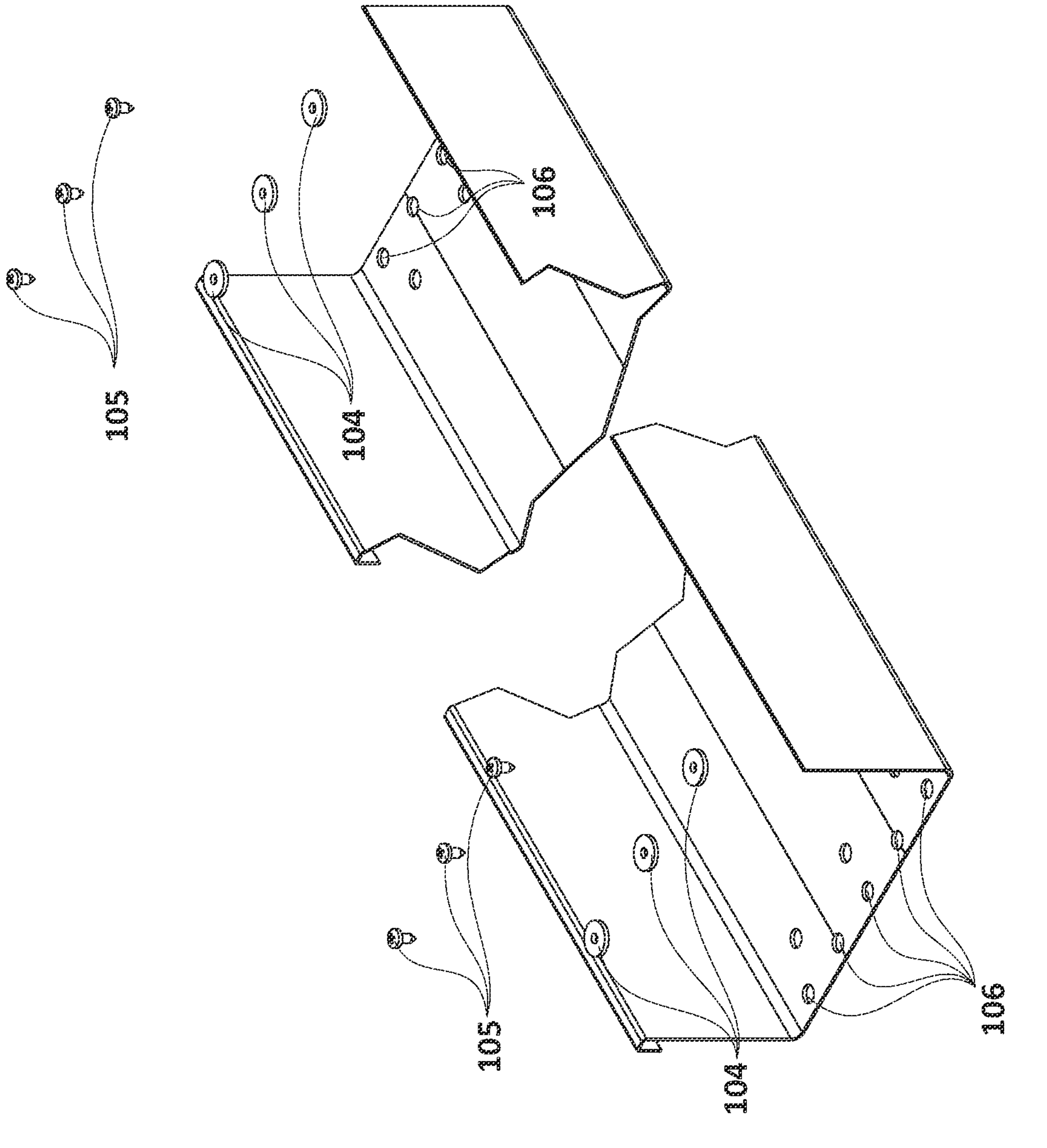
Figure 95:
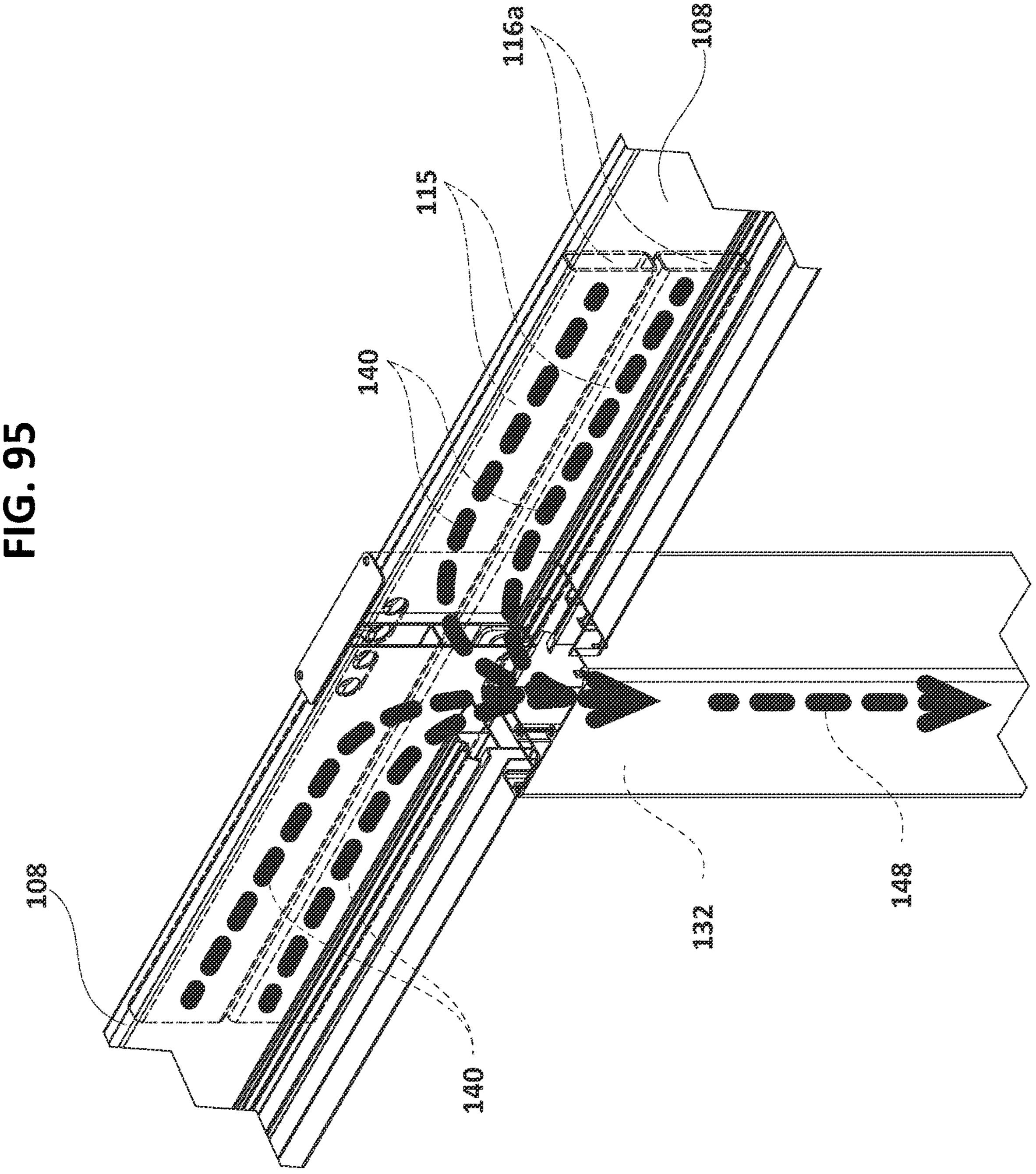
FIG. 95-FIG. 99 illustrate perspective, front, and side views demonstrating how rainwater is guided from rainwater-shedding rainwater-guiding roof shingles 102 into rainwater-guiding troughs 114 and double-deck-locking double-core-aligning double-tunnels 116*a*, and then guided into 4 double-gutter-supporting-and-locking rainwater-draining corner flumes 125 and 2 double-gutter-supporting-and-locking rainwater-draining center flumes 132, then guided out 4 rainwater-draining corner tunnels 126 and 2 rainwater-draining center tunnels 133.
Figure 96B:
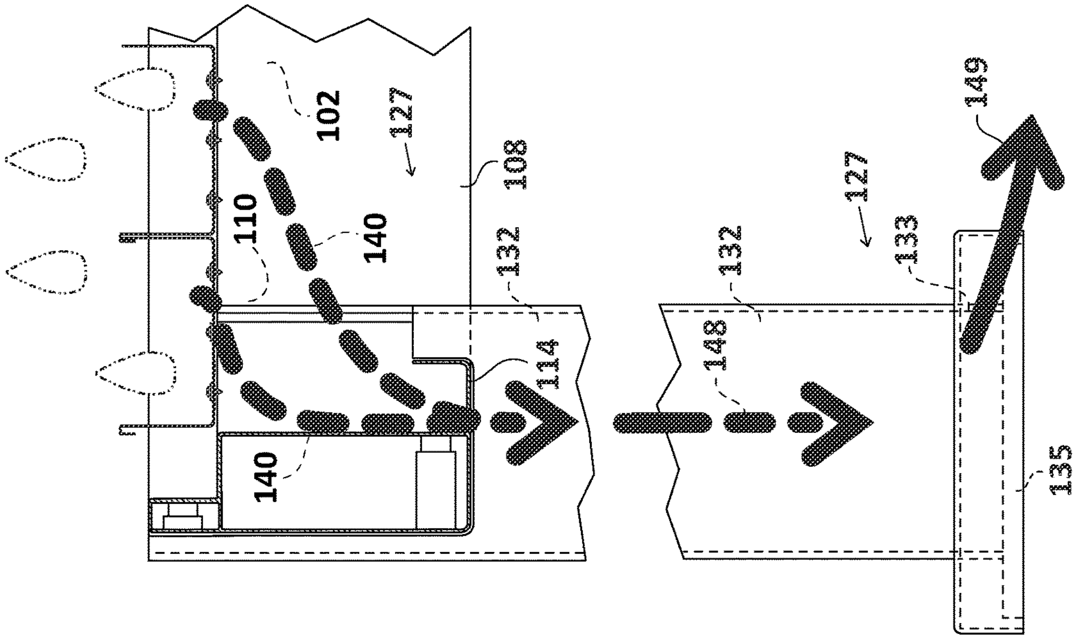
Figure 96A:
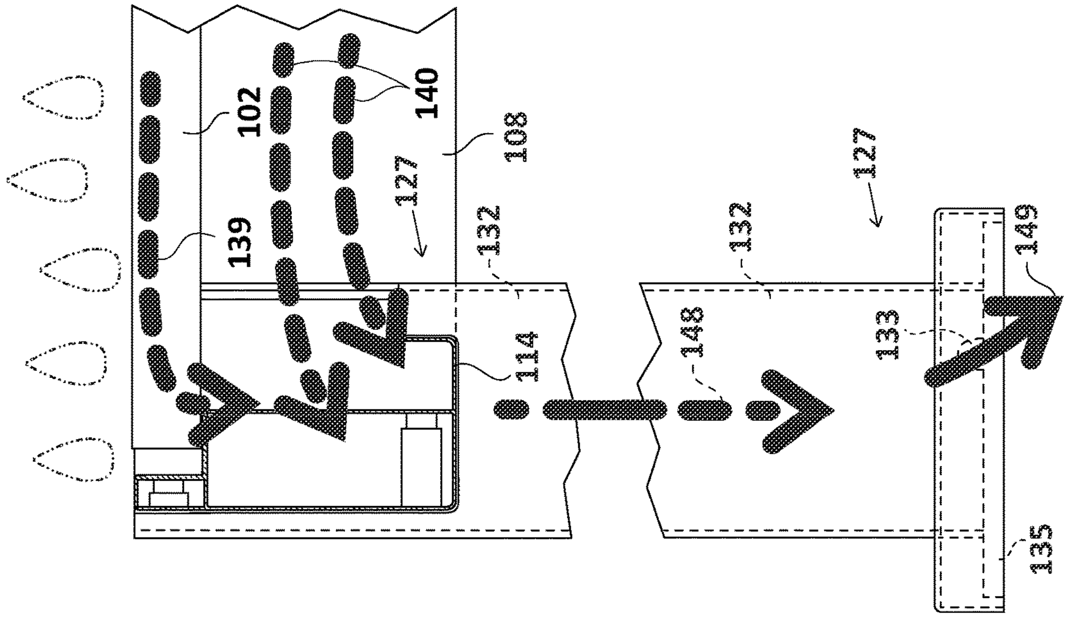
Figure 97:
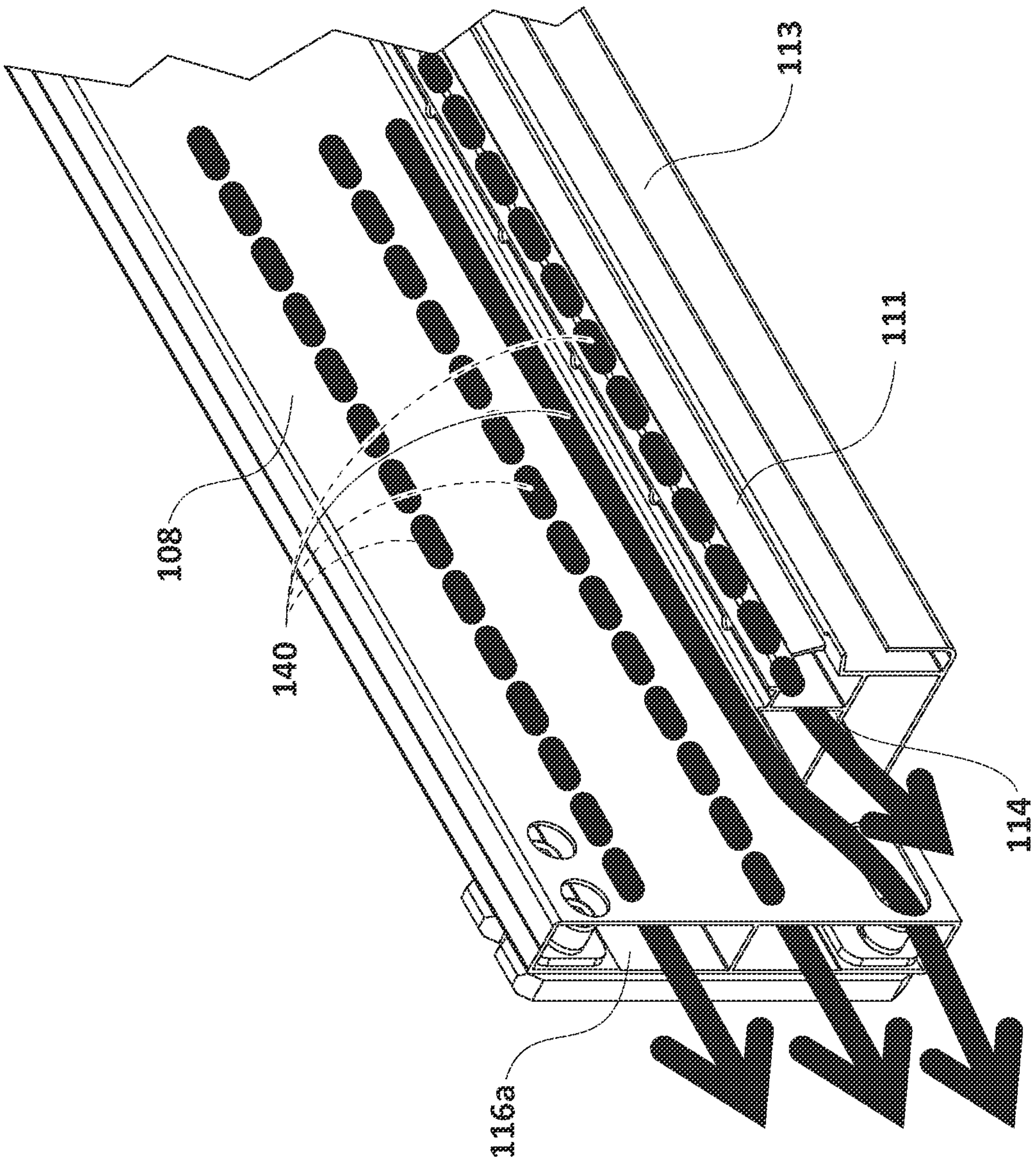
Figure 98:
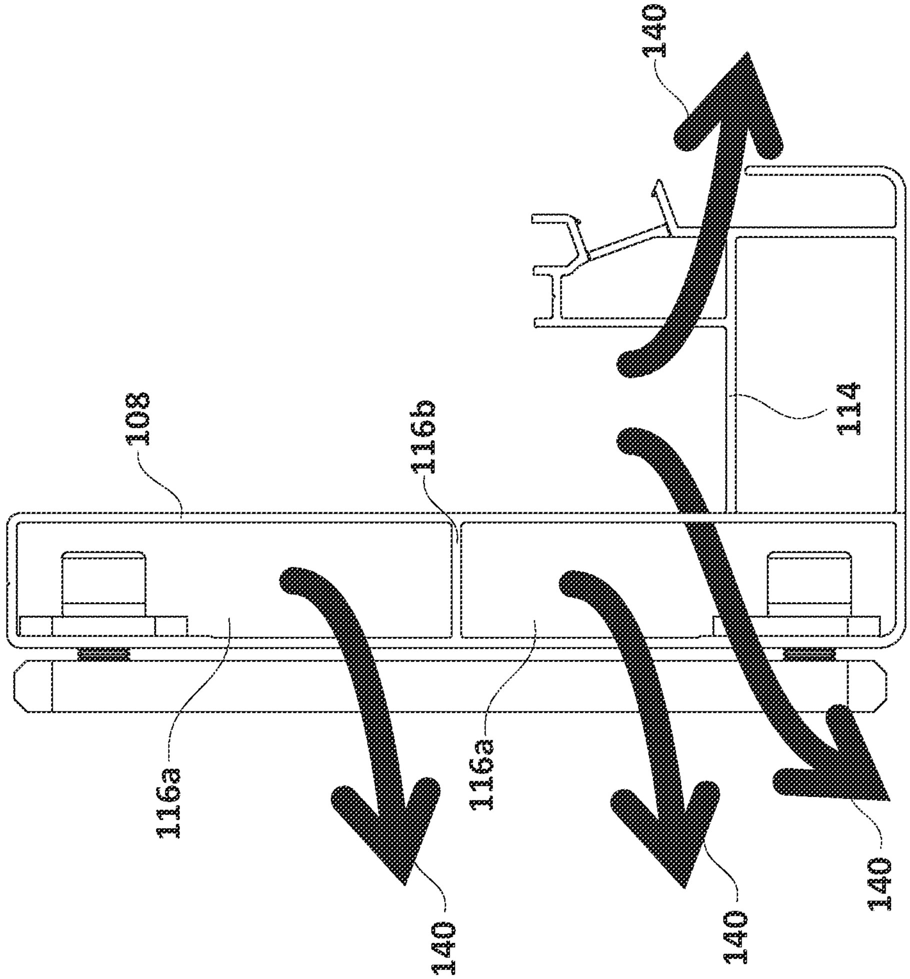
Figure 99:
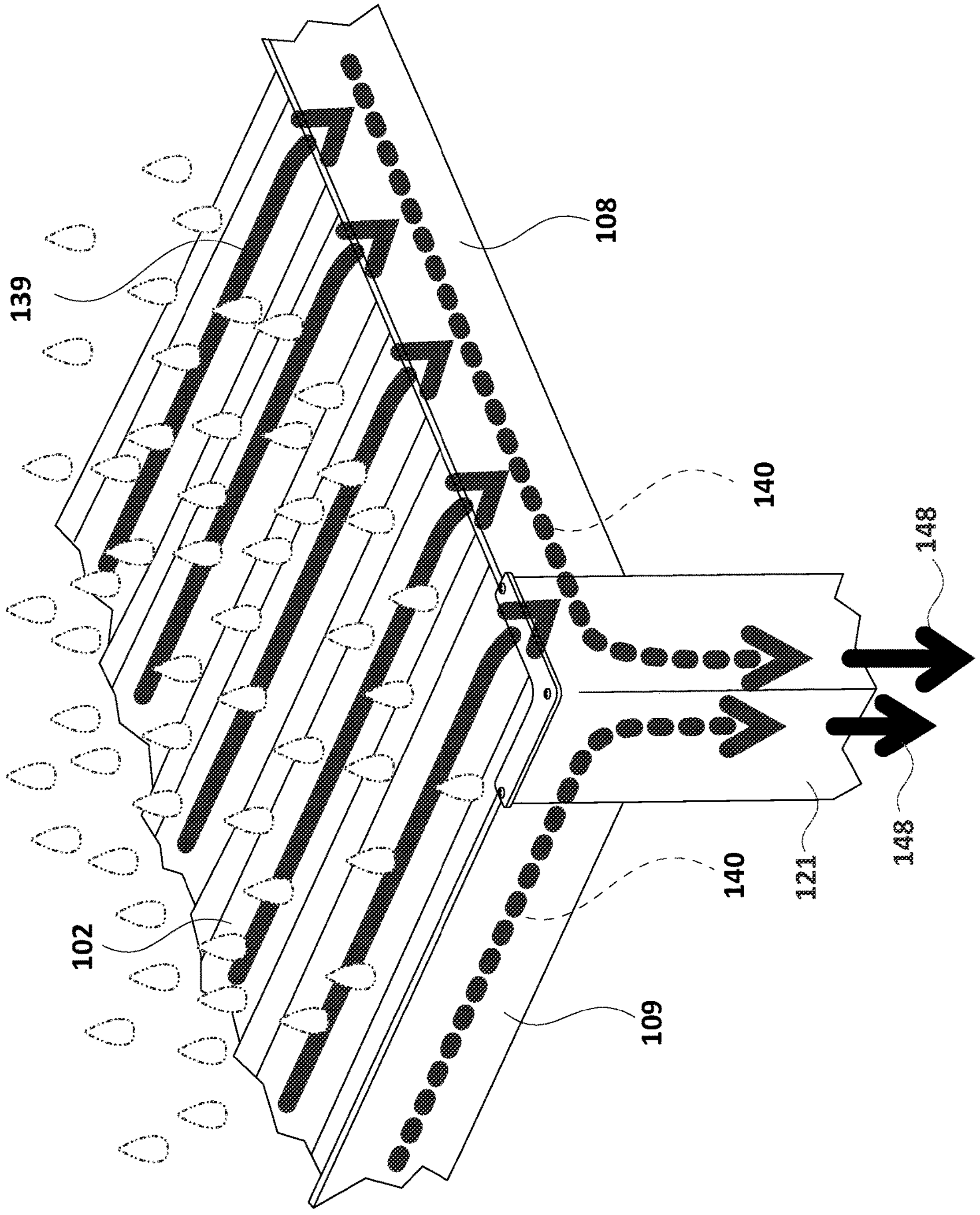
Figure 103:
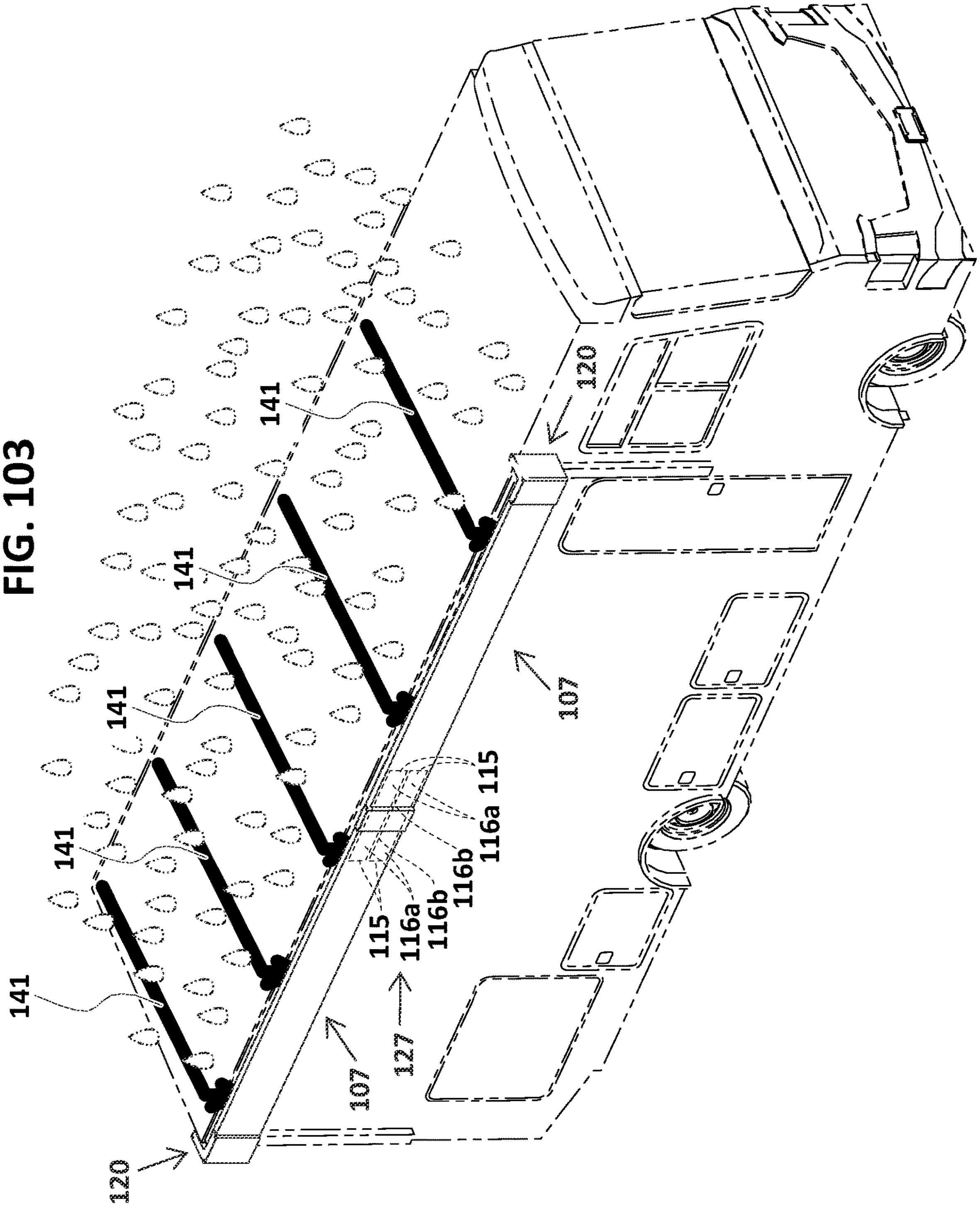
FIG. 103-FIG. 107 illustrate perspective views demonstrating additional applications of the five-device-in-one anti-leaking noise-canceling anti-twisting anti-warping anti-vibrating double-locking double-core double-deck double-stacked internal-gutters being used to reinforce, to connect, and to support horizontal posts, vertical posts, and gutters to shed rainwater and leaves from a pergola, an RV, stage, house, solar array, and an awning, respectively.
Figure 104:
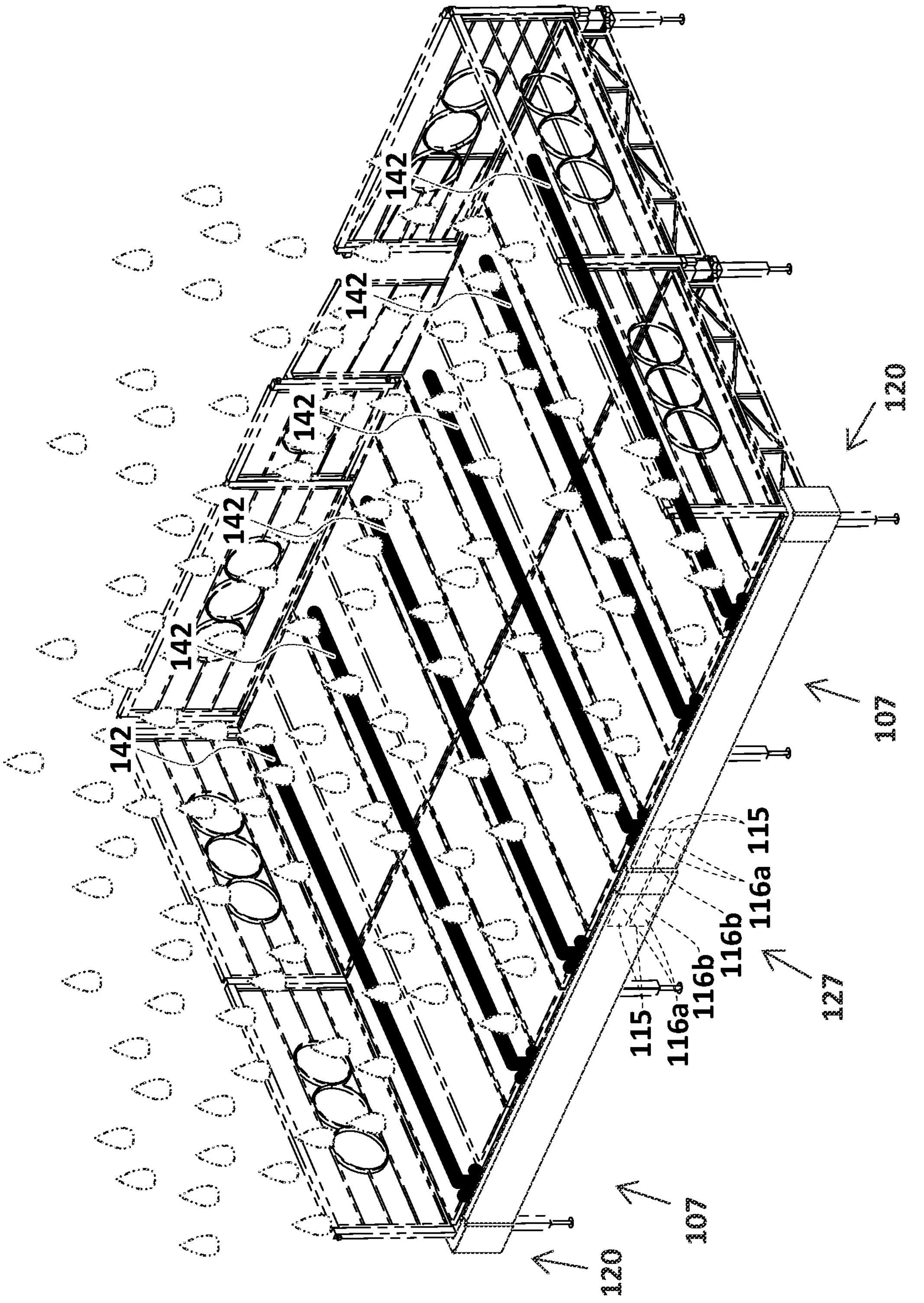
Figure 105:
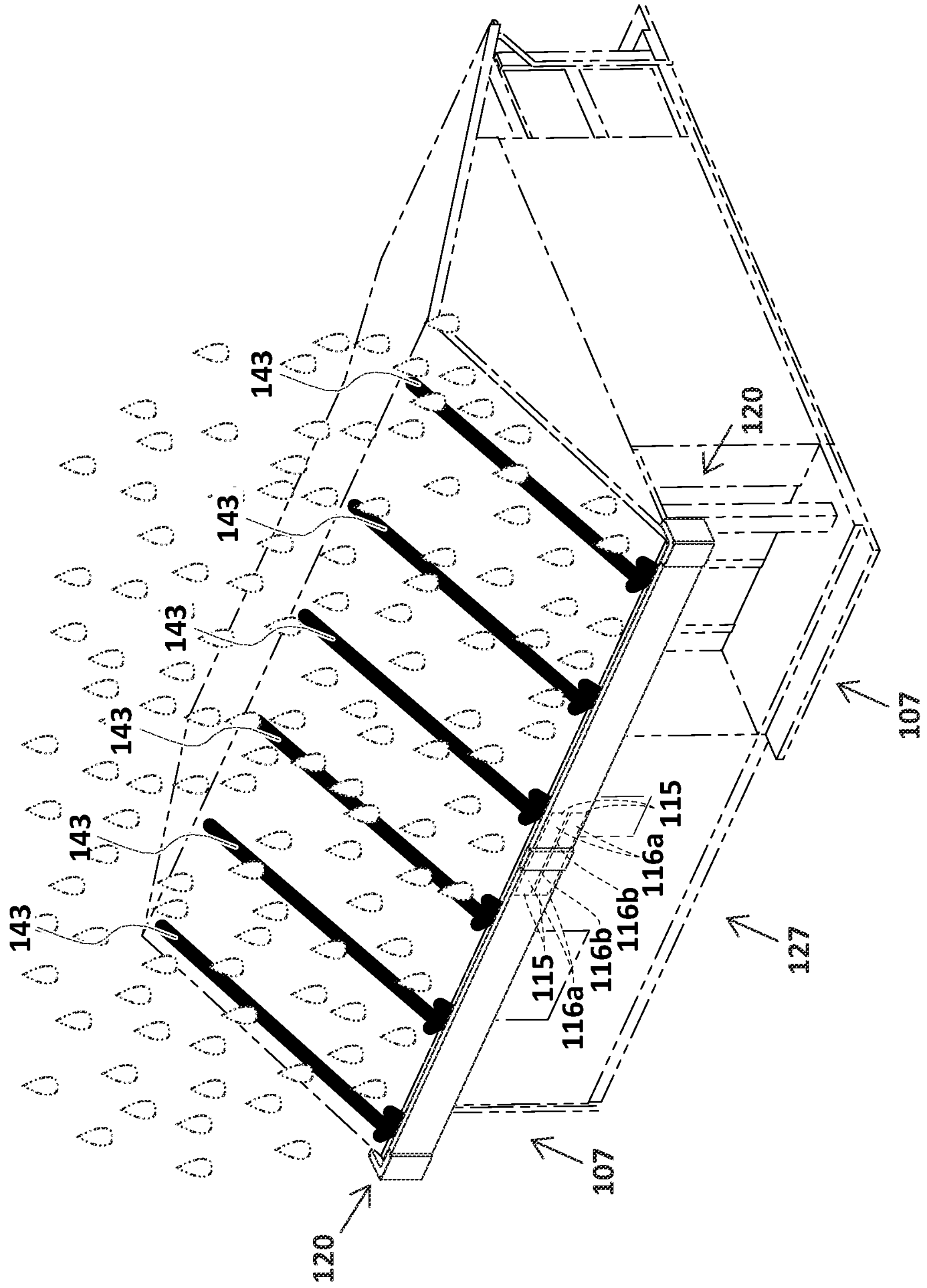
Figure 106:
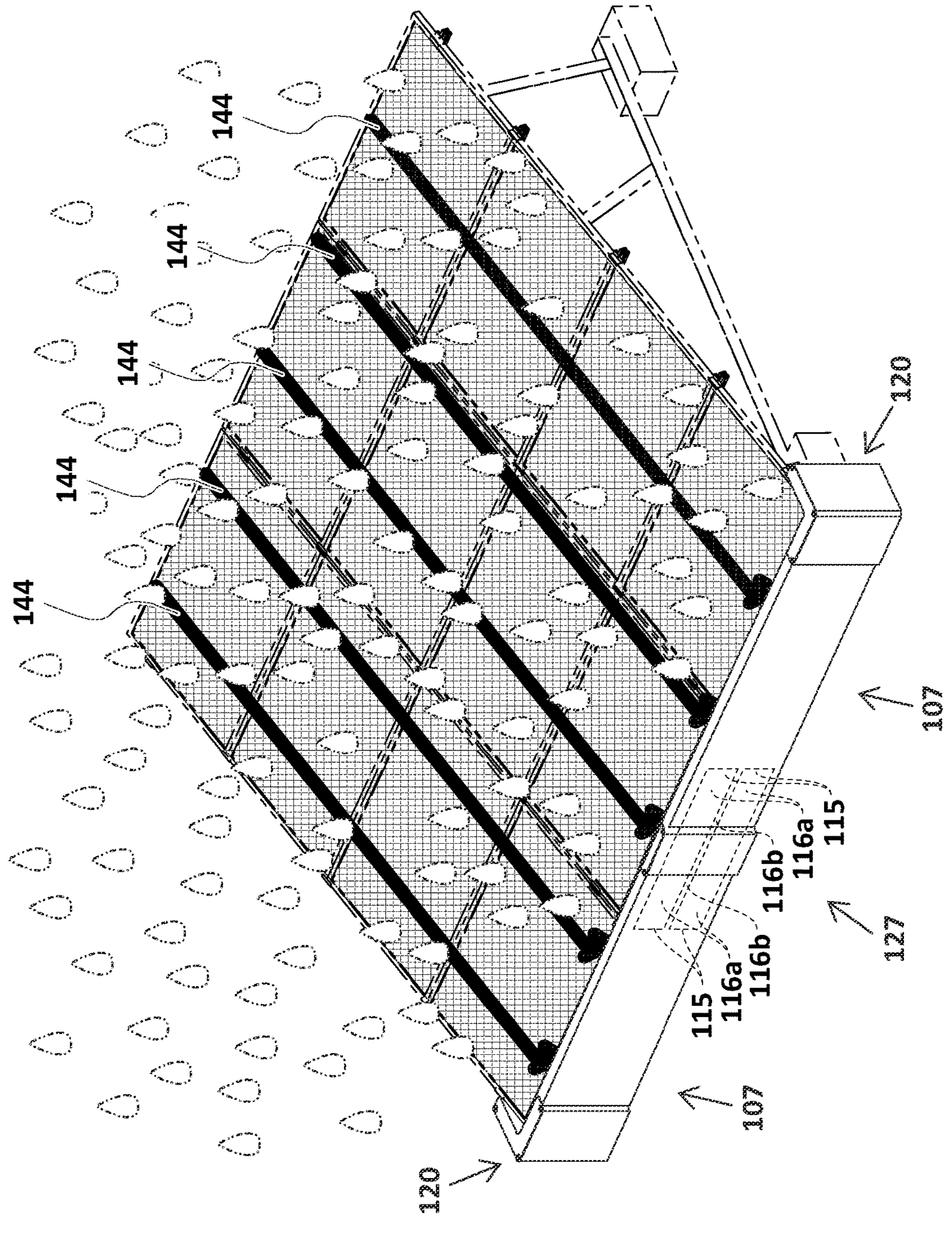
Figure 107:
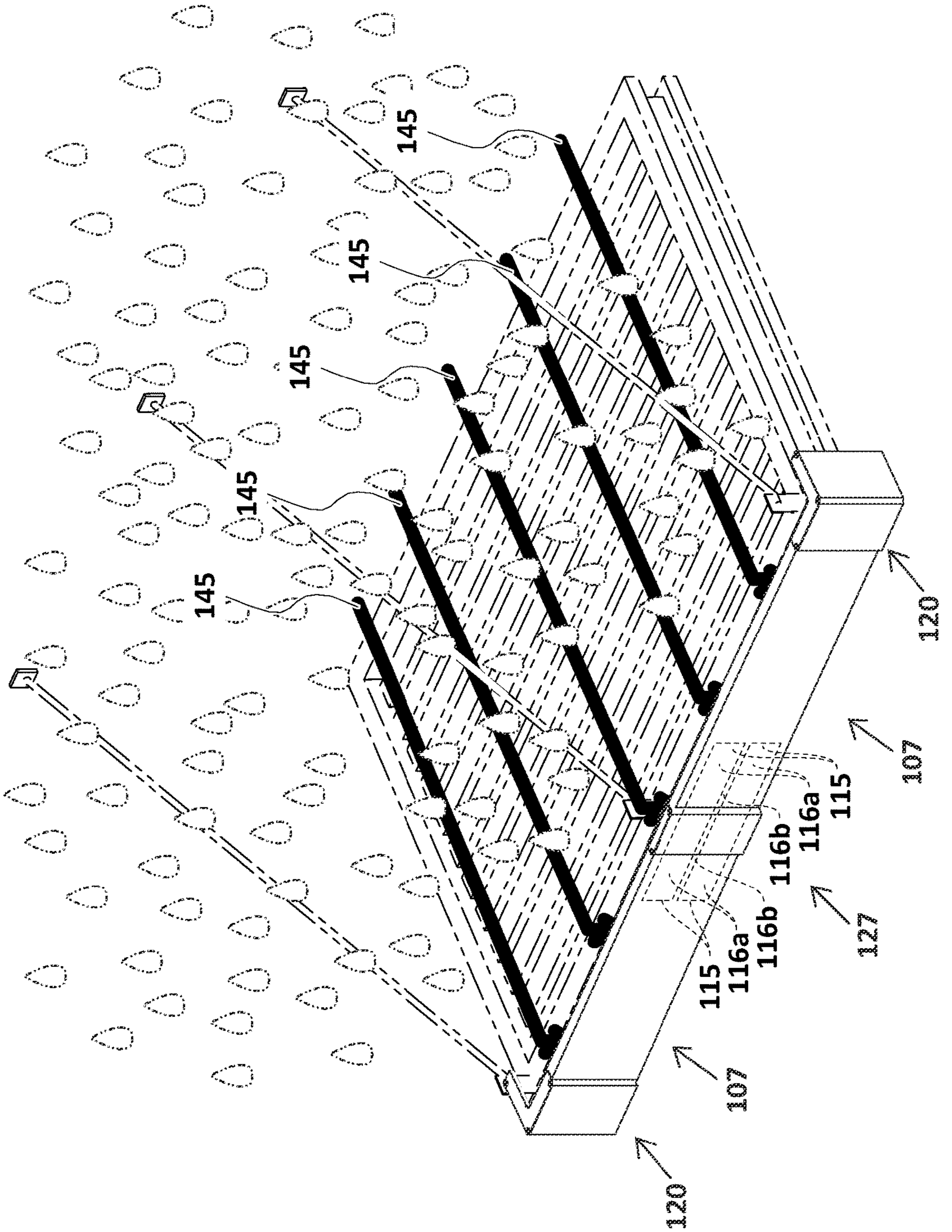

The prior art have failed to solve many problems associated with such gutters, as follows:

1) No prior art mention or disclose any gutters, having 4 side-rainwater-guiding quick-release-accessary-adding double-deck double-stacked-internal-gutters 108. Therefore, the prior art of gutters are: Not capable of guiding rainwater to 4 double-gutter-supporting-and-locking rainwater-draining corner flumes 125 and 2 double-gutter-supporting-and-locking rainwater-draining center flumes 132 to prevent water damage and rust in the direction of arrow 140 (see FIG. 95-FIG. 99); Not capable of shedding rainwater away from five-device-in-one anti-leaking noise-canceling anti-twisting anti-warping anti-vibrating double-locking double-core double-deck double-stacked internal-gutters to prevent water damage and rust in the direction of arrow 140 (see FIG. 95, and FIG. 99); Not capable of supporting an RV gutter to shed rainwater from an RV in the direction of arrow 141 (see FIG. 3, and FIG. 103) Not capable of supporting a concert stage gutter to shed rainwater from a concert stage in the direction of arrow 142 (see FIG. 4, and FIG. 104); Not capable of supporting a house gutter to shed rainwater from a house in the direction of arrow 143 (see FIG. 5, and FIG. 105); Not capable of supporting a solar panel gutter to shed rainwater from a solar panel in the direction of arrow 144 (see FIG. 6, and FIG. 106); and Not capable of supporting an awning gutter to shed rainwater when attached to a building in the direction of arrow 145 (see FIG. 7, and FIG. 107).

2) No prior art mention or disclose any gutters, having 2 end-rainwater-guiding quick-release-accessary-adding double-deck double-stacked-internal-gutters 109. Therefore, the prior art of gutters are: Not capable of guiding rainwater to 4 double-gutter-supporting-and-locking rainwater-draining corner flumes 125 to prevent water damage and rust in the direction of arrow 140 (see FIG. 95-FIG. 99); Not capable of shedding rainwater away from five-device-in-one anti-leaking noise-canceling anti-twisting anti-warping anti-vibrating double-locking double-core double-deck double-stacked internal-gutters to prevent water damage and rust in the direction of arrow 140 (see FIG. 95, and FIG. 99); Not capable of supporting an RV gutter to shed rainwater from an RV in the direction of arrow 141 (see FIG. 3, and FIG. 103) Not capable of supporting a concert stage gutter to shed rainwater from a concert stage in the direction of arrow 142 (see FIG. 4, and FIG. 104); Not capable of supporting a house gutter to shed rainwater from a house in the direction of arrow 143 (see FIG. 5, and FIG. 105); Not capable of supporting a solar panel gutter to shed rainwater from a solar panel in the direction of arrow 144 (see FIG. 6, and FIG. 106); and Not capable of supporting an awning gutter to shed rainwater when attached to a building in the direction of arrow 145 (see FIG. 7, and FIG. 107).

3) No prior art mention or disclose any gutters, having double-deck-locking double-deck-reinforcing double-cores 115. Therefore, the prior art of gutters are: Not capable of securely and stackingly joining 2 end-rainwater-guiding quick-release-accessary-adding double-deck double-stacked-internal-gutters 109 together; and Not capable of securely and stackingly reinforcing 2 end-rainwater-guiding quick-release-accessary-adding double-deck double-stacked-internal-gutters 109 together.

4) No prior art mention or disclose any gutters, having double-deck-locking double-core-aligning double-tunnels 116*a*. Therefore, the prior art of gutters are: Not capable of securely and stackingly providing a location within 2 end-rainwater-guiding quick-release-accessary-adding double-deck double-stacked-internal-gutters 109 for double-deck-locking double-deck-reinforcing double-cores 115 to fit; and Not capable of guiding rainwater to 4 double-gutter-supporting-and-locking rainwater-draining corner flumes 125 in the direction of arrow 140 (see FIG. 95-FIG. 99).

5) No prior art mention or disclose any gutters, having double-core-locking double-core-aligning spines 116*b*. Therefore, the prior art of gutters are: Not capable of aligning double-deck-locking double-deck-reinforcing double-cores 115 within double-deck-locking double-core-aligning double-tunnels 116*a*; Not capable of preventing 2 double-deck-locking double-core-aligning double-tunnels 116*a* from rubbing together.

Figure 100:
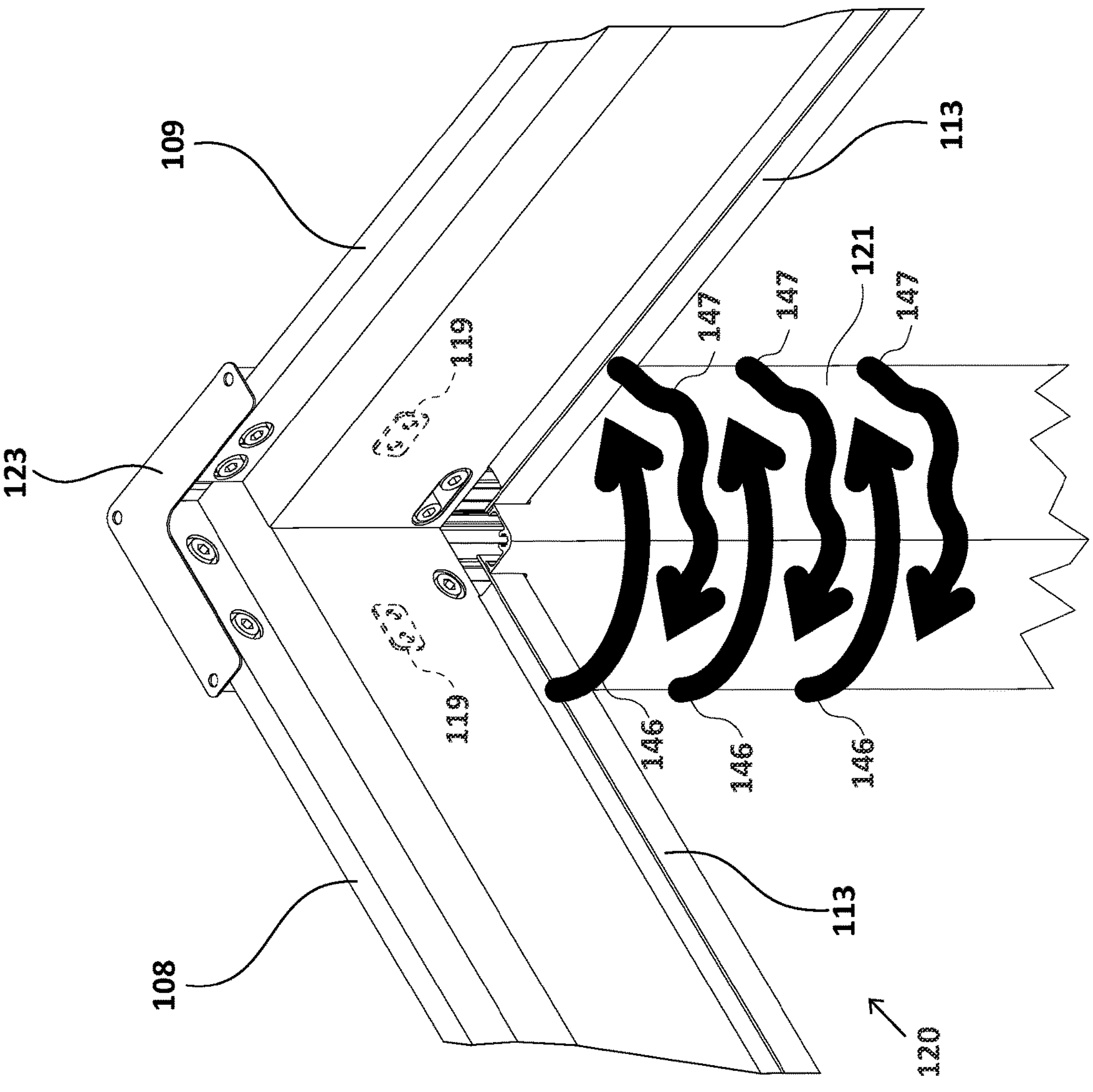
FIG. 100 illustrates a perspective view demonstrating various functions of the anti-twisting and anti-warping capabilities of anti-twisting anti-warping anti-vibrating 90-degree-double-yokes 119.
Figure 101:
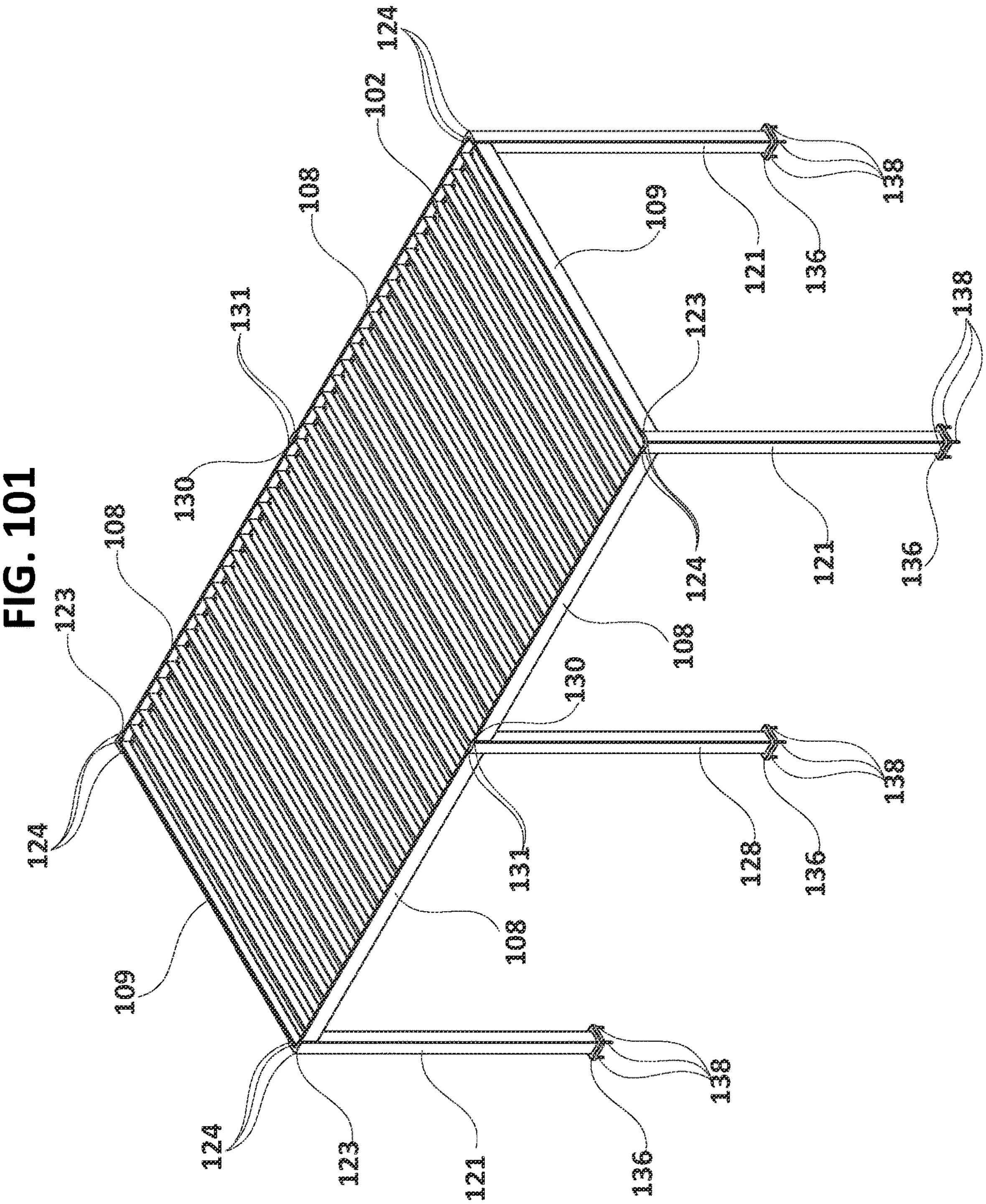
FIG. 101-FIG. 102 illustrate a perspective view and an exploded perspective view demonstrating components and the assembly of the five-device-in-one anti-leaking noise-canceling anti-twisting anti-warping anti-vibrating double-locking double-core double-deck double-stacked internal-gutters.
Figure 102:
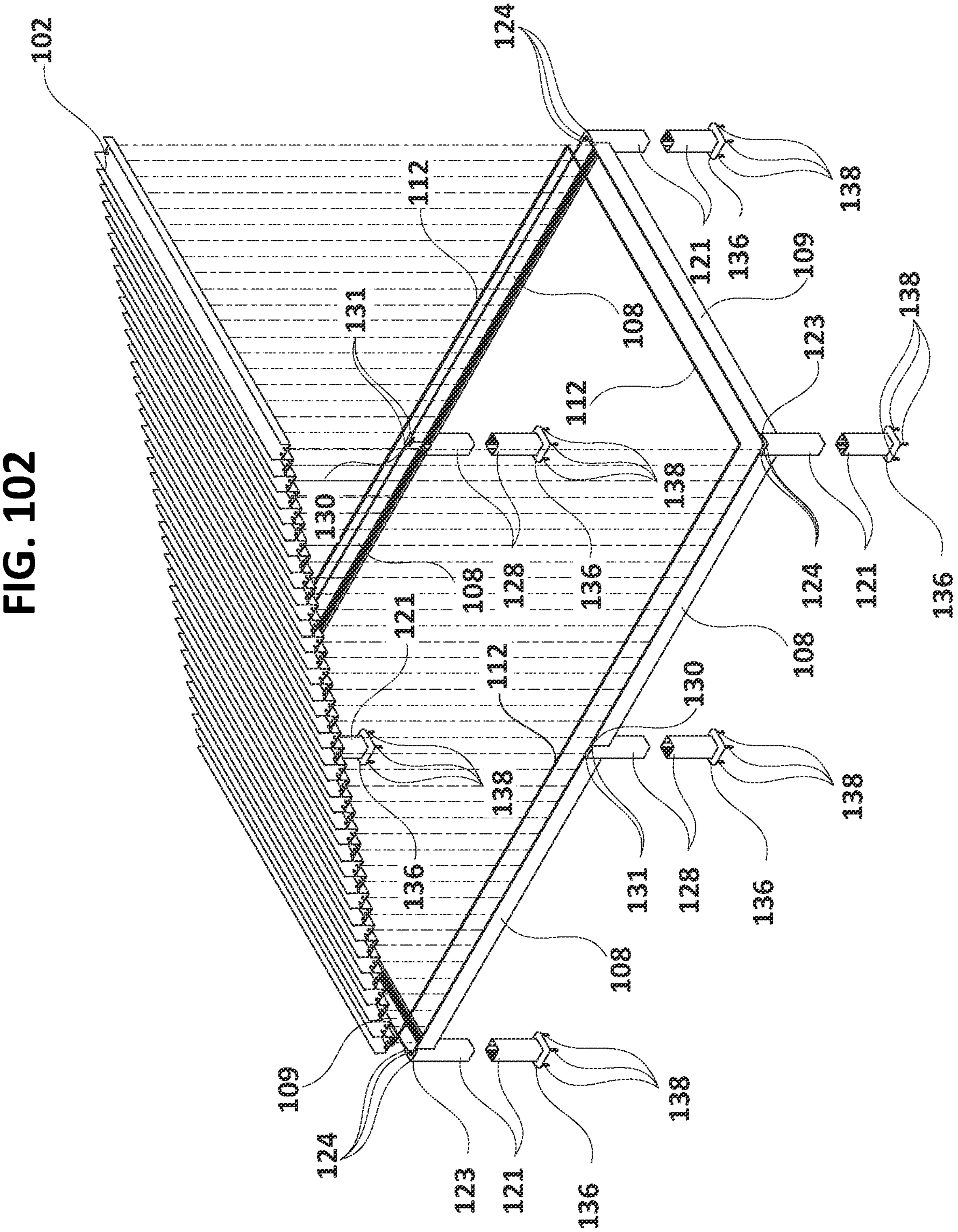

6) No prior art mention or disclose any gutters, having compression-locking gutter-aligning pegs 118. Therefore, the prior art of gutters are: Not capable of aligning 4 side-rainwater-guiding quick-release-accessary-adding double-deck double-stacked-internal-gutters 108 and 2 end-rainwater-guiding quick-release-accessary-adding double-deck double-stacked-internal-gutters 109 to double-gutter-supporting-and-locking corner parapet-post 121 and double-gutter-supporting-and-locking center parapet-posts 128; Not capable of pressure-locking 4 side-rainwater-guiding quick-release-accessary-adding double-deck double-stacked-internal-gutters 108 and 2 end-rainwater-guiding quick-release-accessary-adding double-deck double-stacked-internal-gutters 109 to double-gutter-supporting-and-locking corner parapet-post 121 and double-gutter-supporting-and-locking center parapet-posts 128. No prior art mention or disclose any gutters, having anti-twisting anti-warping anti-vibrating 90-degree-double-yokes 119. Therefore, the prior art of gutters are: Not capable of providing anti-twisting reverse tension to retain the original shape and size of the five-device-in-one anti-leaking noise-canceling anti-twisting anti-warping anti-vibrating double-locking double-core double-deck double-stacked internal-gutters in the directions of arrows 146, and 147 (see FIG. 100, and FIG. 200); Not capable of providing anti-warping reverse tension to retain the original shape and size of the five-device-in-one anti-leaking noise-canceling anti-twisting anti-warping anti-vibrating double-locking double-core double-deck double-stacked internal-gutters in the directions of arrows 146, and 147 (see FIG. 100, and FIG. 200); Not capable of providing anti-vibration by cushioning gutter-securing screws 117. No prior art mention or disclose any gutters, having double-gutter-supporting-and-locking corner parapet-post 121. Therefore, the prior art of gutters are: Not capable of supporting an RV gutter to shed rainwater from an RV in the direction of arrow 141 (see FIG. 3 and FIG. 103); Not capable of supporting a concert stage gutter to shed rainwater from a concert stage in the direction of arrow 142 (see FIG. 4, and FIG. 104); Not capable of supporting a house gutter to shed rainwater from a house in the direction of arrow 143 (see FIG. 5, and FIG. 105); Not capable of supporting a solar panel gutter to shed rainwater from a solar panel in the direction of arrow 144 (see FIG. 6, and FIG. 106); and Not capable of supporting an awning gutter to shed rainwater when attached to a building in the direction of arrow 145 (see FIG. 7, and FIG. 107). No prior art mention or disclose any gutters, having double-gutter-supporting-and-locking center parapet-posts 128. Therefore, the prior art of gutters are: Not capable of supporting an RV gutter to shed rainwater from an RV in the direction of arrow 141 (see FIG. 3 and FIG. 103); Not capable of supporting a concert stage gutter to shed rainwater from a concert stage in the direction of arrow 142 (see FIG. 4, and FIG. 104); Not capable of supporting a house gutter to shed rainwater from a house in the direction of arrow 143 (see FIG. 5, and FIG. 105); Not capable of supporting a solar panel gutter to shed rainwater from a solar panel in the direction of arrow 144 (see FIG. 6, and FIG. 106); and Not capable of supporting an awning gutter to shed rainwater when attached to a building in the direction of arrow 145 (see FIG. 7, and FIG. 107).

Objects and Advantages of Some Embodiments

Some embodiments of the present invention substantially departs from the conventional concepts and designs of the prior art. In doing so, embodiments of the present invention provides a five-device-in-one anti-leaking noise-canceling anti-twisting anti-warping anti-vibrating double-locking double-core double-deck double-stacked internal-gutters (for being adapted to pergola, RV, house, solar panel, and concert stage), having many new and significant features, functions, and advantages, which overcome all the disadvantages of the prior art, as follows:

1) It is an object of some embodiments to provide the five-device-in-one anti-leaking noise-canceling anti-twisting anti-warping anti-vibrating double-locking double-core double-deck double-stacked internal-gutters, having 4 side-rainwater-guiding quick-release-accessary-adding double-deck double-stacked-internal-gutters 108. Therefore, the five-device-in-one anti-leaking noise-canceling anti-twisting anti-warping anti-vibrating double-locking double-core double-deck double-stacked internal-gutters may be: Capable of guiding rainwater to 4 double-gutter-supporting-and-locking rainwater-draining corner flumes 125 and 2 double-gutter-supporting-and-locking rainwater-draining center flumes 132 to prevent water damage and rust in the direction of arrow 140 (see FIG. 95-FIG. 99); Capable of shedding rainwater away from five-device-in-one anti-leaking noise-canceling anti-twisting anti-warping anti-vibrating double-locking double-core double-deck double-stacked internal-gutters to prevent water damage and rust in the direction of arrow 140 (see FIG. 95, and FIG. 99); Capable of supporting an RV gutter to shed rainwater from an RV in the direction of arrow 141 (see FIG. 3, and FIG. 103) Capable of supporting a concert stage gutter to shed rainwater from a concert stage in the direction of arrow 142 (see FIG. 4, and FIG. 104); Capable of supporting a house gutter to shed rainwater from a house in the direction of arrow 143 (see FIG. 5, and FIG. 105); Capable of supporting a solar panel gutter to shed rainwater from a solar panel in the direction of arrow 144 (see FIG. 6, and FIG. 106); and Capable of supporting an awning gutter to shed rainwater when attached to a building in the direction of arrow 145 (see FIG. 7, and FIG. 107).

Figure 48:
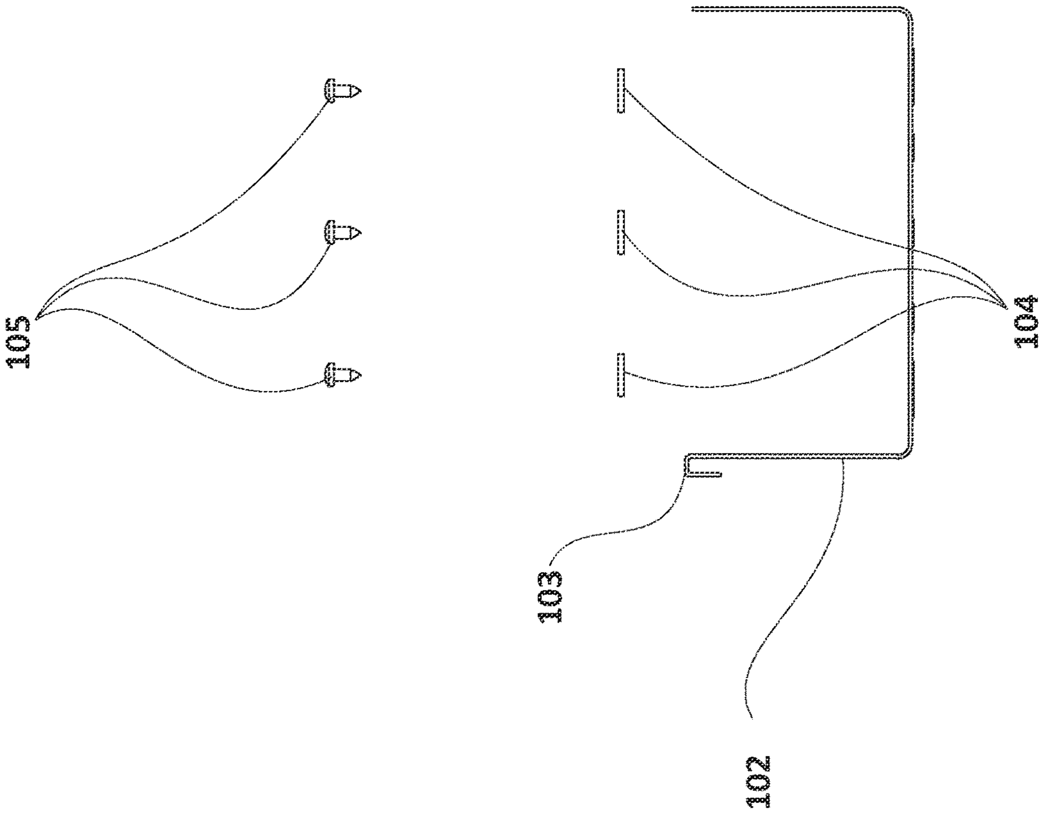
Figure 49:
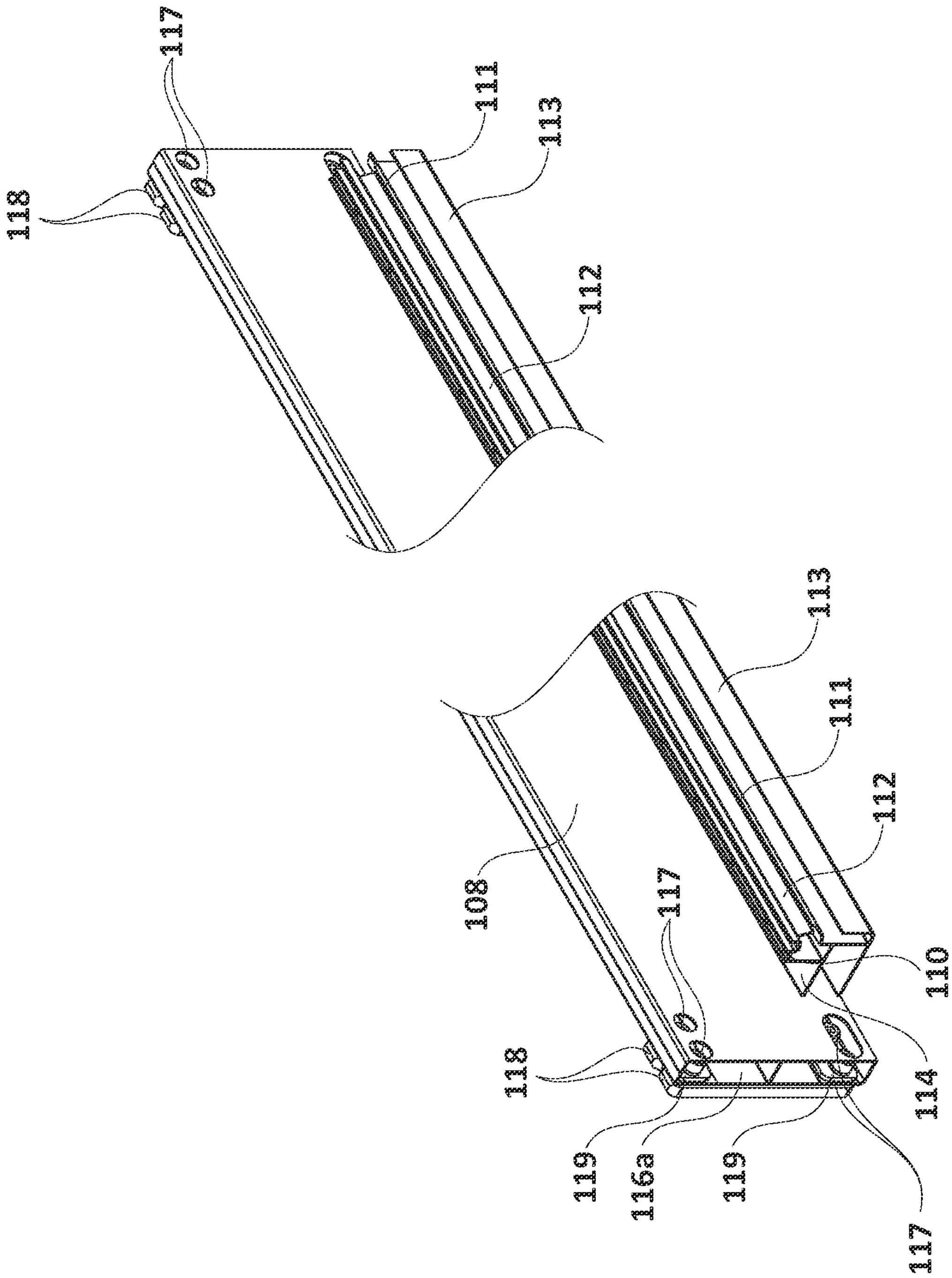
Figure 50:
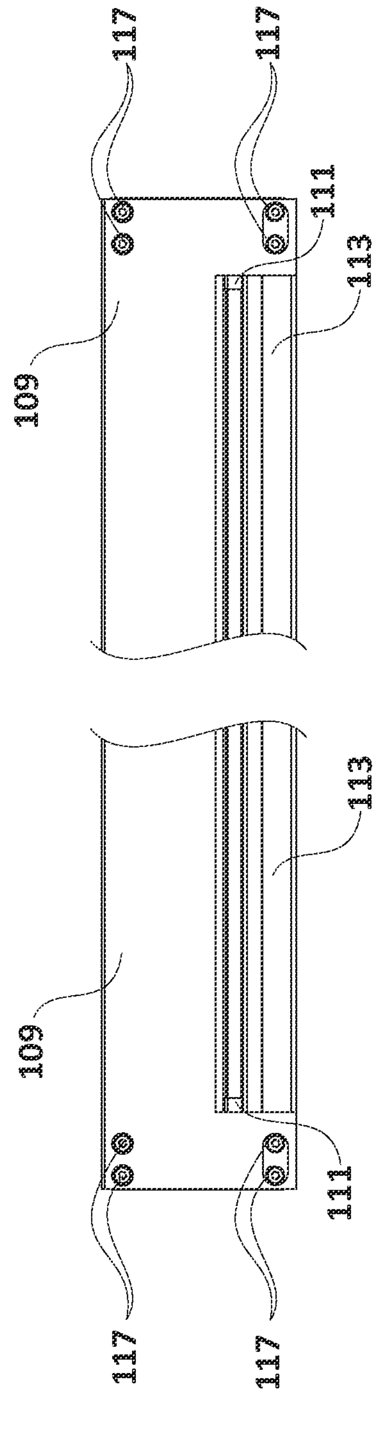
Figure 51:
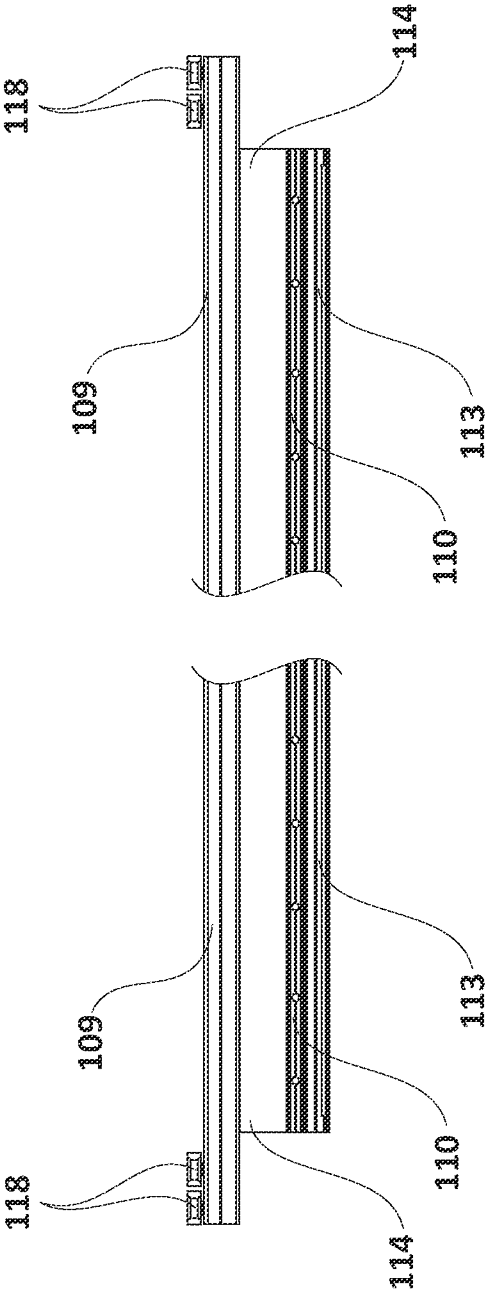
Figure 52:
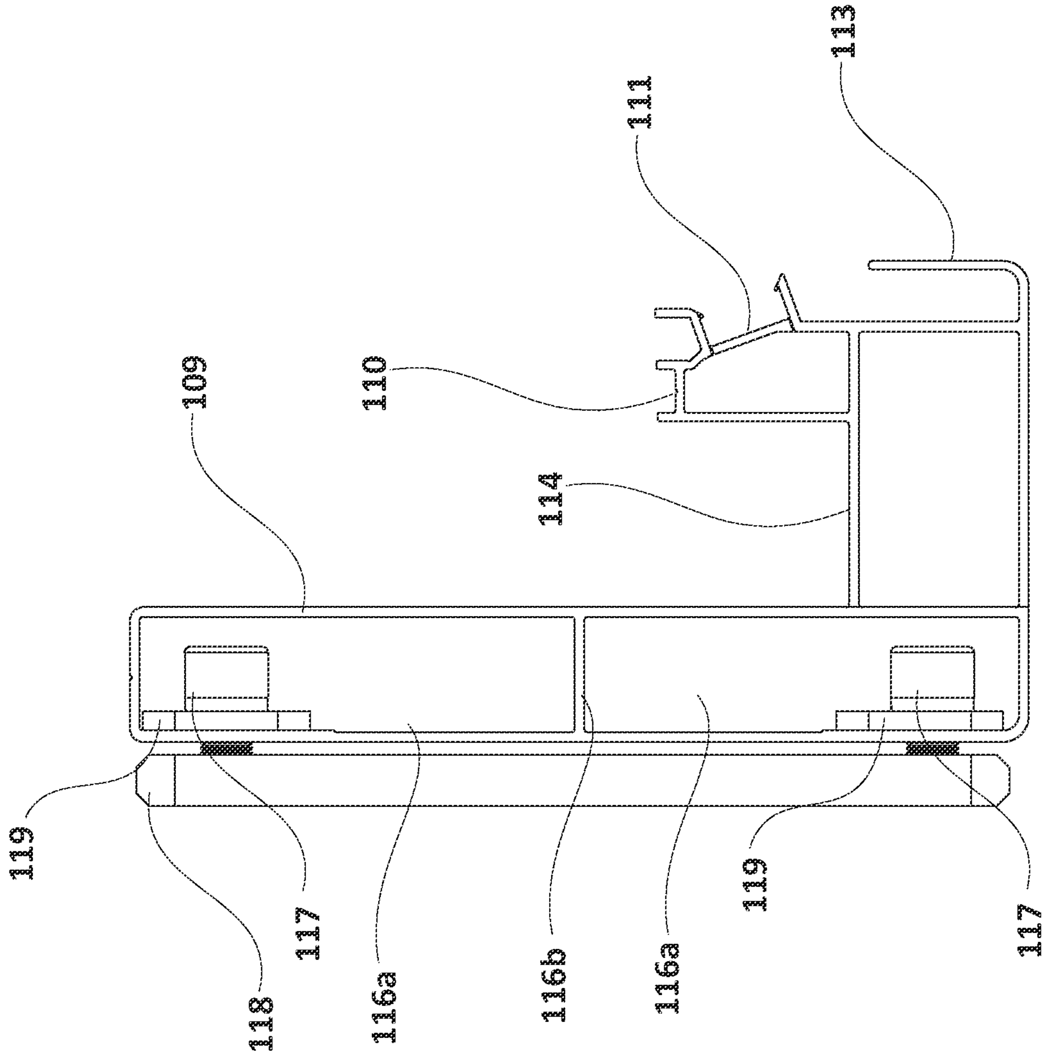
Figure 53:
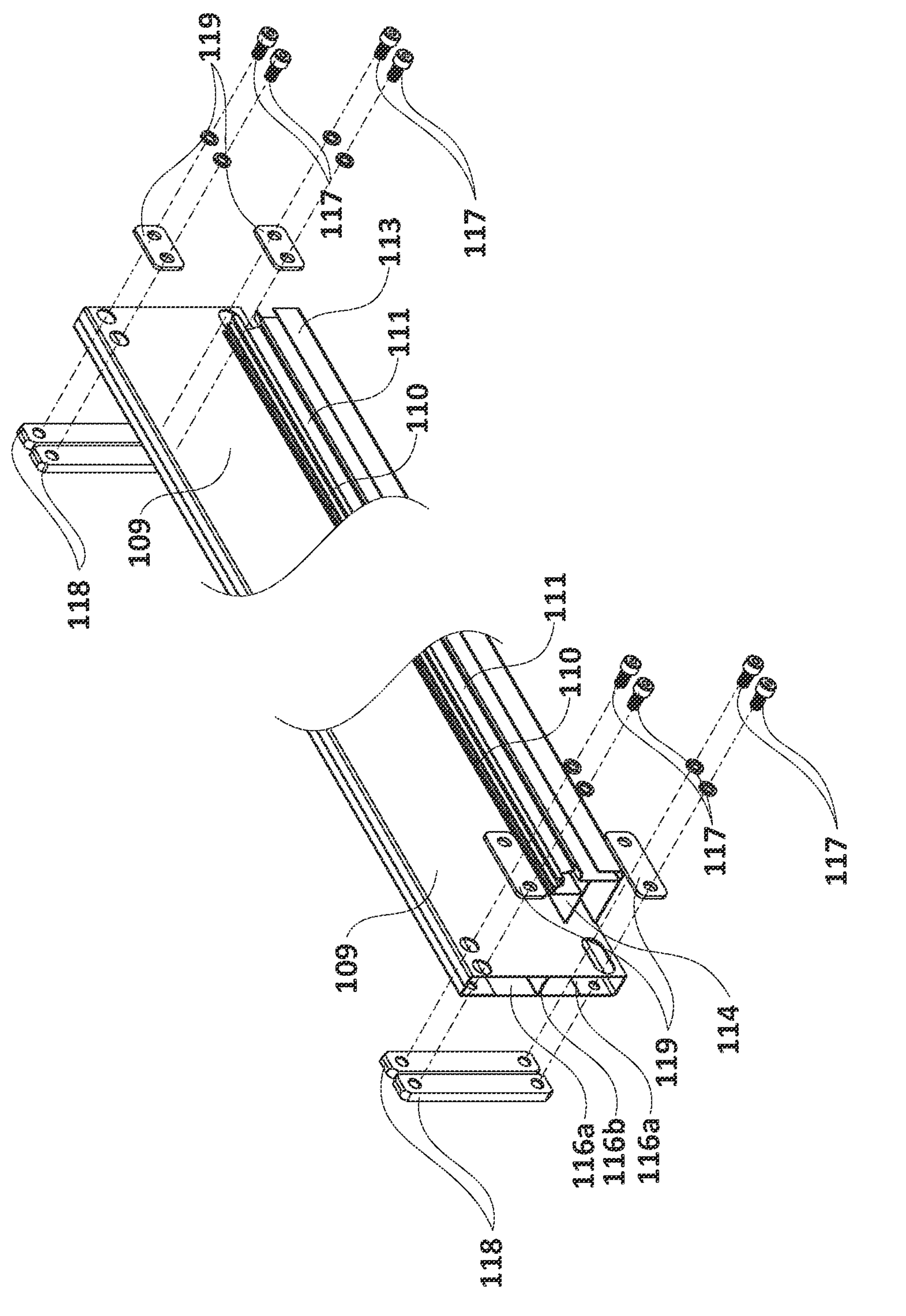
Figure 54:
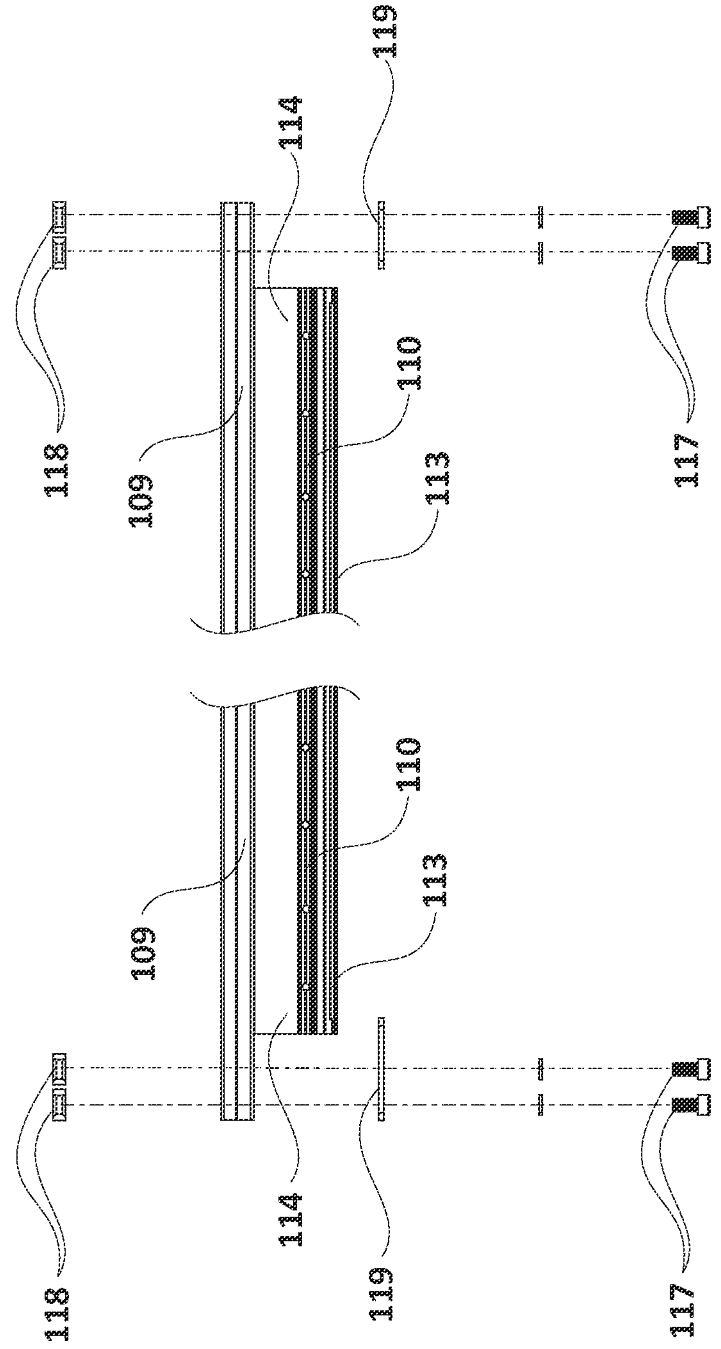
Figure 55:
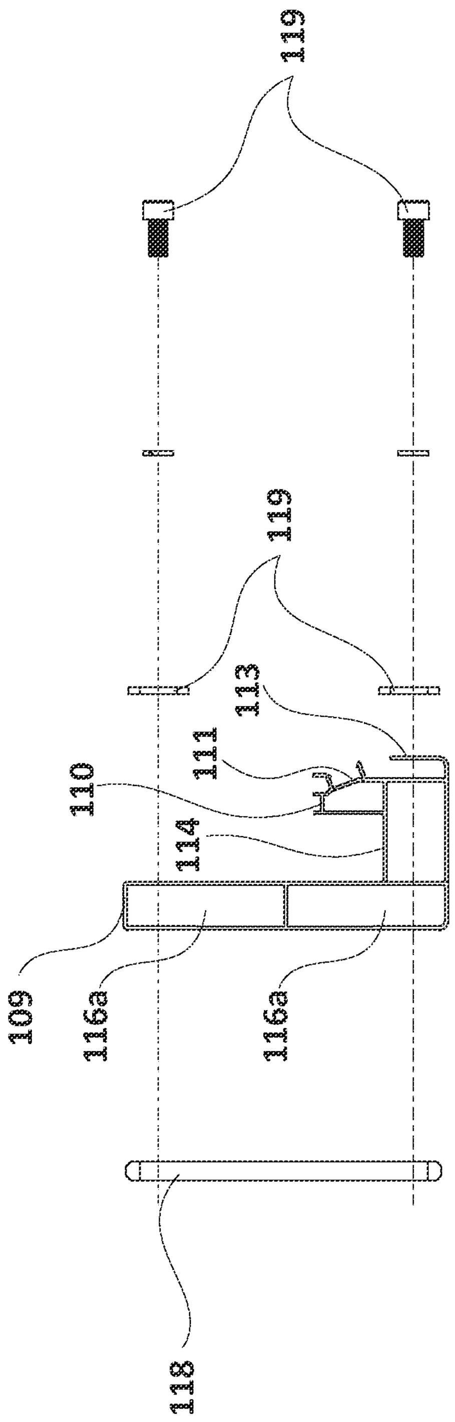
Figure 56:
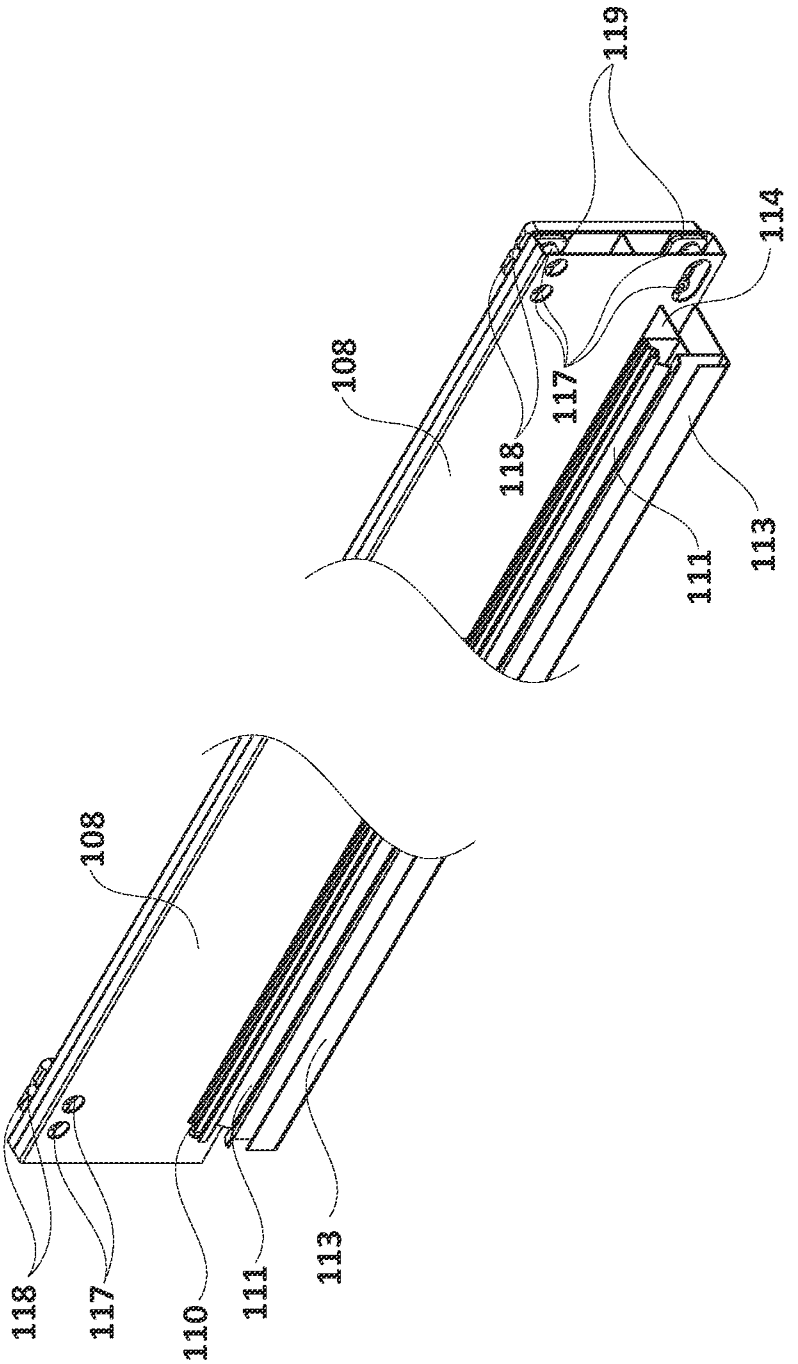
Figure 57:
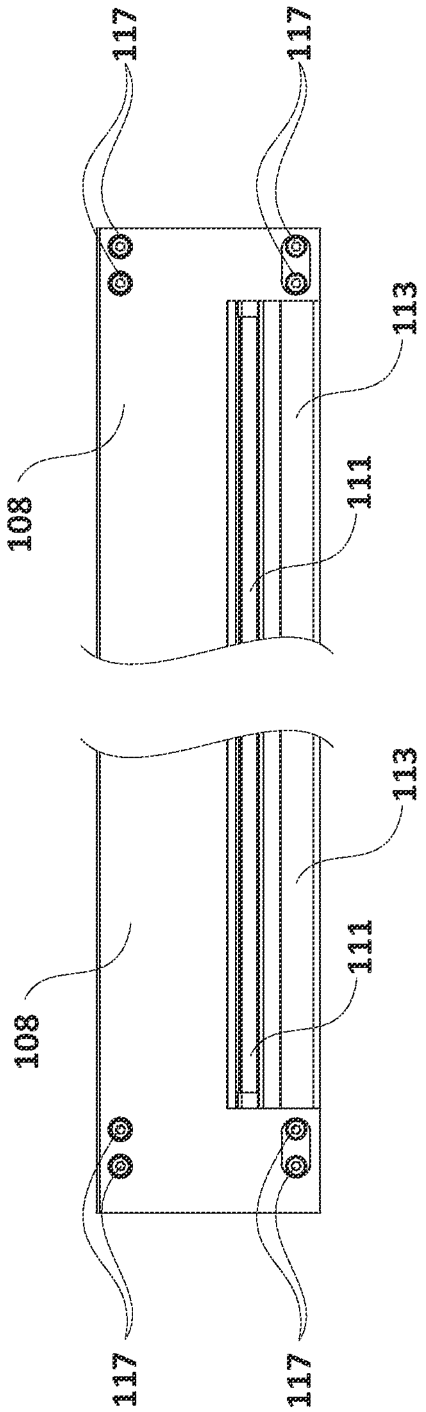
Figure 58:
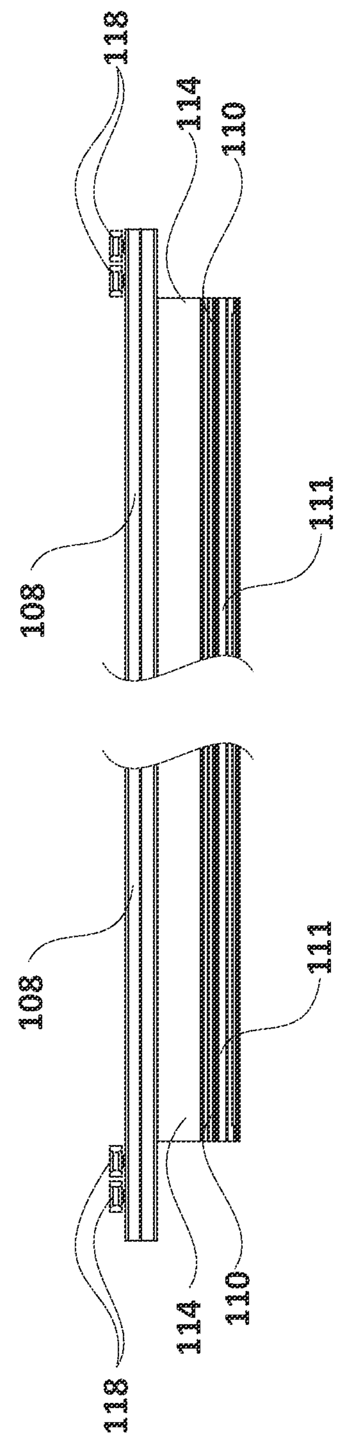
Figure 59:
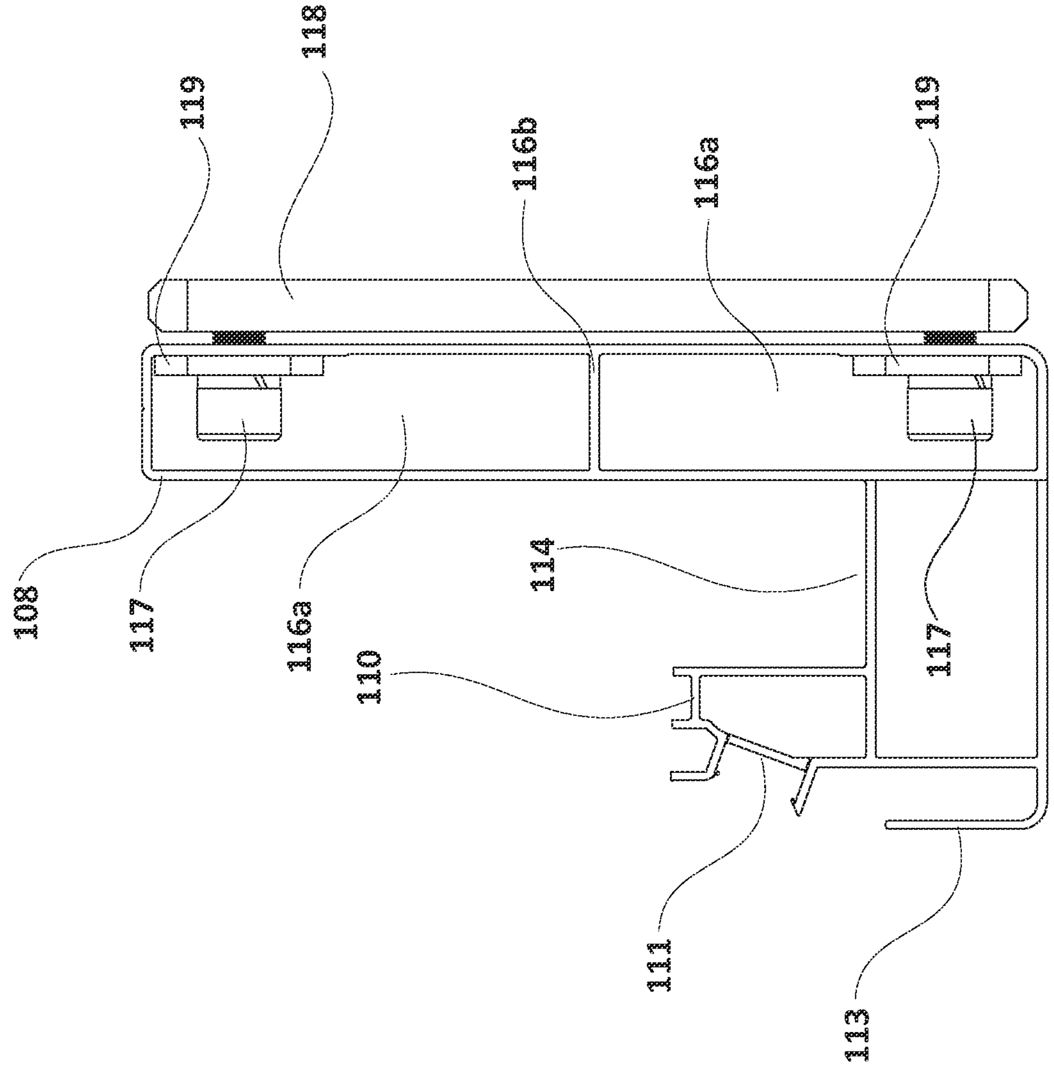
Figure 60:
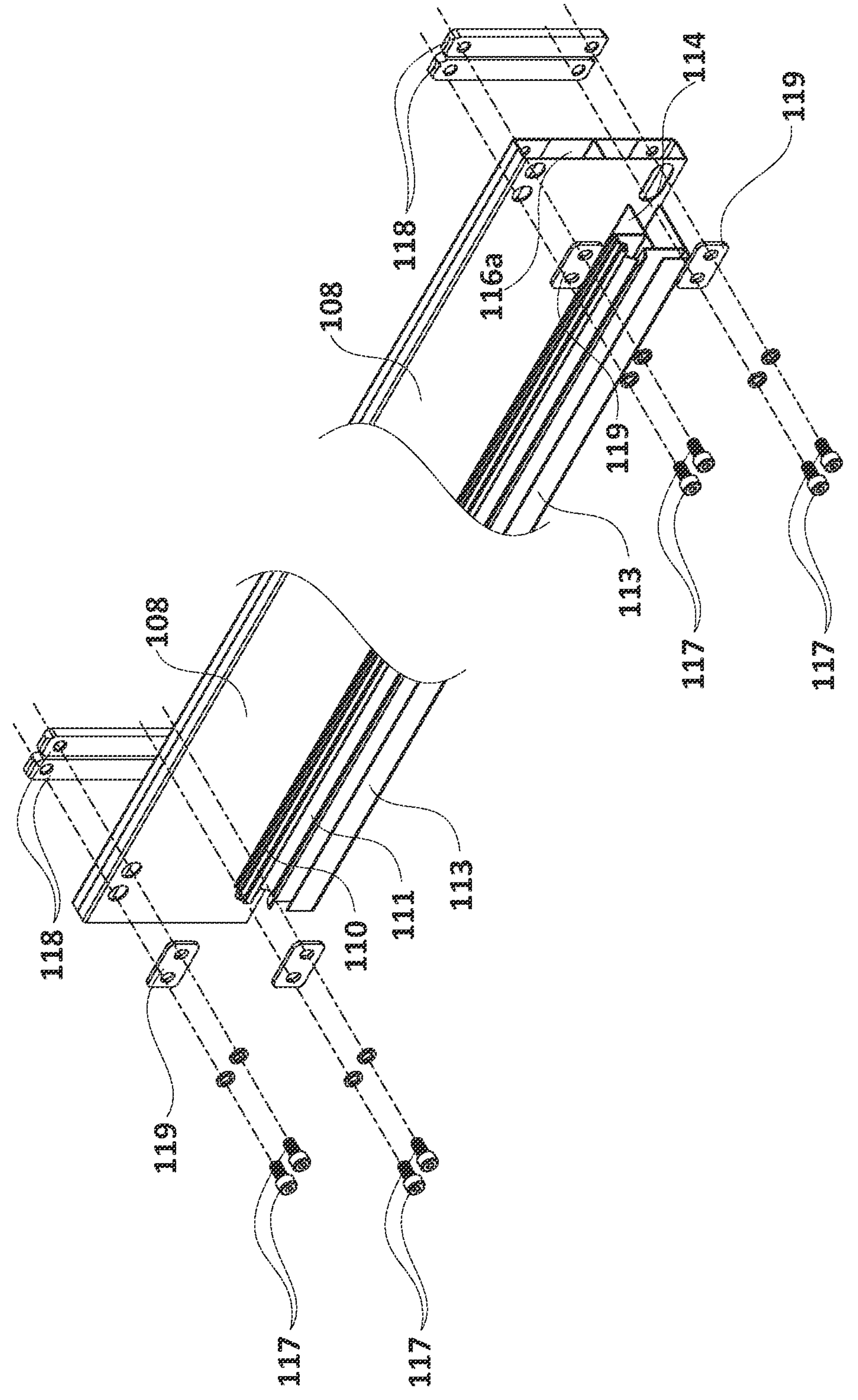
Figure 61:
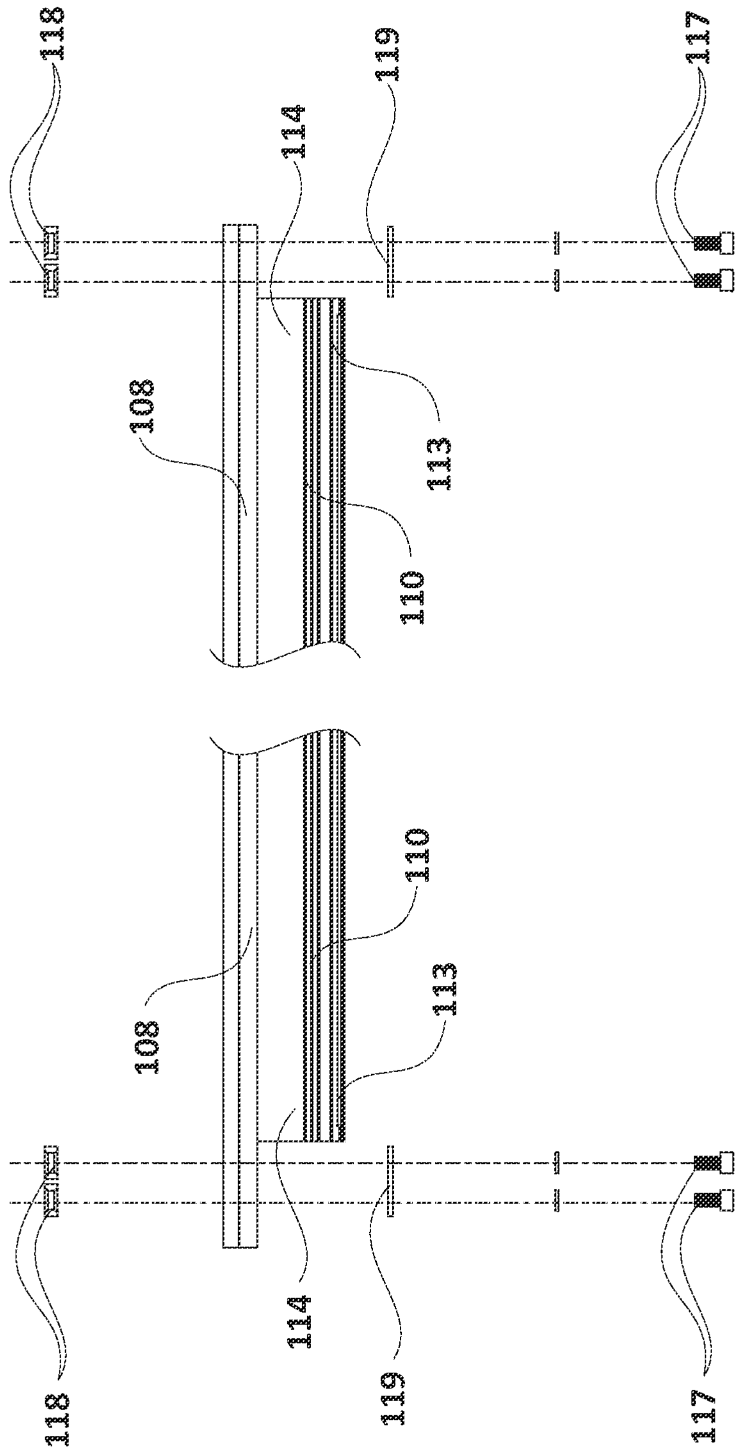
Figure 62:
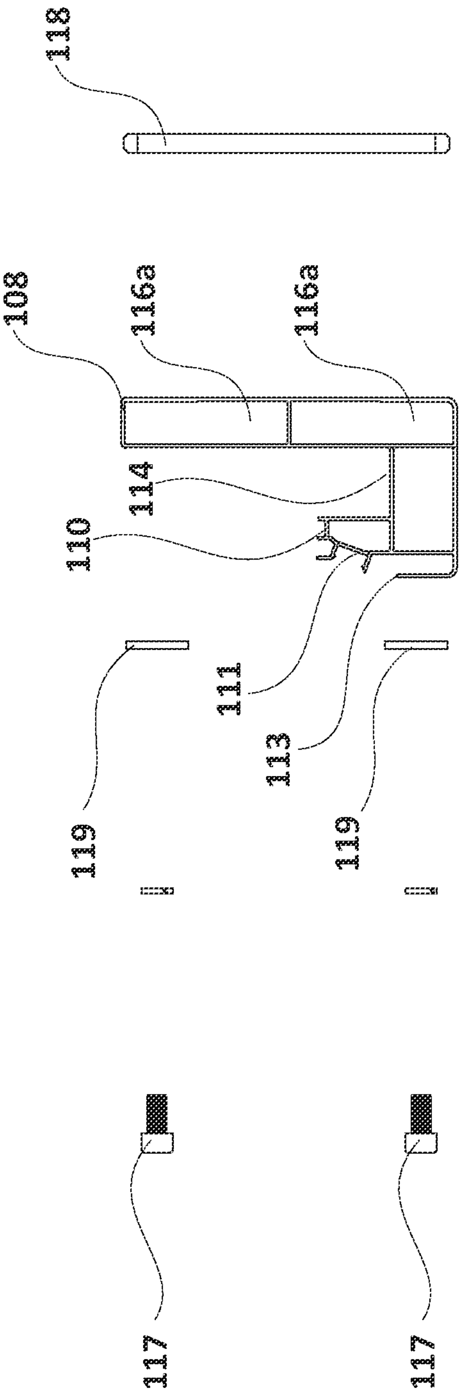
Figure 63:
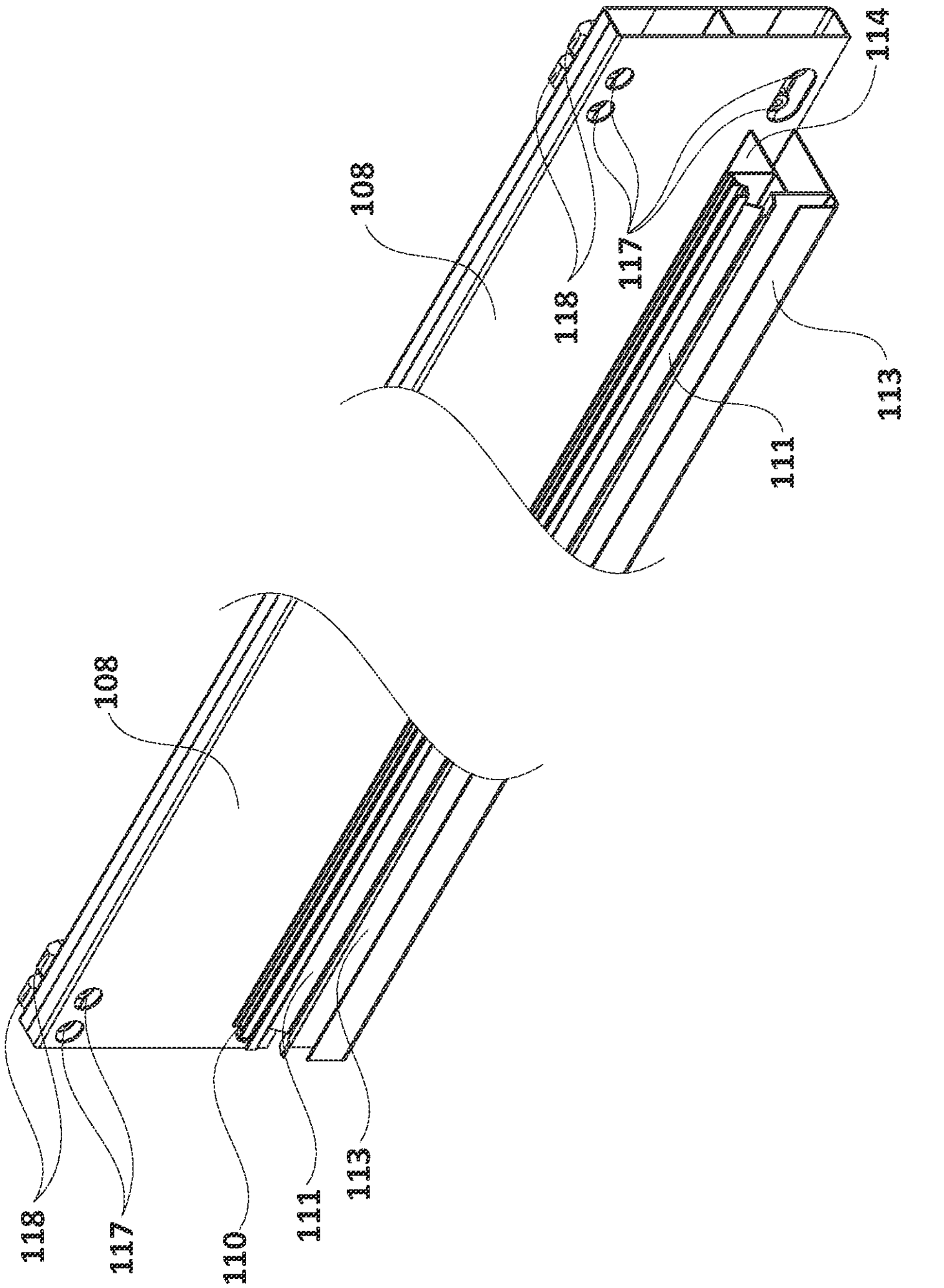
Figure 64:
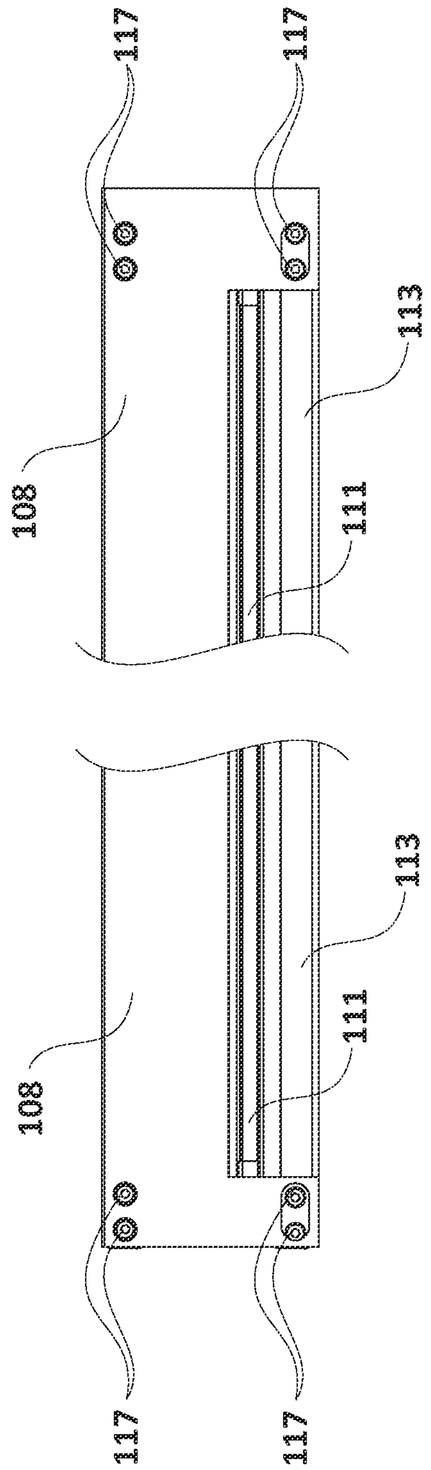
Figure 65:
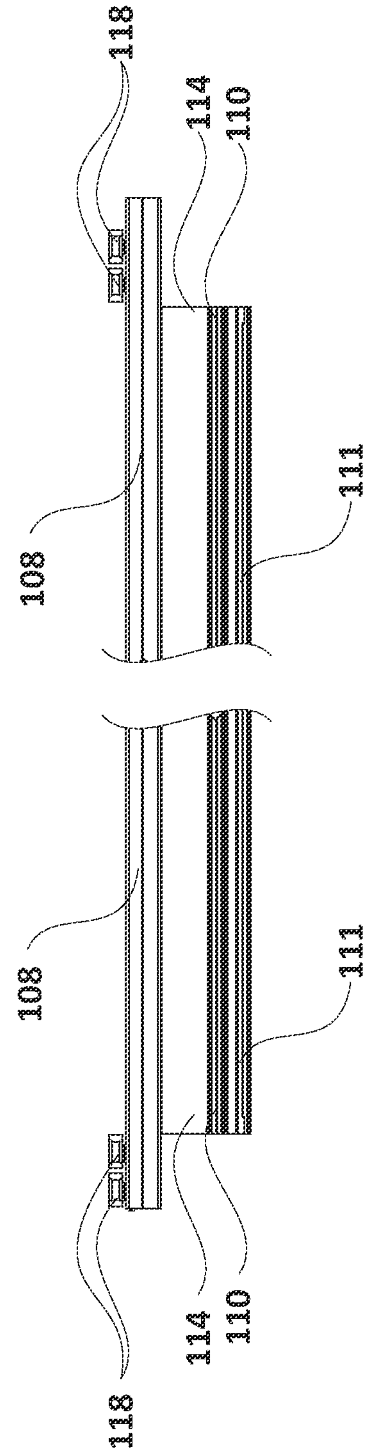
Figure 66:
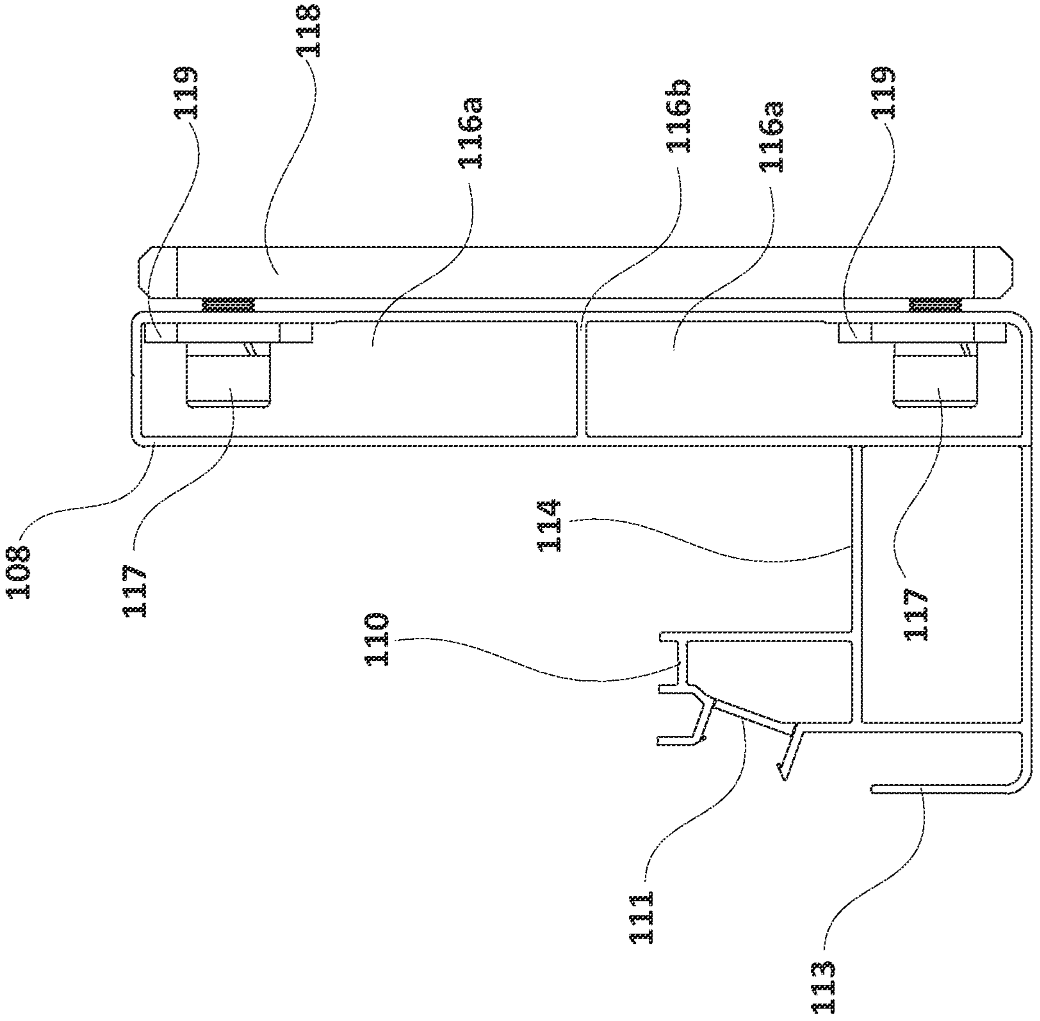
Figure 67:
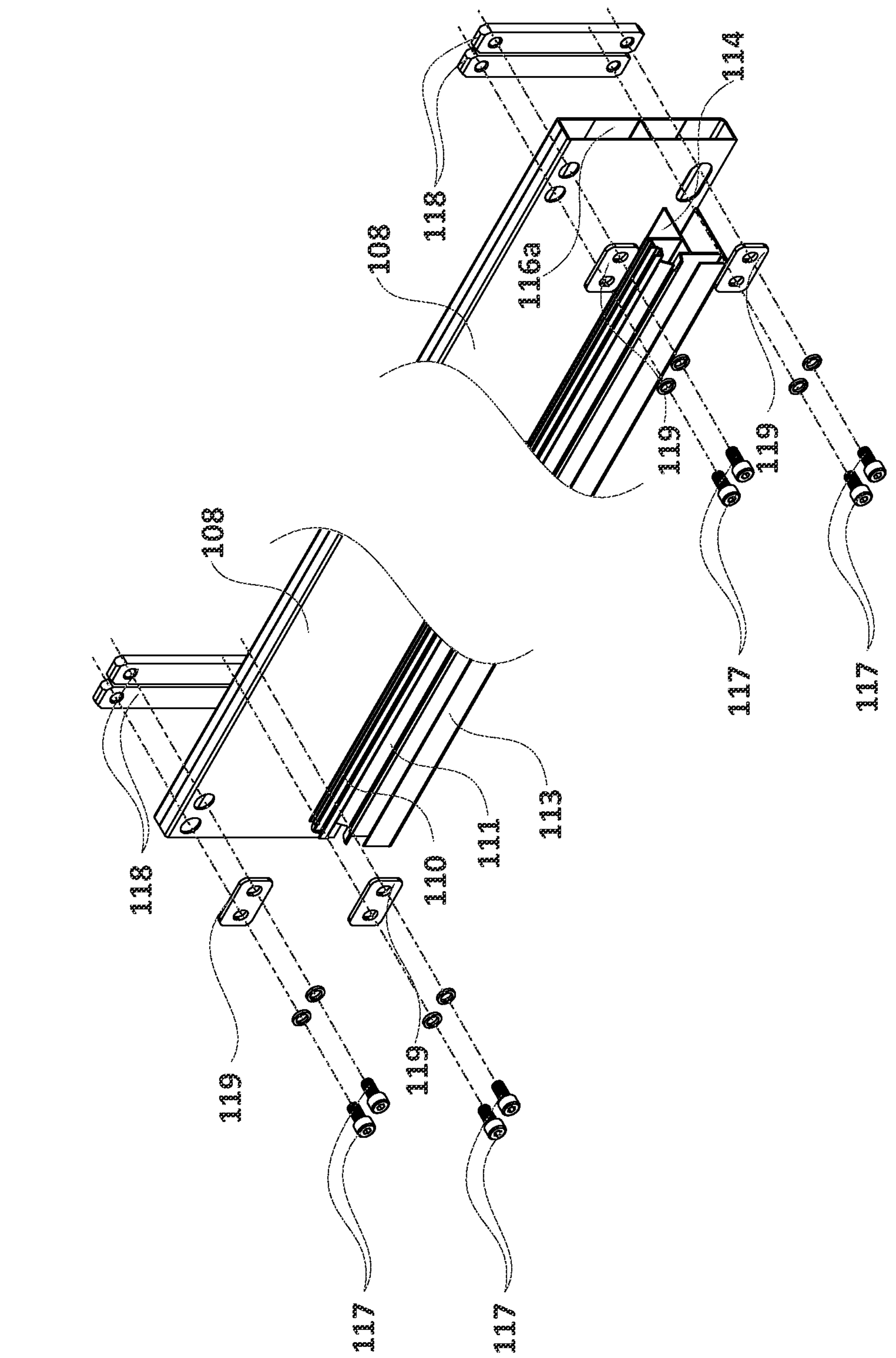
Figure 68:
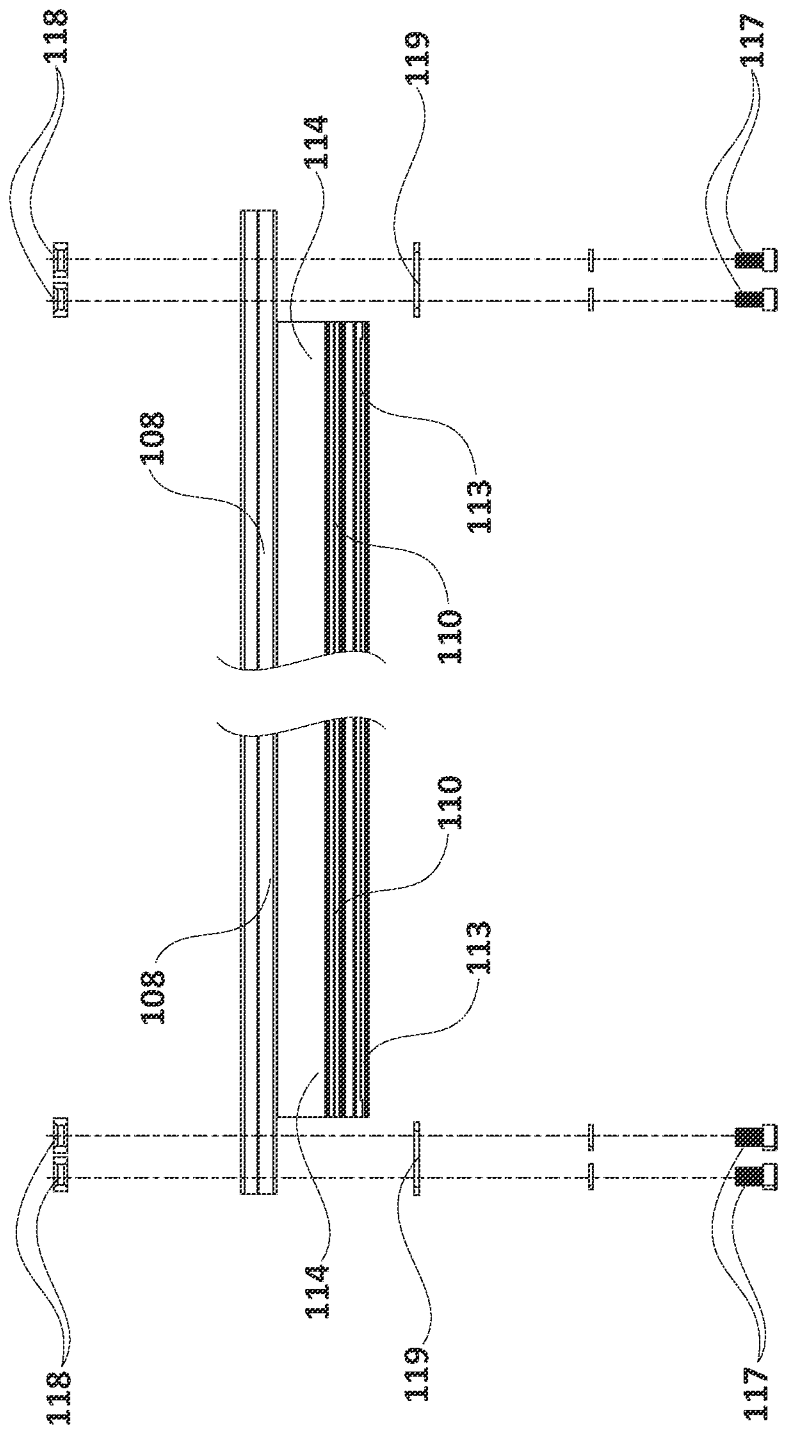
Figure 69:
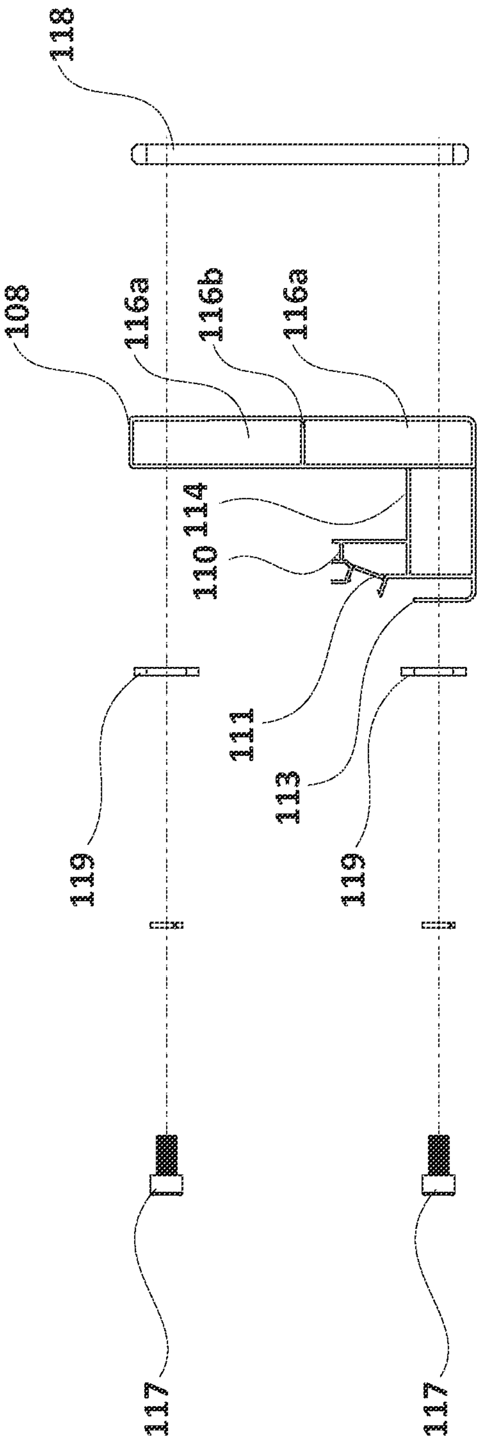
Figure 70:
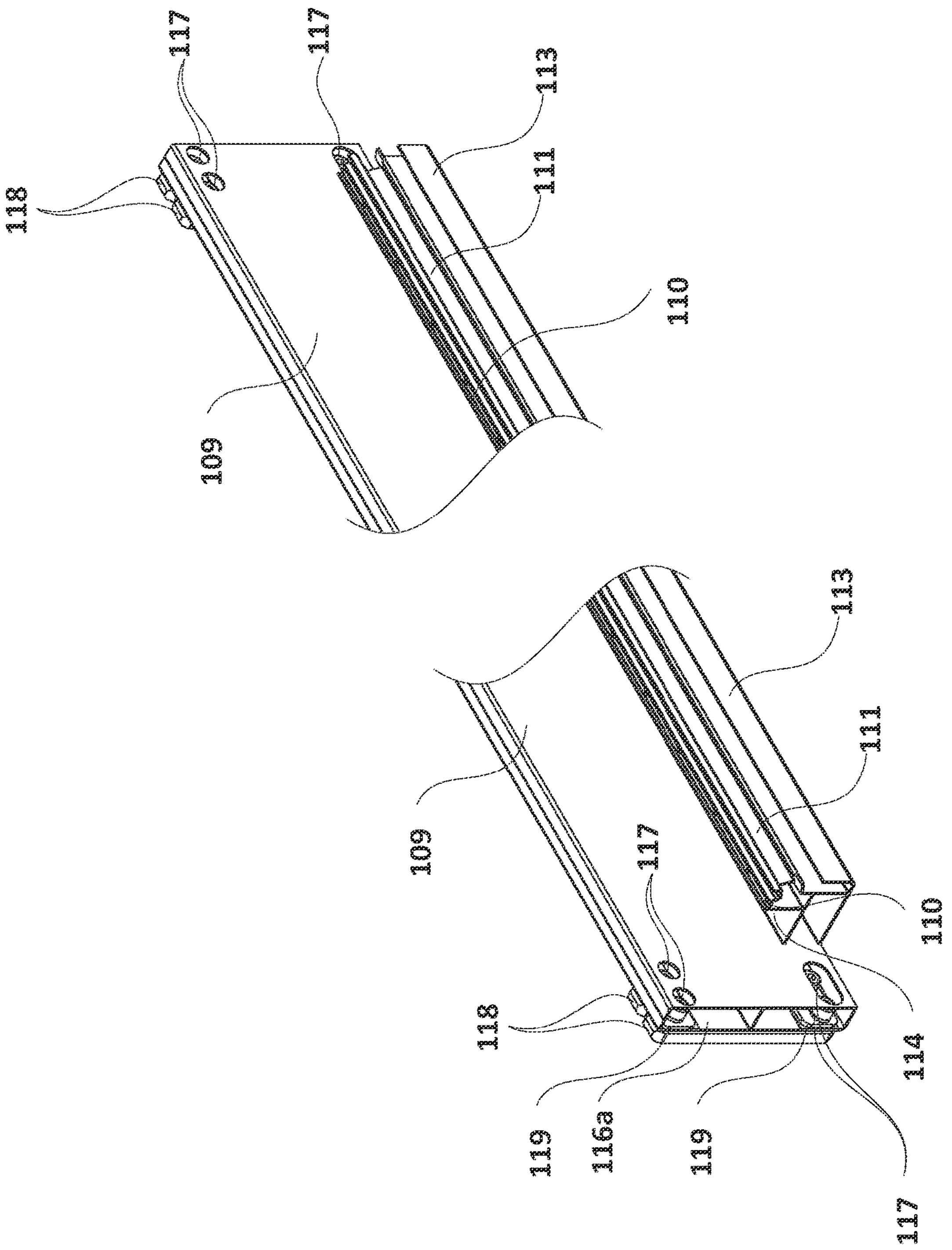
Figure 71:
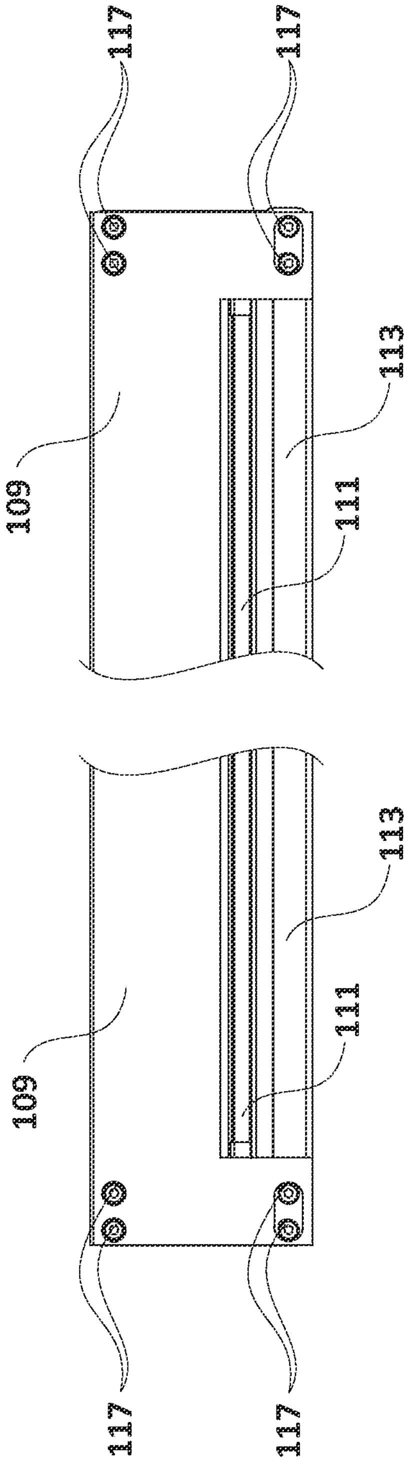
Figure 72:
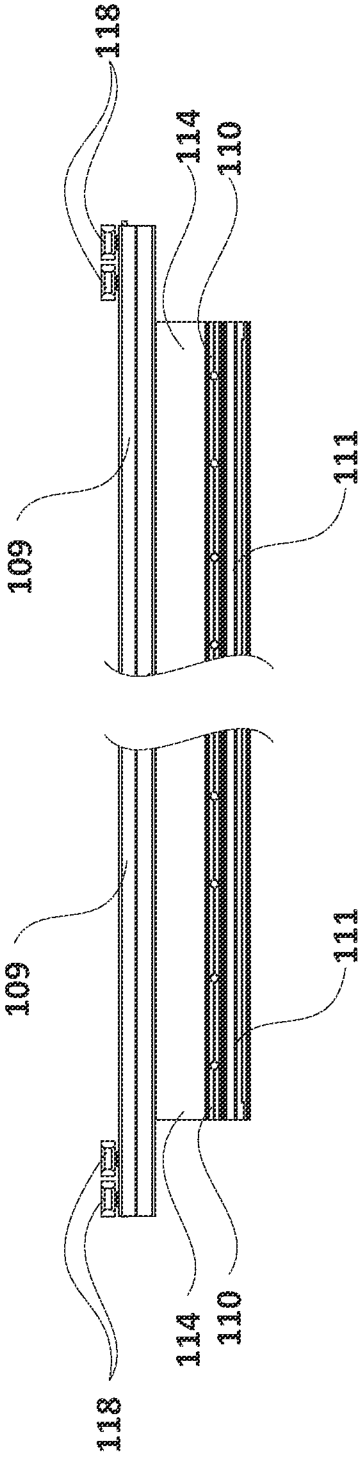
Figure 73:
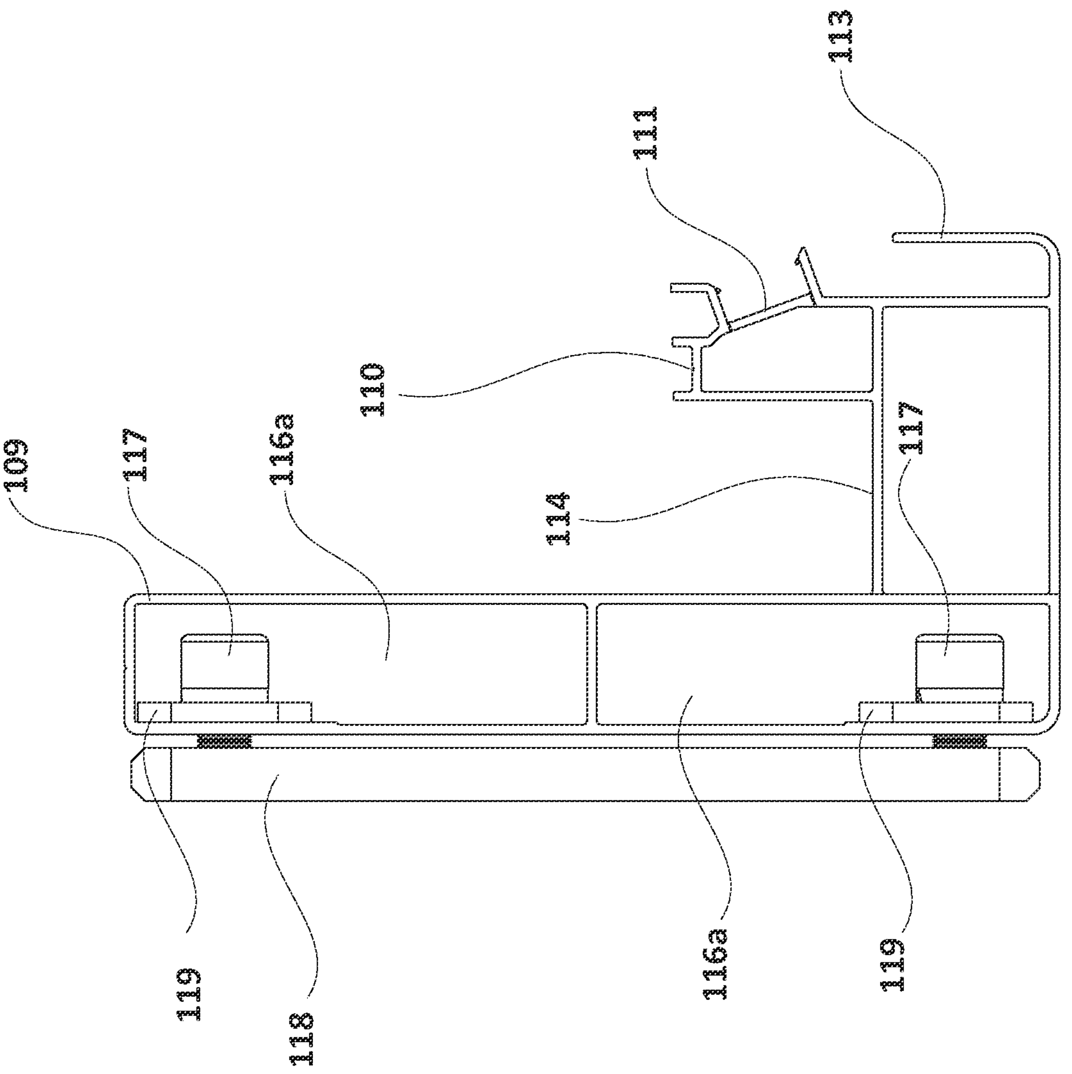
Figure 74:
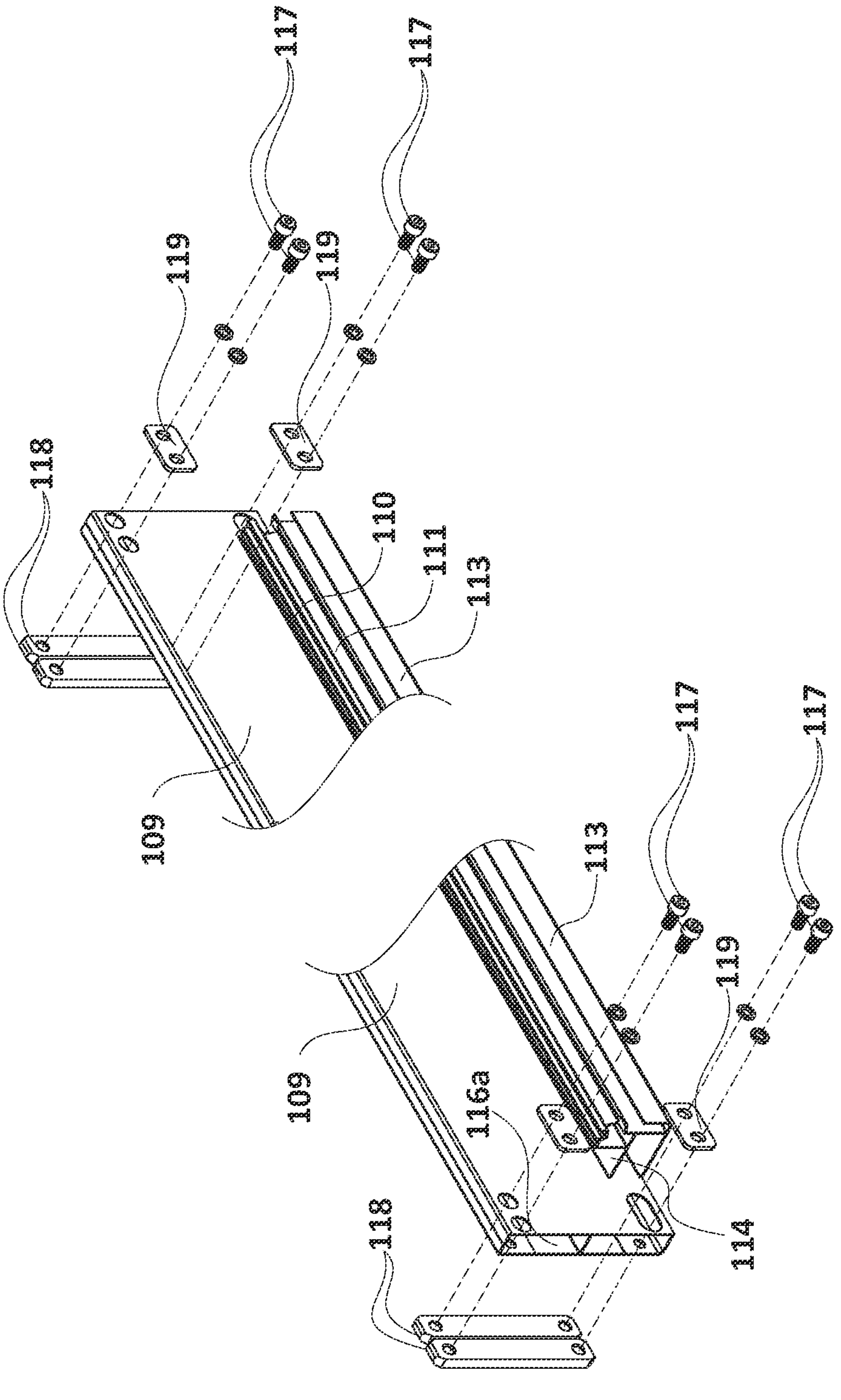
Figure 75:
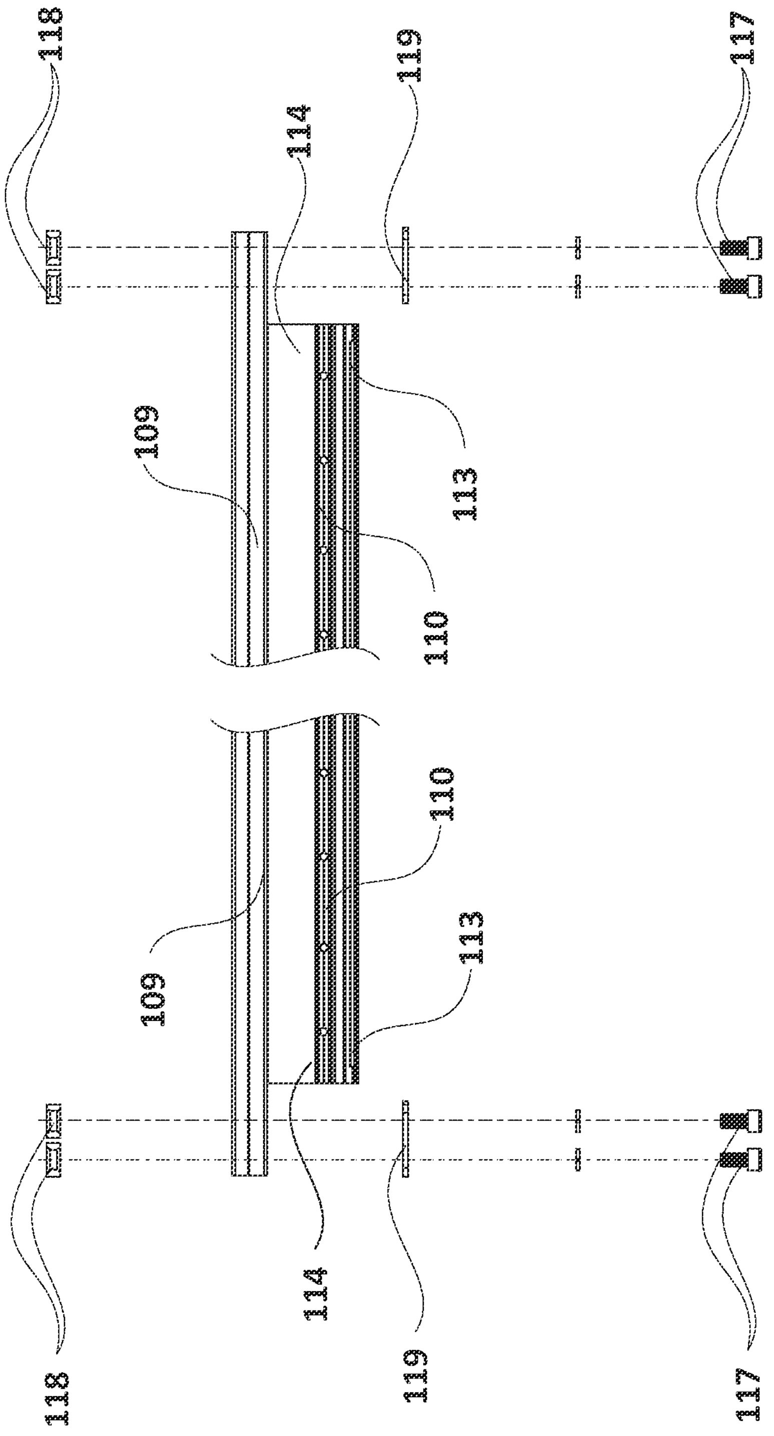
Figure 76:
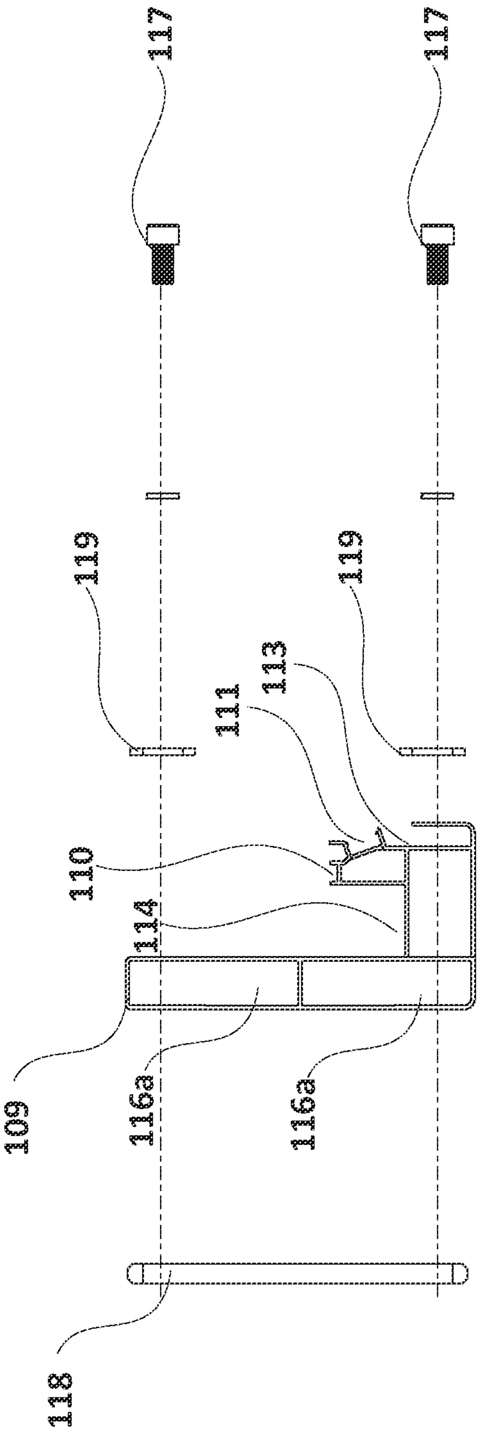
Figure 77:
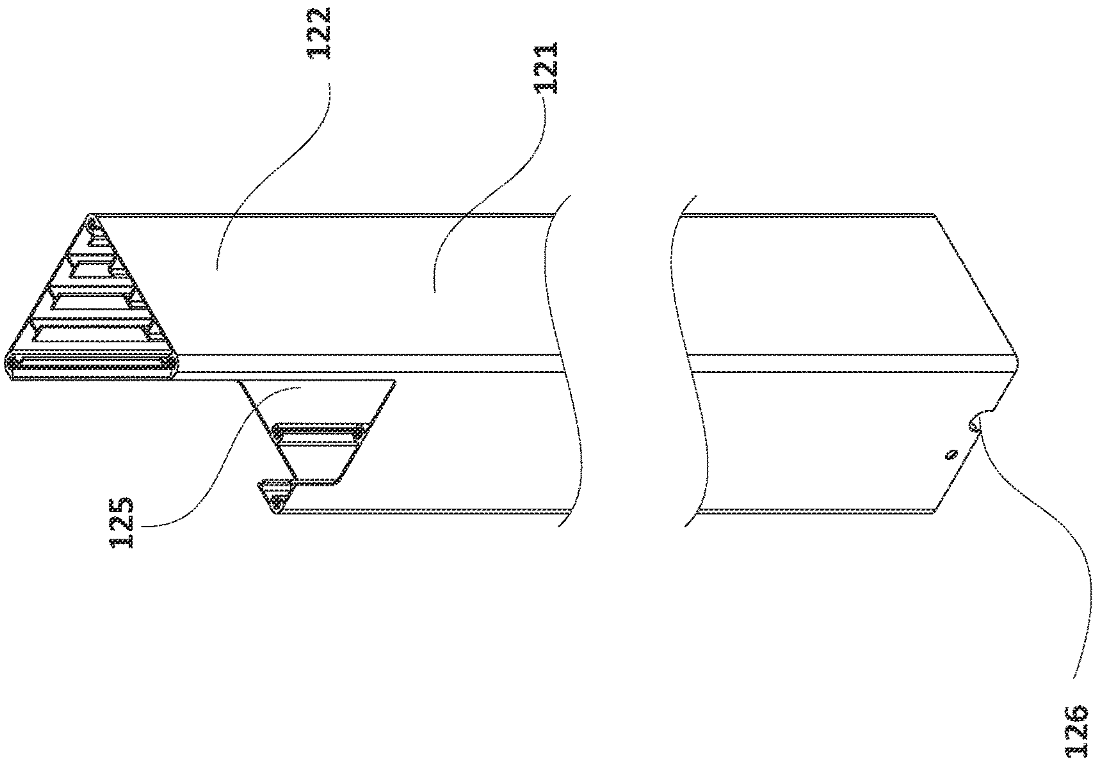
Figure 78:
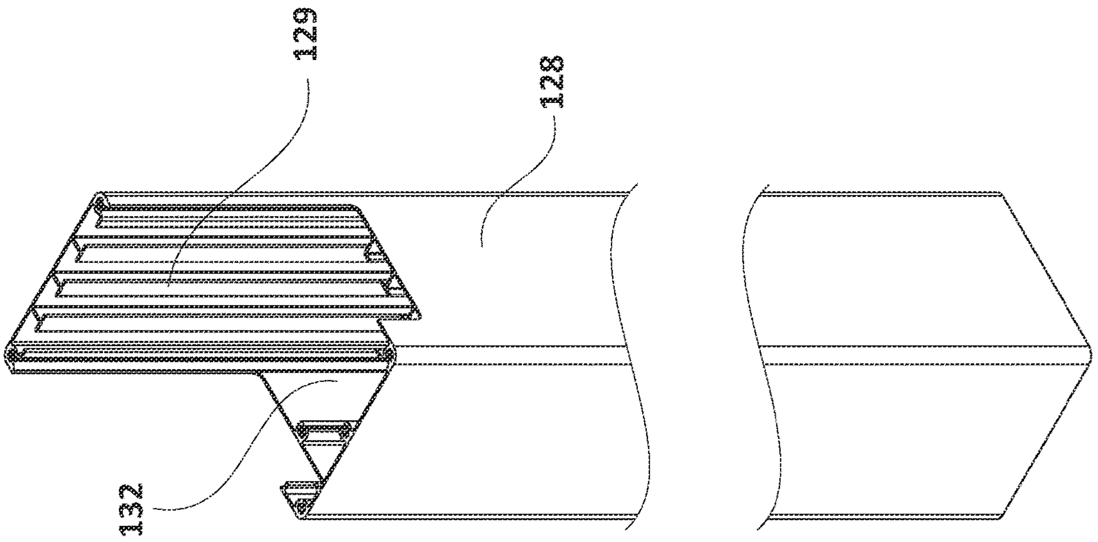
Figure 79:
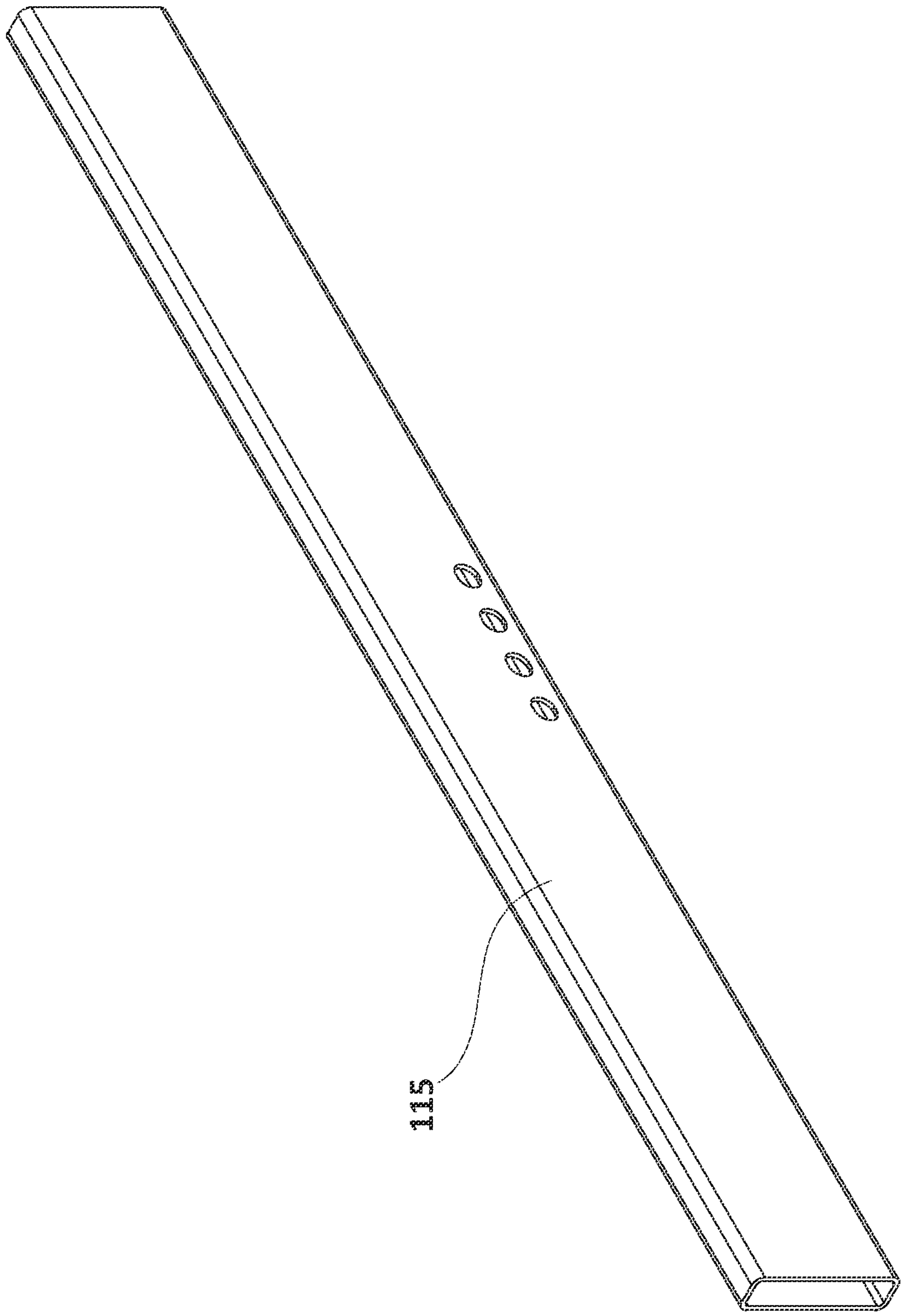
Figure 80:
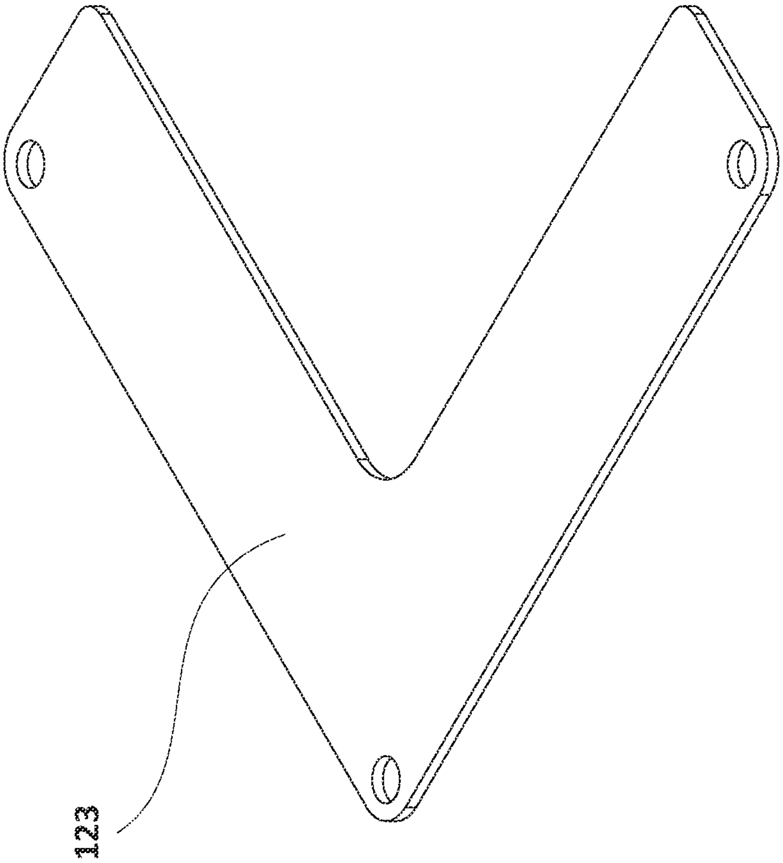
Figure 81:
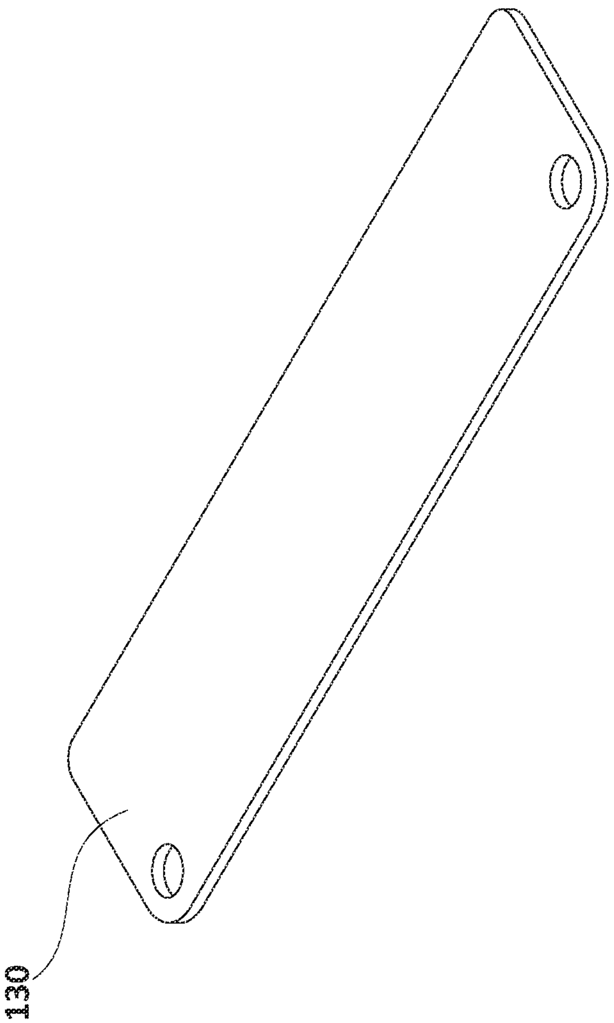
Figure 82A:
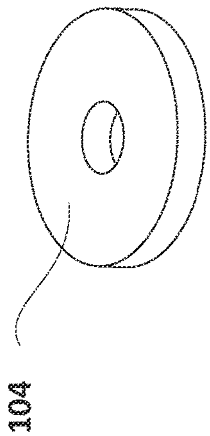
Figure 82B:
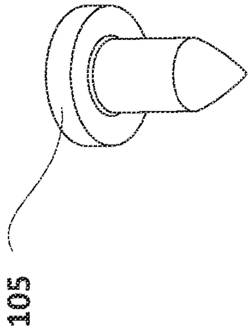
Figure 82C:
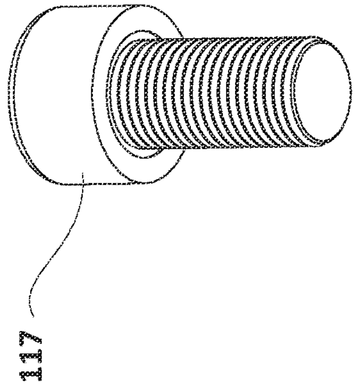
Figure 82D:
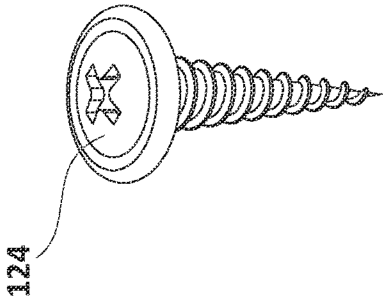
Figure 82E:
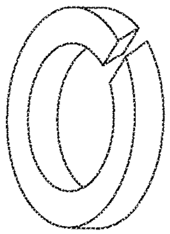
Figure 83:
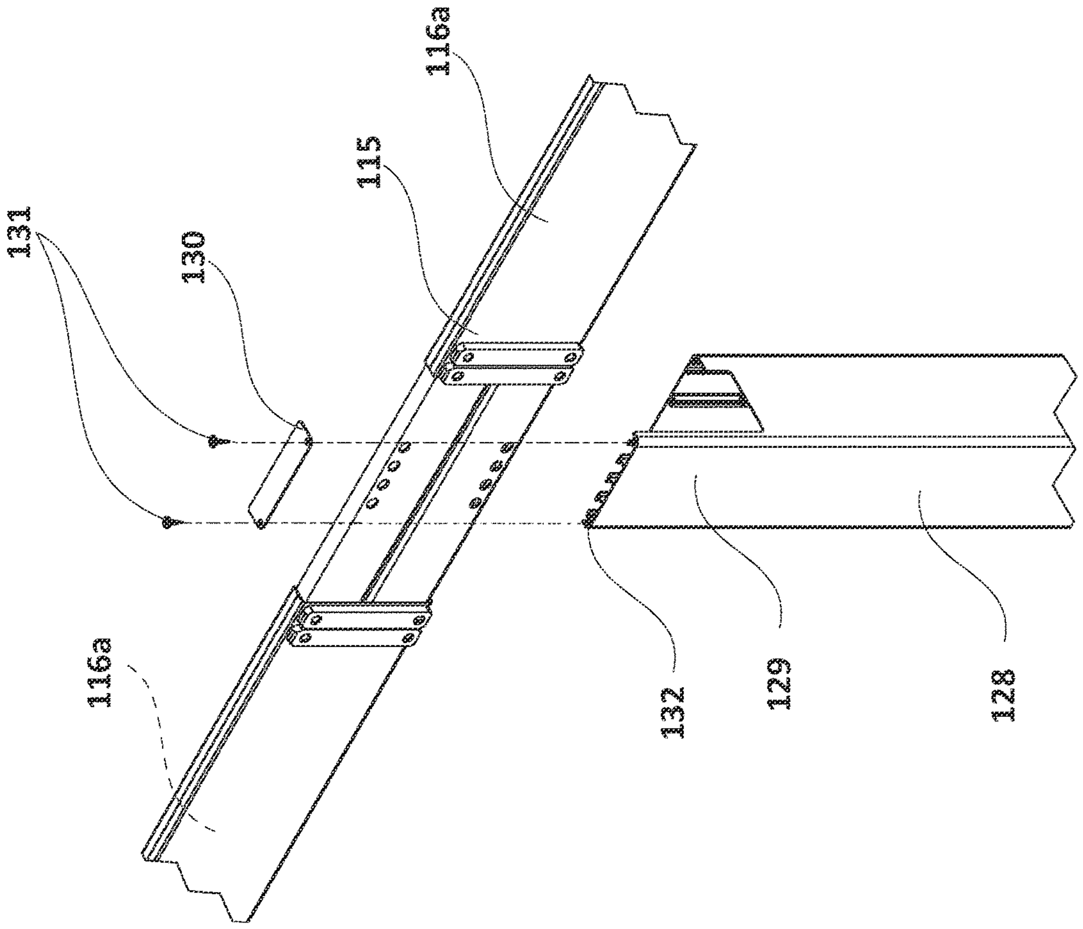
Figure 84:
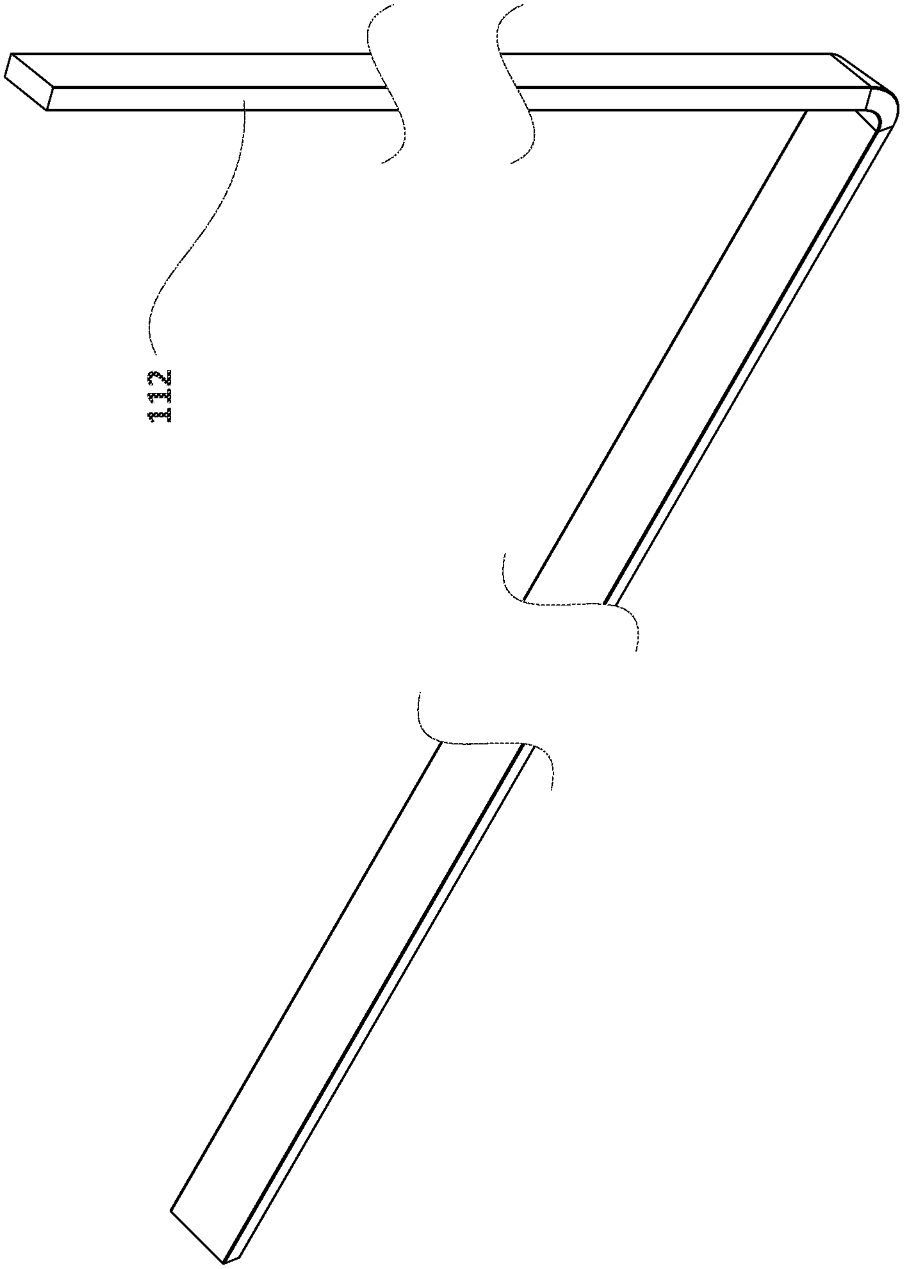
Figure 85:
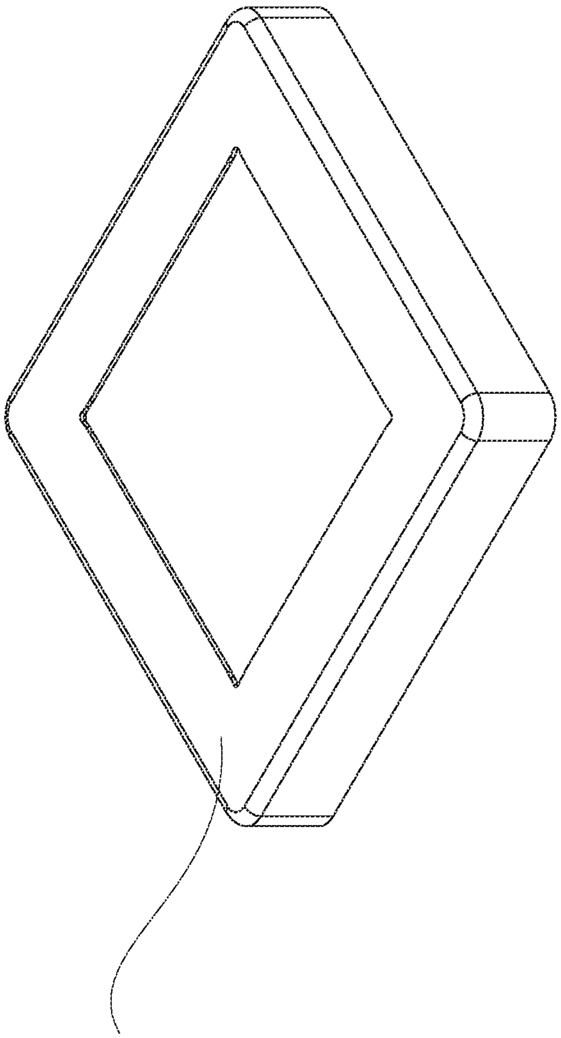
Figure 86B:
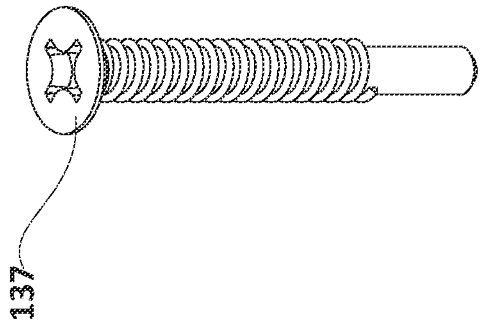
Figure 86A:
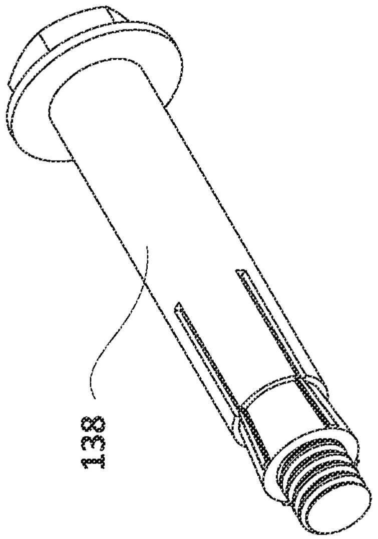
Figure 87:
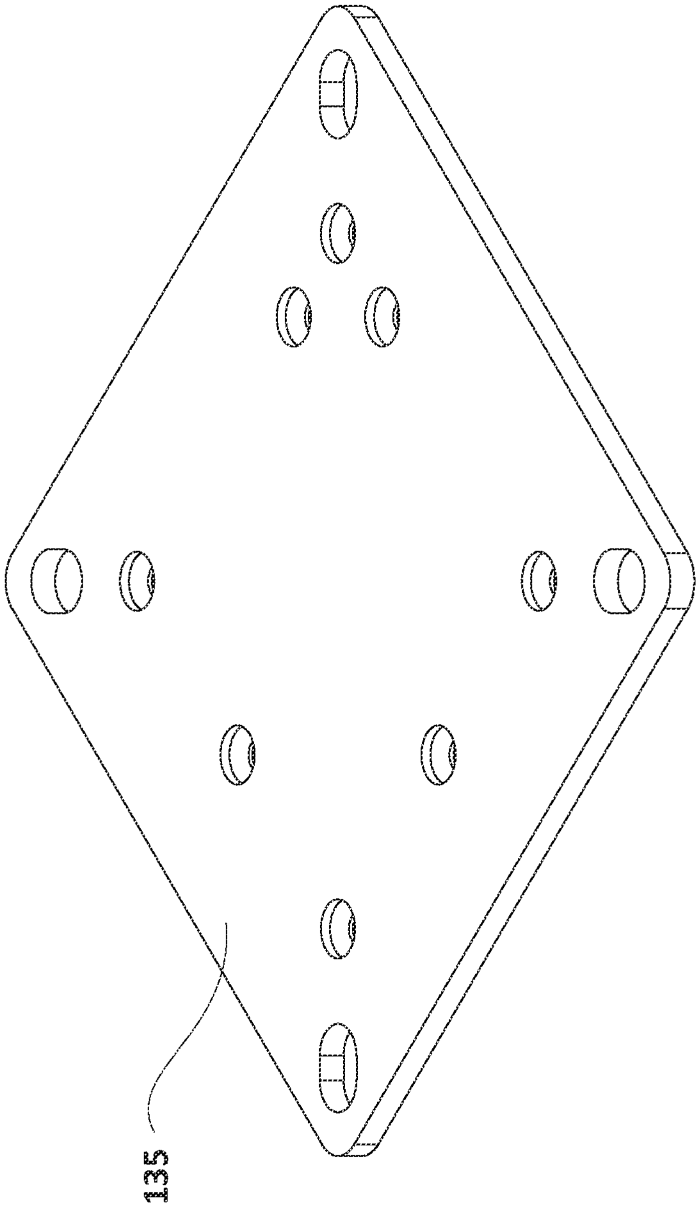
Figure 88:
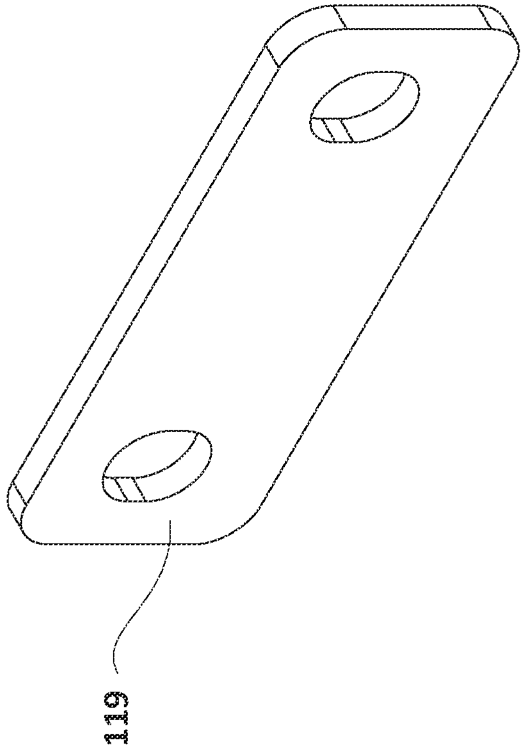
Figure 89:
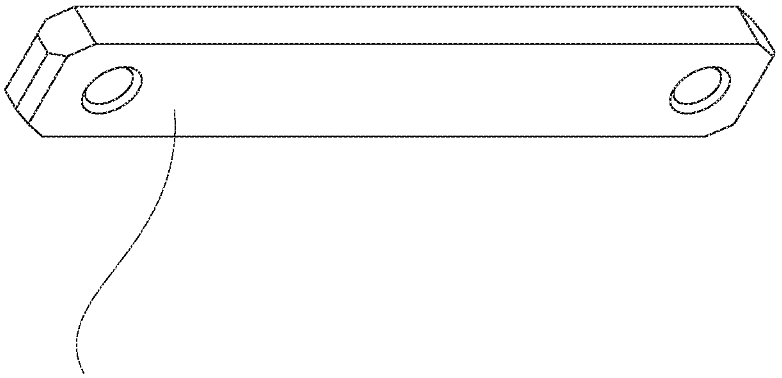
Figure 90:
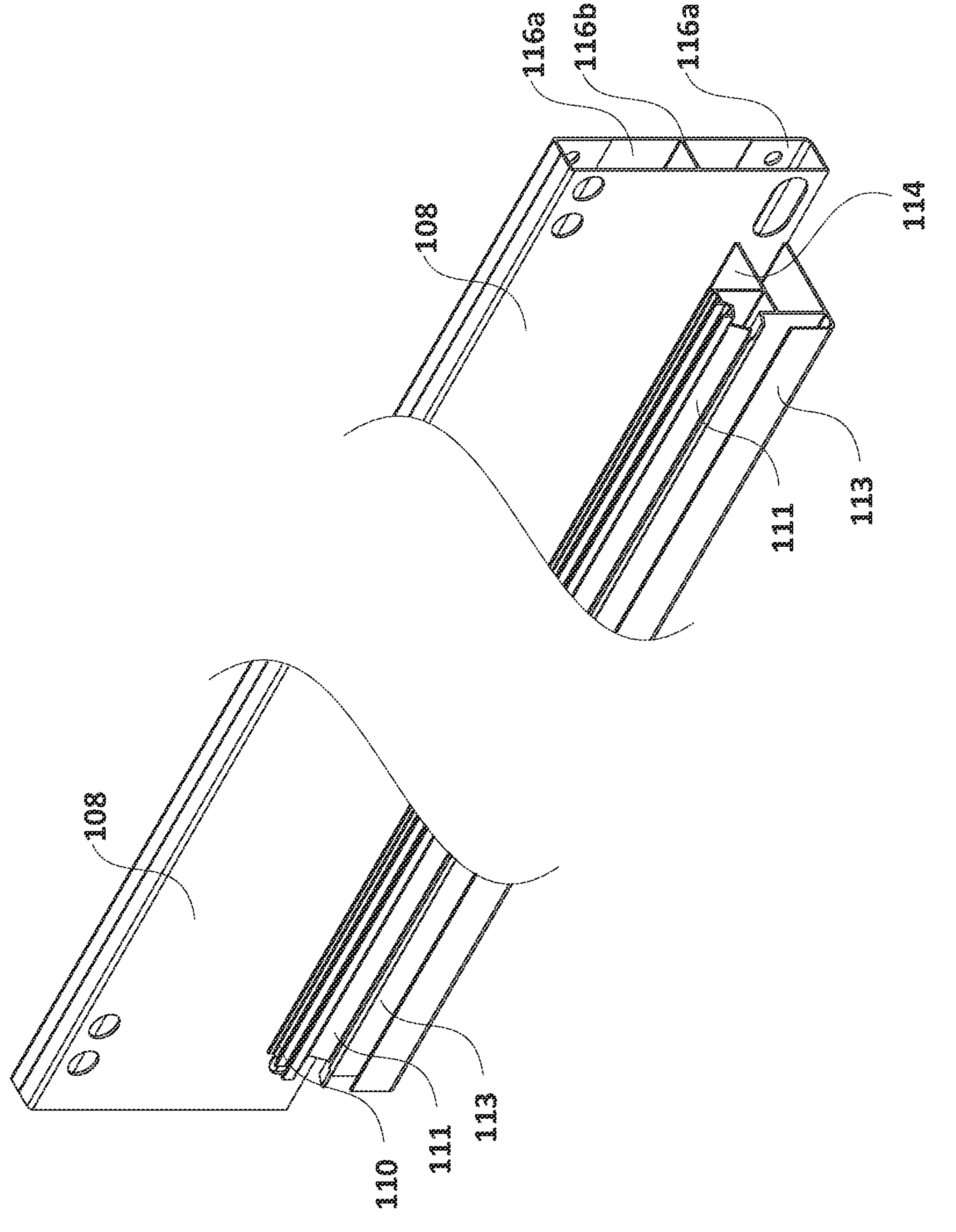
Figure 91:
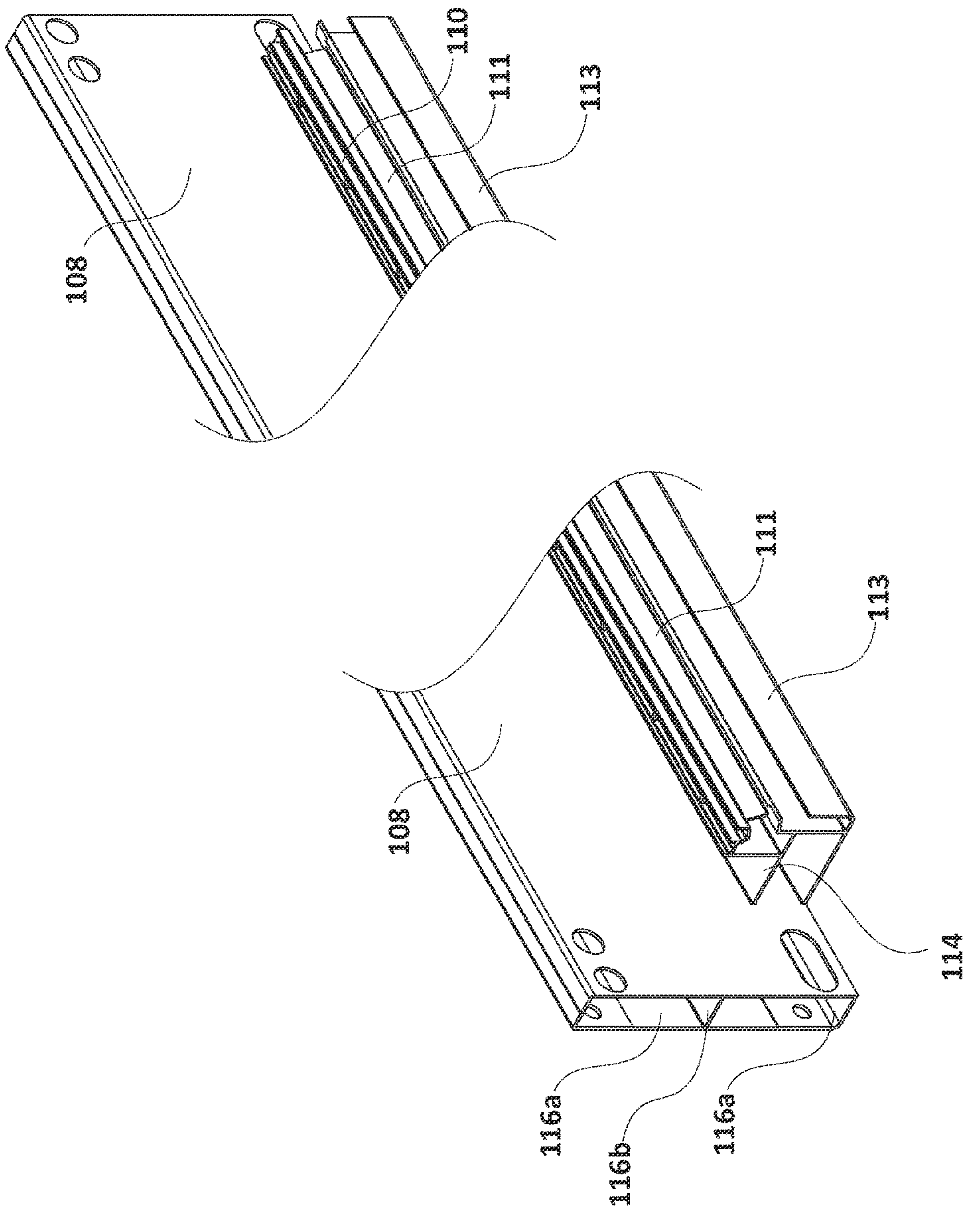

2) It is another object of some embodiments to provide the five-device-in-one anti-leaking noise-canceling anti-twisting anti-warping anti-vibrating double-locking double-core double-deck double-stacked internal-gutters, having 2 end-rainwater-guiding quick-release-accessary-adding double-deck double-stacked-internal-gutters 109. Therefore, the five-device-in-one anti-leaking noise-canceling anti-twisting anti-warping anti-vibrating double-locking double-core double-deck double-stacked internal-gutters may be: Capable of guiding rainwater to 4 double-gutter-supporting-and-locking rainwater-draining corner flumes 125 to prevent water damage and rust in the direction of arrow 140 (see FIG. 96-FIG. 99); Capable of shedding rainwater away from five-device-in-one anti-leaking noise-canceling anti-twisting anti-warping anti-vibrating double-locking double-core double-deck double-stacked internal-gutters to prevent water damage and rust in the direction of arrow 140 (see FIG. 5, and FIG. 48); Capable of supporting an RV gutter to shed rainwater from an RV in the direction of arrow 141 (see FIG. 3, and FIG. 103) Capable of supporting a concert stage gutter to shed rainwater from a concert stage in the direction of arrow 142 (see FIG. 4, and FIG. 104); Capable of supporting a house gutter to shed rainwater from a house in the direction of arrow 143 (see FIG. 5, and FIG. 105); Capable of supporting a solar panel gutter to shed rainwater from a solar panel in the direction of arrow 144 (see FIG. 6, and FIG. 106); and Capable of supporting an awning gutter to shed rainwater when attached to a building in the direction of arrow 145 (see FIG. 7, and FIG. 107).

3) It is still another object of some embodiments to provide the five-device-in-one anti-leaking noise-canceling anti-twisting anti-warping anti-vibrating double-locking double-core double-deck double-stacked internal-gutters, having double-deck-locking double-deck-reinforcing double-cores 115. Therefore, the five-device-in-one anti-leaking noise-canceling anti-twisting anti-warping anti-vibrating double-locking double-core double-deck double-stacked internal-gutters may be: Capable of securely and stackingly joining 2 end-rainwater-guiding quick-release-accessary-adding double-deck double-stacked-internal-gutters 109 together; and Capable of securely and stackingly reinforcing 2 end-rainwater-guiding quick-release-accessary-adding double-deck double-stacked-internal-gutters 109 together.

4) It is a further object of some embodiments to provide the five-device-in-one anti-leaking noise-canceling anti-twisting anti-warping anti-vibrating double-locking double-core double-deck double-stacked internal-gutters r, having double-deck-locking double-core-aligning double-tunnels 116*a*. Therefore, the five-device-in-one anti-leaking noise-canceling anti-twisting anti-warping anti-vibrating double-locking double-core double-deck double-stacked internal-gutters may be: Capable of securely and stackingly providing a location within 2 end-rainwater-guiding quick-release-accessary-adding double-deck double-stacked-internal-gutters 109 for double-deck-locking double-deck-reinforcing double-cores 115 to fit; and Capable of guiding rainwater to 4 double-gutter-supporting-and-locking rainwater-draining corner flumes 125 in the direction of arrow 140 (see FIG. 96-FIG. 99).

5) It is a further object of some embodiments to provide the five-device-in-one anti-leaking noise-canceling anti-twisting anti-warping anti-vibrating double-locking double-core double-deck double-stacked internal-gutters, having double-core-locking double-core-aligning spines 116*b*. Therefore, the five-device-in-one anti-leaking noise-canceling anti-twisting anti-warping anti-vibrating double-locking double-core double-deck double-stacked internal-gutters may be: Capable of aligning double-deck-locking double-deck-reinforcing double-cores 115 within double-deck-locking double-core-aligning double-tunnels 116*a*; Capable of preventing 2 double-deck-locking double-core-aligning double-tunnels 116*a* from rubbing together.

6) It is another further object of some embodiments to provide the five-device-in-one anti-leaking noise-canceling anti-twisting anti-warping anti-vibrating double-locking double-core double-deck double-stacked internal-gutters, having compression-locking gutter-aligning pegs 118. Therefore, the five-device-in-one anti-leaking noise-canceling anti-twisting anti-warping anti-vibrating double-locking double-core double-deck double-stacked internal-gutters may be: Capable of aligning 4 side-rainwater-guiding quick-release-accessary-adding double-deck double-stacked-internal-gutters 108 and 2 end-rainwater-guiding quick-release-accessary-adding double-deck double-stacked-internal-gutters 109 to double-gutter-supporting-and-locking corner parapet-post 121 and double-gutter-supporting-and-locking center parapet-posts 128; Capable of pressure-locking 4 side-rainwater-guiding quick-release-accessary-adding double-deck double-stacked-internal-gutters 108 and 2 end-rainwater-guiding quick-release-accessary-adding double-deck double-stacked-internal-gutters 109 to double-gutter-supporting-and-locking corner parapet-post 121 and double-gutter-supporting-and-locking center parapet-posts 128. It is yet another further object of some embodiments to provide the five-device-in-one anti-leaking noise-canceling anti-twisting anti-warping anti-vibrating double-locking double-core double-deck double-stacked internal-gutters, having anti-twisting anti-warping anti-vibrating 90-degree-double-yokes 119. Therefore, the five-device-in-one anti-leaking noise-canceling anti-twisting anti-warping anti-vibrating double-locking double-core double-deck double-stacked internal-gutters may be: Capable of providing anti-twisting reverse tension to retain the original shape and size of the five-device-in-one anti-leaking noise-canceling anti-twisting anti-warping anti-vibrating double-locking double-core double-deck double-stacked internal-gutters in the directions of arrows 146, and 147 (see FIG. 100, and FIG. 200); Capable of providing anti-warping reverse tension to retain the original shape and size of the five-device-in-one anti-leaking noise-canceling anti-twisting anti-warping anti-vibrating double-locking double-core double-deck double-stacked internal-gutters in the directions of arrows 146, and 147 (see FIG. 100, and FIG. 200); Capable of providing anti-vibration by cushioning gutter-securing screws 117. It is still yet another further object of some embodiments to provide the five-device-in-one anti-leaking noise-canceling anti-twisting anti-warping anti-vibrating double-locking double-core double-deck double-stacked internal-gutters, having double-gutter-supporting-and-locking corner parapet-post 121. Therefore, the five-device-in-one anti-leaking noise-canceling anti-twisting anti-warping anti-vibrating double-locking double-core double-deck double-stacked internal-gutters may be: Capable of supporting an RV gutter to shed rainwater from an RV in the direction of arrow 141 (see FIG. 3 and FIG. 103); Capable of supporting a concert stage gutter to shed rainwater from a concert stage in the direction of arrow 142 (see FIG. 4, and FIG. 104); Capable of supporting a house gutter to shed rainwater from a house in the direction of arrow 143 (see FIG. 5, and FIG. 105); Capable of supporting a solar panel gutter to shed rainwater from a solar panel in the direction of arrow 144 (see FIG. 6, and FIG. 106); and Capable of supporting an awning gutter to shed rainwater when attached to a building in the direction of arrow 145 (see FIG. 7, and FIG. 107). It is still yet another further object of some embodiments to provide the five-device-in-one anti-leaking noise-canceling anti-twisting anti-warping anti-vibrating double-locking double-core double-deck double-stacked internal-gutters, having double-gutter-supporting-and-locking center parapet-posts 128. Therefore, the five-device-in-one anti-leaking noise-canceling anti-twisting anti-warping anti-vibrating double-locking double-core double-deck double-stacked internal-gutters may be: Capable of supporting an RV gutter to shed rainwater from an RV in the direction of arrow 141 (see FIG. 3 and FIG. 103); Capable of supporting a concert stage gutter to shed rainwater from a concert stage in the direction of arrow 142 (see FIG. 4, and FIG. 104); Capable of supporting a house gutter to shed rainwater from a house in the direction of arrow 143 (see FIG. 5, and FIG. 105); Capable of supporting a solar panel gutter to shed rainwater from a solar panel in the direction of arrow 144 (see FIG. 6, and FIG. 106); and Capable of supporting an awning gutter to shed rainwater when attached to a building in the direction of arrow 145 (see FIG. 7, and FIG. 107). Other objects and advantages of the present invention will become apparent from a consideration of the accompanying drawings and ensuing description. The five-device-in-one anti-leaking noise-canceling anti-twisting anti-warping anti-vibrating double-locking double-core double-deck double-stacked internal-gutters (for being adapted to pergola, RV, house, solar panel, and concert stage)

comprise: Anti-leaking noise-canceling rainwater-shedding rainwater-guiding clamp-shield roof system, Anti-twisting anti-warping anti-vibrating double-locking double-core double-deck double-stacked-internal-gutter systems, Double-gutter-supporting-and-locking corner parapet-post systems, Double-gutter-supporting-and-locking center parapet-post systems, and 6 expandable foot-locking sleeve-bolt systems.

Component

Figure 1:
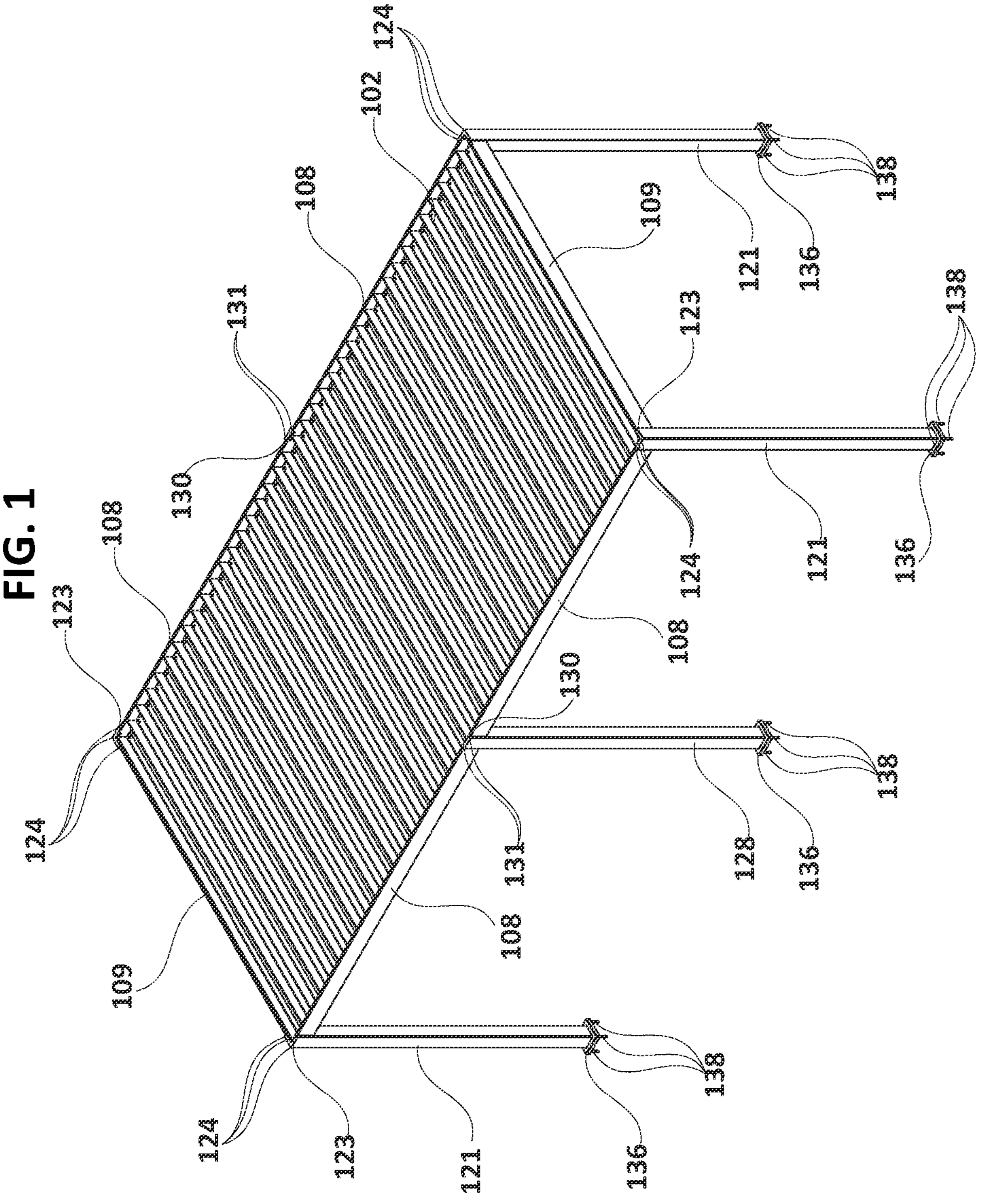
FIG. 1-FIG. 2 illustrate a perspective view and an exploded perspective view demonstrating components and the assembly of the five-device-in-one anti-leaking noise-canceling anti-twisting anti-warping anti-vibrating double-locking double-core double-deck double-stacked internal-gutters.
Figure 2:
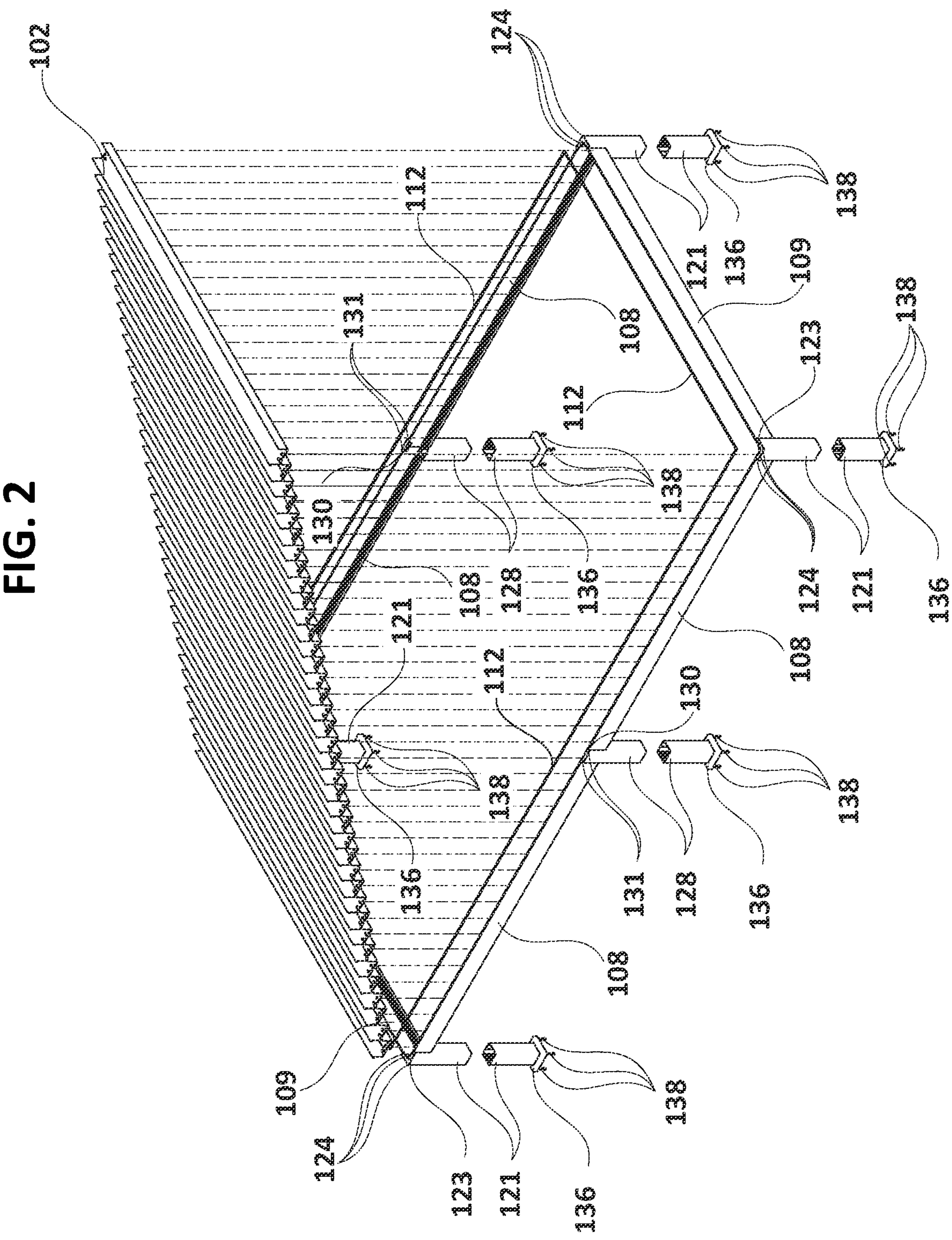
Figure 92:
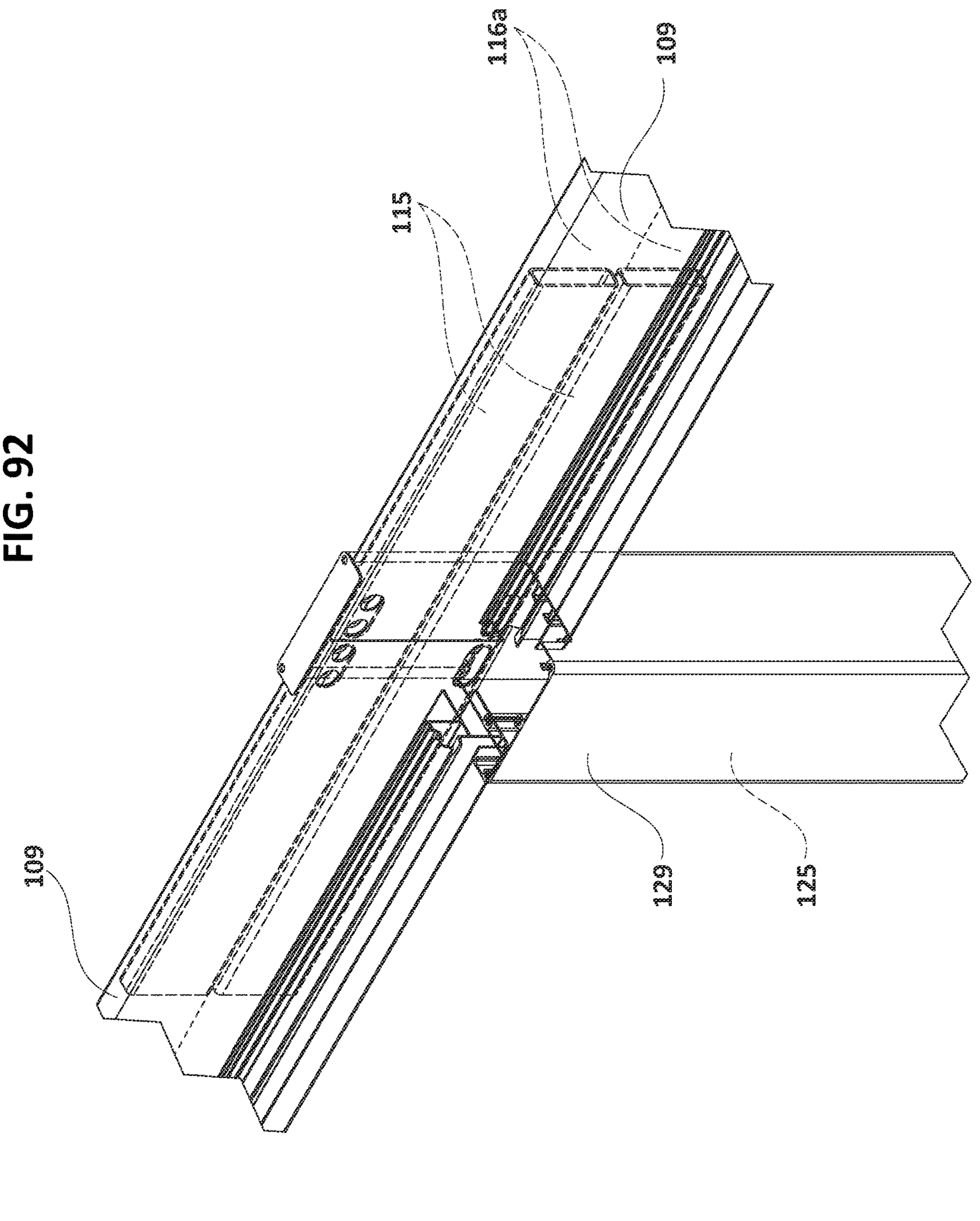
Figure 93:
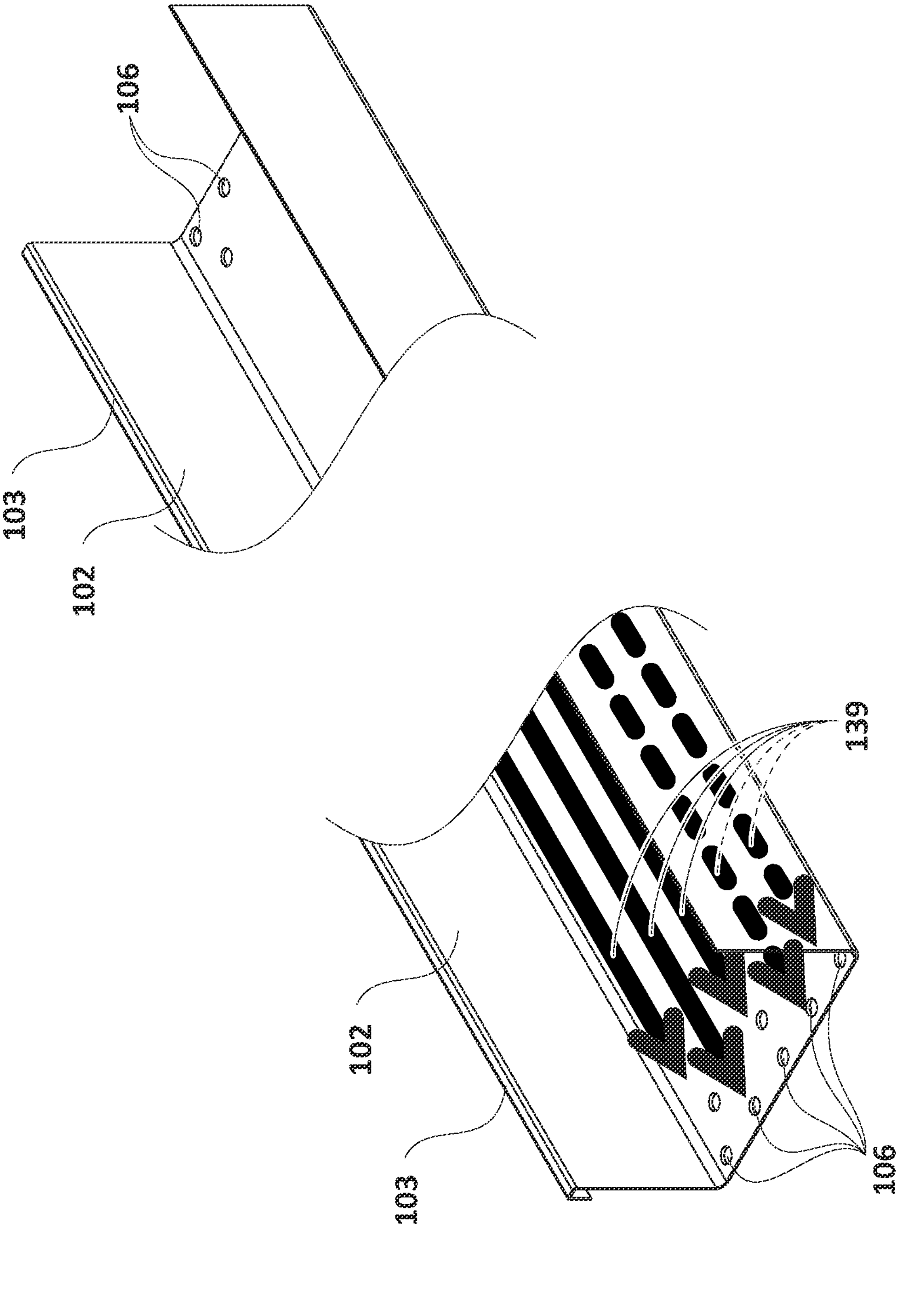
FIG. 93-FIG. 94 illustrate perspective views demonstrating the how rainwater is shed and guided from rainwater-shedding rainwater-guiding roof shingles 102 to and through anti-clogging rainwater-shedding holes 106.
Figure 94:
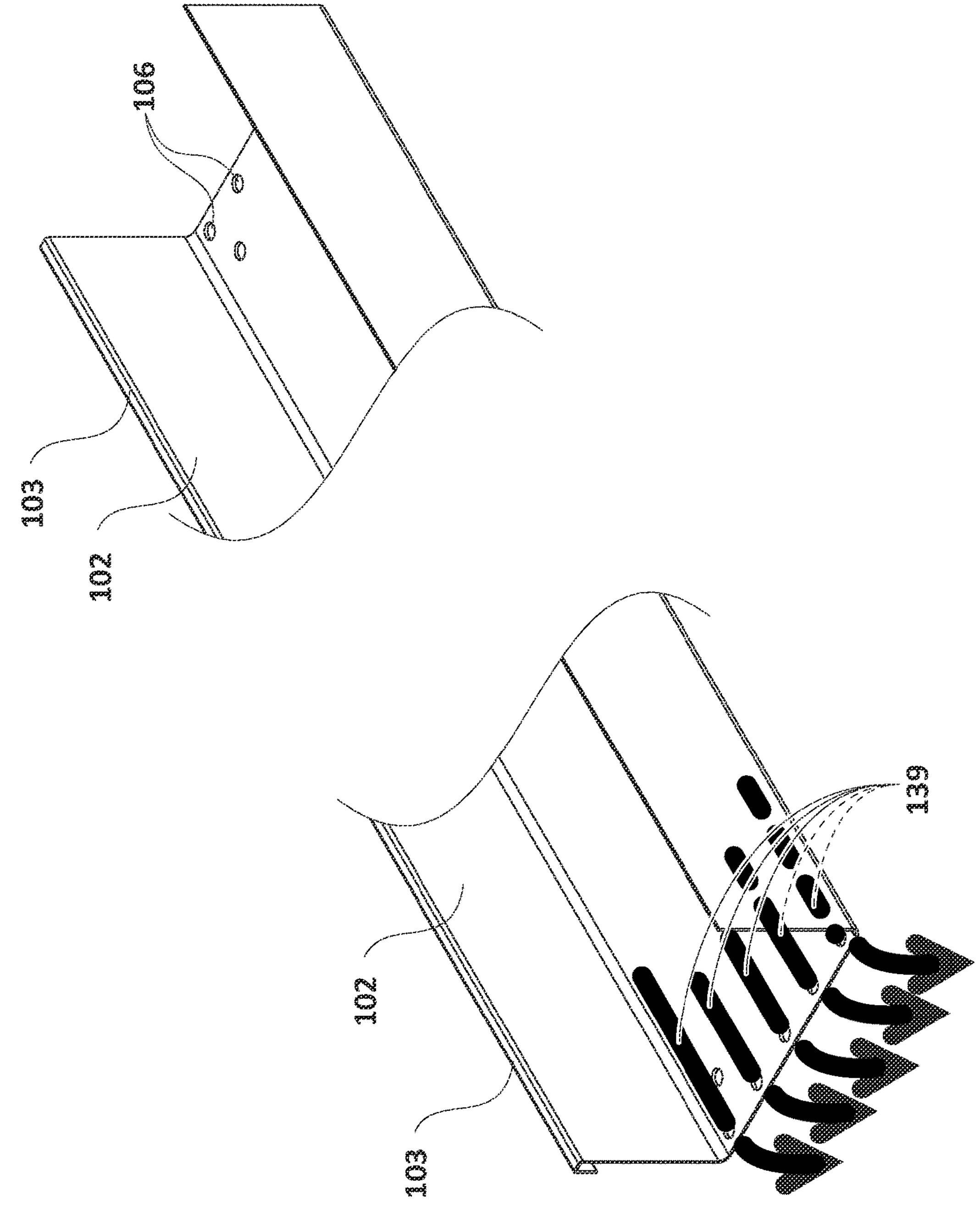

Referring to FIG. 1-FIG. 92, the five-device-in-one anti-leaking noise-canceling anti-twisting anti-warping anti-vibrating double-locking double-core double-deck double-stacked internal-gutters (for being adapted to pergola, RV, house, solar panel, and concert stage) comprise: Anti-leaking noise-canceling rainwater-shedding rainwater-guiding clamp-shield roof system 101 comprising: Rainwater-shedding rainwater-guiding roof shingles 102, Anti-leaking noise-canceling overlapping clamp-shield 103, Rainwater-sealing grommets 104, Clamp-Shingle-securing screws 105, and Anti-clogging rainwater-shedding holes 106; Anti-twisting anti-warping anti-vibrating double-locking double-core double-deck double-stacked-internal-gutter systems 107 each comprising: 4 side-rainwater-guiding quick-release-accessary-adding double-deck double-stacked internal-gutters 108, 2 end-rainwater-guiding quick-release-accessary-adding double-deck double-stacked-internal-gutters 109, Roof-shingle-securing shelves 110, LED-light-securing tracks 111, LED-light arrays 112, Accessory-securing tracks 113, Rainwater-guiding troughs 114, Double-deck-locking double-deck-reinforcing double-cores 115, Double-deck-locking double-core-aligning double-tunnels 116*a*, Double-core-locking double-core-aligning spines 116*b*, Gutter-securing screws 117, Compression-locking gutter-aligning pegs 118, and Anti-twisting anti-warping anti-vibrating 90-degree-double-yokes 119; Double-gutter-supporting-and-locking corner parapet-post systems 120 each comprising Double-gutter-supporting-and-locking corner parapet-post 121, Cost-saving production-increasing inner corner parapet 122, Corner-post caps 123, Corner-post-cap screws 124, 4 double-gutter-supporting-and-locking rainwater-draining corner flumes 125, and 4 rainwater-draining corner tunnels 126; Double-gutter-supporting-and-locking center parapet-post systems 127 each comprising: Double-gutter-supporting-and-locking center parapet-posts 128, Cost-saving production-increasing center parapet 129, Center-post caps 130, Center-post-cap screws 131, 2 double-gutter-supporting-and-locking rainwater-draining center flumes 132, and 2 rainwater-draining center tunnels 133; and 6 expandable foot-locking sleeve-bolt systems 134 each comprising: 6 post-feet 135, 6 post-feet covers 136, Post-feet-securing screws 137, and Ground-secured expandable foot-locking sleeve-bolts 138.

Material

Referring to FIG. 1-FIG. 92: Anti-leaking noise-canceling rainwater-shedding rainwater-guiding clamp-shield roof system 101 may be made of the combined materials of its components. Rainwater-shedding rainwater-guiding roof shingles 102 may each be of the material of metal, plastic, wood, or rubber. Anti-leaking noise-canceling overlapping clamp-shield 103 may be made of the material of metal, plastic, wood, or rubber. Rainwater-scaling grommets 104 may each be of the material of metal, plastic, wood, or rubber. Clamp-Shingle-securing screws 105 may each be of the material of metal, plastic, wood, or rubber. Anti-clogging rainwater-shedding holes 106 may each be of empty space. Anti-twisting anti-warping anti-vibrating double-locking double-core double-deck double-stacked-internal-gutter systems 107 may each be of the combined materials of its components. 4 side-rainwater-guiding quick-release-accessary-adding double-deck double-stacked internal-gutters 108 may each be of the material of metal, plastic, wood, or rubber. 2 end-rainwater-guiding quick-release-accessary-adding double-deck double-stacked-internal-gutters 109 may each be of the material of metal, plastic, wood, or rubber. Roof-shingle-securing shelves 110 may each be of the material of metal, plastic, wood, or rubber. LED-light-securing tracks 111 may each be of the material of metal, plastic, wood, or rubber. LED-light arrays 112 may each be of the material of metal, plastic, wood, or rubber. Accessory-securing tracks 113 may each be of the material of metal, plastic, wood, or rubber. Rainwater-guiding troughs 114 may each be of the material of metal, plastic, wood, or rubber. Double-deck-locking double-deck-reinforcing double-cores 115 may each be of the material of metal, plastic, wood, or rubber. Double-deck-locking double-core-aligning double-tunnels 116*a* may each be of empty space. Double-core-locking double-core-aligning spines 116*b* may each be of the material of metal, plastic, wood, or rubber. Gutter-securing screws 117 may each be of the material of metal, plastic, wood, or rubber. Compression-locking gutter-aligning pegs 118 may each be of the material of metal, plastic, wood, or rubber. Anti-twisting anti-warping anti-vibrating 90-degree-double-yokes 119 may each be of the material of metal, plastic, wood, or rubber. Double-gutter-supporting-and-locking corner parapet-post systems 120 may each be of the combined materials of its components. Double-gutter-supporting-and-locking corner parapet-post 121 may be made of the material of metal, plastic, wood, or rubber. Cost-saving production-increasing inner corner parapet 122 may be made of the material of metal, plastic, wood, or rubber. Corner-post caps 123 may each be of the material of metal, plastic, wood, or rubber. Corner-post-cap screws 124 may each be of the material of metal, plastic, wood, or rubber. 4 double-gutter-supporting-and-locking rainwater-draining corner flumes 125 may each be of empty space. 4 rainwater-draining corner tunnels 126 may each be of empty space. Double-gutter-supporting-and-locking center parapet-post systems 127 may each be of the combined materials of its components. Double-gutter-supporting-and-locking center parapet-posts 128 may each be of the material of metal, plastic, wood, or rubber. Cost-saving production-increasing center parapet 129 may be made of the material of metal, plastic, wood, or rubber. Center-post caps 130 may each be of the material of metal, plastic, wood, or rubber. Center-post-cap screws 131 may each be of the material of metal, plastic, wood, or rubber. 2 double-gutter-supporting-and-locking rainwater-draining center flumes 132 may each be of empty space. 2 rainwater-draining center tunnels 133 may each be of empty space. 6 expandable foot-locking sleeve-bolt systems 134 may each be of the combined materials of its components. 6 post-feet 135 may each be of the material of metal, plastic, wood, or rubber. 6 post-feet covers 136 may each be of the material of metal, plastic, wood, or rubber. Post-feet-securing screws 137 may each be of the material of metal, plastic, wood, or rubber. Ground-secured expandable foot-locking sleeve-bolts 138 may each be of the material of metal, plastic, wood, or rubber.

Shape

Referring to FIG. 1-FIG. 92: Anti-leaking noise-canceling rainwater-shedding rainwater-guiding clamp-shield roof system 101 may be formed into the combined shapes of its components. Rainwater-shedding rainwater-guiding roof shingles 102 may each be formed into the shape of an elongated groove with a U-shaped cross-section. Anti-leaking noise-canceling overlapping clamp-shield 103 may be formed into the shape of an elongated groove with a U-shaped cross-section. Rainwater-scaling grommets 104 may each be formed into the shape of a tube with a circular ring at one end. Clamp-Shingle-securing screws 105 may each be formed into the shape of a screw.

Anti-clogging rainwater-shedding holes 106 may each be formed into the shape of a round opening. Anti-twisting anti-warping anti-vibrating double-locking double-core double-deck double-stacked-internal-gutter systems 107 may each be formed into the combined shapes of its components. 4 side-rainwater-guiding quick-release-accessary-adding double-deck double-stacked internal-gutters 108 may each be formed into the shape of two stacked tubes with rectangular cross-section. 2 end-rainwater-guiding quick-release-accessary-adding double-deck double-stacked-internal-gutters 109 may each be formed into the shape of two stacked tubes each with a rectangular cross-section. Roof-shingle-securing shelves 110 may each be formed into the shape of a groove with a rectangular cross-section. LED-light-securing tracks 111 may each be formed into the shape of an angled groove with a rectangular cross-section.

LED-light arrays 112 may each be formed into the shape of an elongated strip with a rectangular cross-section. Accessory-securing tracks 113 may each be formed into the shape of a groove with a G-shaped cross-section. Rainwater-guiding troughs 114 may each be formed into the shape of a groove with a U-shaped cross-section. Double-deck-locking double-deck-reinforcing double-cores 115 may each be formed into the shape of two stacked tubes with an 8-shaped cross-section. Double-deck-locking double-core-aligning double-tunnels **116*a* may each be formed into the shape of two stacked tunnels each with a rectangular cross-section. Double-core-locking double-core-aligning spines 116*b*** may each be formed into the shape of an elongated flat stick.

Gutter-securing screws 117 may each be formed into the shape of a screw. Compression-locking gutter-aligning pegs 118 may each be formed into the shape of a stick with a rectangular cross-section. Anti-twisting anti-warping anti-vibrating 90-degree-double-yokes 119 may each be formed into the shape of two side-by-side rings. Double-gutter-supporting-and-locking corner parapet-post systems 120 may each be formed into the combined shapes of its components. Double-gutter-supporting-and-locking corner parapet-post 121 may be formed into the shape of a tube with a rectangular cross-section. Cost-saving production-increasing inner corner parapet 122 may be formed into the shape of rectangles with opposite-L-shaped cross-sections.

Corner-post caps 123 may each be formed into the shape of an L shape. Corner-post-cap screws 124 may each be formed into the shape of a screw. 4 double-gutter-supporting-and-locking rainwater-draining corner flumes 125 may each be formed into the shape of a rectangular opening. 4 rainwater-draining corner tunnels 126 may each be formed into the shape of a half pic. Double-gutter-supporting-and-locking center parapet-post systems 127 may each be formed into the combined shapes of its components.

Double-gutter-supporting-and-locking center parapet-posts 128 may each be formed into the shape of a tube with a rectangular cross-section. Cost-saving production-increasing center parapet 129 may be formed into the shape of rectangles with opposite-L-shaped cross-sections.

Center-post caps 130 may each be formed into the shape of an I shape. Center-post-cap screws 131 may each be formed into the shape of screw. 2 double-gutter-supporting-and-locking rainwater-draining center flumes 132 may each be formed into the shape of a rectangular opening. 2 rainwater-draining center tunnels 133 may each be formed into the shape of a half pic. 6 expandable foot-locking sleeve-bolt systems 134 may each be formed into the combined shapes of its components. 6 post-feet 135 may each be formed into the shape of a rectangle with multiple through holes. 6 post-feet covers 136 may each be formed into the shape of a square ring with an L-shaped cross-section. Post-feet-securing screws 137 may each be formed into the shape of a screw. Ground-secured expandable foot-locking sleeve-bolts 138 may each be formed into the shape of a bolt with a tube (having an expandable parapet end) encircling it.

Connection

Referring to FIG. 1-FIG. 92: Anti-leaking noise-canceling rainwater-shedding rainwater-guiding clamp-shield roof system 101 has the combined connections of its components. Rainwater-shedding rainwater-guiding roof shingles 102 may be respectively attached to roof-shingle-securing shelves 110. Anti-leaking noise-canceling overlapping clamp-shield 103 may be formed to rainwater-shedding rainwater-guiding roof shingles 102. Rainwater-scaling grommets 104 may be respectively secured around clamp-shingle-securing screws 105. Clamp-shingle-securing screws 105 may be respectively secured to rainwater-shedding rainwater-guiding roof shingles 102. Anti-clogging rainwater-shedding holes 106 may be respectively drilled into rainwater-shedding rainwater-guiding roof shingles 102. Anti-twisting anti-warping anti-vibrating double-locking double-core double-deck double-stacked-internal-gutter systems 107 each have the combined connections of its components.

4 side-rainwater-guiding quick-release-accessary-adding double-deck double-stacked internal-gutters 108 may be respectively attached between 2 double-gutter-supporting-and-locking corner parapet-post 121. 2 end-rainwater-guiding quick-release-accessary-adding double-deck double-stacked-internal-gutters 109 may be respectively attached between double-gutter-supporting-and-locking corner parapet-post 121 and double-gutter-supporting-and-locking center parapet-posts 128. Roof-shingle-securing shelves 110 may be respectively formed to 4 side-rainwater-guiding quick-release-accessary-adding double-deck double-stacked internal-gutters 108 and 2 end-rainwater-guiding quick-release-accessary-adding double-deck double-stacked-internal-gutters 109.

LED-light-securing tracks 111 may be respectively formed to 4 side-rainwater-guiding quick-release-accessary-adding double-deck double-stacked internal-gutters 108 and 2 end-rainwater-guiding quick-release-accessary-adding double-deck double-stacked-internal-gutters 109. LED-light arrays 112 may be respectively slid into LED-light-securing tracks 111. Accessory-securing tracks 113 may be respectively formed to 4 side-rainwater-guiding quick-release-accessary-adding double-deck double-stacked internal-gutters 108 and 2 end-rainwater-guiding quick-release-accessary-adding double-deck double-stacked-internal-gutters 109.

Rainwater-guiding troughs 114 may be respectively may each be formed to 4 side-rainwater-guiding quick-release-accessary-adding double-deck double-stacked internal-gutters 108 and 2 end-rainwater-guiding quick-release-accessary-adding double-deck double-stacked-internal-gutters 109. Double-deck-locking double-deck-reinforcing double-cores 115 may be respectively slid into double-deck-locking double-core-aligning double-tunnels **116*a*. Double-deck-locking double-core-aligning double-tunnels 116*a* may be respectively formed into 4 side-rainwater-guiding quick-release-accessary-adding double-deck double-stacked internal-gutters 108 and 2 end-rainwater-guiding quick-release-accessary-adding double-deck double-stacked-internal-gutters 109**.

Double-core-locking double-core-aligning spines 116*b* may be respectively formed into 4 side-rainwater-guiding quick-release-accessary-adding double-deck double-stacked internal-gutters 108 and 2 end-rainwater-guiding quick-release-accessary-adding double-deck double-stacked-internal-gutters 109.

Gutter-securing screws 117 may be respectively secured to compression-locking gutter-aligning pegs 118. Compression-locking gutter-aligning pegs 118 may be respectively secured to double-gutter-supporting-and-locking corner parapet-post 121 and Double-gutter-supporting-and-locking center parapet-posts 128. Anti-twisting anti-warping anti-vibrating 90-degree-double-yokes 119 may be respectively secured around gutter-securing screws 117. Double-gutter-supporting-and-locking corner parapet-post systems 120 have the combined connections of its components.

Double-gutter-supporting-and-locking corner parapet-post 121 may be secured to 4 side-rainwater-guiding quick-release-accessary-adding double-deck double-stacked internal-gutters 108 and 2 end-rainwater-guiding quick-release-accessary-adding double-deck double-stacked-internal-gutters 109.

Cost-saving production-increasing inner corner parapet 122 may be formed to double-gutter-supporting-and-locking corner parapet-post 121. Corner-post caps 123 may be respectively secured to double-gutter-supporting-and-locking corner parapet-post 121. Corner-post-cap screws 124 may be respectively secured to corner-post caps 123. 4 double-gutter-supporting-and-locking rainwater-draining corner flumes 125 may be respectively formed within double-gutter-supporting-and-locking corner parapet-post 121. 4 rainwater-draining corner tunnels 126 may be respectively formed to the bottom of double-gutter-supporting-and-locking corner parapet-post 121.

Double-gutter-supporting-and-locking center parapet-post systems 127 have the combined connections of its components. Double-gutter-supporting-and-locking center parapet-posts 128 may be respectively secured to 4 side-rainwater-guiding quick-release-accessary-adding double-deck double-stacked internal-gutters 108. Cost-saving production-increasing center parapet 129 may be formed to double-gutter-supporting-and-locking center parapet-posts 128. Center-post caps 130 may be respectively secured to double-gutter-supporting-and-locking center parapet-posts 128.

Center-post-cap screws 131 may be respectively secured to center-post caps 130. 2 double-gutter-supporting-and-locking rainwater-draining center flumes 132 may be respectively formed within double-gutter-supporting-and-locking center parapet-posts 128. 2 rainwater-draining center tunnels 133 may be respectively formed to the bottom of double-gutter-supporting-and-locking center parapet-posts 128. 6 expandable foot-locking sleeve-bolt systems 134 has the combined connections of its components. 6 Post-feet 135 may be respectively secured to double-gutter-supporting-and-locking corner parapet-post 121 and double-gutter-supporting-and-locking center parapet-posts 128. 6-post-feet covers 136 may be respectively slid around double-gutter-supporting-and-locking corner parapet-post 121 and double-gutter-supporting-and-locking center parapet-posts 128. Post-feet-securing screws 137 may be respectively secured to 6 Post-feet 135. Ground-secured expandable foot-locking sleeve-bolts 138 may be respectively secured through 6 Post-feet 135 and into a ground surface.

Function

Referring to FIG. 93-FIG. 107: Anti-leaking noise-canceling rainwater-shedding rainwater-guiding clamp-shield roof system 101 may be for performing the combined functions of its components. Rainwater-shedding rainwater-guiding roof shingles 102 may be respectively for: Guiding rainwater towards anti-clogging rainwater-shedding holes 106 to prevent water damage and rust in the direction of arrow 139 (see FIG. 93, FIG. 94, FIG. 96A, FIG. 96B, and FIG. 99); Protecting occupants from rain, snow, or other severe weather; and Providing shade to occupants within five-device-in-one anti-leaking noise-canceling anti-twisting anti-warping anti-vibrating double-locking double-core double-deck double-stacked internal-gutters to prevent water damage and rust. Anti-leaking noise-canceling overlapping clamp-shield 103 may be for:

Scaling gap between adjacent rainwater-shedding rainwater-guiding roof shingles 102 preventing leaking; Noise-cancelling adjacent rainwater-shedding rainwater-guiding roof shingles 102 from rubbing together; and Clamping adjacent rainwater-shedding rainwater-guiding roof shingles 102 together. Rainwater-sealing grommets 104 may be respectively for: Sealing rainwater from getting inside five-device-in-one anti-leaking noise-canceling anti-twisting anti-warping anti-vibrating double-locking double-core double-deck double-stacked internal-gutters to prevent water damage and rust. Clamp-Shingle-securing screws 105 may be respectively for:

Securing rainwater-shedding rainwater-guiding roof shingles 102 to roof-shingle-securing shelves 110. Anti-clogging rainwater-shedding holes 106 may be respectively for: Draining rainwater into rainwater-guiding troughs 114; Securing a solar panel, light, or speaker; and Preventing leaves and other debris from getting into rainwater-guiding troughs 114. Double-gutter-supporting-and-locking double-core double-deck double-stacked-internal-gutter systems 107 may be for performing the combined functions of its components. 4 side-rainwater-guiding quick-release-accessary-adding double-deck double-stacked-internal-gutters 108 may be respectively for: Guiding rainwater to 4 double-gutter-supporting-and-locking rainwater-draining corner flumes 125 and 2 double-gutter-supporting-and-locking rainwater-draining center flumes 132 to prevent water damage and rust in the direction of arrow 140 (see FIG. 95-FIG. 99); Shedding rainwater away from five-device-in-one anti-leaking noise-canceling anti-twisting anti-warping anti-vibrating double-locking double-core double-deck double-stacked internal-gutters to prevent water damage and rust in the direction of arrow 140 (see FIG. 5, and FIG. 48); Supporting an RV gutter to shed rainwater from an RV in the direction of arrow 141 (see FIG. 3, and FIG. 103) Supporting a concert stage gutter to shed rainwater from a concert stage in the direction of arrow 142 (see FIG. 4, and FIG. 104); Supporting a house gutter to shed rainwater from a house in the direction of arrow 143 (see FIG. 5, and FIG. 105);

Supporting a solar panel gutter to shed rainwater from a solar panel in the direction of arrow 144 (see FIG. 6, and FIG. 106); and Supporting an awning gutter to shed rainwater when attached to a building in the direction of arrow 145 (see FIG. 7, and FIG. 107). 2 end-rainwater-guiding quick-release-accessary-adding double-deck double-stacked-internal-gutters 109 may be respectively for: Guiding rainwater to 4 double-gutter-supporting-and-locking rainwater-draining corner flumes 125 to prevent water damage and rust in the direction of arrow 140 (see FIG. 95-FIG. 99); Shedding rainwater away from five-device-in-one anti-leaking noise-canceling anti-twisting anti-warping anti-vibrating double-locking double-core double-deck double-stacked internal-gutters to prevent water damage and rust in the direction of arrow 140 (see FIG. 5, and FIG. 48); Supporting an RV gutter to shed rainwater from an RV in the direction of arrow 141 (see FIG. 3, and FIG. 103) Supporting a concert stage gutter to shed rainwater from a concert stage in the direction of arrow 142 (see FIG. 4, and FIG. 104); Supporting a house gutter to shed rainwater from a house in the direction of arrow 143 (see FIG. 5, and FIG. 105); Supporting a solar panel gutter to shed rainwater from a solar panel in the direction of arrow 144 (see FIG. 6, and FIG. 106); and Supporting an awning gutter to shed rainwater when attached to a building in the direction of arrow 145 (see FIG. 7, and FIG. 107).

Roof-shingle-securing shelves 110 may be respectively for: Providing a location for rainwater-shedding rainwater-guiding roof shingles 102 to be installed. LED-light-securing tracks 111 may be respectively for: Providing a place where LED-light arrays 112 can be inserted and installed. LED-light arrays 112 may be respectively for: Providing light to occupants within five-device-in-one anti-leaking noise-canceling anti-twisting anti-warping anti-vibrating double-locking double-core double-deck double-stacked internal-gutters.

Accessory-securing tracks 113 may be respectively for: Securing extraneous accessories. Rainwater-guiding troughs 114 may be respectively for: Guiding rainwater to 4 double-gutter-supporting-and-locking rainwater-draining corner flumes 125 to prevent water damage and rust in the direction of arrow 140 (see FIG. 95-FIG. 99); and Shedding rainwater away from five-device-in-one anti-leaking noise-canceling anti-twisting anti-warping anti-vibrating double-locking double-core double-deck double-stacked internal-gutters to prevent water damage and rust in the direction of arrow 140 (see FIG. 95, and FIG. 99); Double-deck-locking double-deck-reinforcing double-cores 115 may be respectively for: Securely-and-stackingly joining 2 end-rainwater-guiding quick-release-accessary-adding double-deck double-stacked-internal-gutters 109 together; and Securely-and-stackingly reinforcing 2 end-rainwater-guiding quick-release-accessary-adding double-deck double-stacked-internal-gutters 109 together.

Double-deck-locking double-core-aligning double-tunnels 116*a* may be respectively for: Securely-and-stackingly providing a location within 2 end-rainwater-guiding quick-release-accessary-adding double-deck double-stacked-internal-gutters 109 for double-deck-locking double-deck-reinforcing double-cores 115 to fit; and Guiding rainwater to 4 double-gutter-supporting-and-locking rainwater-draining corner flumes 125 in the direction of arrow 140 (see FIG. 95-FIG. 99).

Double-core-locking double-core-aligning spines 116*b* may be respectively for: Aligning double-deck-locking double-deck-reinforcing double-cores 115 within double-deck-locking double-core-aligning double-tunnels 116*a*; Preventing 2 double-deck-locking double-core-aligning double-tunnels 116*a* from rubbing together. Gutter-securing screws 117 may be respectively for: Securing 4 side-rainwater-guiding quick-release-accessary-adding double-deck double-stacked-internal-gutters 108 and 2 end-rainwater-guiding quick-release-accessary-adding double-deck double-stacked-internal-gutters 109 to double-gutter-supporting-and-locking corner parapet-post 121 and double-gutter-supporting-and-locking center parapet-posts 128.

Compression-locking gutter-aligning pegs 118 may be respectively for: 4 side-rainwater-guiding quick-release-accessary-adding double-deck double-stacked-internal-gutters 108 and 2 end-rainwater-guiding quick-release-accessary-adding double-deck double-stacked-internal-gutters 109 to double-gutter-supporting-and-locking corner parapet-post 121 and double-gutter-supporting-and-locking center parapet-posts 128. Anti-twisting anti-warping anti-vibrating 90-degree-double-yokes 119 may be respectively for: Providing anti-twisting reverse tension to retain the original shape and size of the five-device-in-one anti-leaking noise-canceling anti-twisting anti-warping anti-vibrating double-locking double-core double-deck double-stacked internal-gutters in the directions of arrows 146, and 147 (see FIG. 100, and FIG. 200); Providing anti-warping reverse tension to retain the original shape and size of the five-device-in-one anti-leaking noise-canceling anti-twisting anti-warping anti-vibrating double-locking double-core double-deck double-stacked internal-gutters in the directions of arrows 146, and 147 (see FIG. 100, and FIG. 200); Providing anti-vibration by cushioning gutter-securing screws 117.

Double-gutter-supporting-and-locking corner parapet-post systems 120 may be for performing the combined functions of its components. Double-gutter-supporting-and-locking corner parapet-post 121 may be for: Supporting an RV gutter to shed rainwater from an RV in the direction of arrow 141 (see FIG. 3 and FIG. 103); Supporting a concert stage gutter to shed rainwater from a concert stage in the direction of arrow 142 (see FIG. 4, and FIG. 104); Supporting a house gutter to shed rainwater from a house in the direction of arrow 143 (see FIG. 5, and FIG. 105); Supporting a solar panel gutter to shed rainwater from a solar panel in the direction of arrow 144 (see FIG. 6, and FIG. 106); and Supporting an awning gutter to shed rainwater when attached to a building in the direction of arrow 145 (see FIG. 7, and FIG. 107).

Cost-saving production-increasing inner corner parapet 122 may be for: Supporting an RV gutter to shed rainwater from an RV in the direction of arrow 141 (see FIG. 3 and FIG. 103); Supporting a concert stage gutter to shed rainwater from a concert stage in the direction of arrow 142 (see FIG. 4, and FIG. 104); Supporting a house gutter to shed rainwater from a house in the direction of arrow 143 (see FIG. 5, and FIG. 105); Supporting a solar panel gutter to shed rainwater from a solar panel in the direction of arrow 144 (see FIG. 6, and FIG. 106); and Supporting an awning gutter to shed rainwater when attached to a building in the direction of arrow 145 (see FIG. 7, and FIG. 107).

Corner-post caps 123 may be respectively for: Protecting double-gutter-supporting-and-locking corner parapet-post 121 and cost-saving production-increasing inner corner parapet 122 to prevent water damage and rust. Corner-post-cap screws 124 may be respectively for: Securing corner-post caps 123.

4 double-gutter-supporting-and-locking rainwater-draining corner flumes 125 may be respectively for: Discretely draining rainwater away from five-device-in-one anti-leaking noise-canceling anti-twisting anti-warping anti-vibrating double-locking double-core double-deck double-stacked internal-gutters in the direction of arrow 148 (see FIG. 95, FIG. 96A, FIG. 96B, and FIG. 99). 4 rainwater-draining corner tunnels 126 may be respectively for: Evacuating rainwater out of and away from five-device-in-one anti-leaking noise-canceling anti-twisting anti-warping anti-vibrating double-locking double-core double-deck double-stacked internal-gutters in the direction of arrow 149 (see FIG. 96A, and FIG. 96B).

Double-gutter-supporting-and-locking center parapet-post systems 127 may be for performing the combined functions of its components. Double-gutter-supporting-and-locking center parapet-posts 128 may be respectively for: Supporting an RV gutter to shed rainwater from an RV in the direction of arrow 141 (see FIG. 3 and FIG. 103); Supporting a concert stage gutter to shed rainwater from a concert stage in the direction of arrow 142 (see FIG. 4, and FIG. 104); Supporting a house gutter to shed rainwater from a house in the direction of arrow 143 (see FIG. 5, and FIG. 105); Supporting a solar panel gutter to shed rainwater from a solar panel in the direction of arrow 144 (see FIG. 6, and FIG. 106); and Supporting an awning gutter to shed rainwater when attached to a building in the direction of arrow 145 (see FIG. 7, and FIG. 107).

Cost-saving production-increasing center parapet 129 may be for: Supporting an RV gutter to shed rainwater from an RV in the direction of arrow 141 (see FIG. 3 and FIG. 103); Supporting a concert stage gutter to shed rainwater from a concert stage in the direction of arrow 142 (see FIG. 4, and FIG. 104); Supporting a house gutter to shed rainwater from a house in the direction of arrow 143 (see FIG. 5, and FIG. 105); Supporting a solar panel gutter to shed rainwater from a solar panel in the direction of arrow 144 (see FIG. 6, and FIG. 106); and Supporting an awning gutter to shed rainwater when attached to a building in the direction of arrow 145 (see FIG. 7, and FIG. 107).

Center-post caps 130 may be respectively for: Protecting double-gutter-supporting-and-locking center parapet-posts 128 and cost-saving production-increasing center parapet 129 to prevent water damage and rust. Center-post-cap screws 131 may be respectively for: Securing center-post caps 130. 2 double-gutter-supporting-and-locking rainwater-draining center flumes 132 may be respectively for: Discretely draining rainwater away from five-device-in-one anti-leaking noise-canceling anti-twisting anti-warping anti-vibrating double-locking double-core double-deck double-stacked internal-gutters in the direction of arrow 148 (see FIG. 95, FIG. 96A, FIG. 96B, and FIG. 99).

2 rainwater-draining center tunnels 133 may be respectively for: Evacuating rainwater out of and away from five-device-in-one anti-leaking noise-canceling anti-twisting anti-warping anti-vibrating double-locking double-core double-deck double-stacked internal-gutters in the direction of arrow 149 (see FIG. 96A, and FIG. 96B). 6 expandable foot-locking sleeve-bolt systems 134 may be for performing the combined functions of its components. 6 post-feet 135 may be respectively for: Stabilizing five-device-in-one anti-leaking noise-canceling anti-twisting anti-warping anti-vibrating double-locking double-core double-deck double-stacked internal-gutters. 6-post-feet covers 136 may be respectively for: Protecting 6 post-feet 135 and ground-secured expandable foot-locking sleeve-bolts 138 to prevent water damage and rust. Post-feet-securing screws 137 may be respectively for: Securing 6 post-feet 135 to double-gutter-supporting-and-locking corner parapet-post 121 or double-gutter-supporting-and-locking center parapet-posts 128. Ground-secured expandable foot-locking sleeve-bolts 138 may be respectively for: Securing five-device-in-one anti-leaking noise-canceling anti-twisting anti-warping anti-vibrating double-locking double-core double-deck double-stacked internal-gutters to the ground or other surface.

Variation

Figure 108:
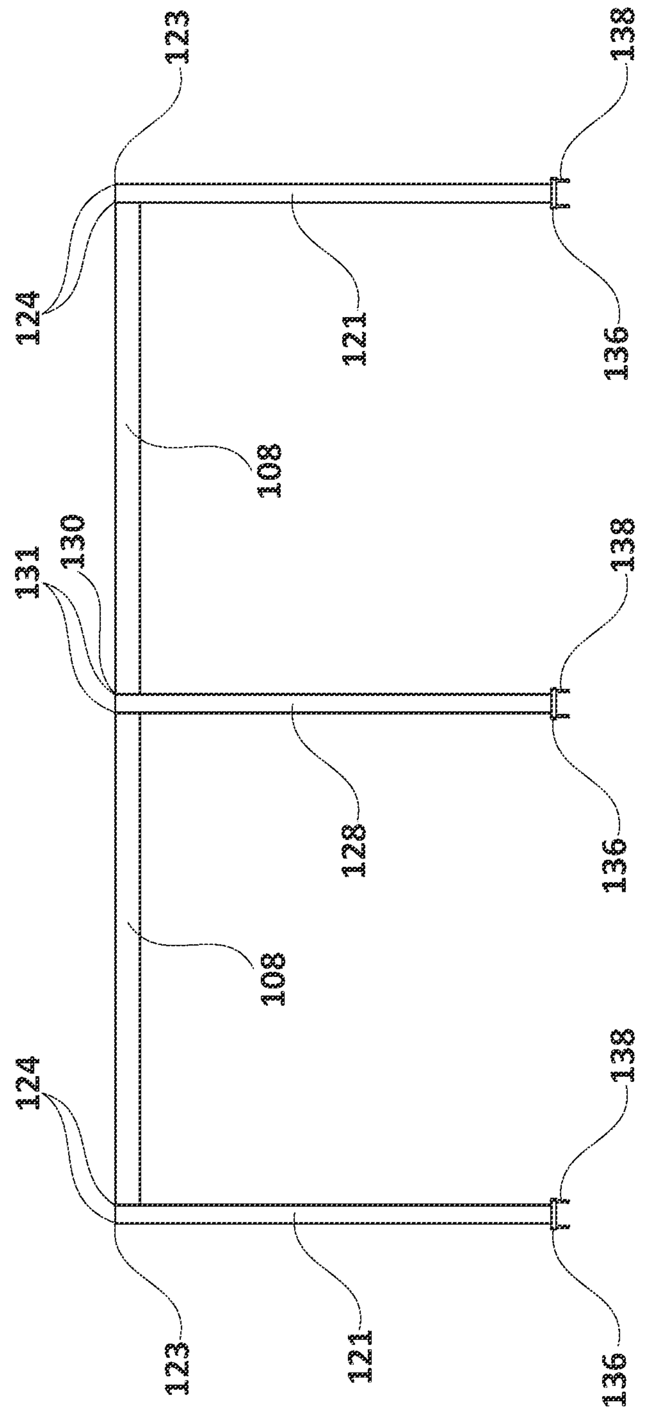
FIG. 108-FIG. 200 illustrate perspective, side, front, back, and top views demonstrating equivalent variations of components, assembly and functions of the five-device-in-one anti-leaking noise-canceling anti-twisting anti-warping anti-vibrating double-locking double-core double-deck double-stacked internal-gutters.
Figure 109:
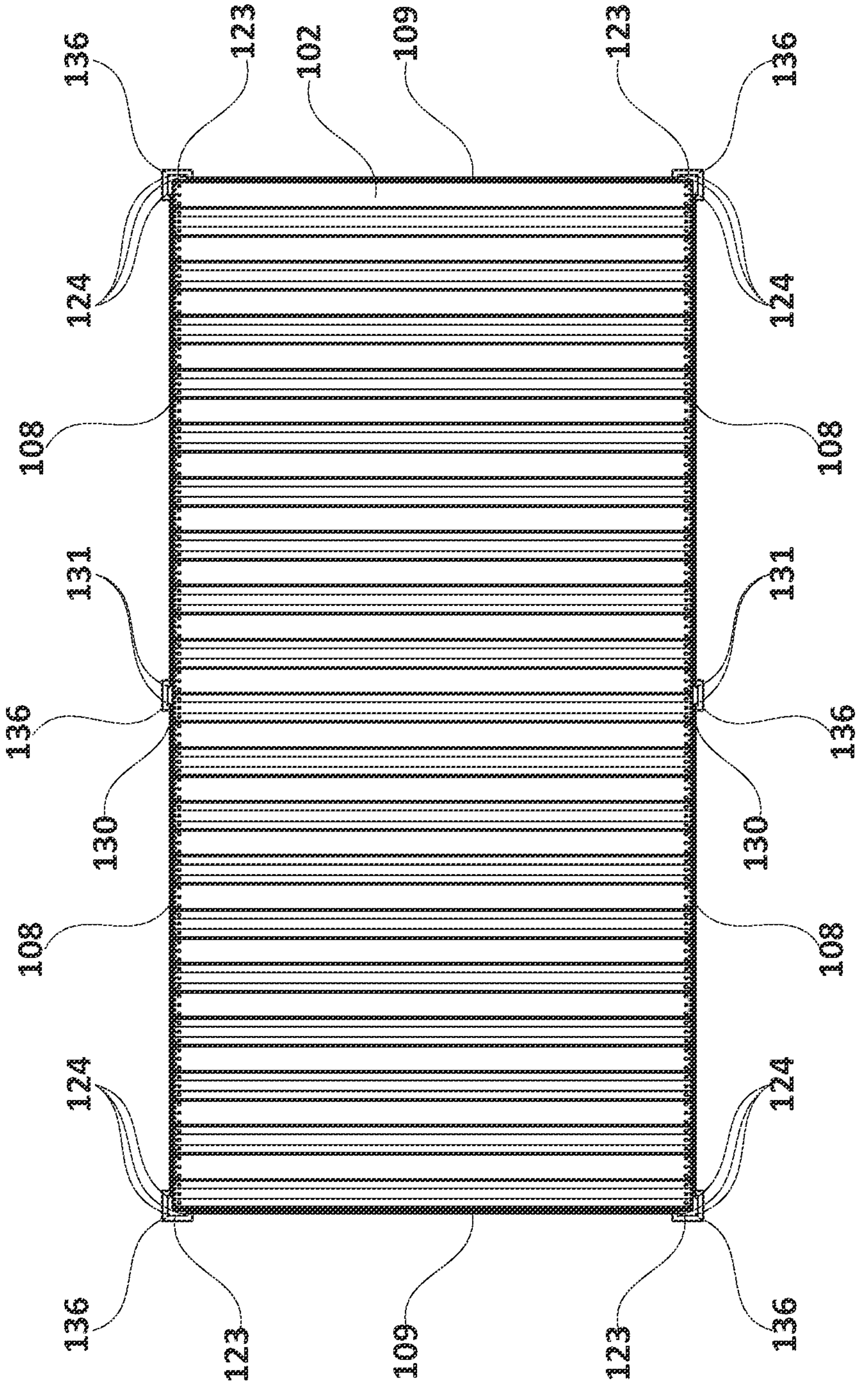
Figure 110:
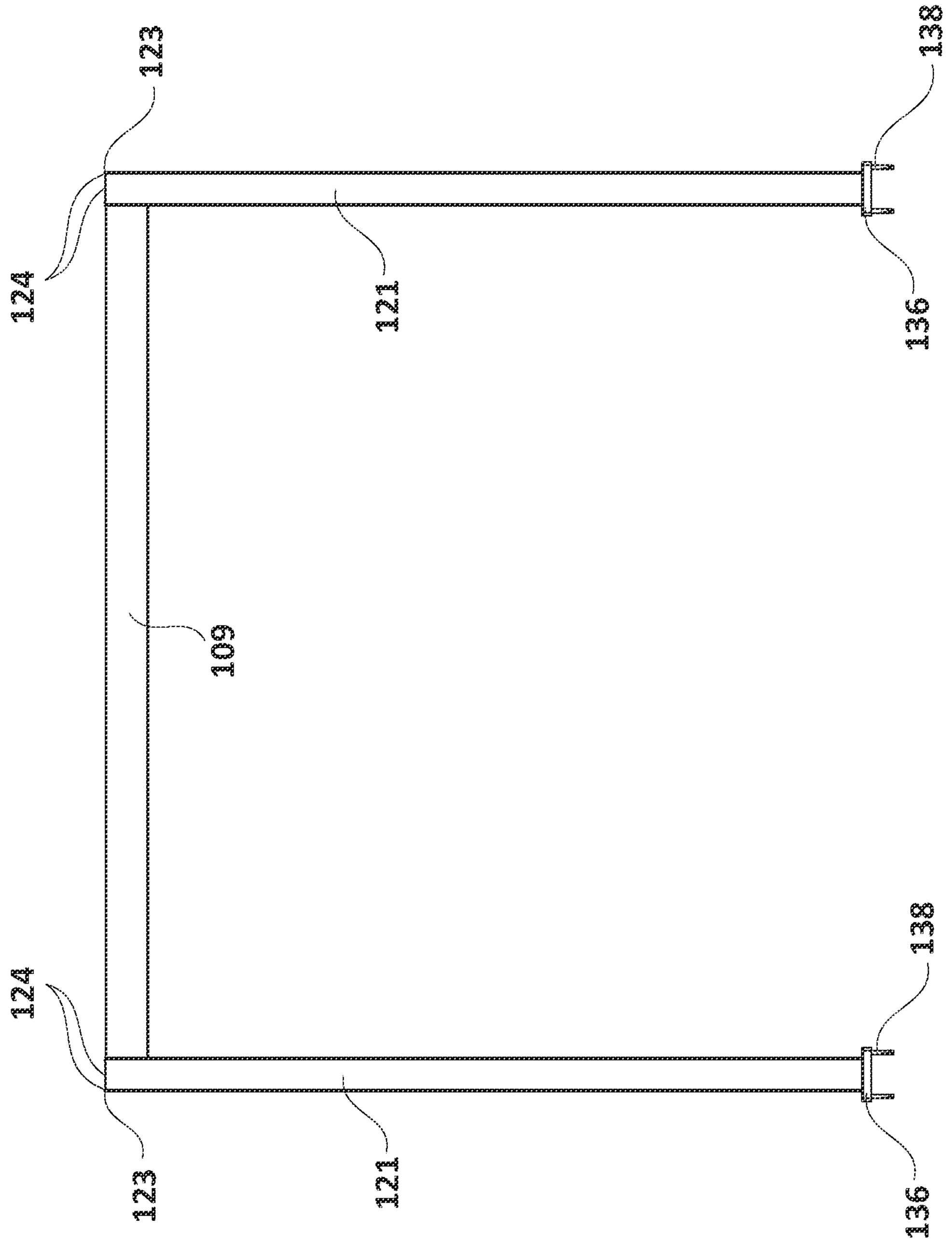
Figure 111:
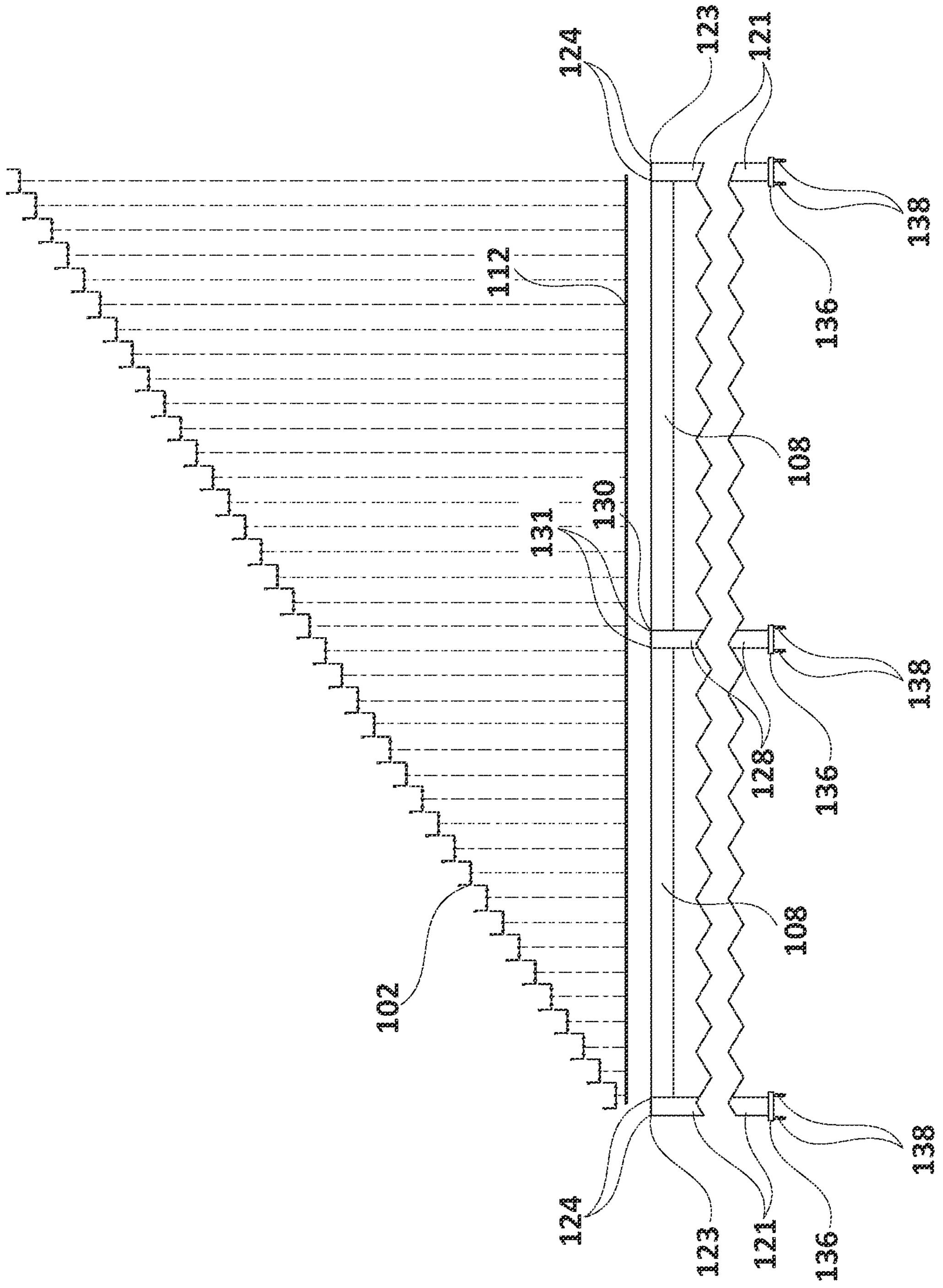
Figure 112:
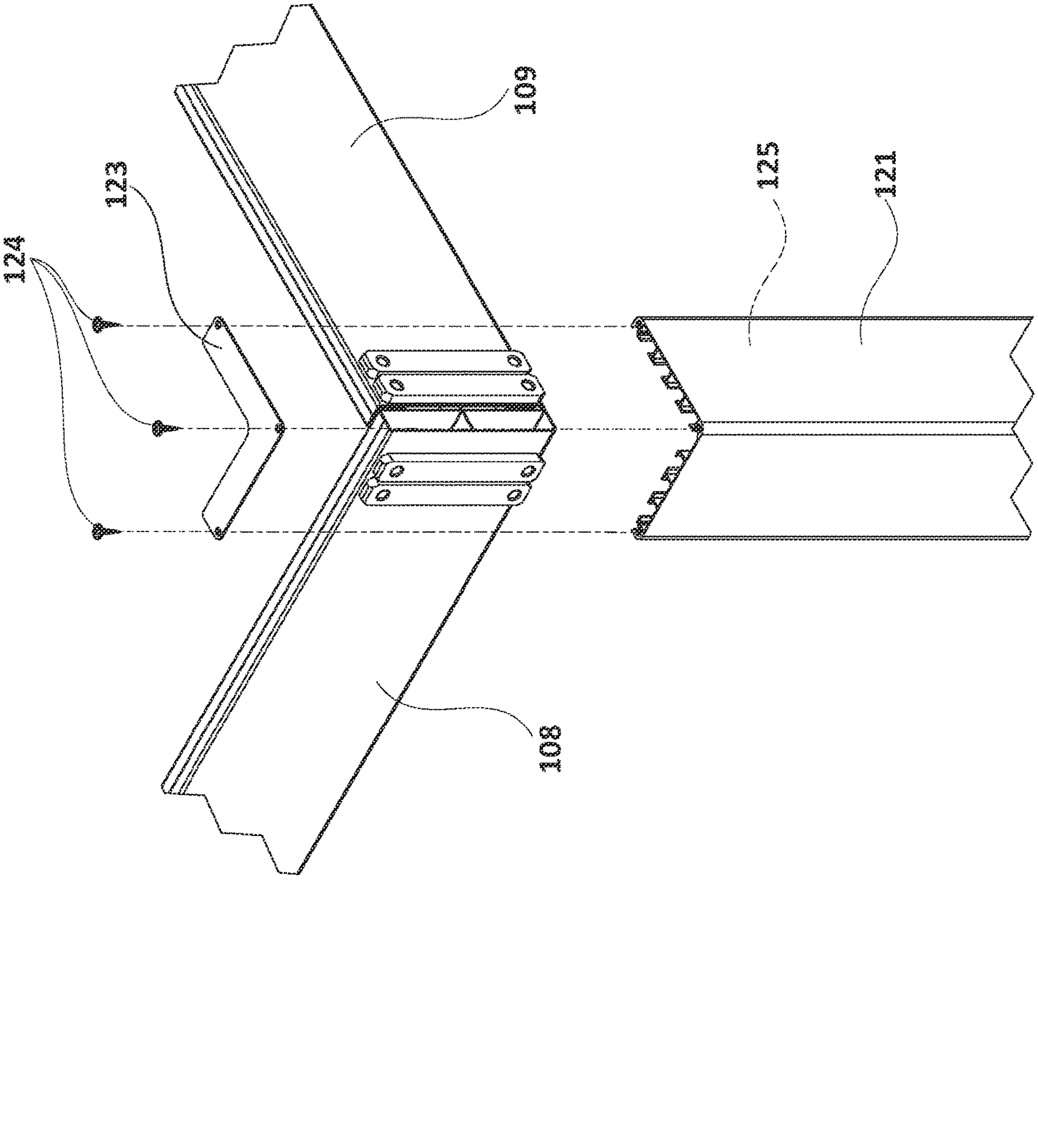
Figure 113:
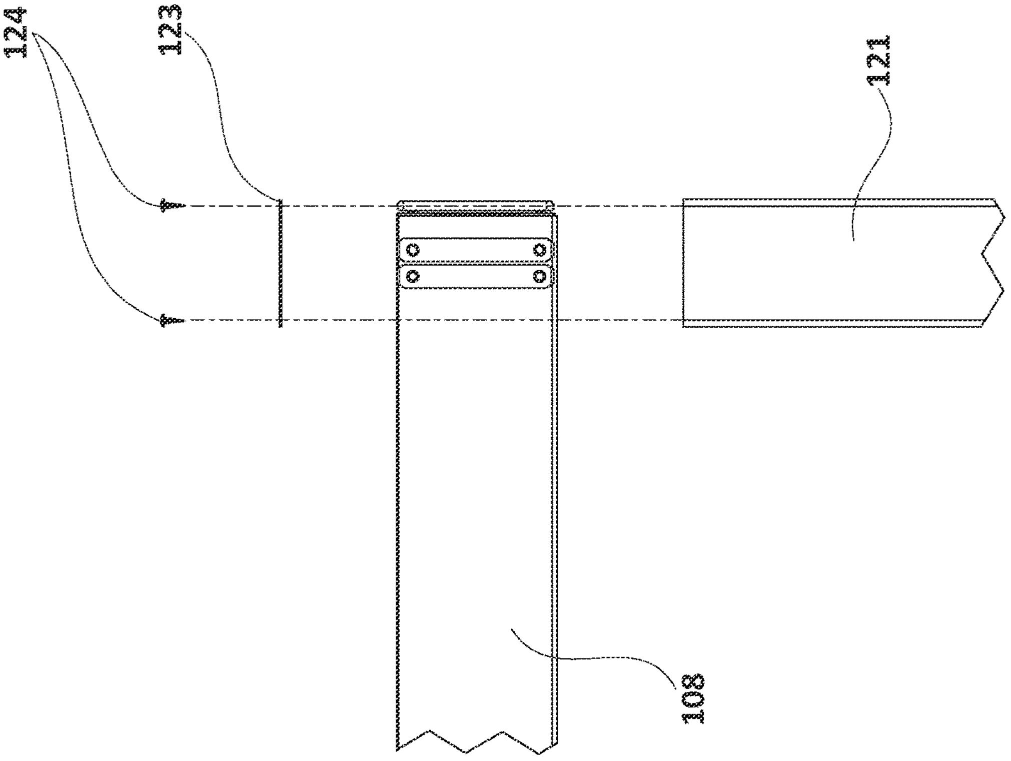
Figure 114:
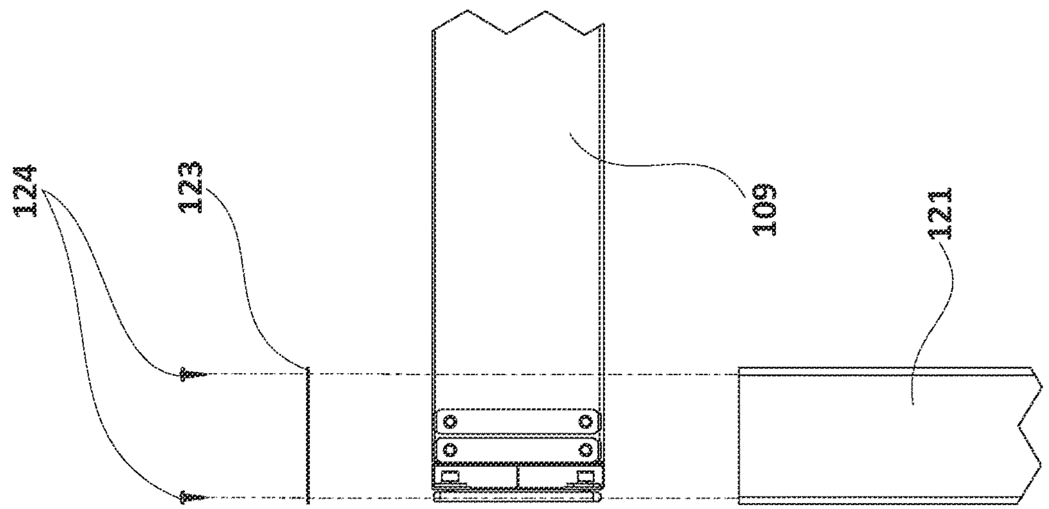
Figure 115:
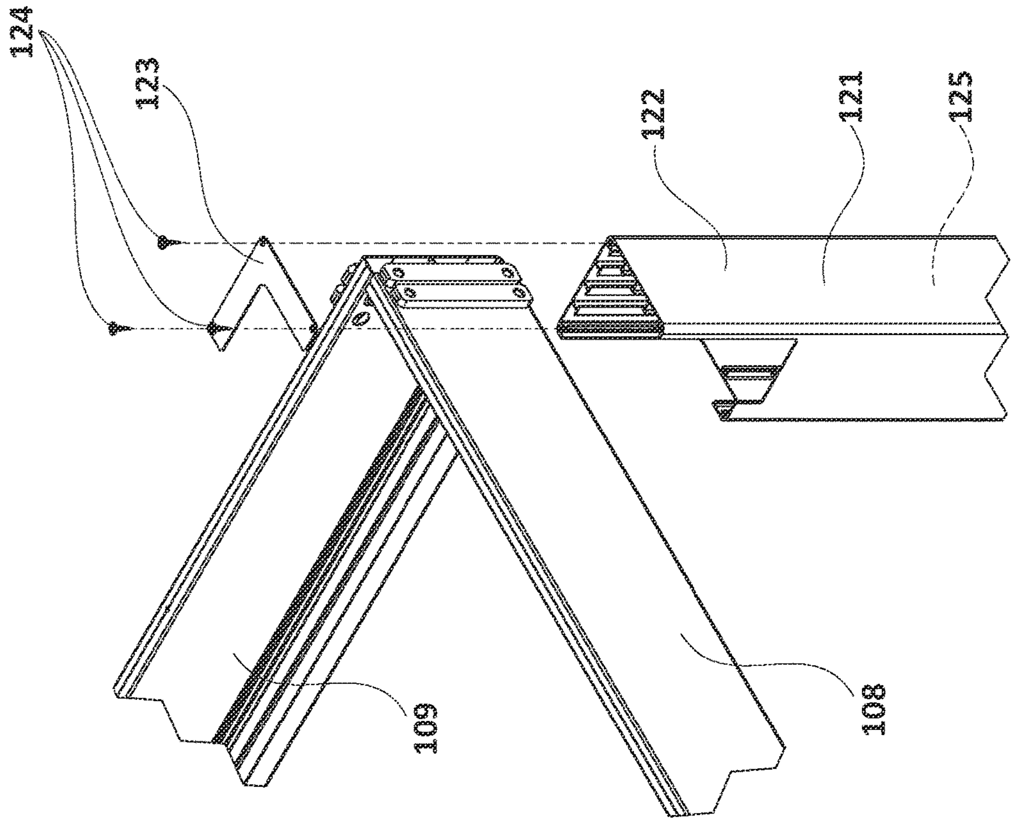
Figure 116:
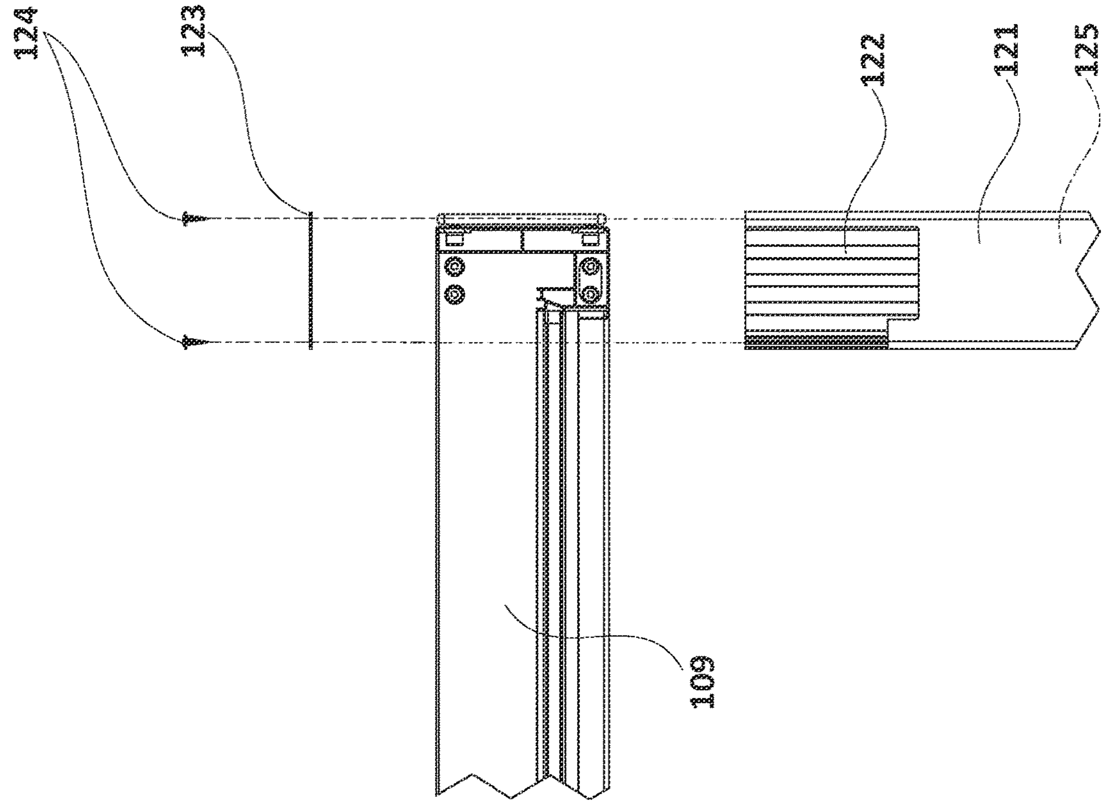
Figure 117:
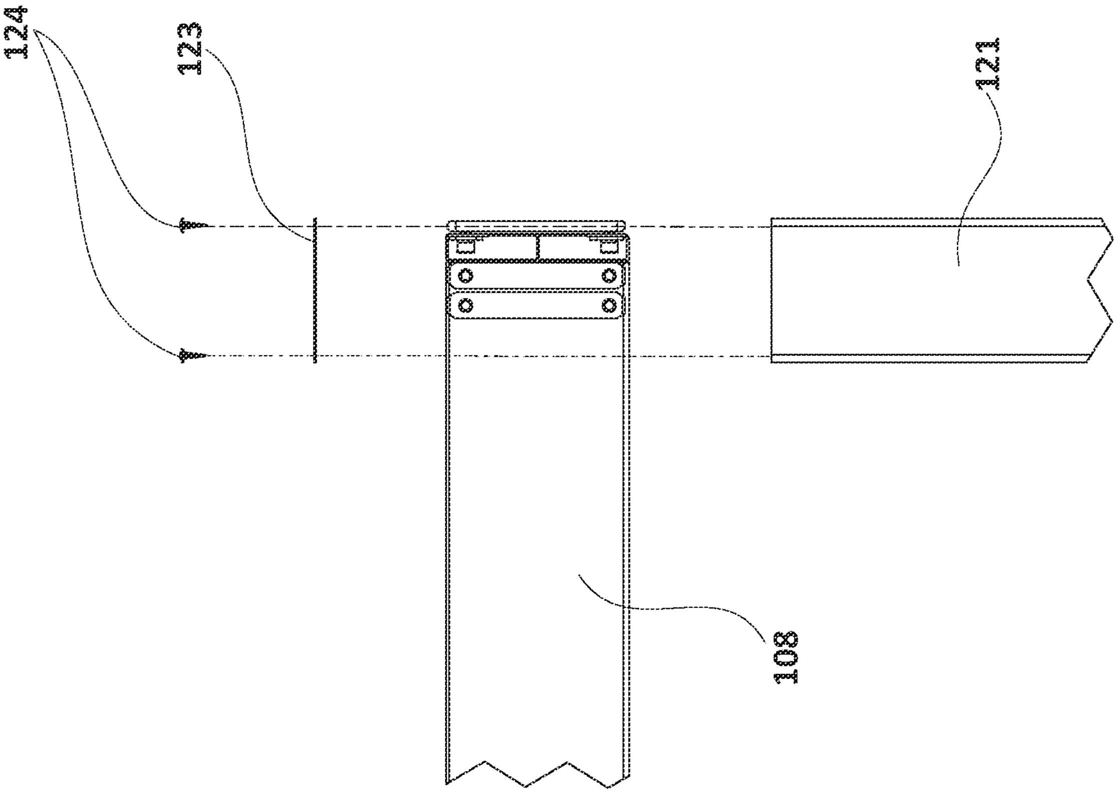
Figure 118:
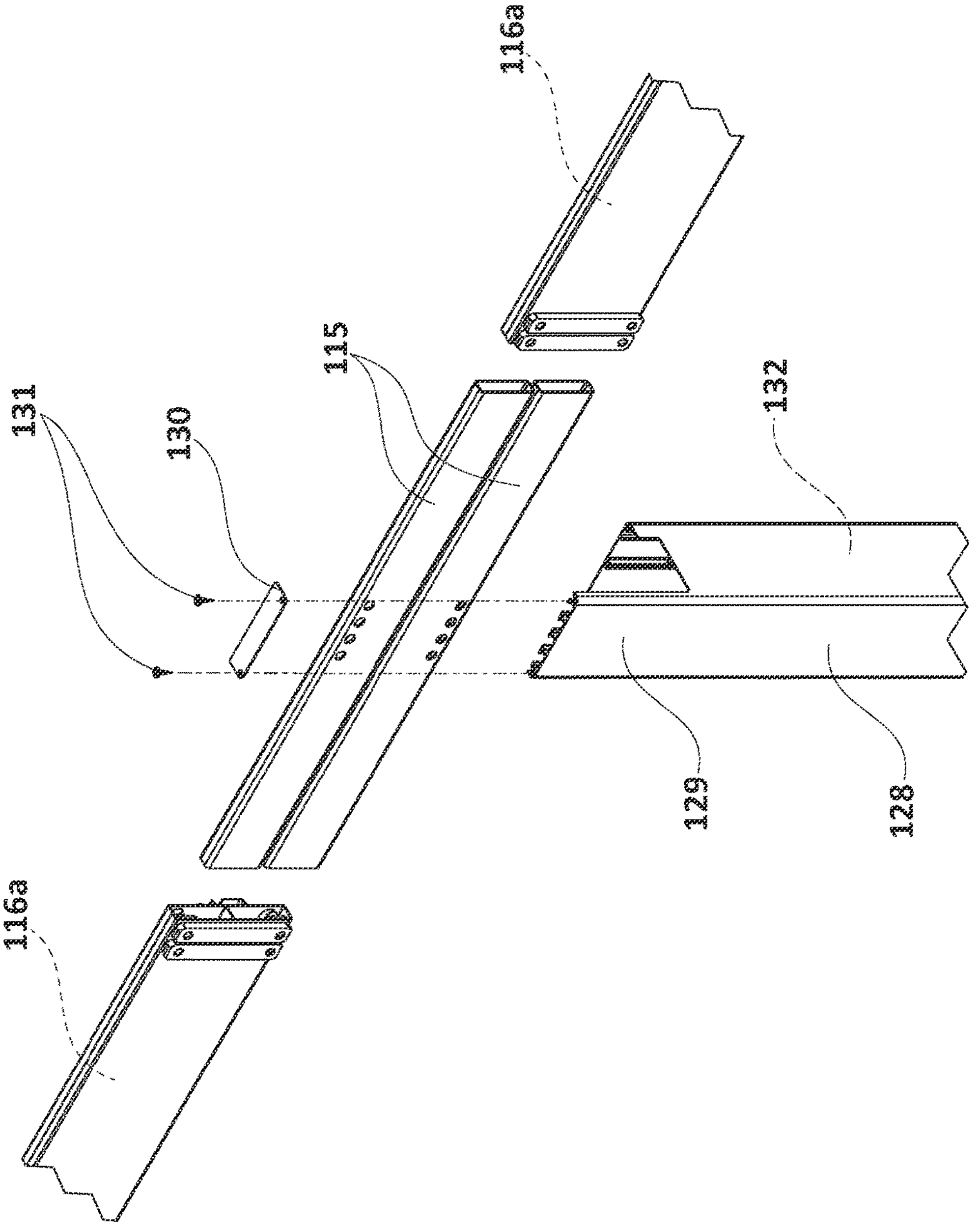
Figure 119:
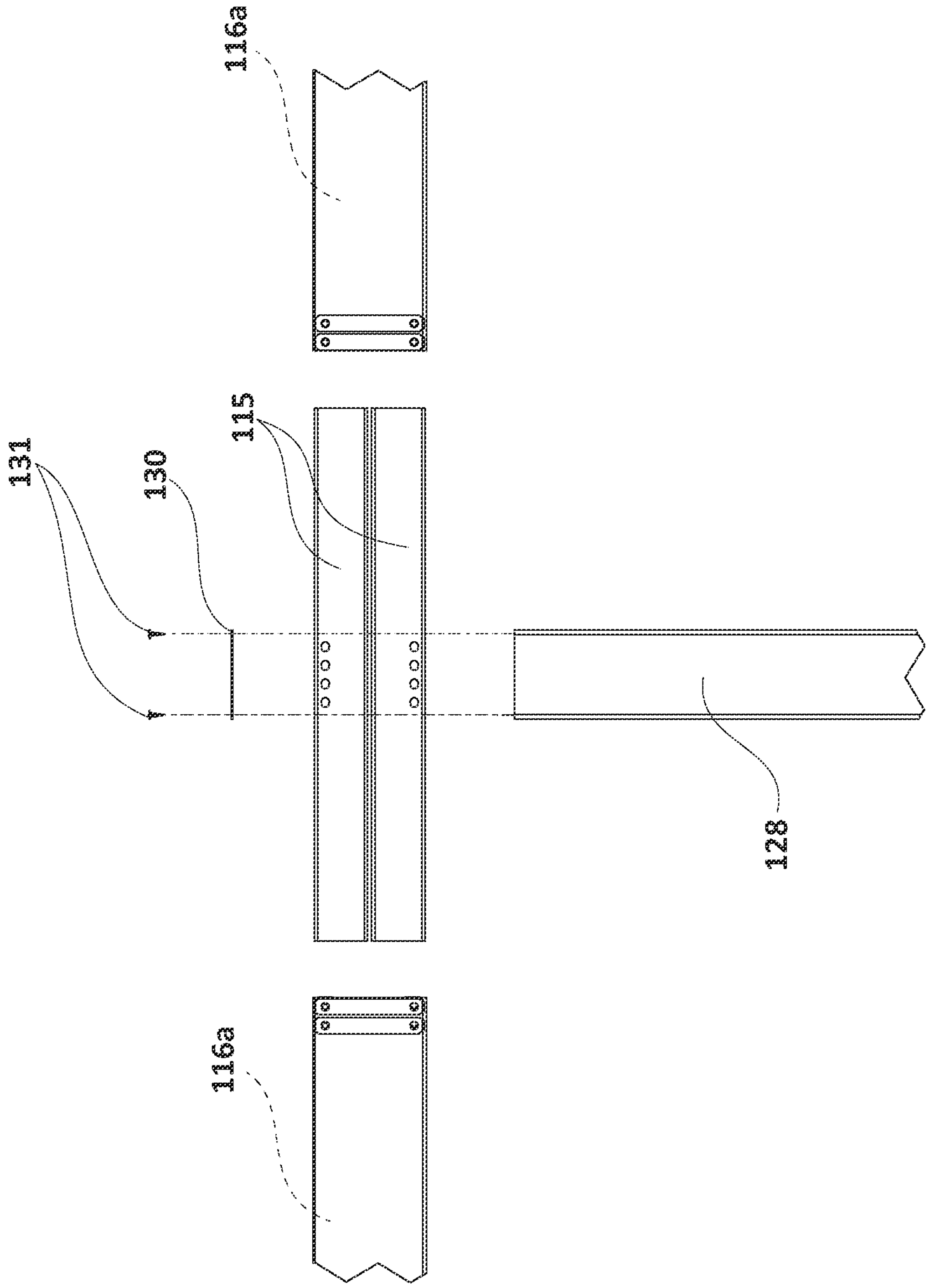
Figure 120:
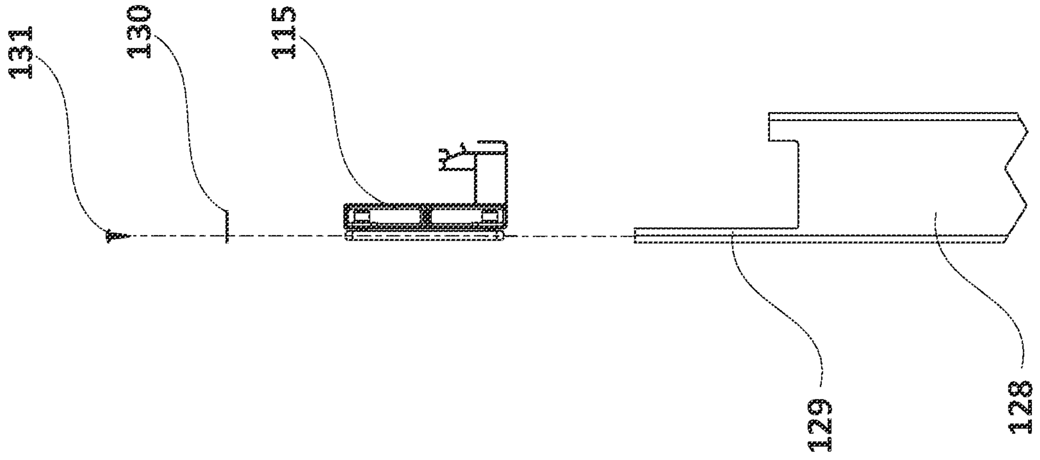
Figure 121:
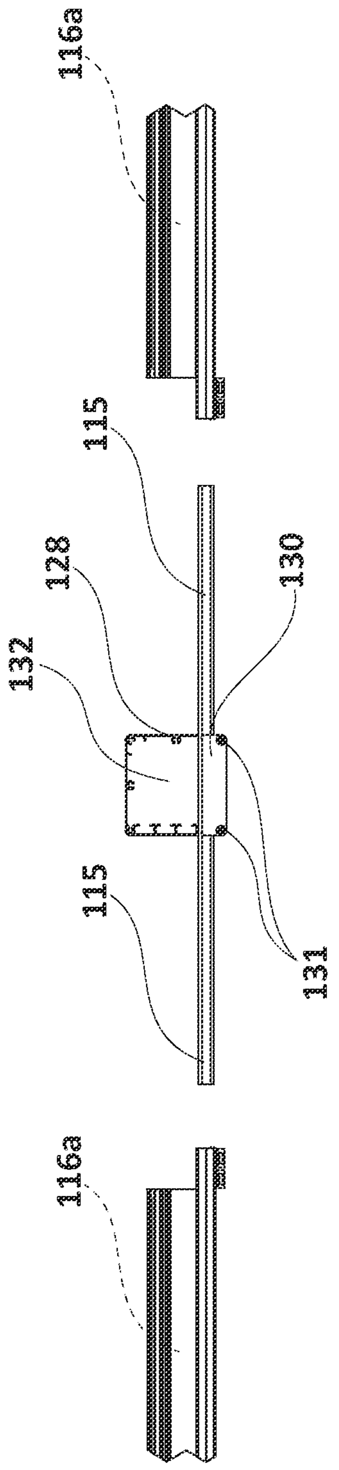
Figure 122:
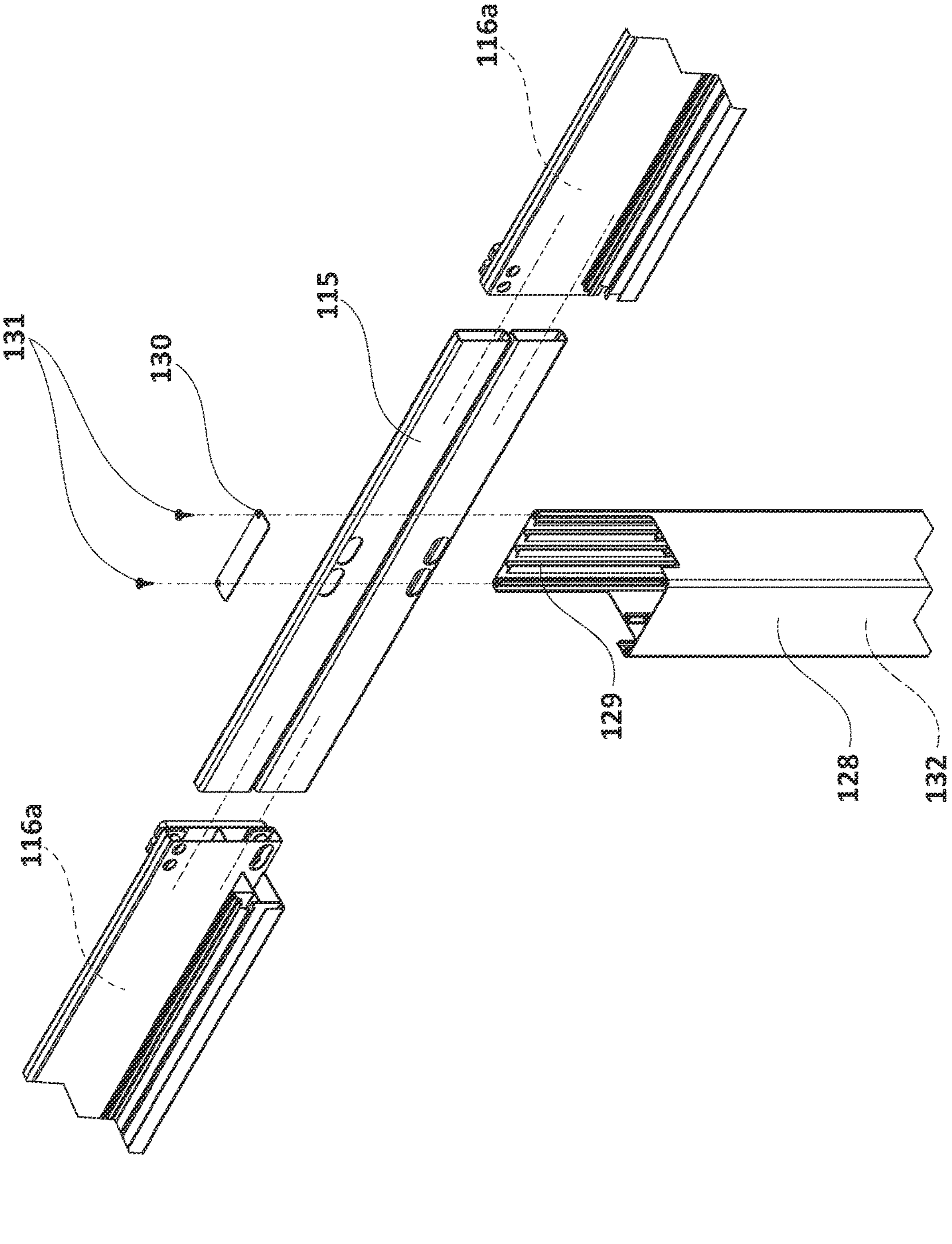
Figure 123:
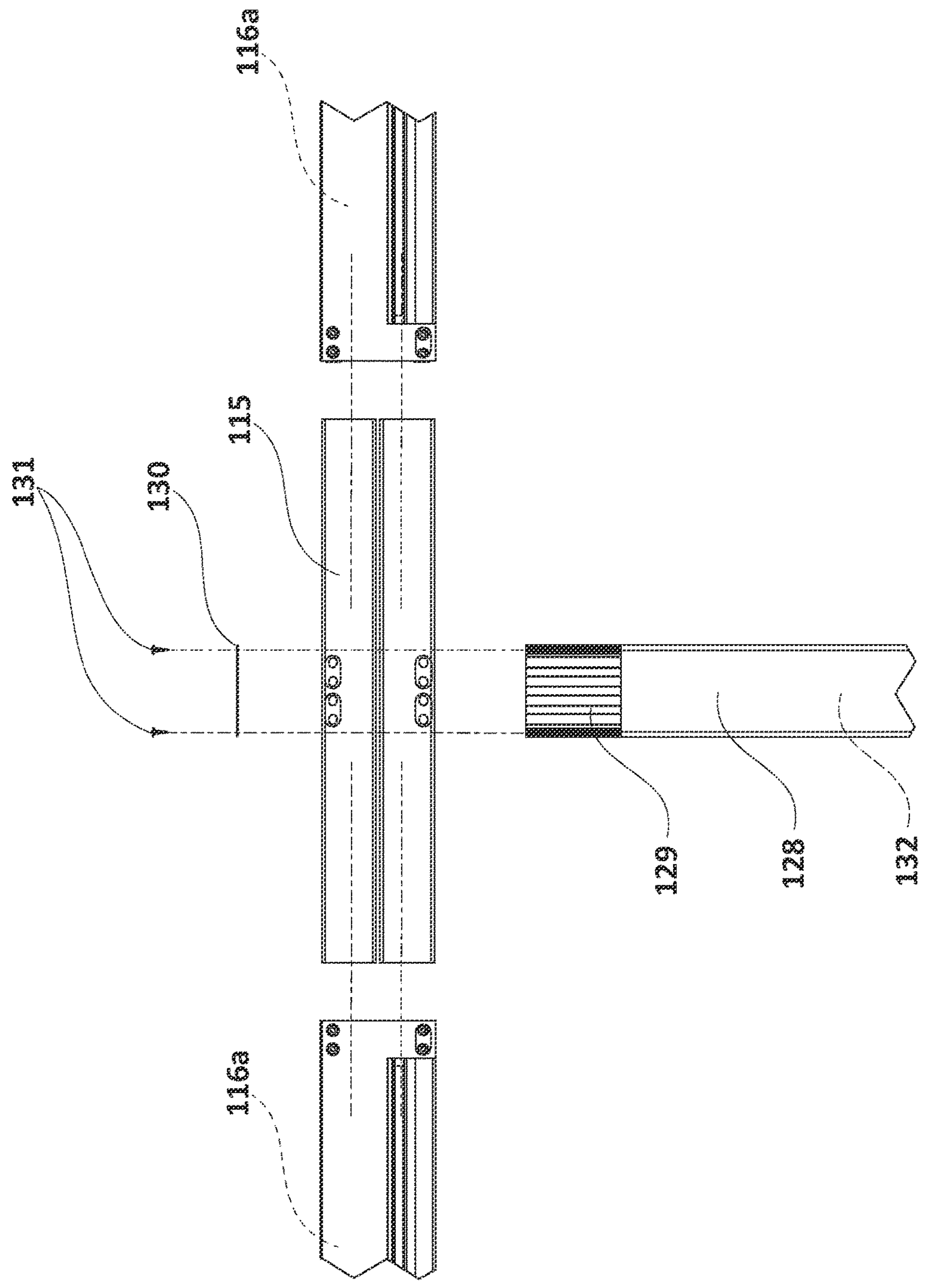
Figure 124:
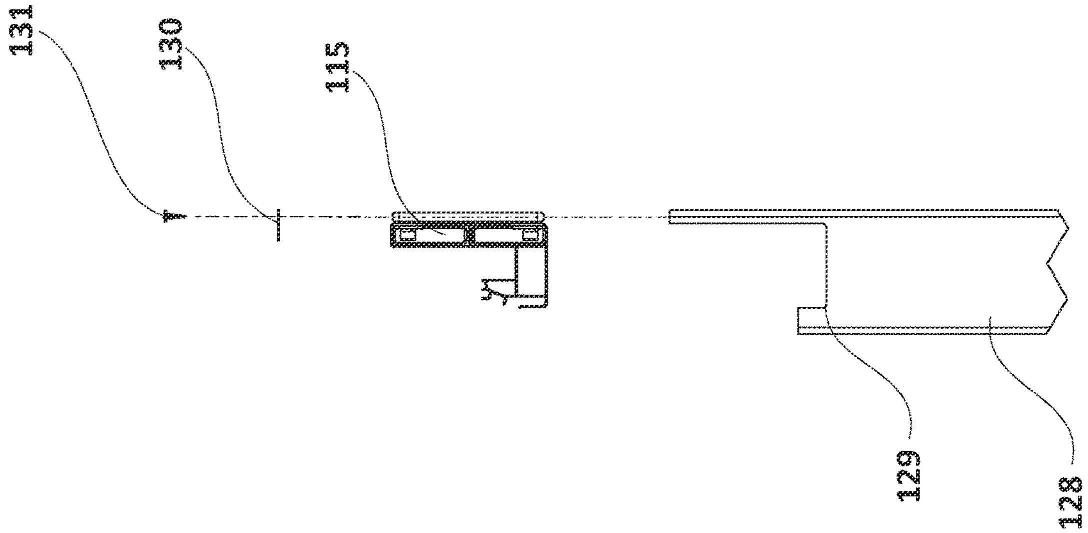
Figure 125:
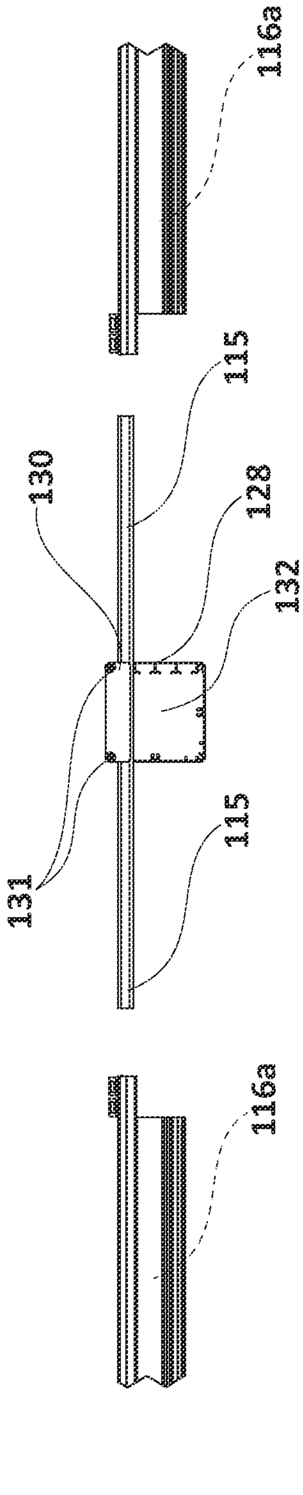
Figure 126:
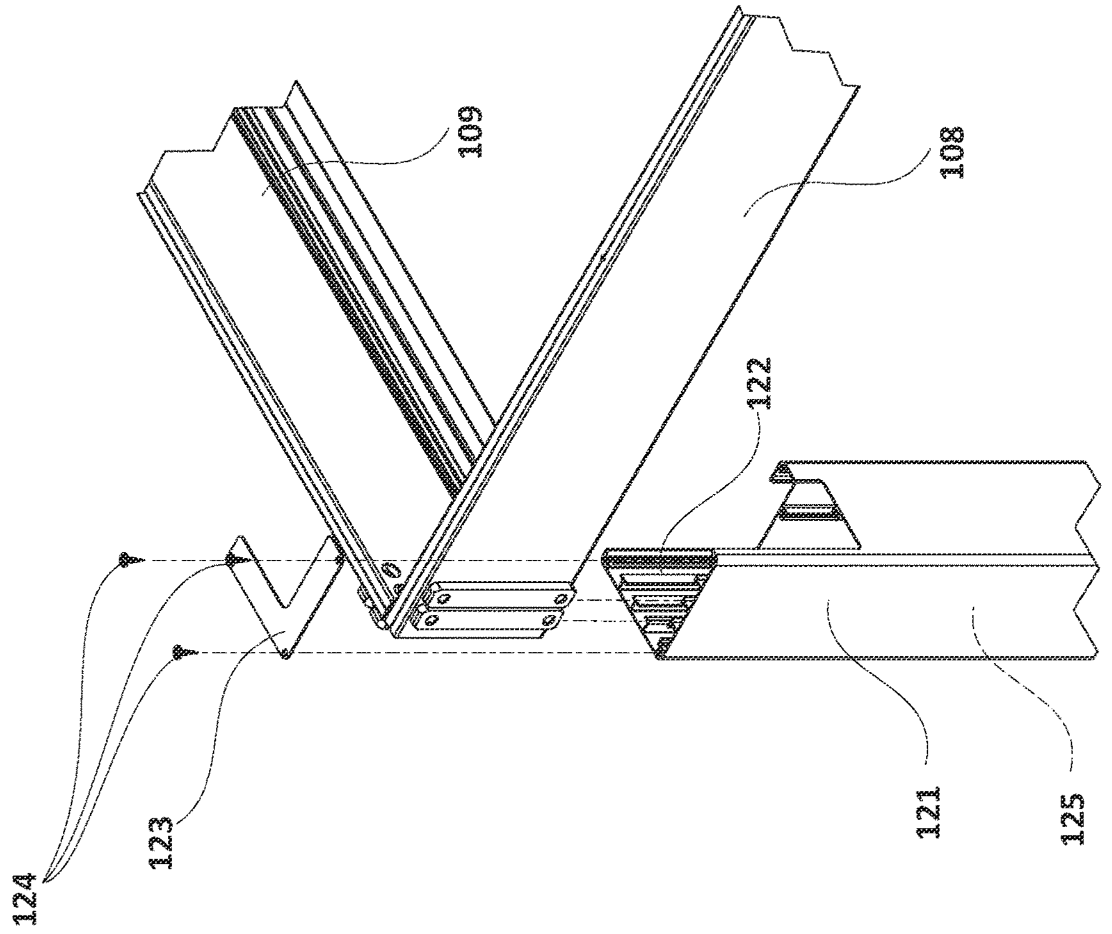
Figure 127:
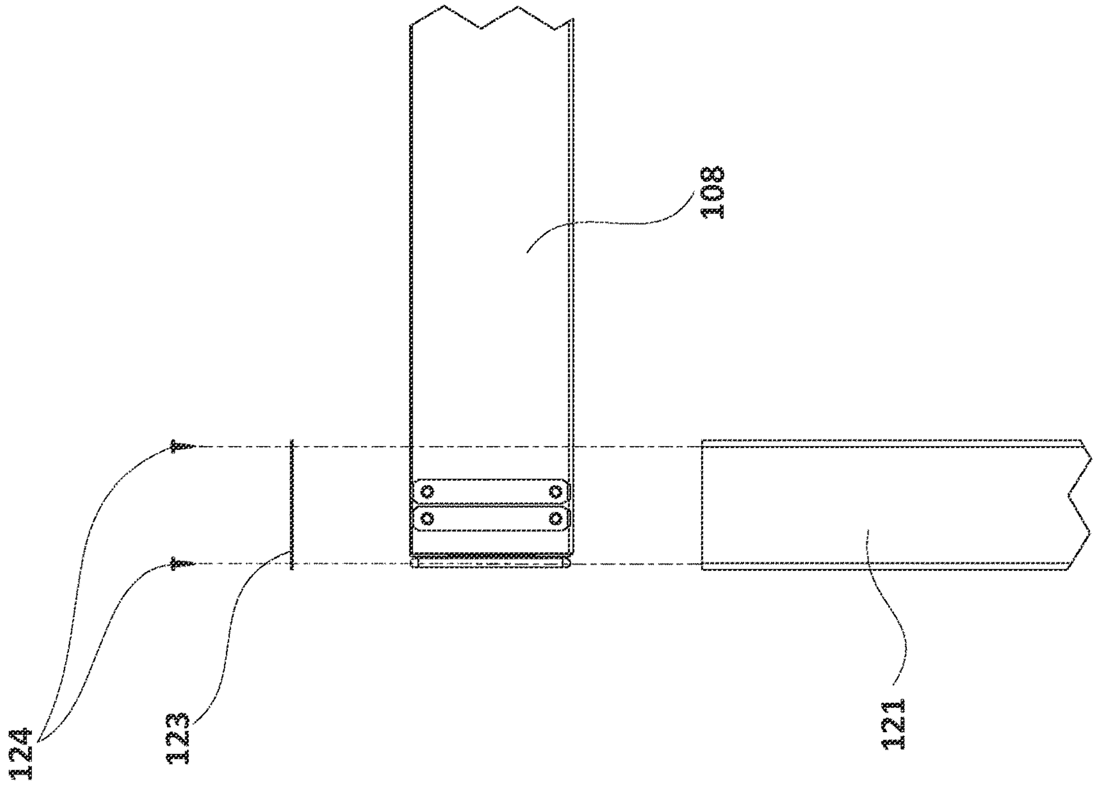
Figure 128:
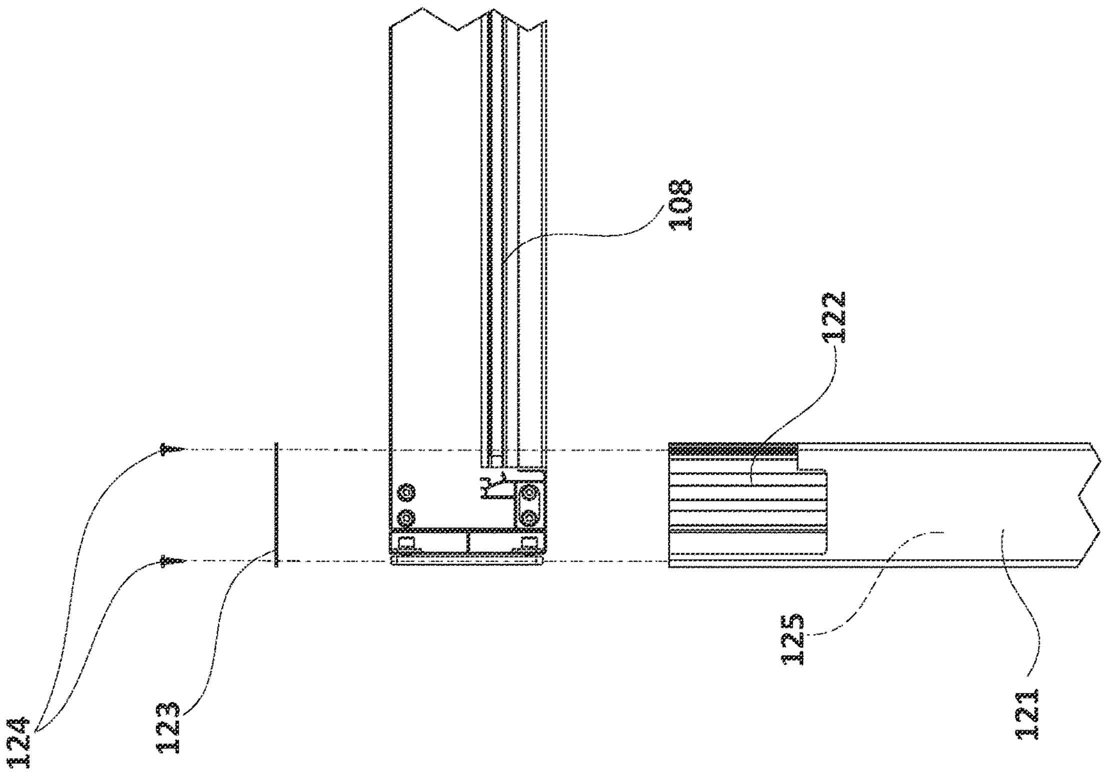
Figure 129:
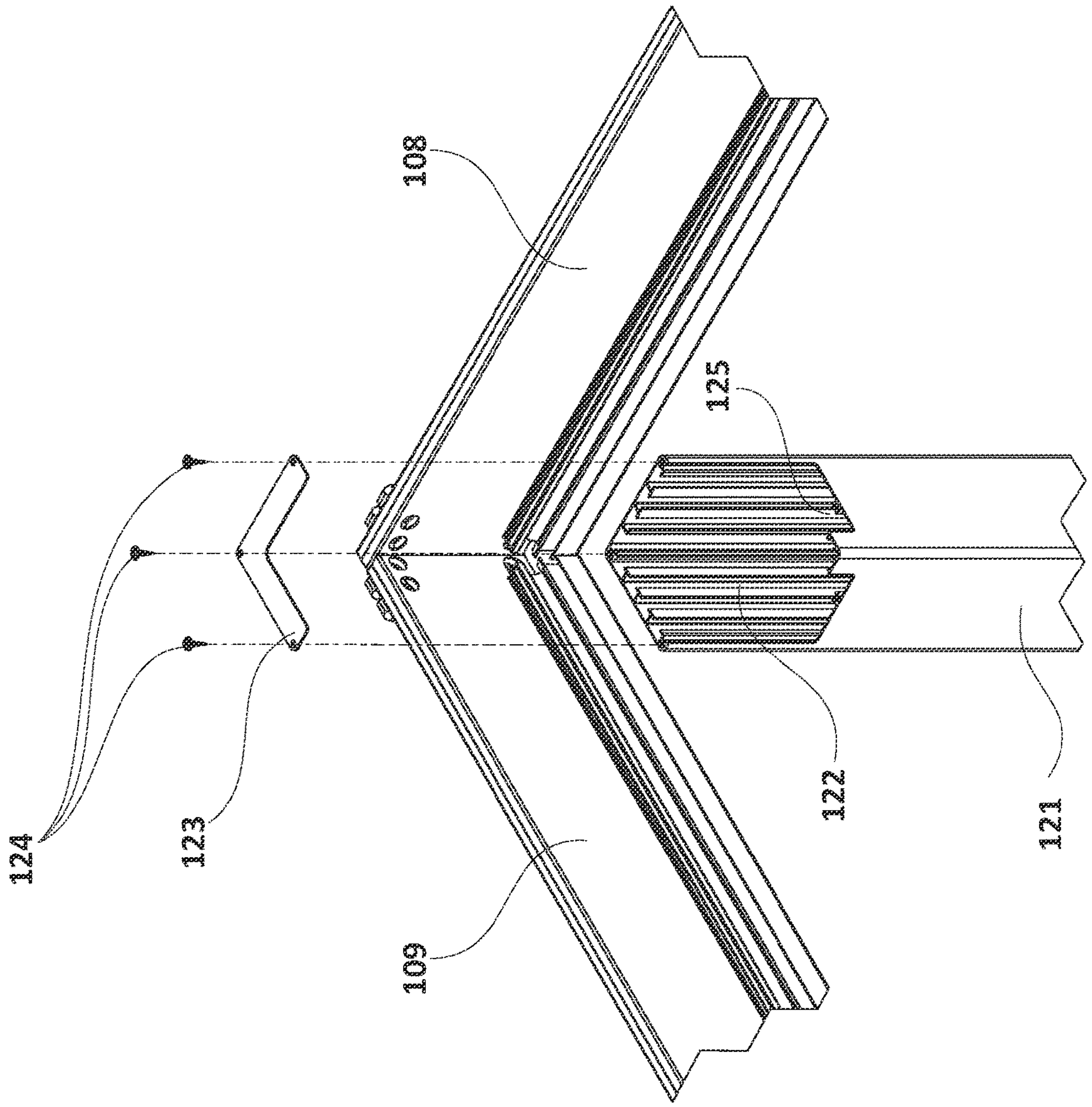
Figure 130:
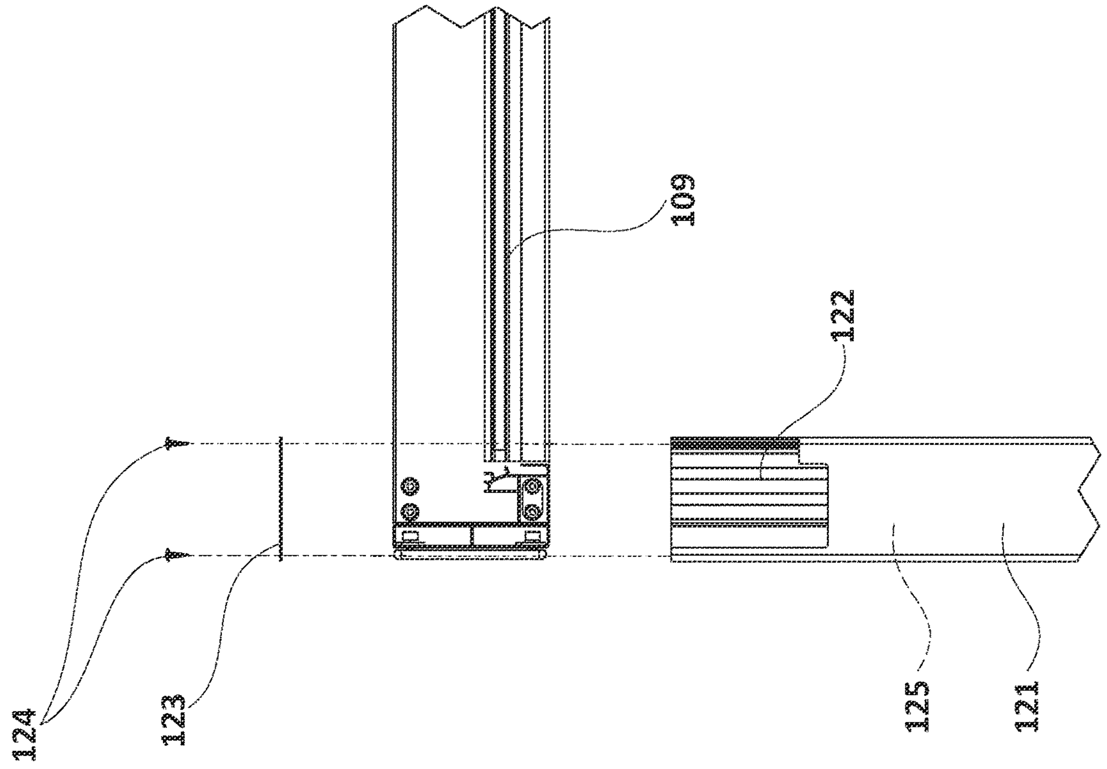
Figure 131:
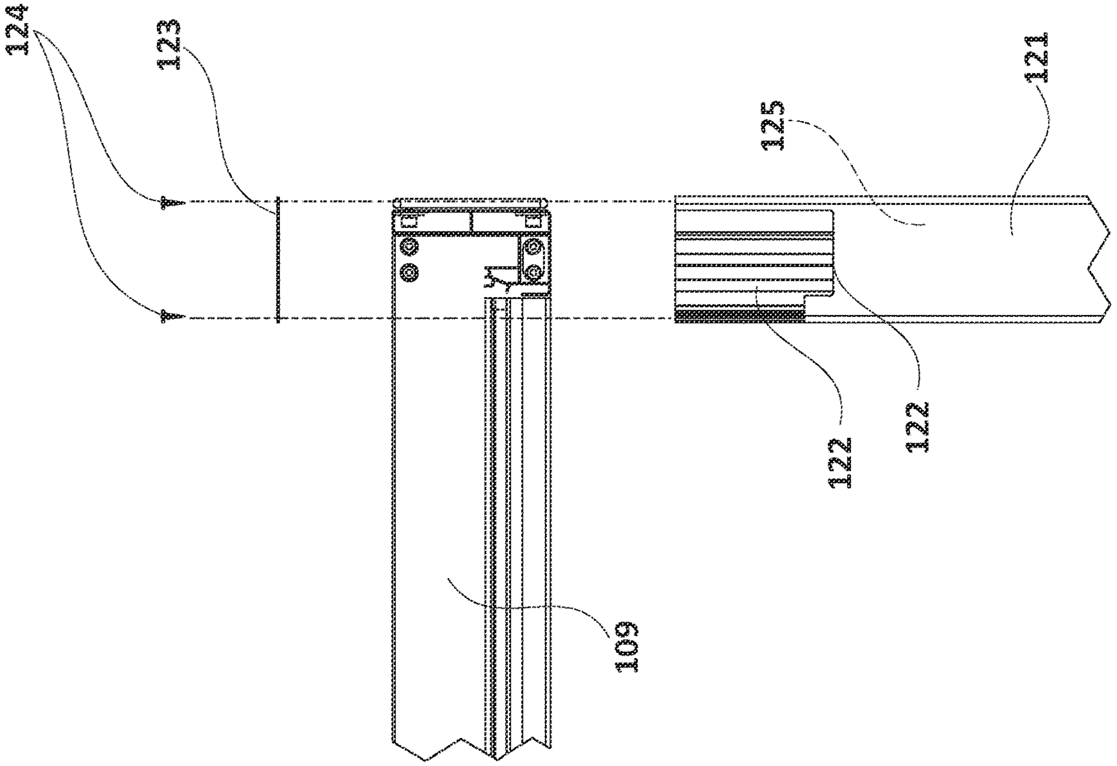
Figure 132:
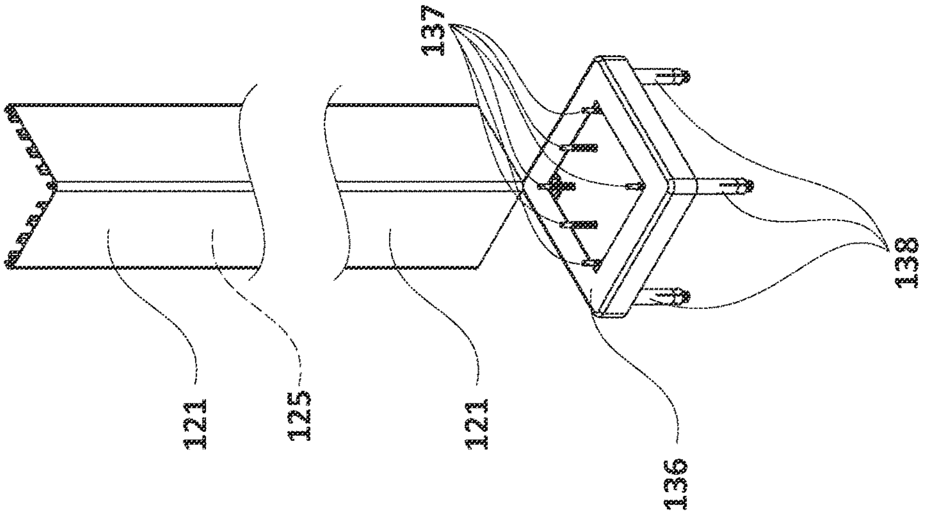
Figure 133:
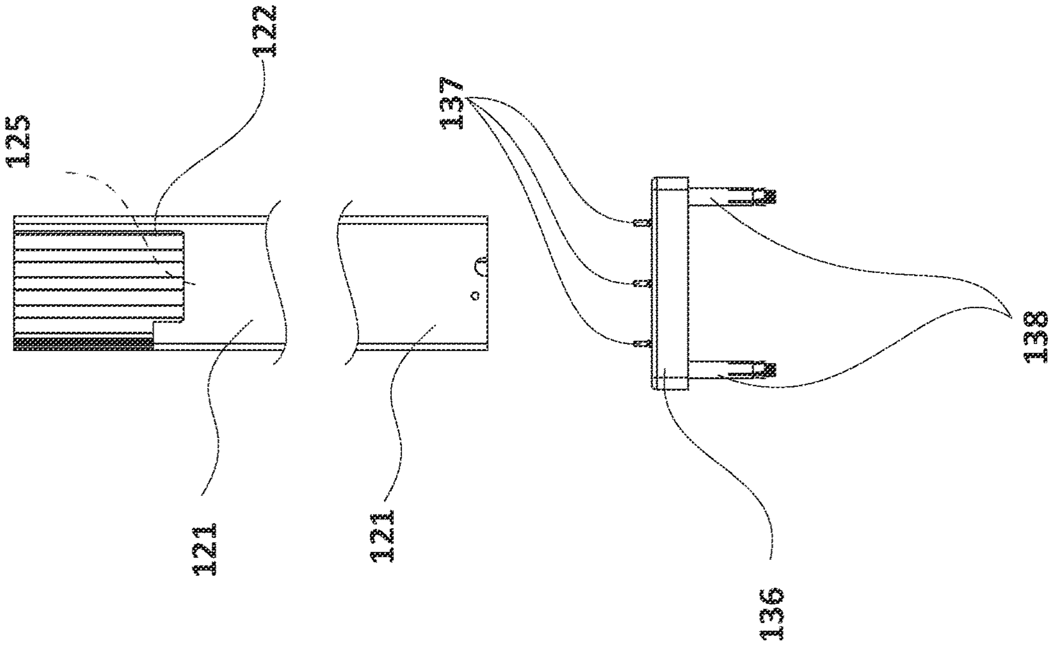
Figure 134:
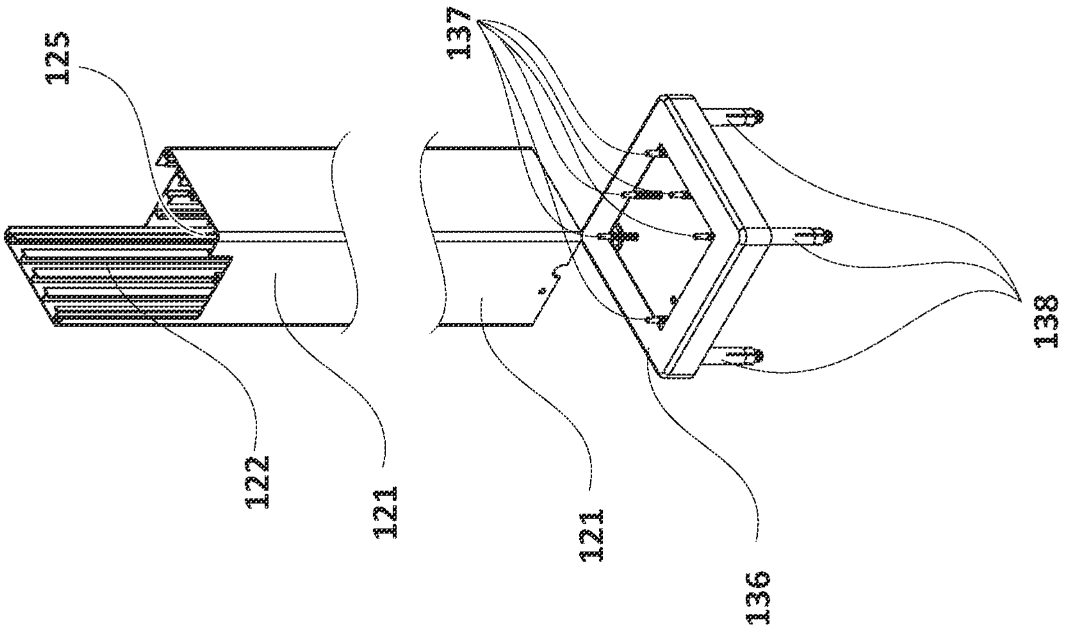
Figure 135:
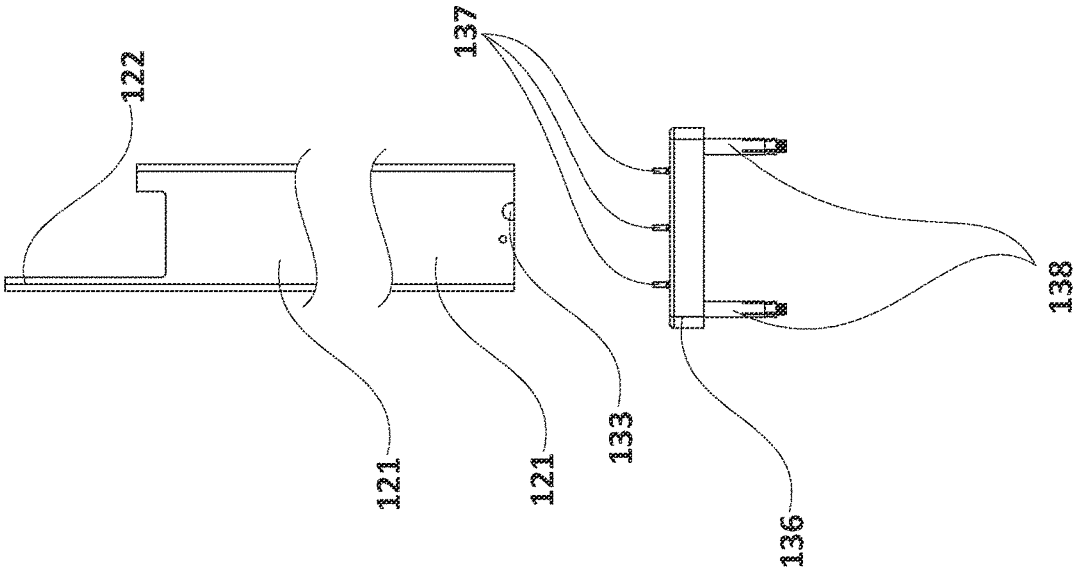
Figure 136:
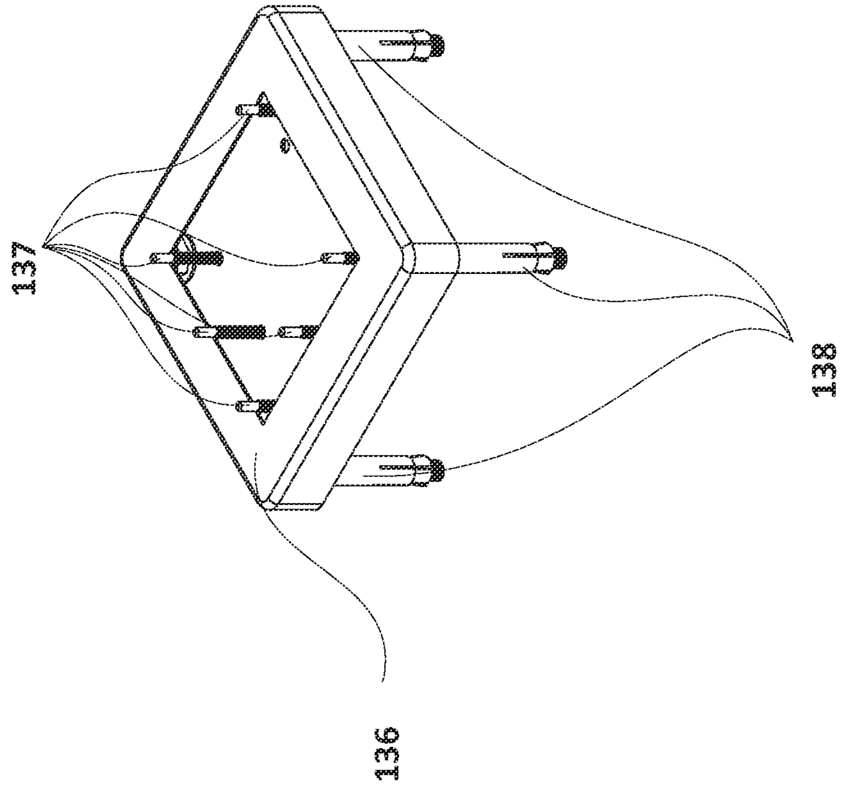
Figure 137:
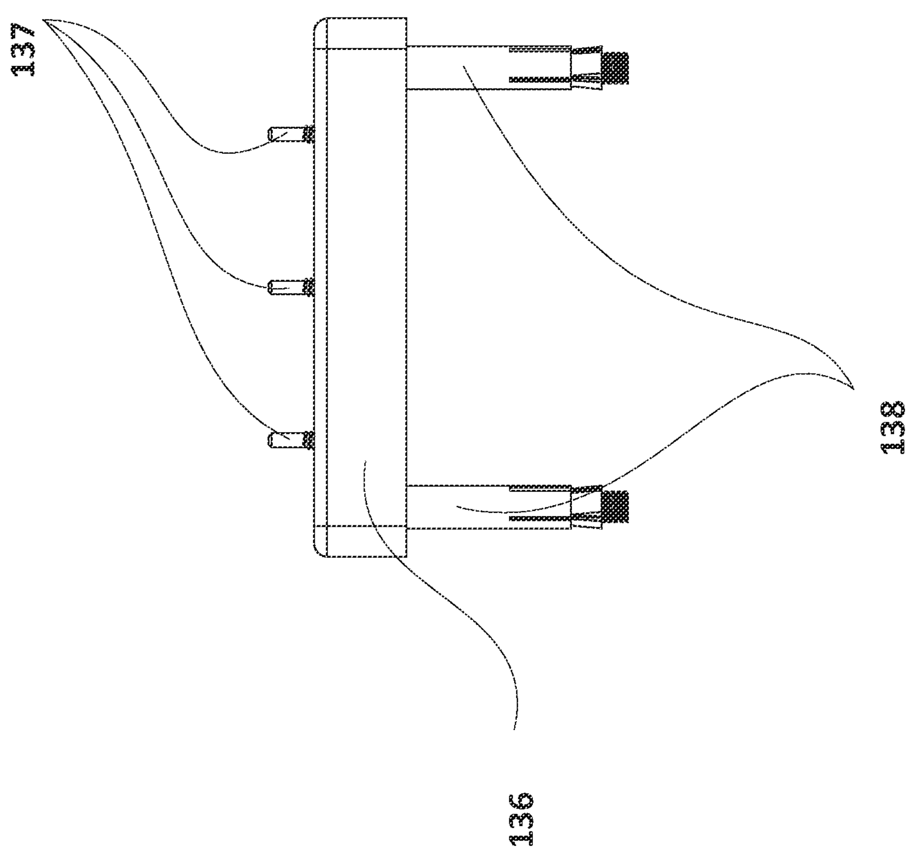
Figure 138:
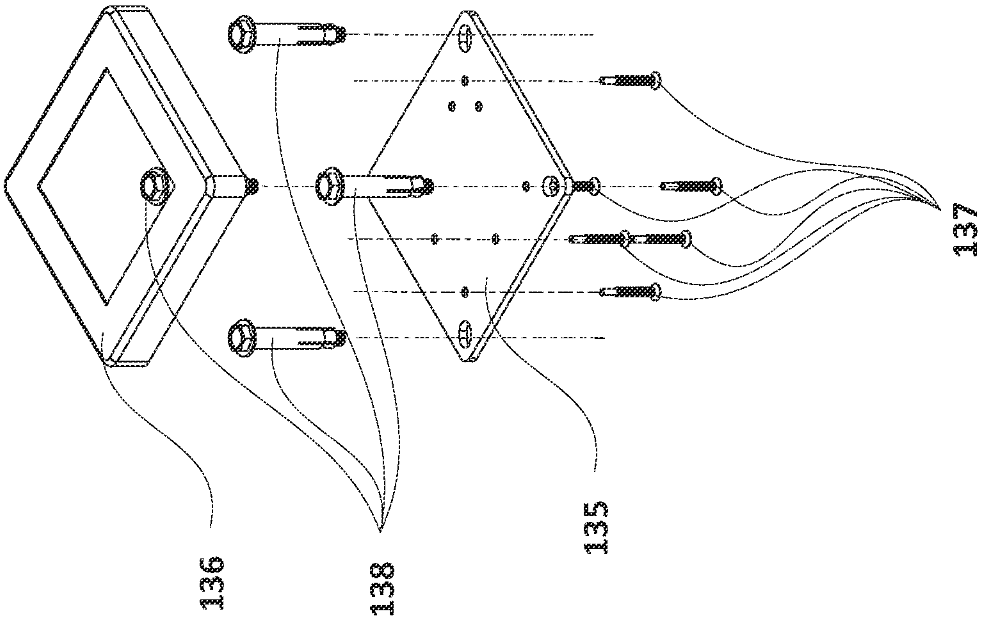
Figure 139:
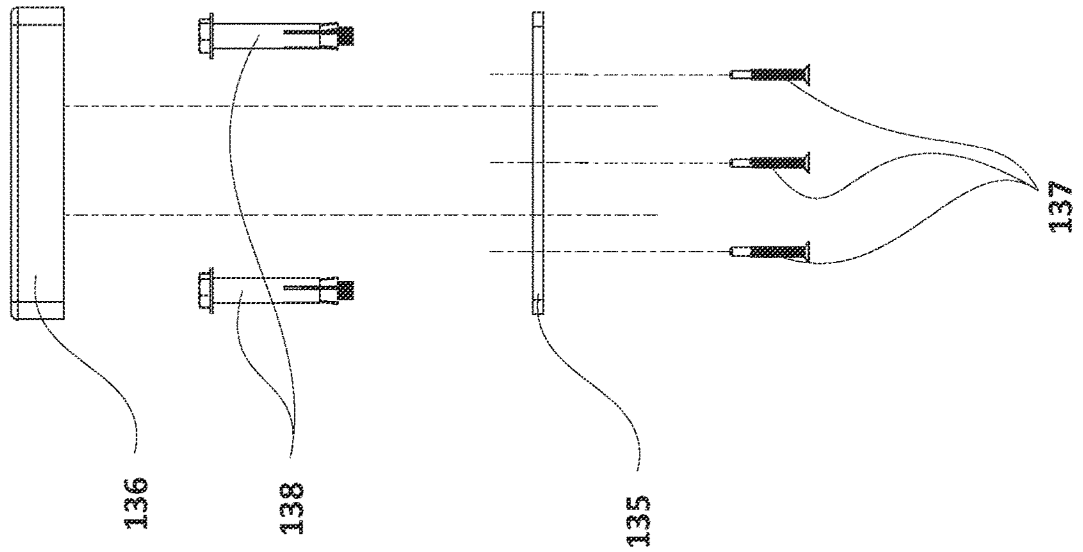
Figure 140:
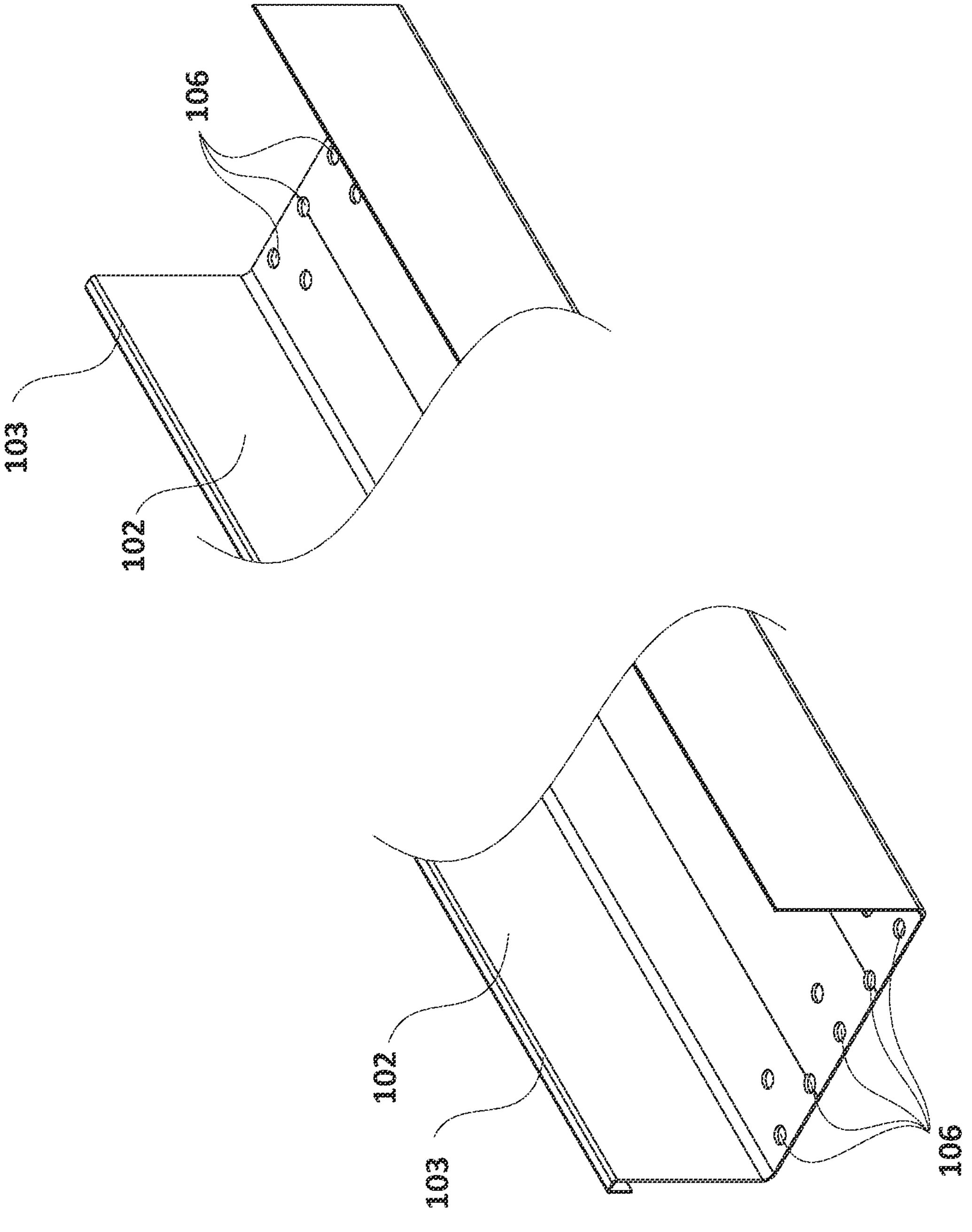
Figure 141:
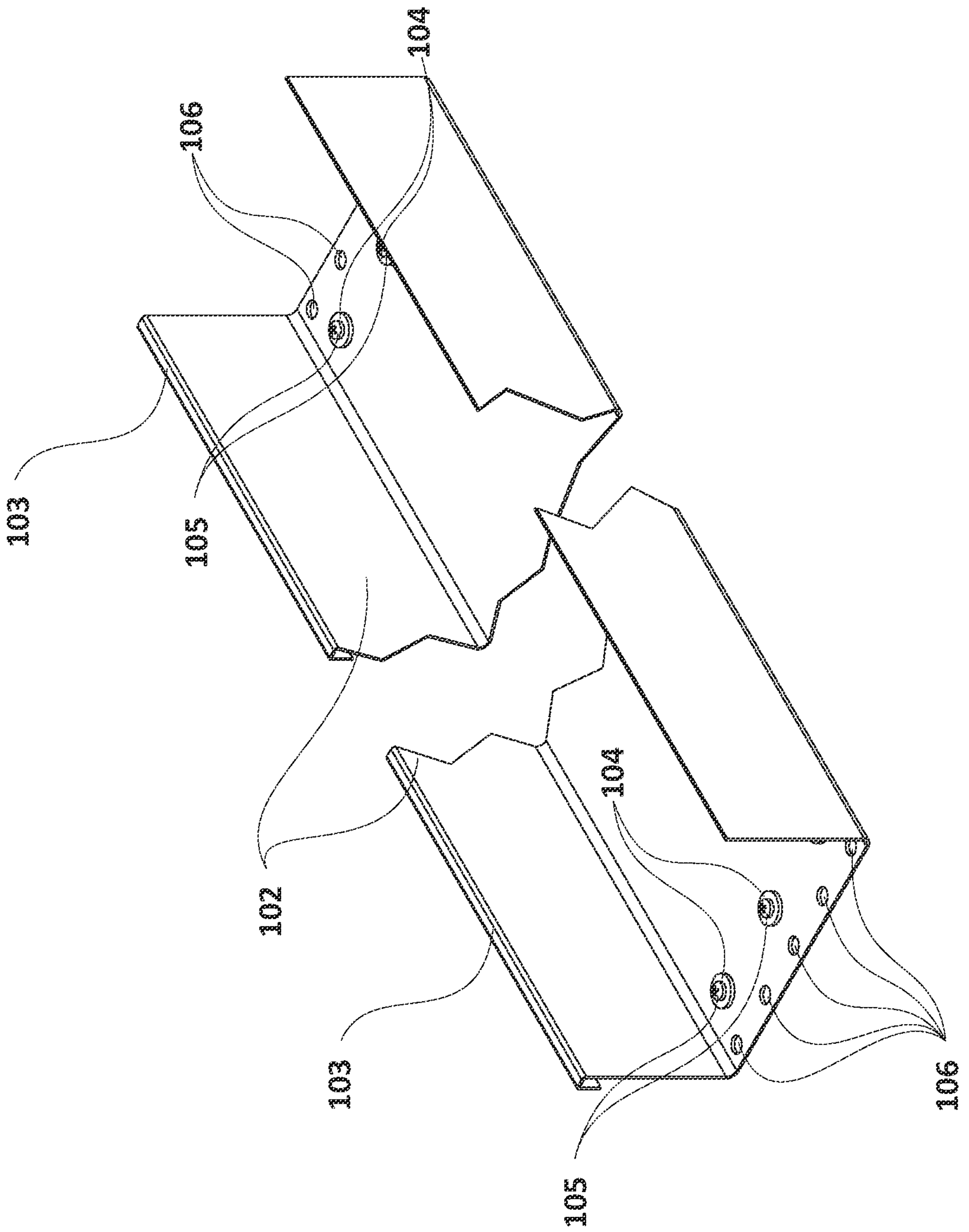
Figure 142:
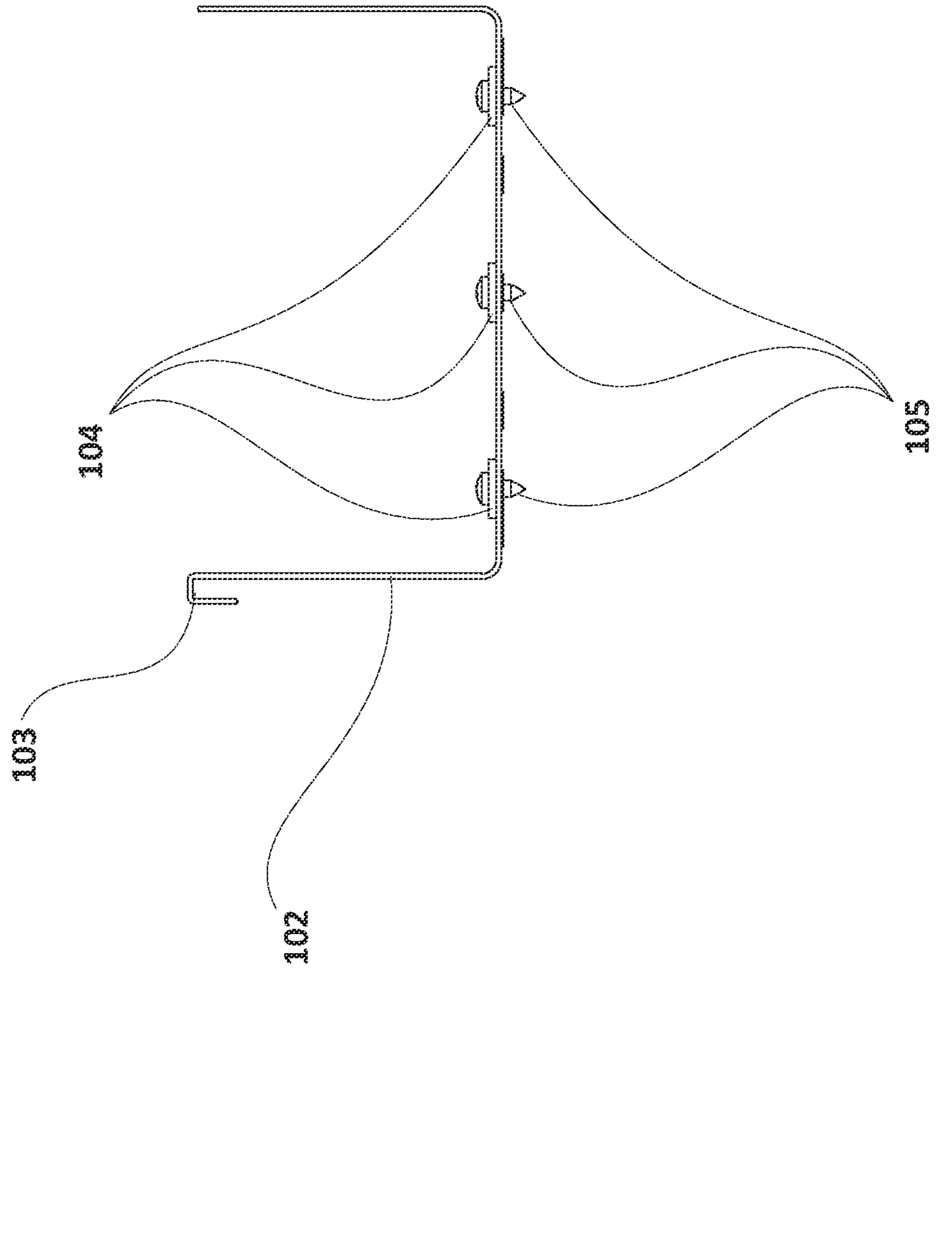
Figure 143:
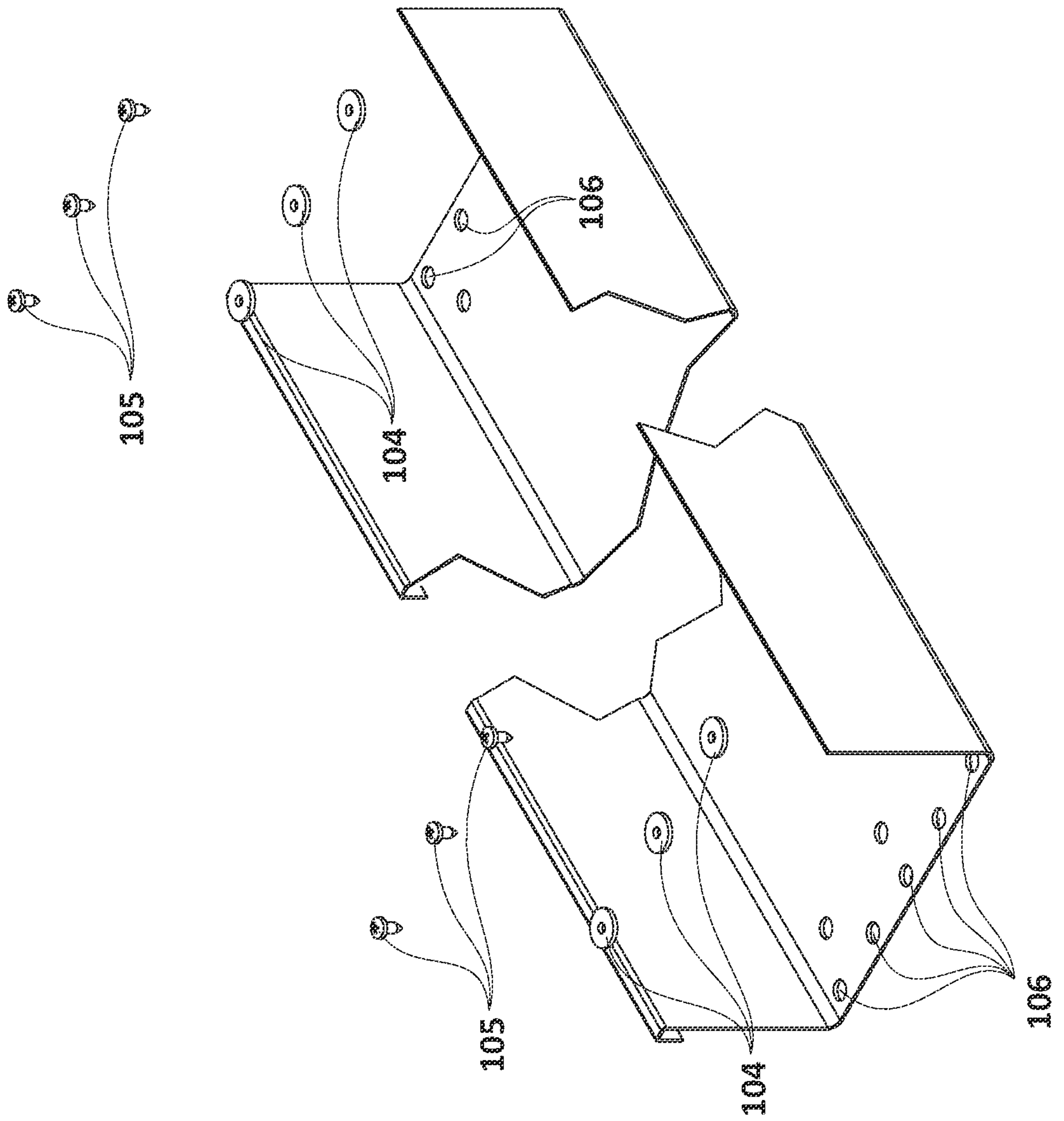
Figure 144:
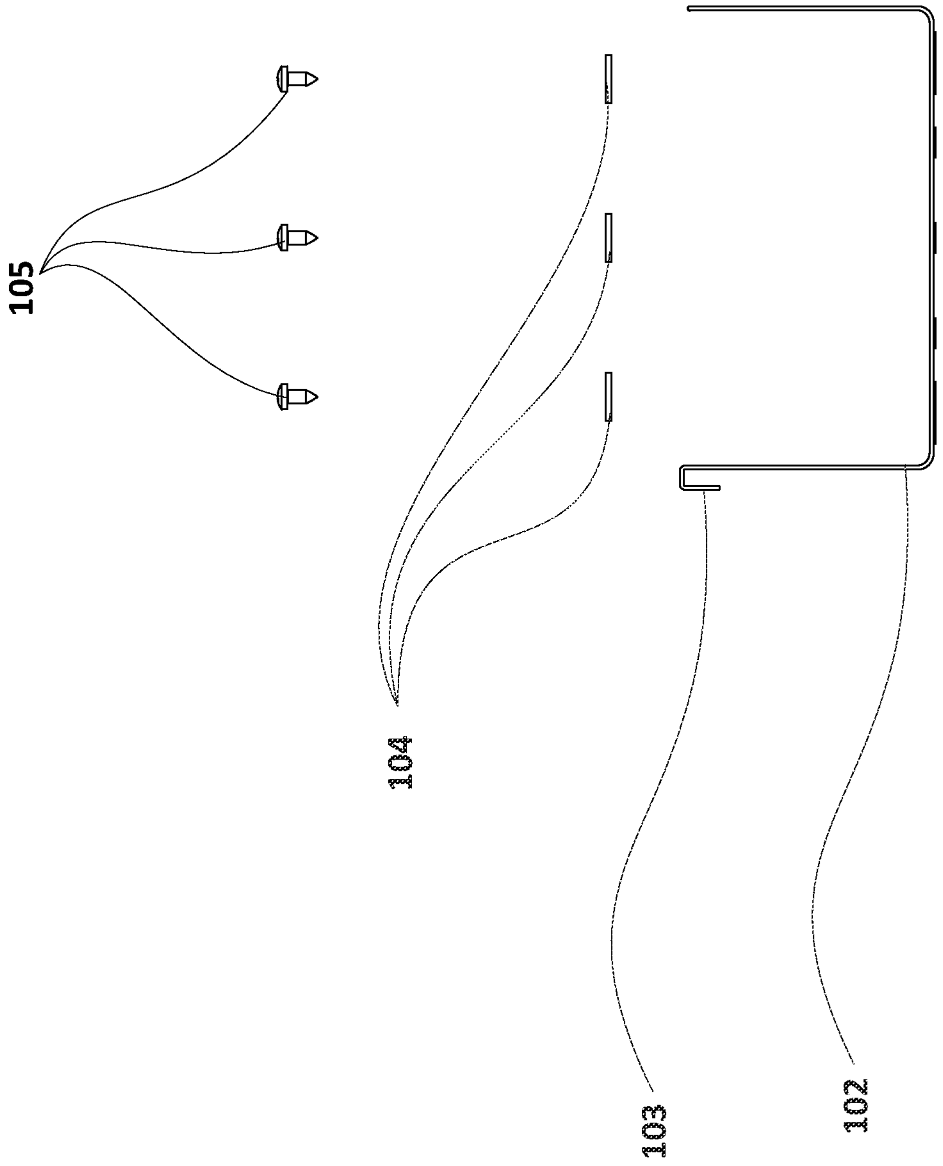
Figure 145:
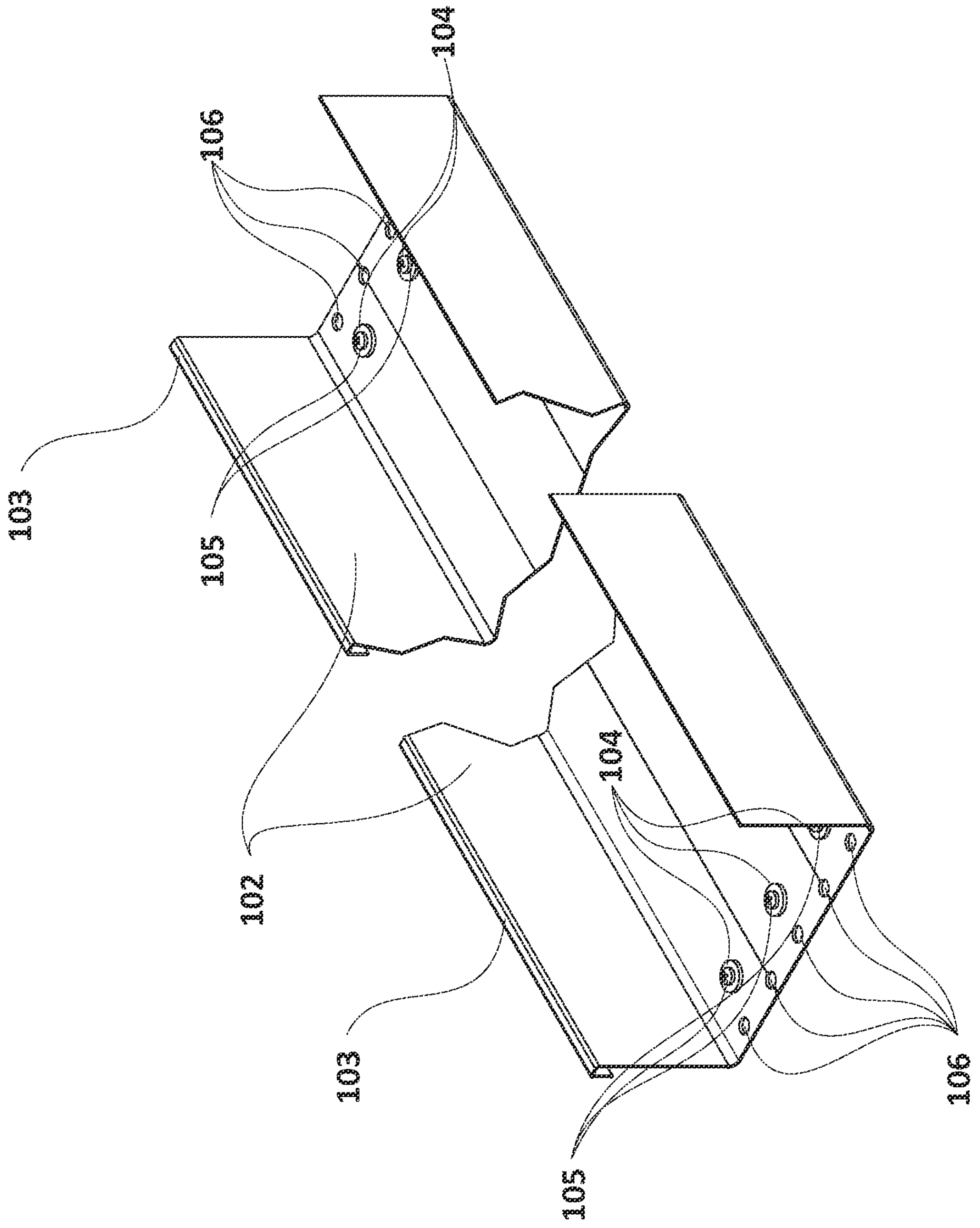
Figure 146:
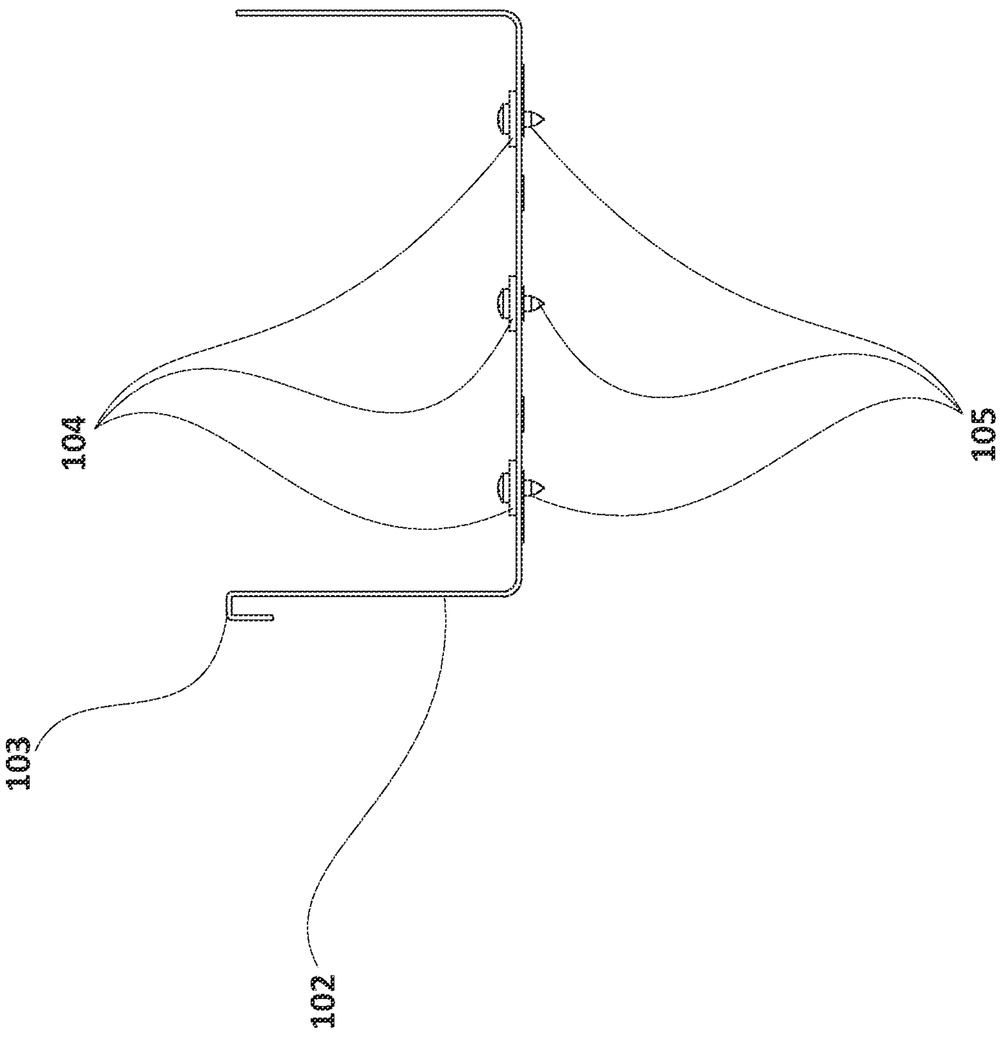
Figure 147:
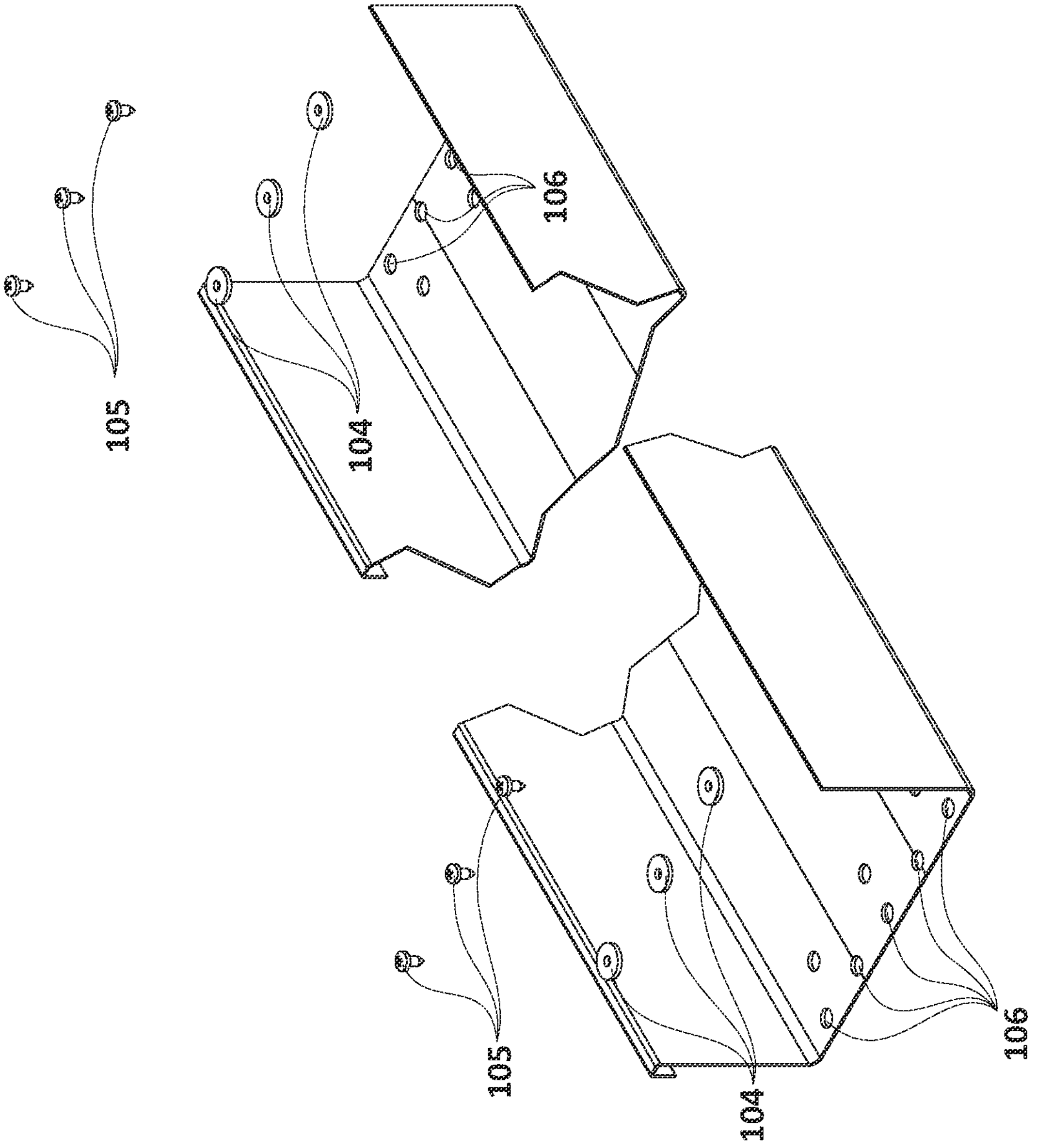
Figure 148:
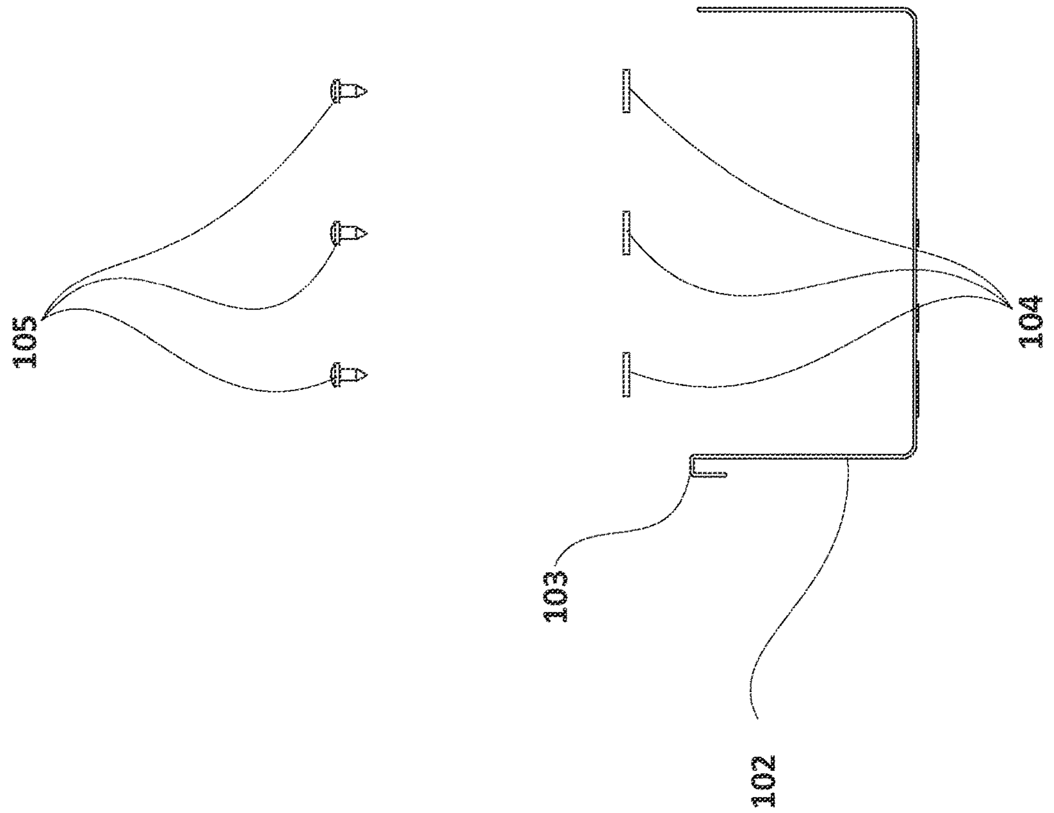
Figure 149:
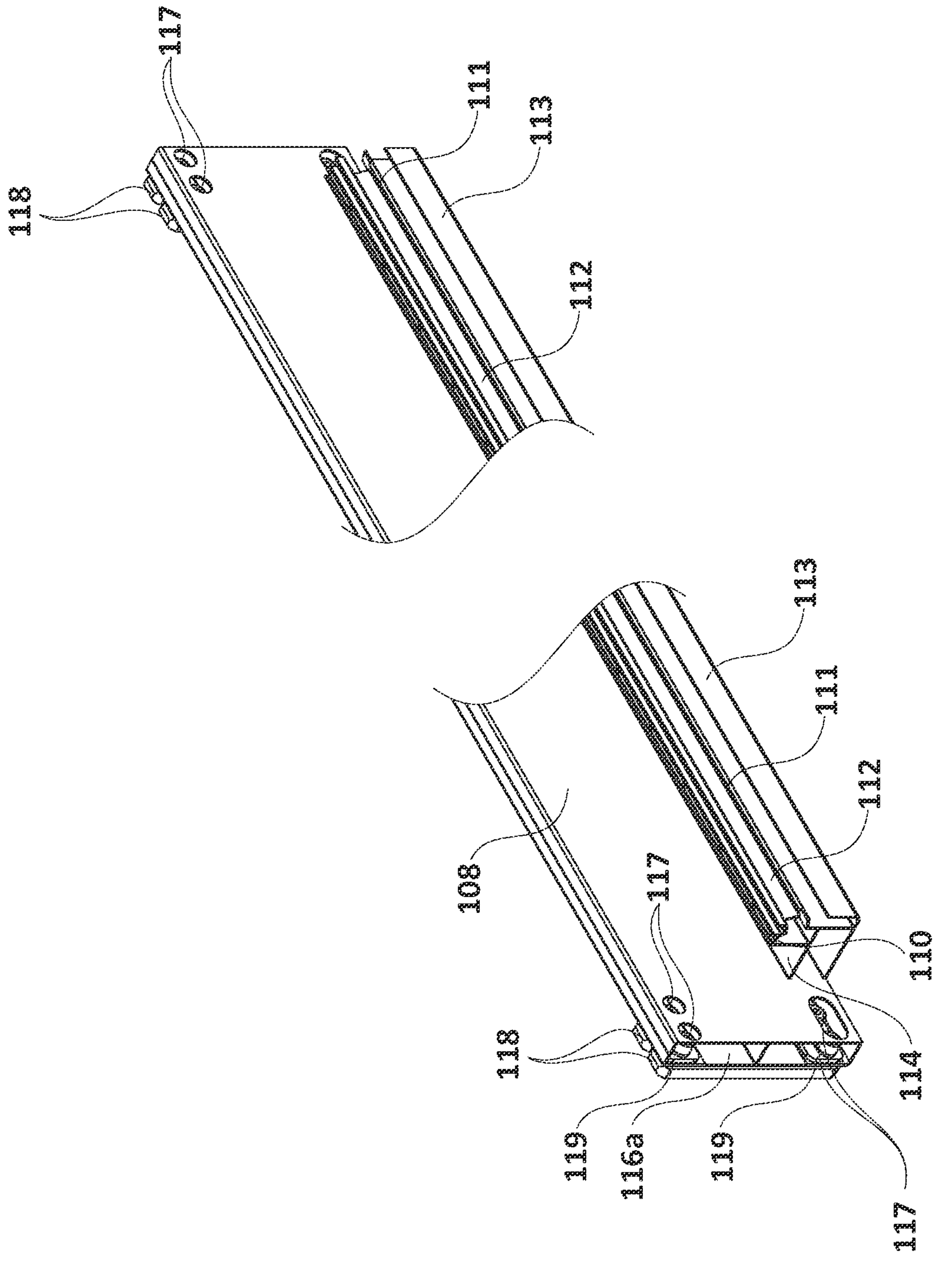
Figure 150:
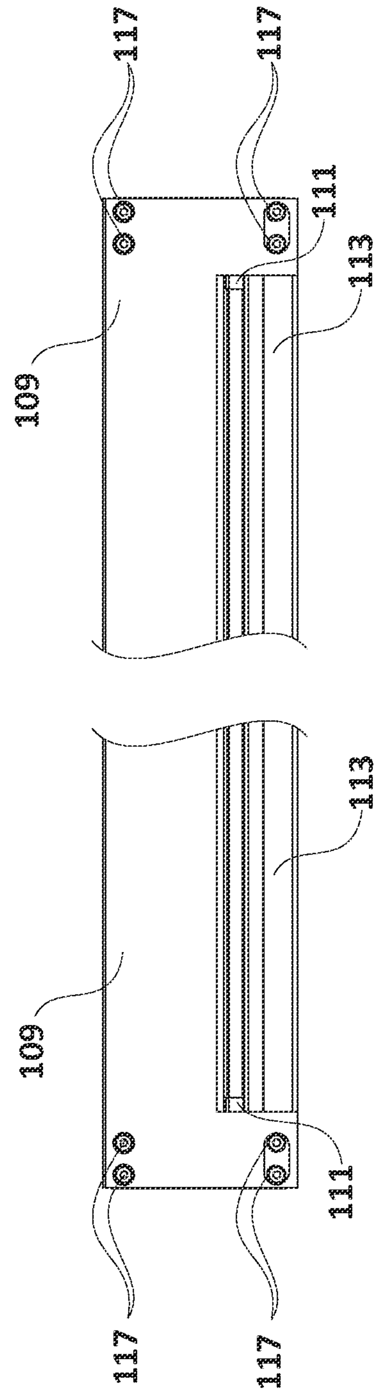
Figure 151:
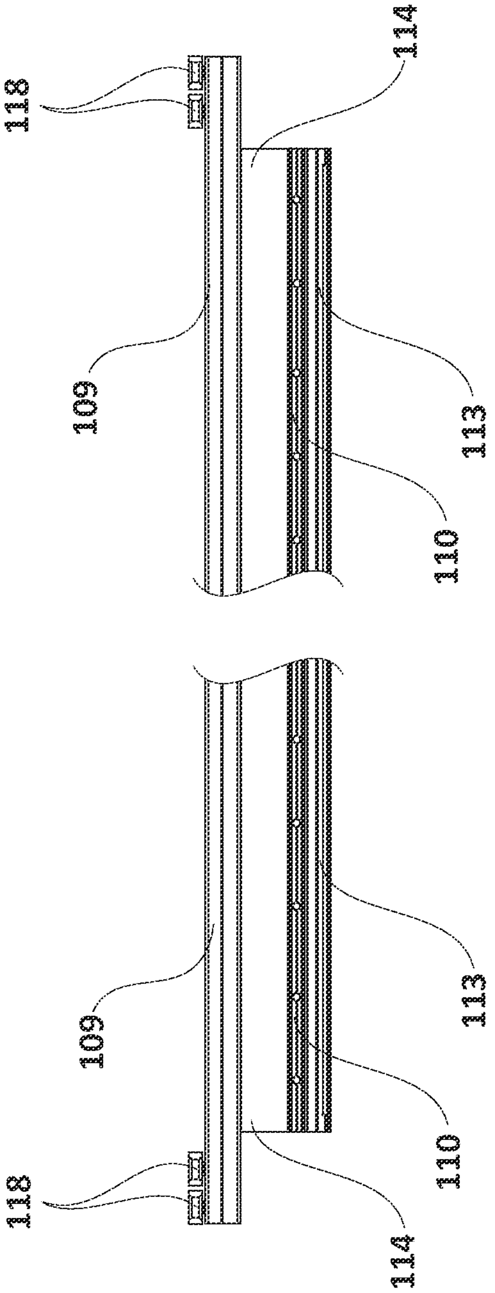
Figure 152:
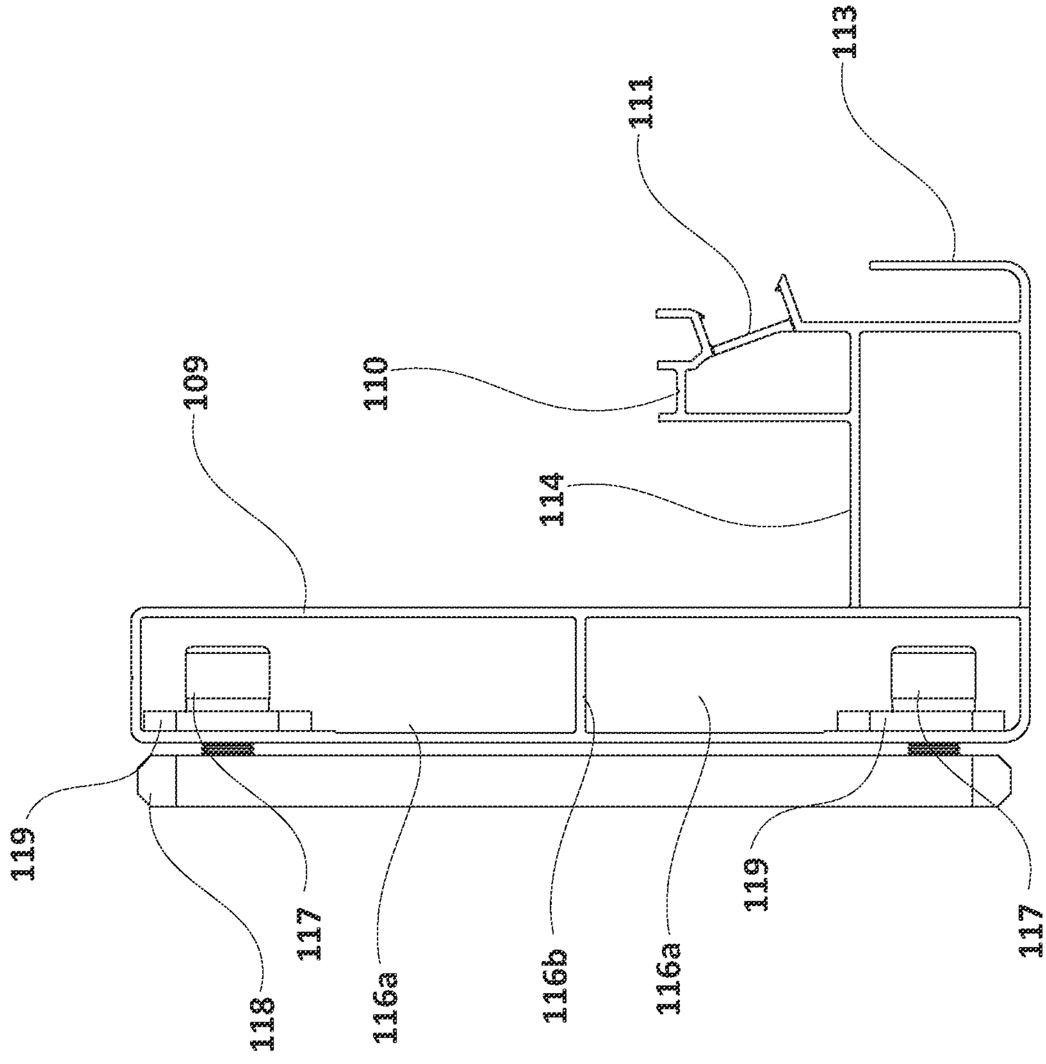
Figure 153:
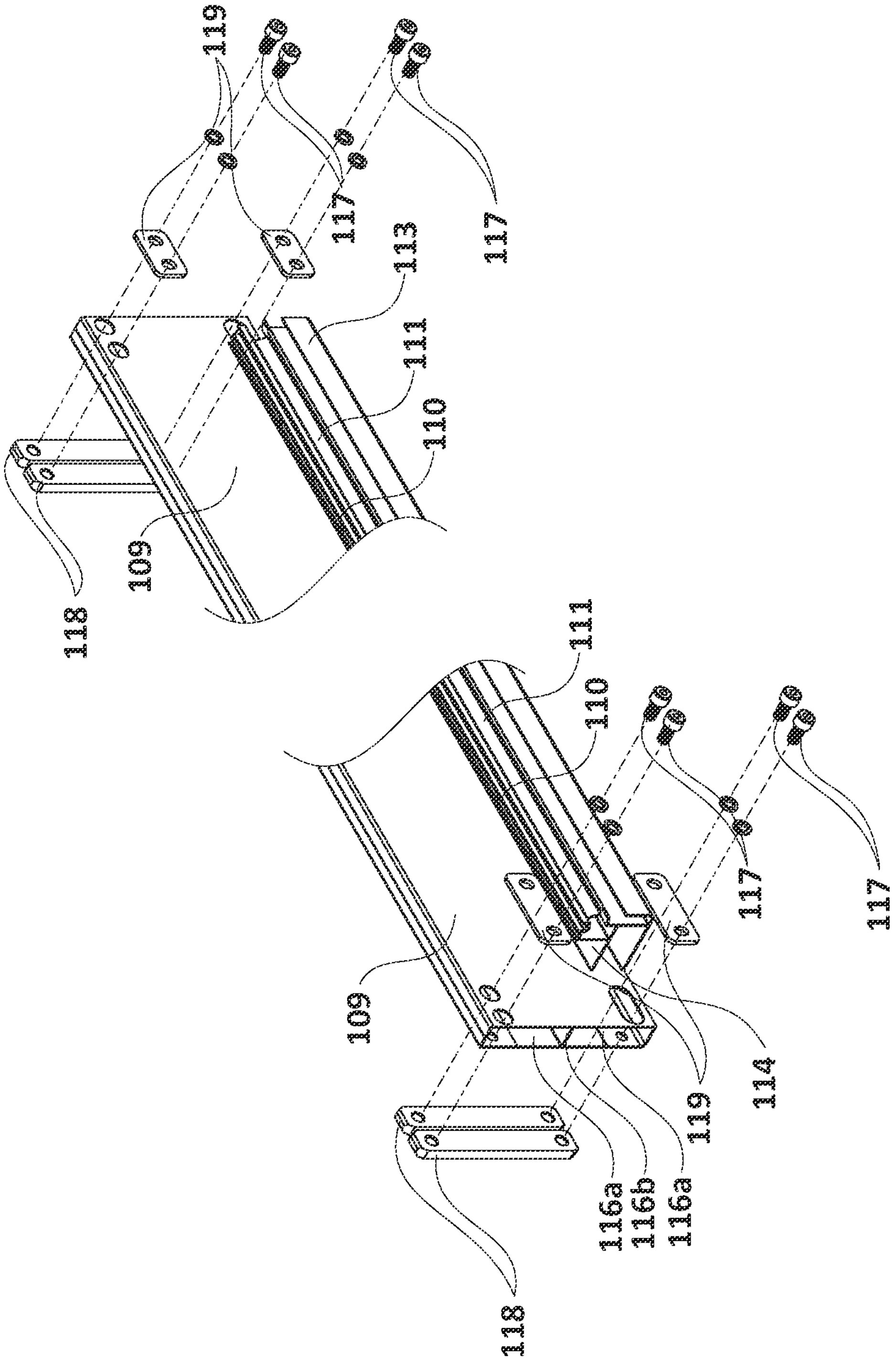
Figure 154:
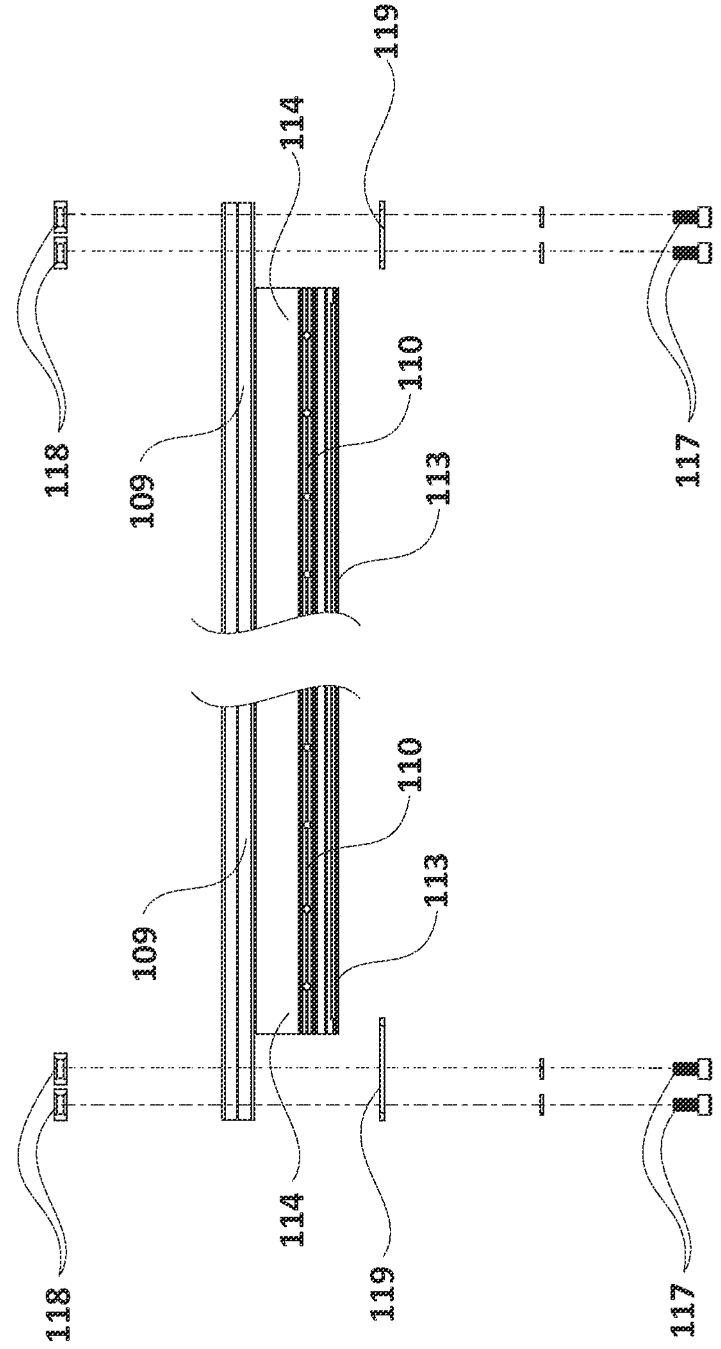
Figure 155:
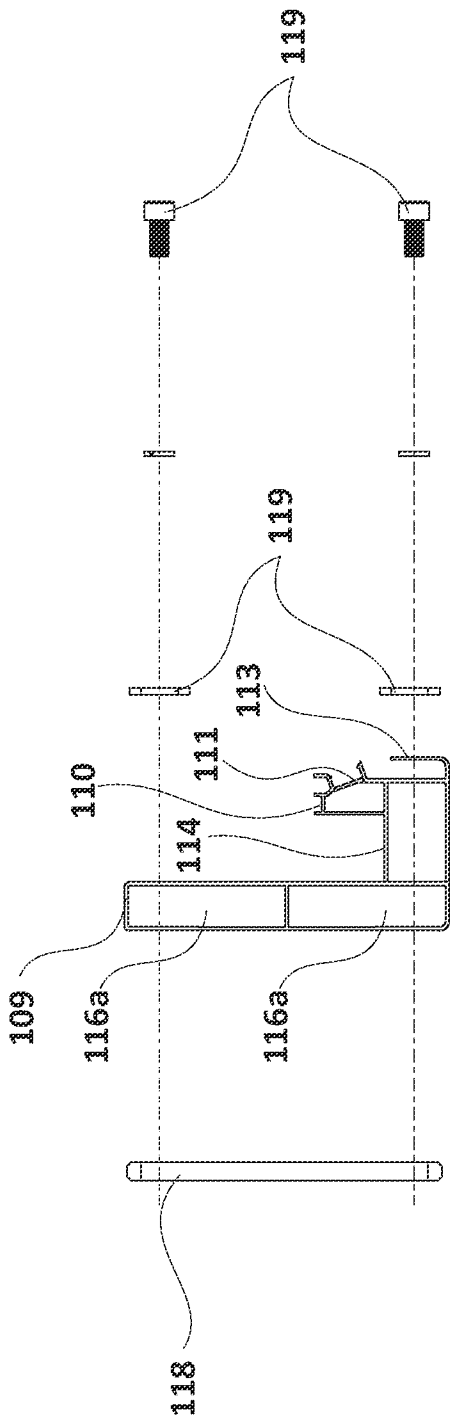
Figure 156:
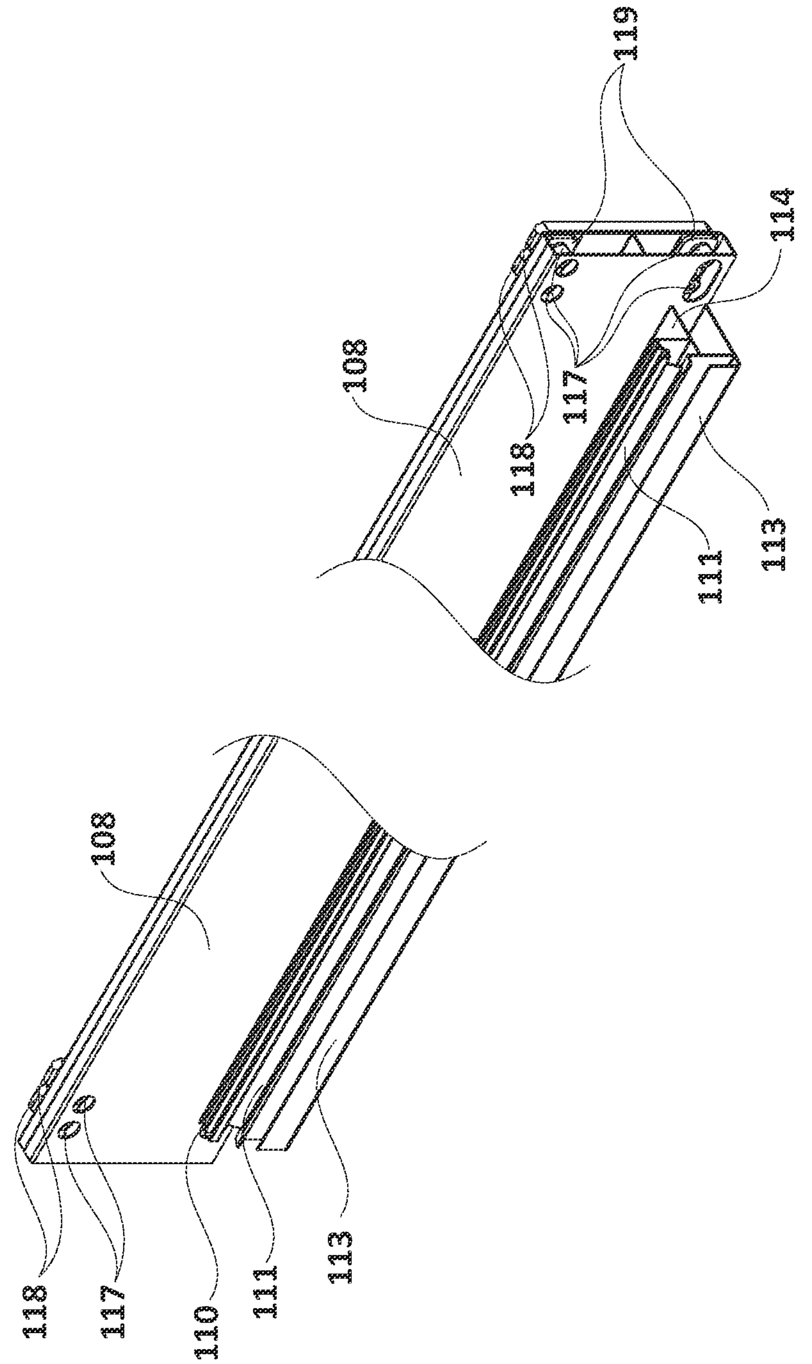
Figure 157:
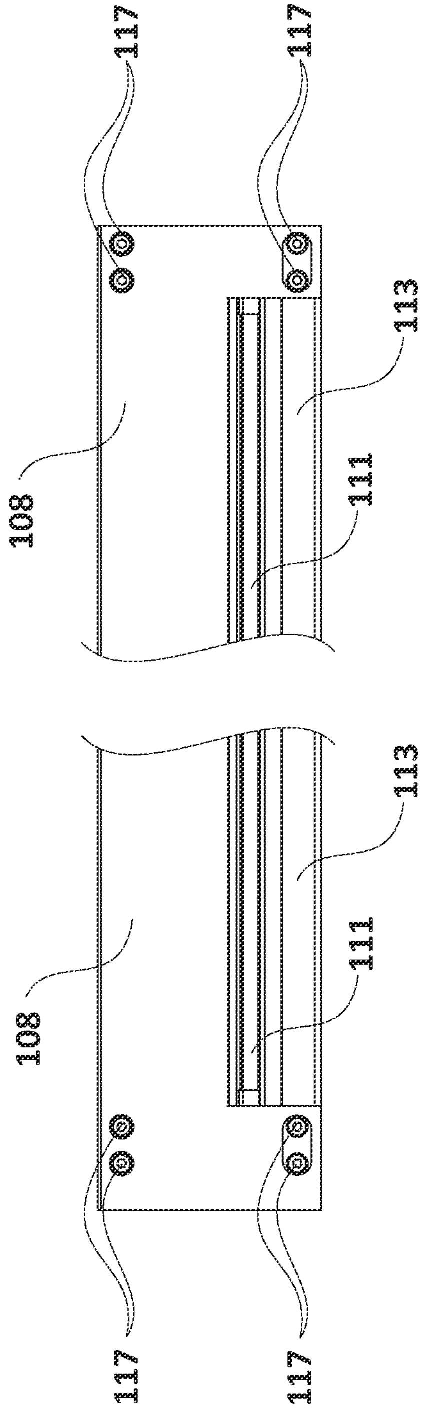
Figure 158:
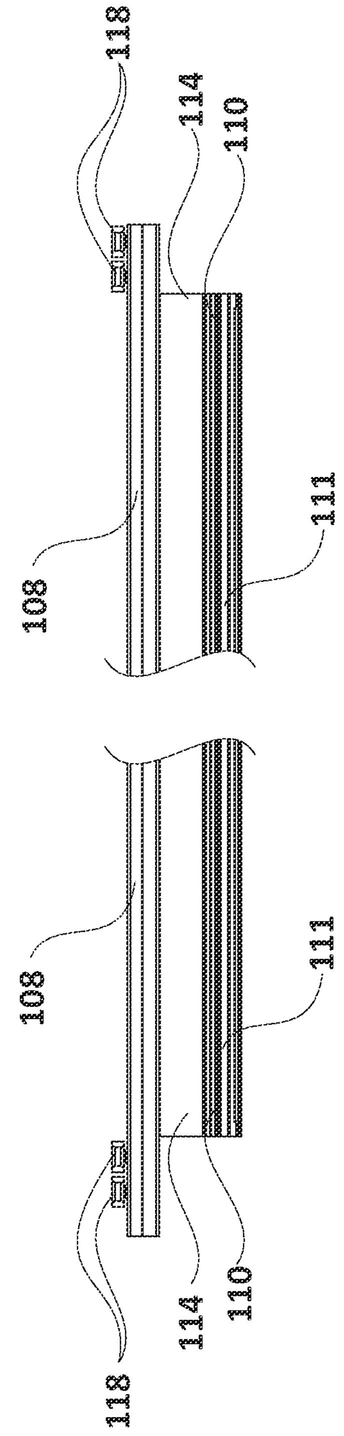
Figure 159:
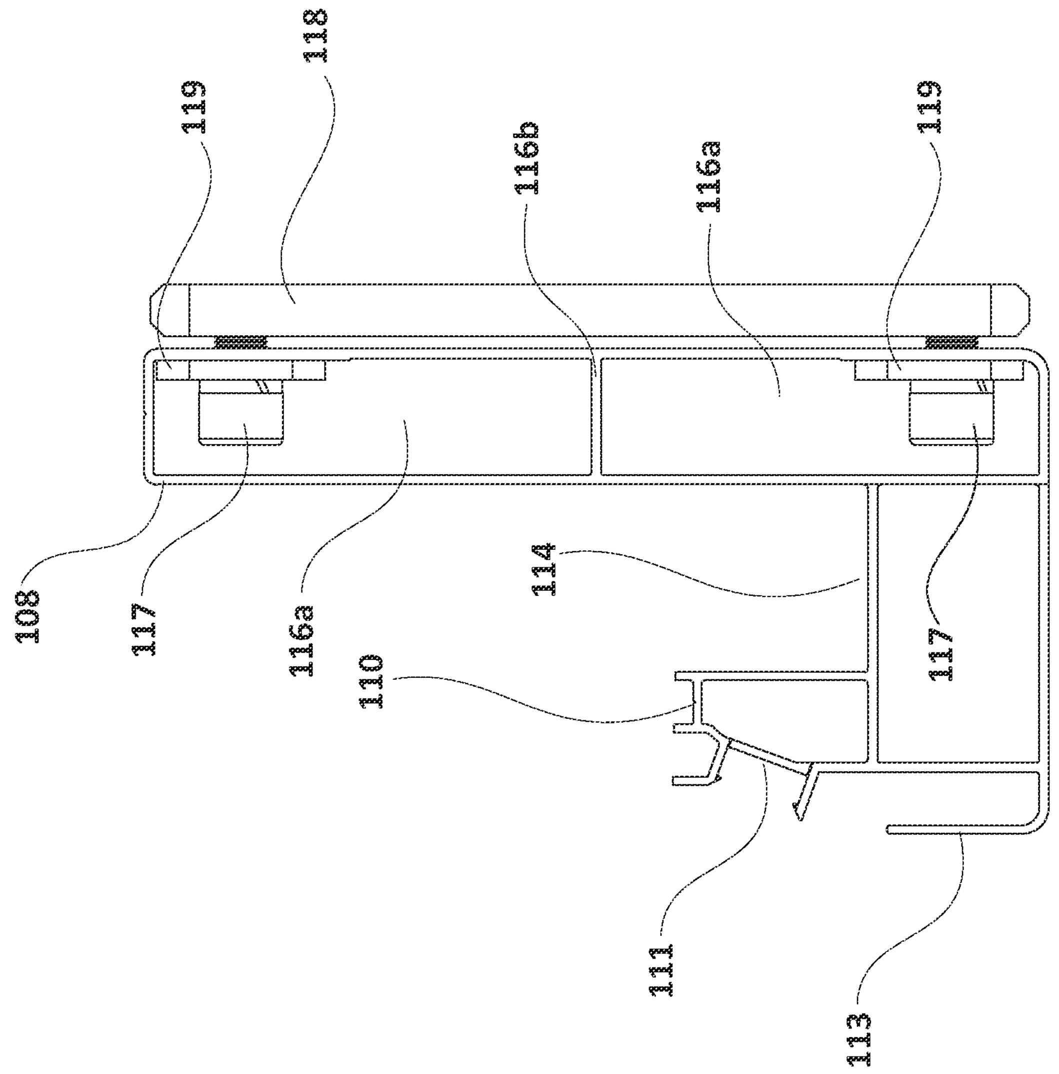
Figure 160:
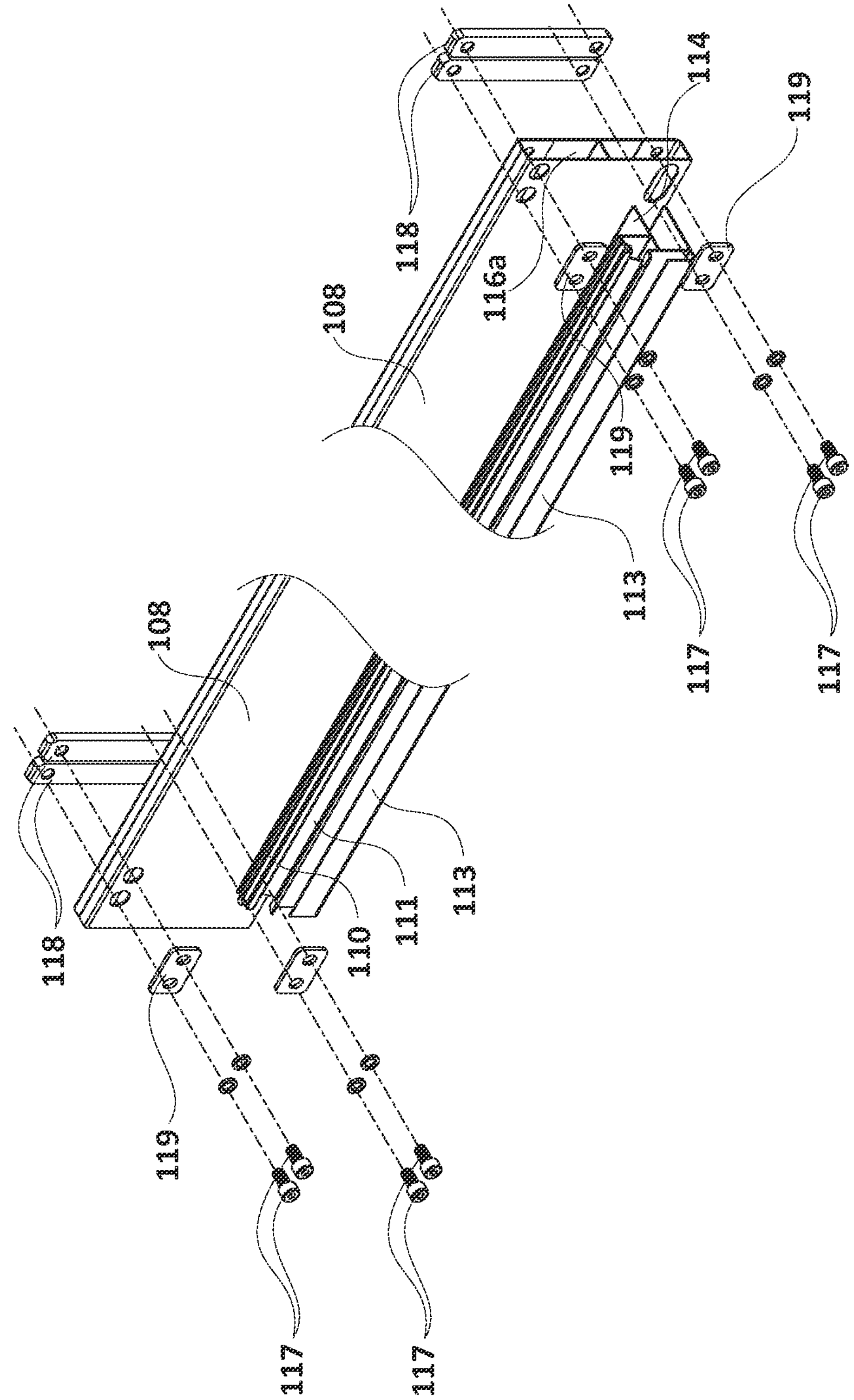
Figure 161:
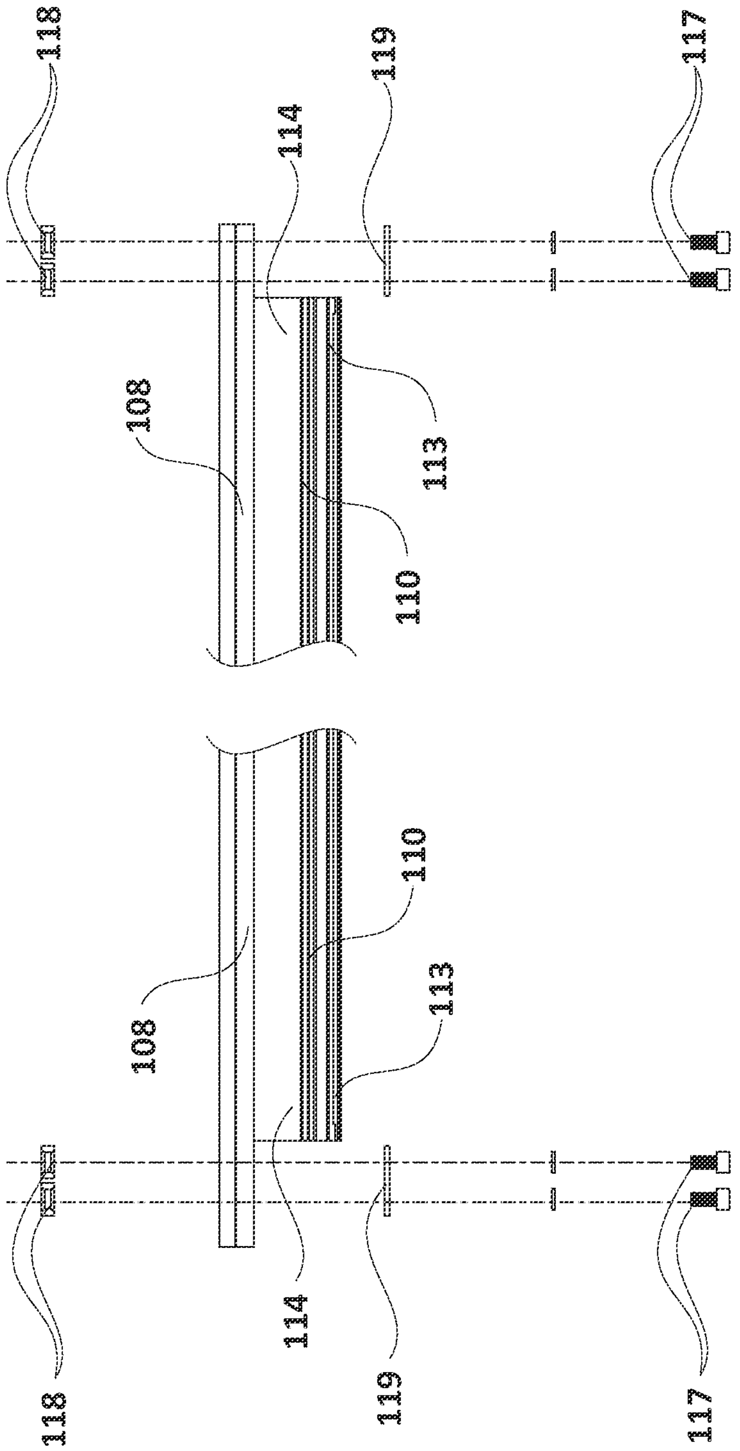
Figure 162:
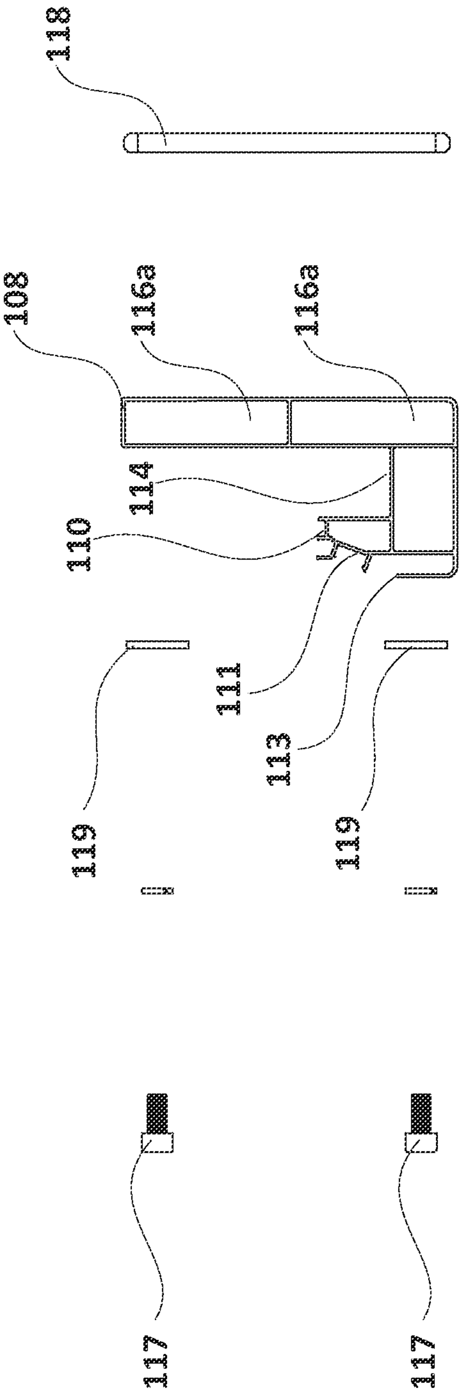
Figure 163:
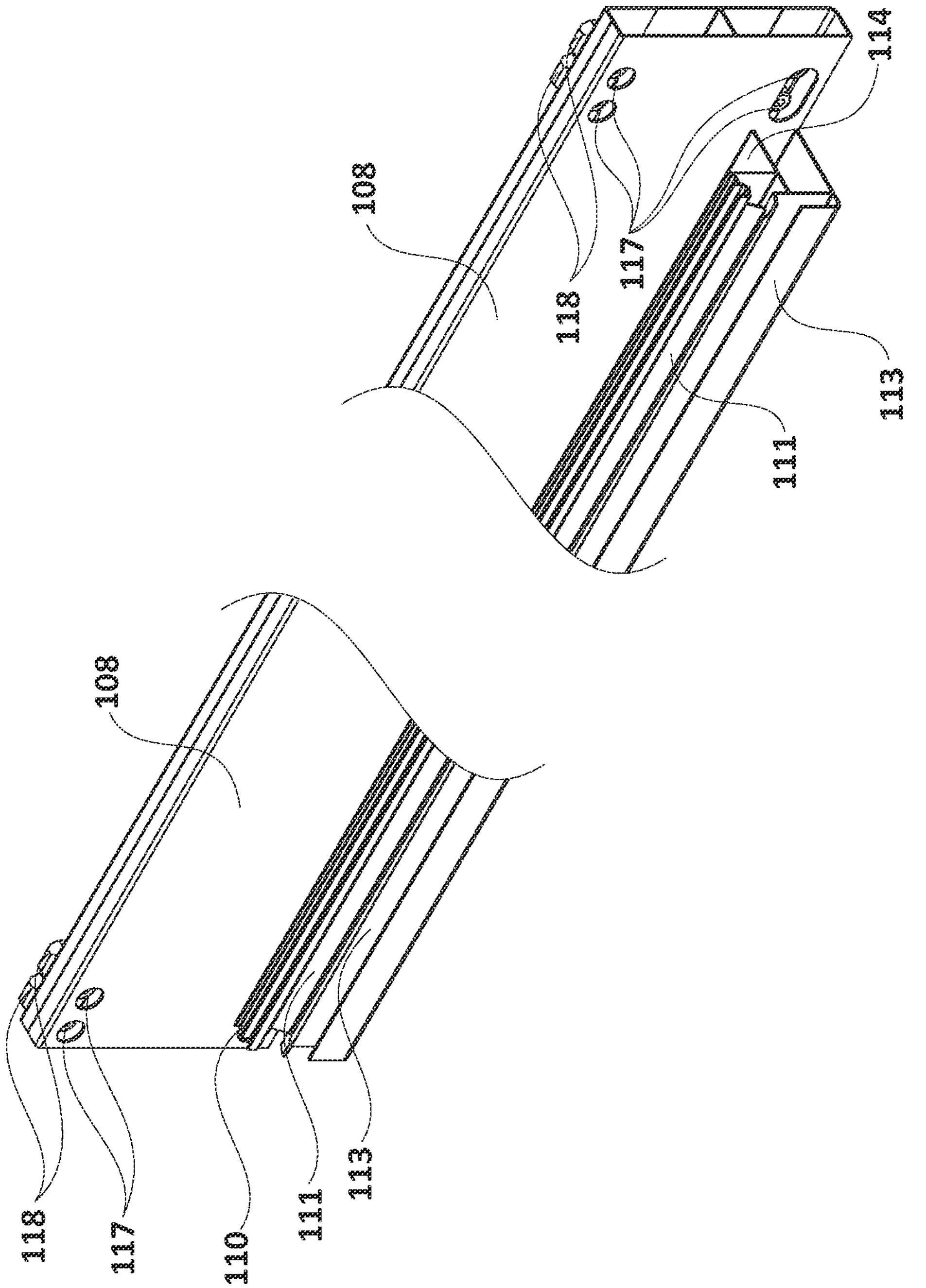
Figure 164:
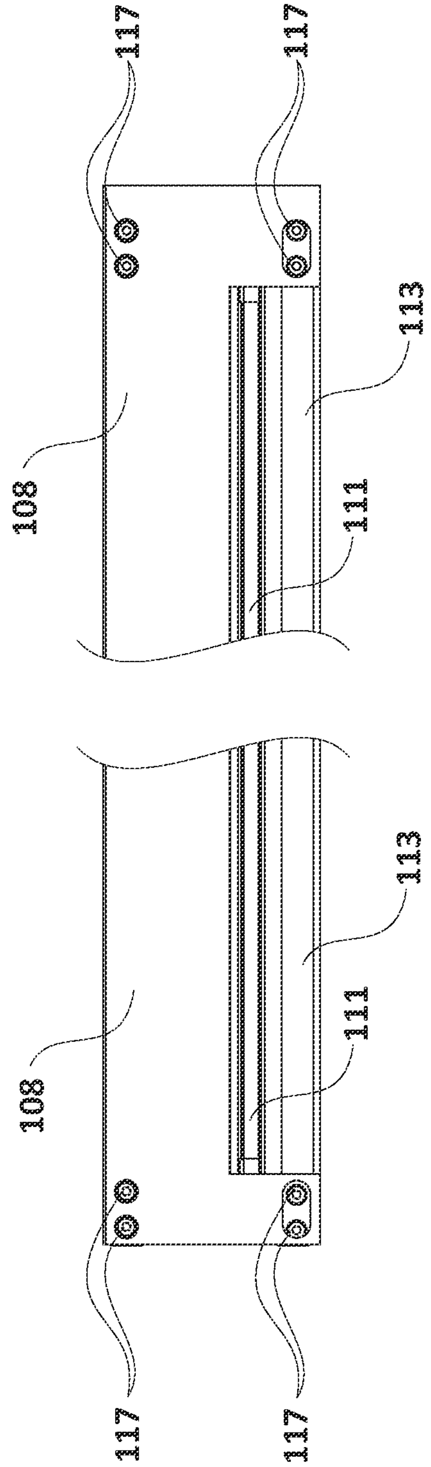
Figure 165:
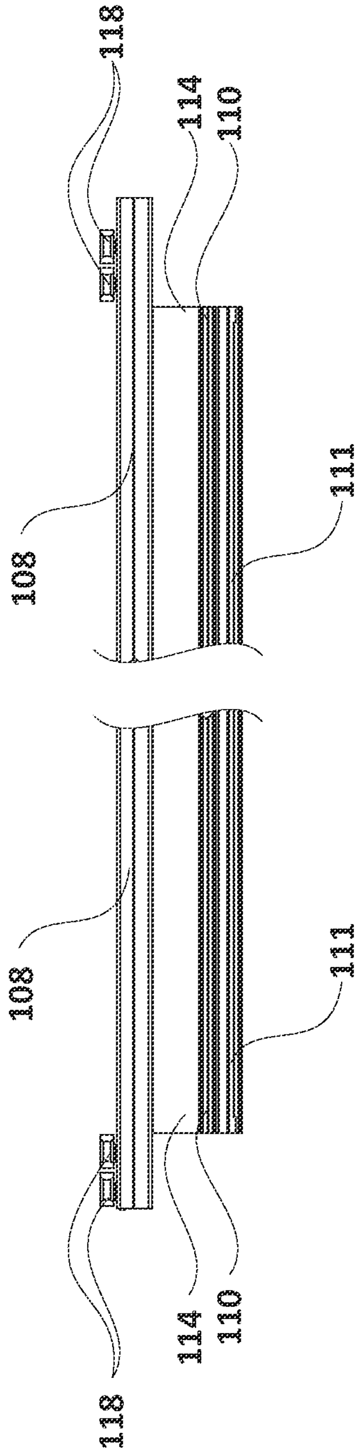
Figure 166:
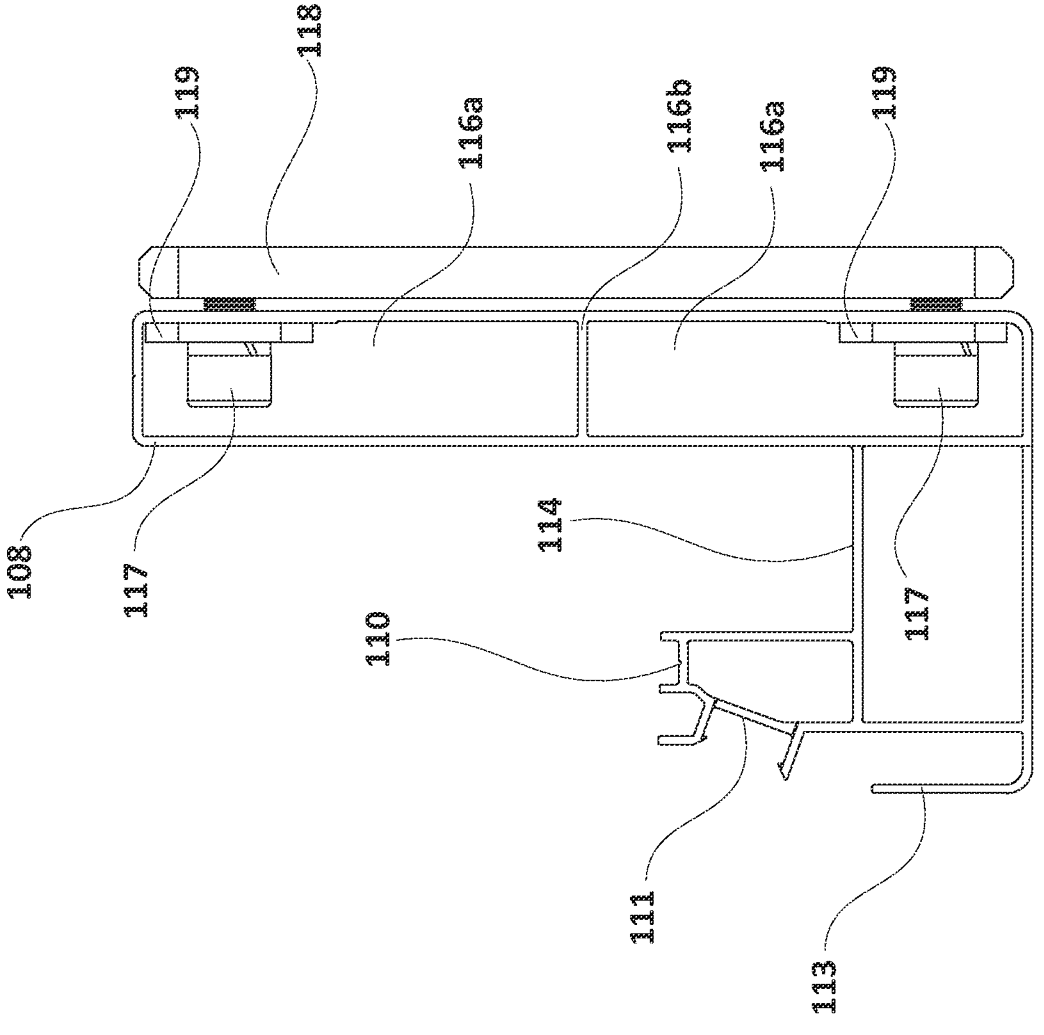
Figure 167:
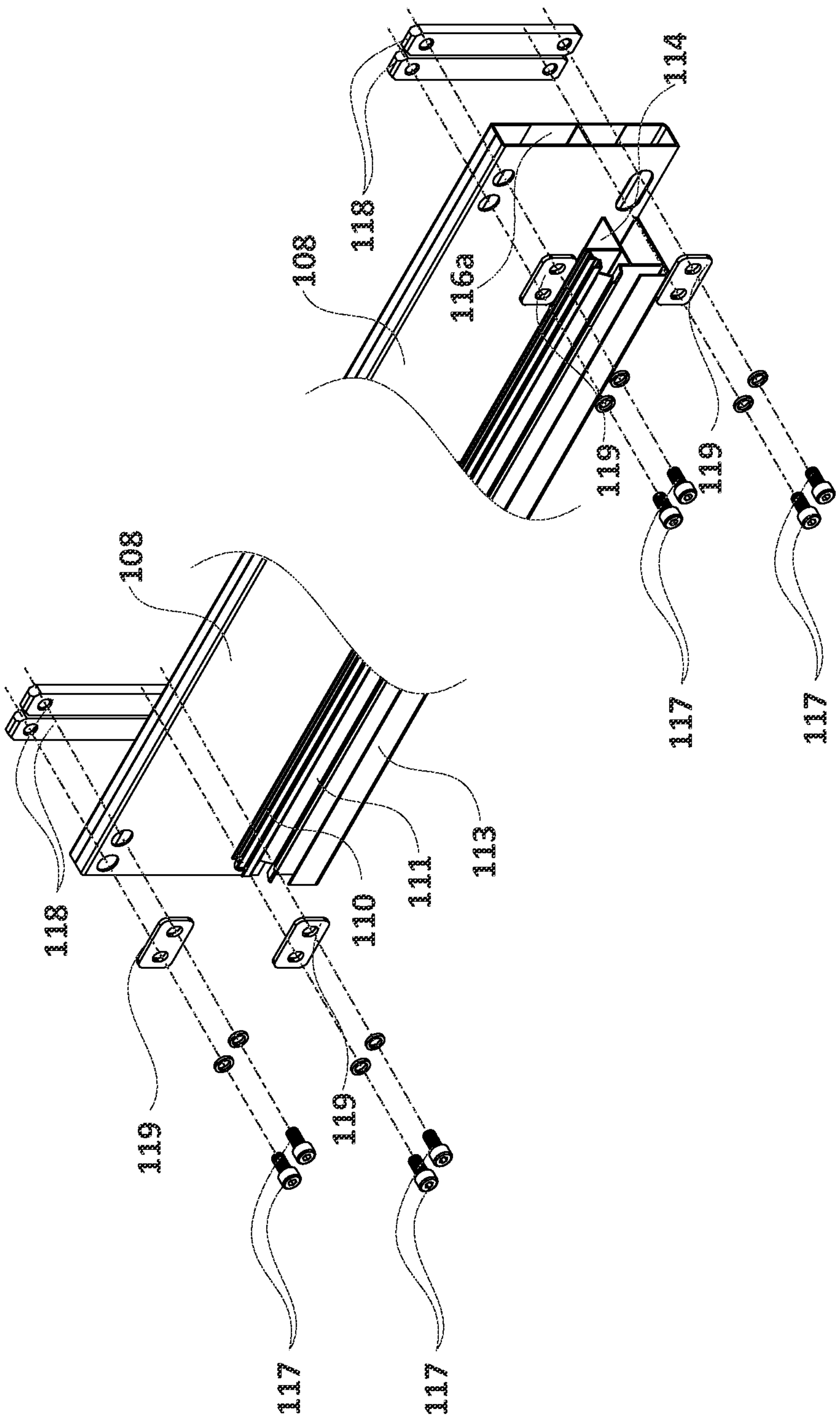
Figure 168:
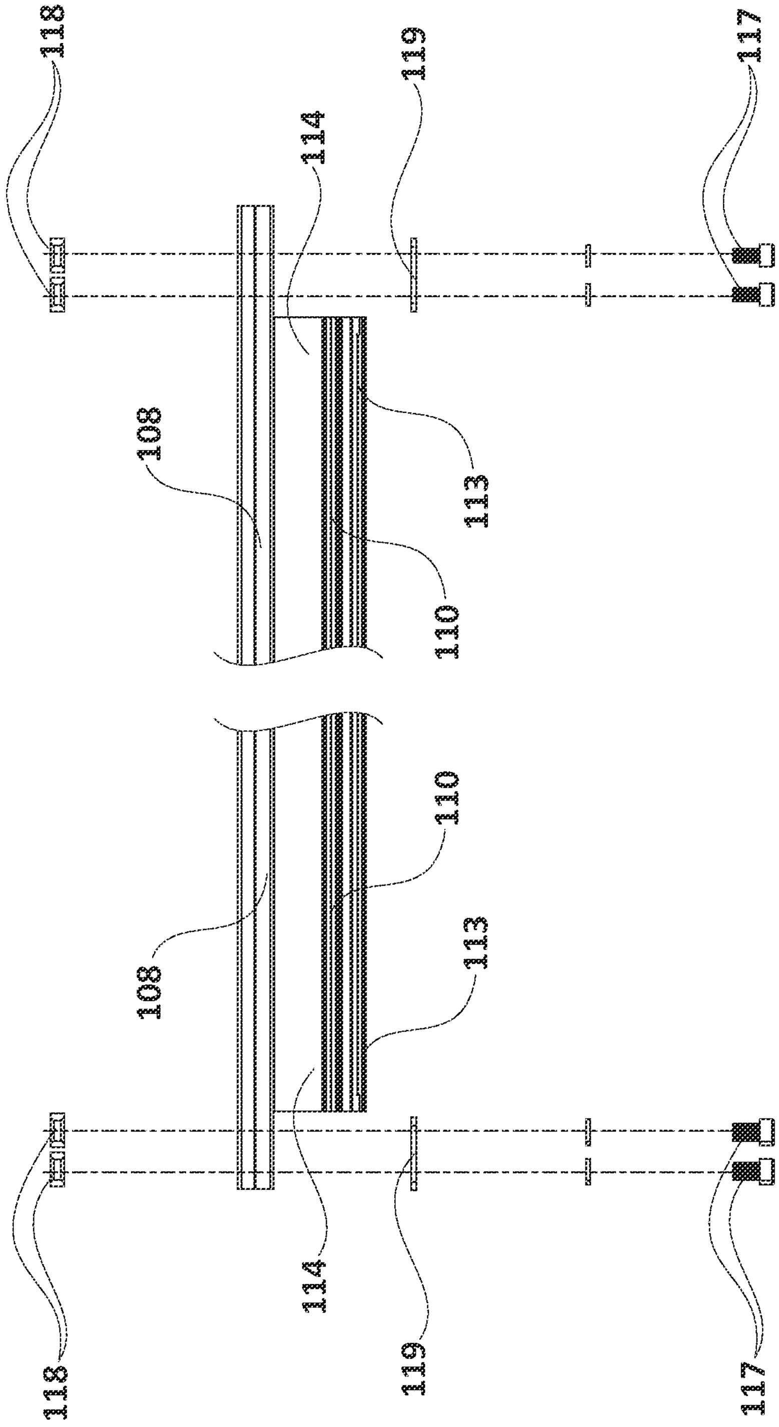
Figure 169:
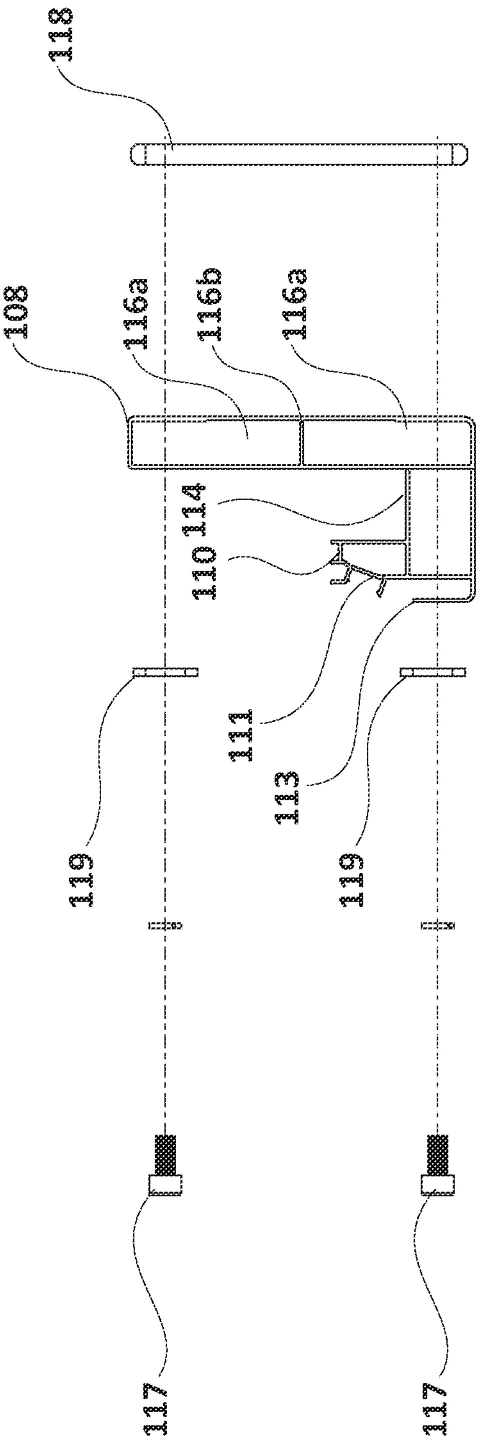
Figure 170:
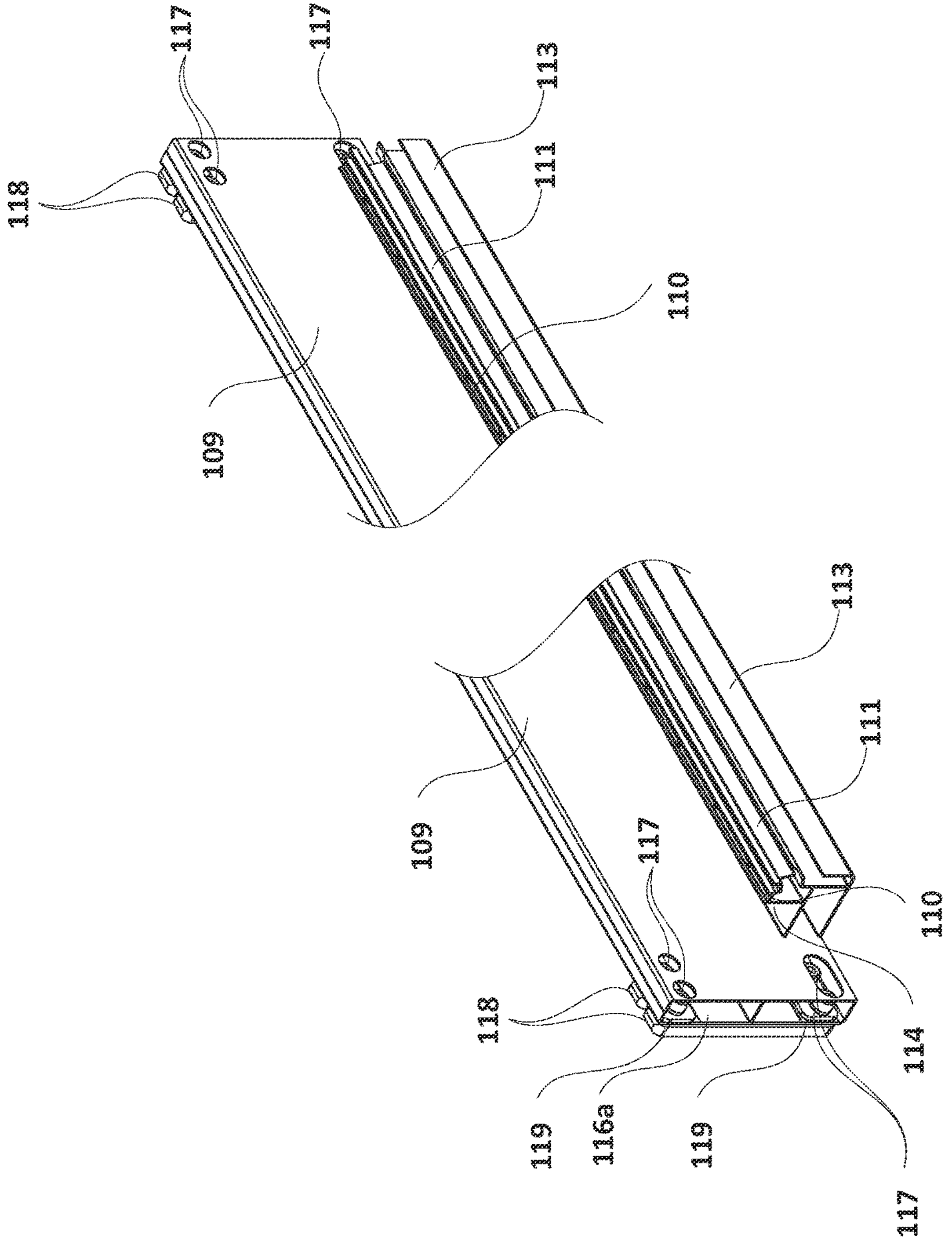
Figure 171:
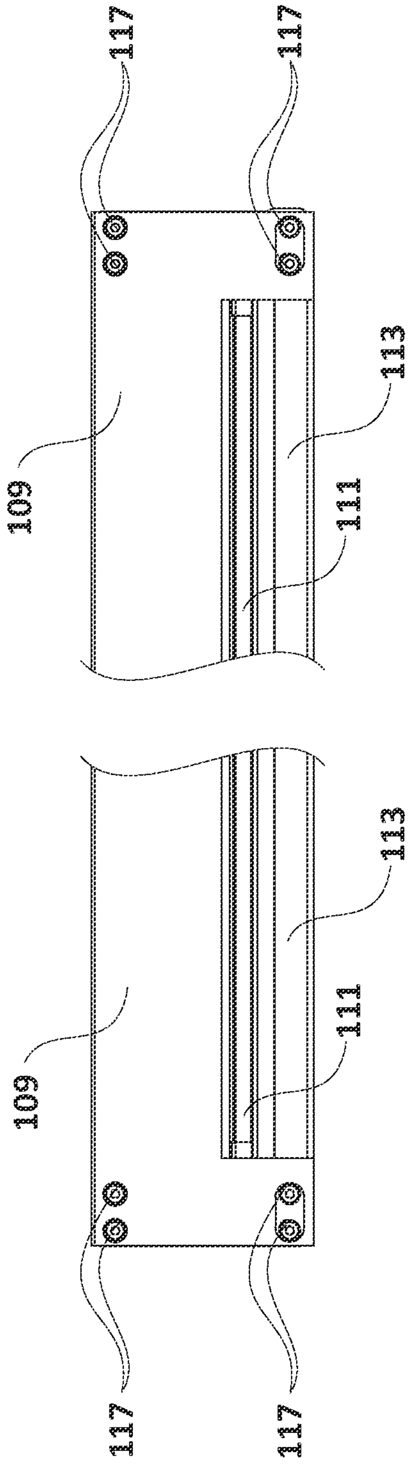
Figure 172:
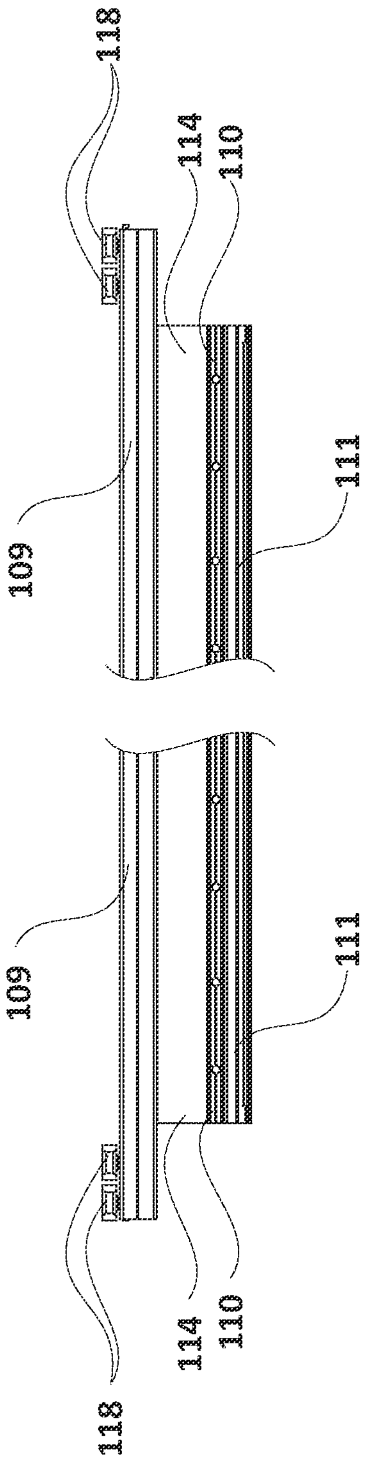
Figure 173:
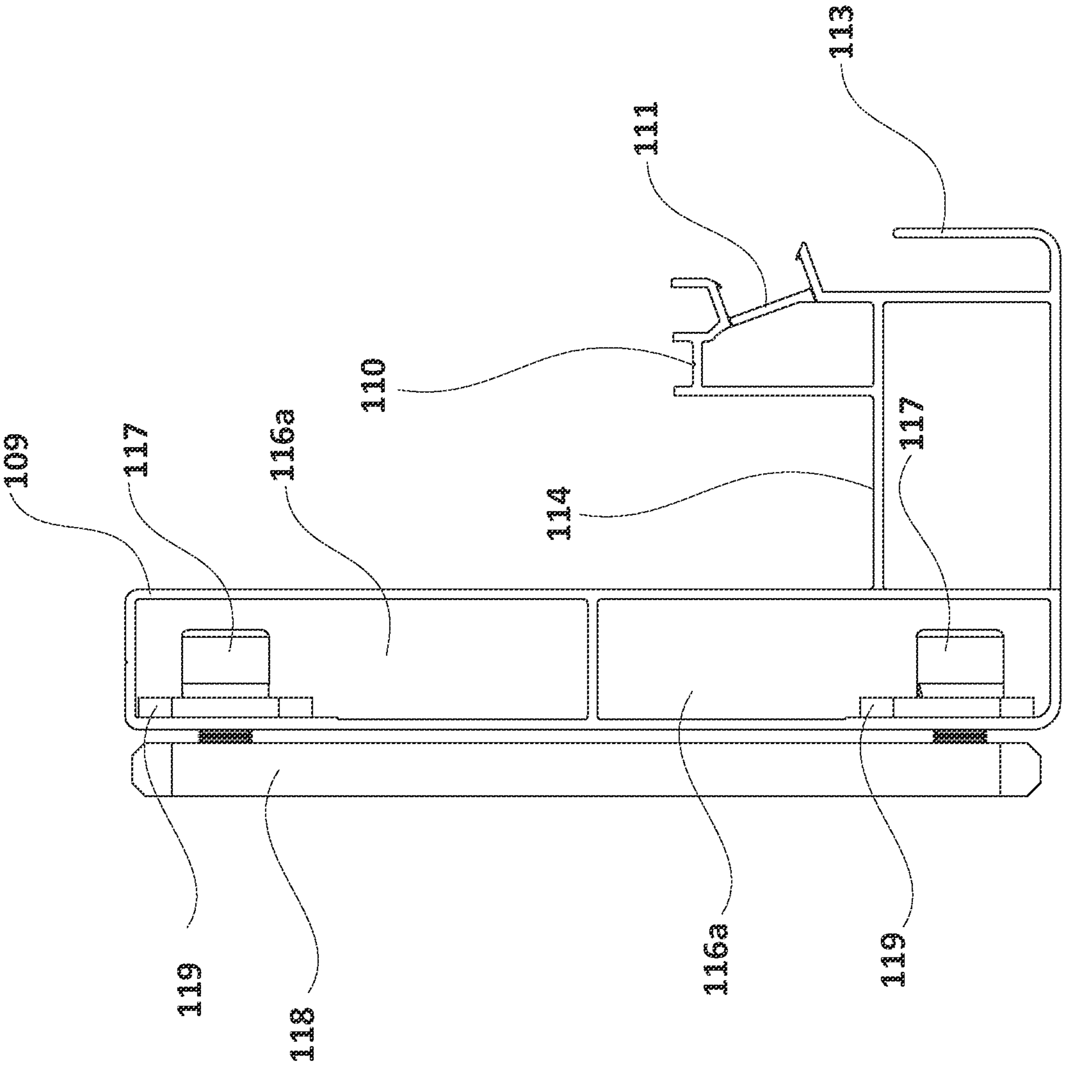
Figure 174:
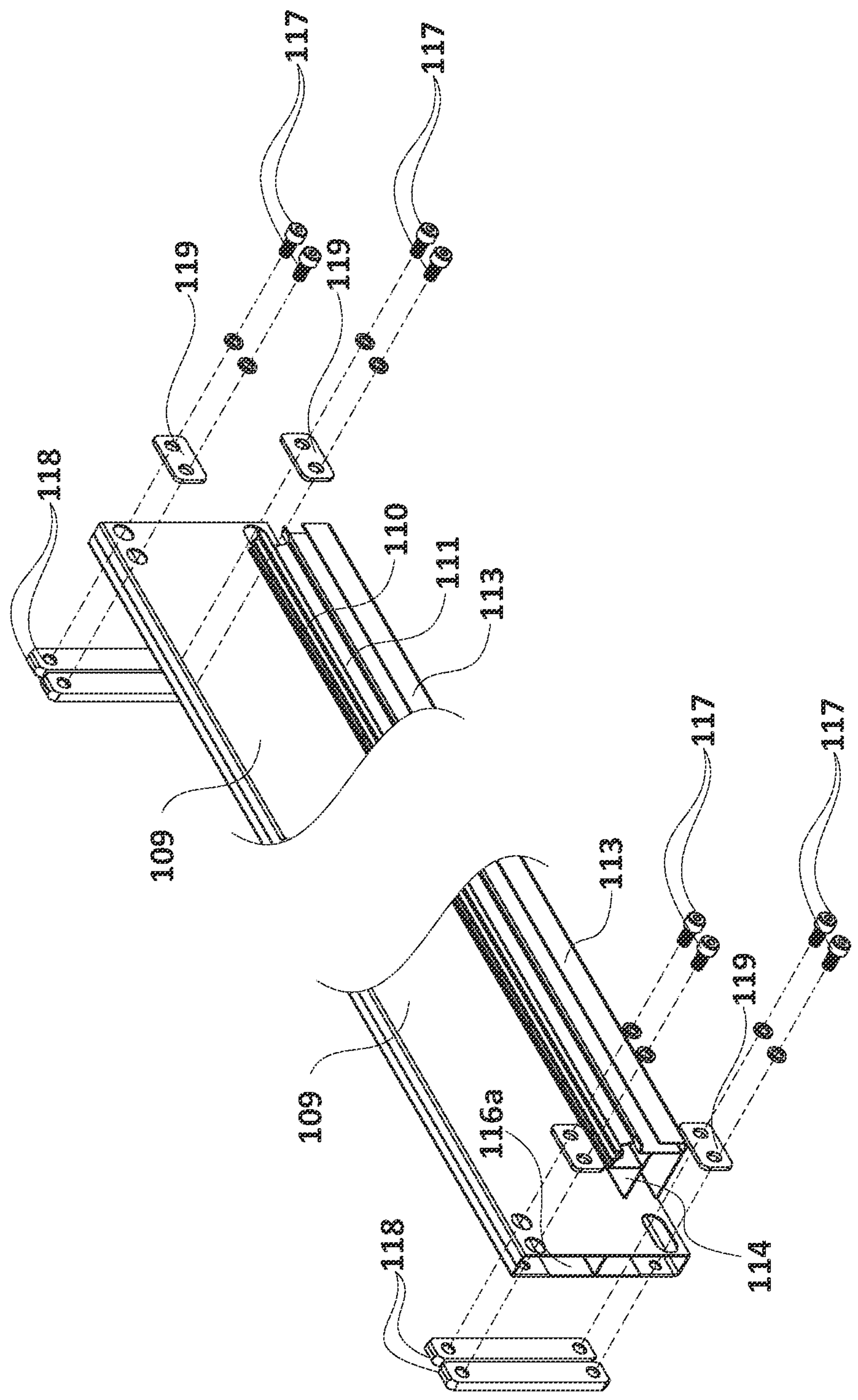
Figure 175:
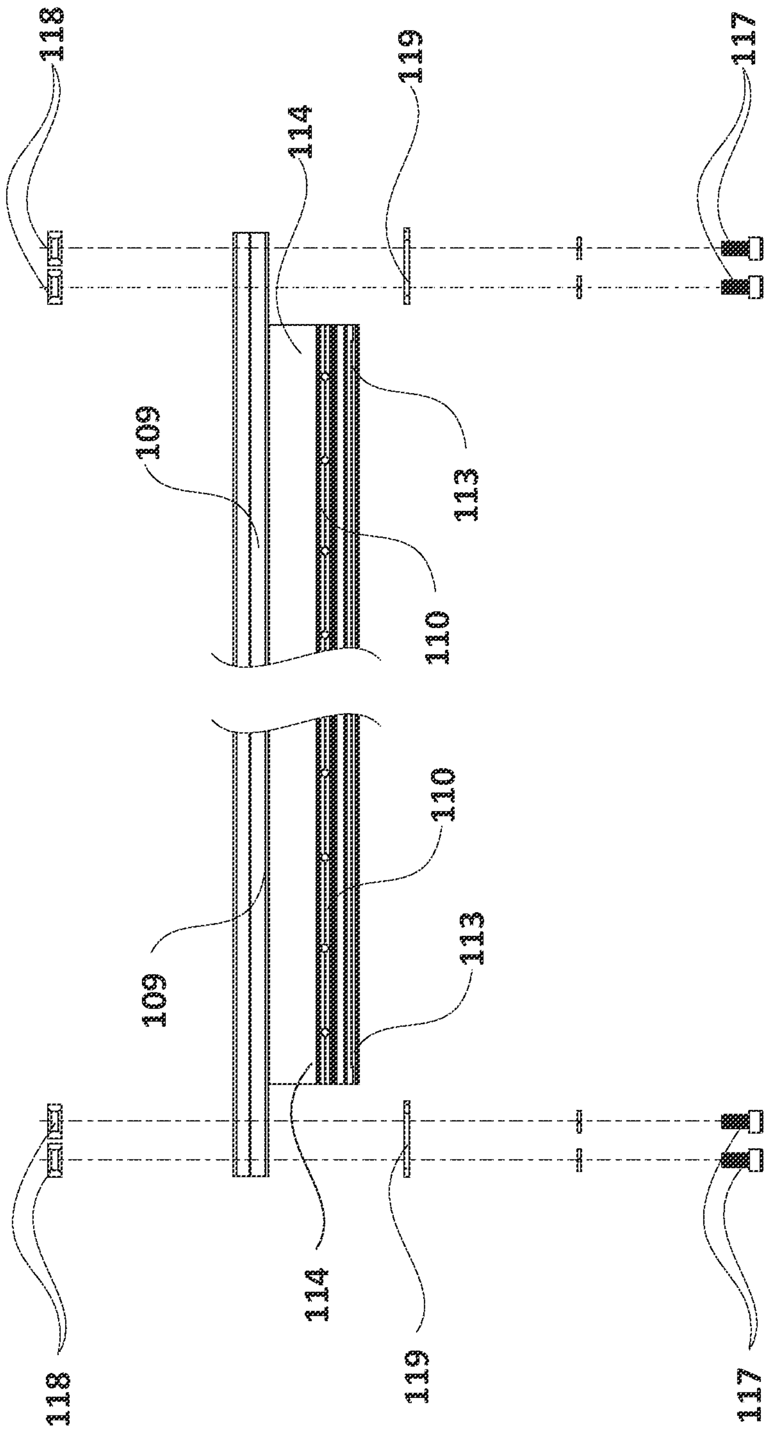
Figure 176:
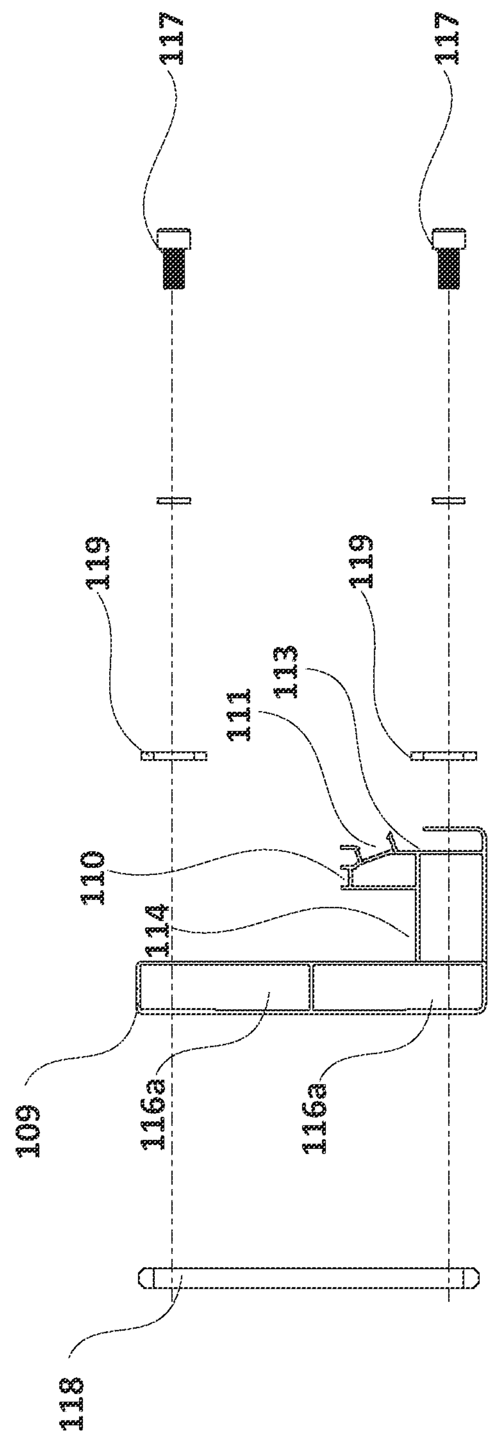
Figure 177:
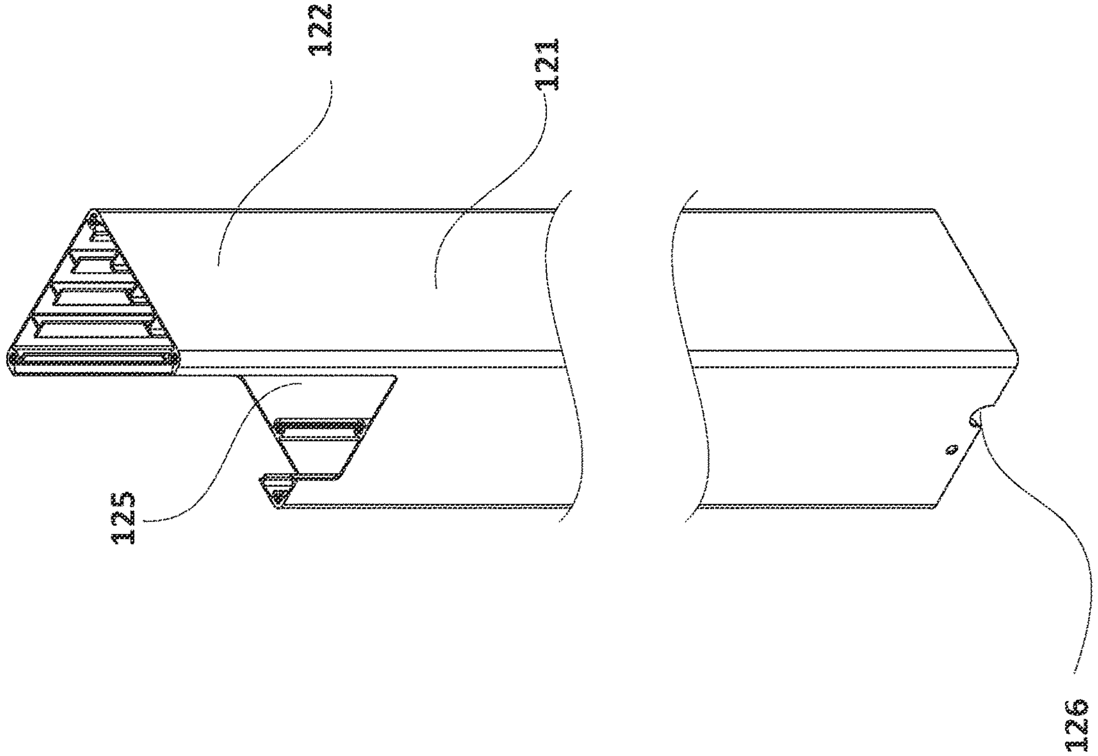
Figure 178:
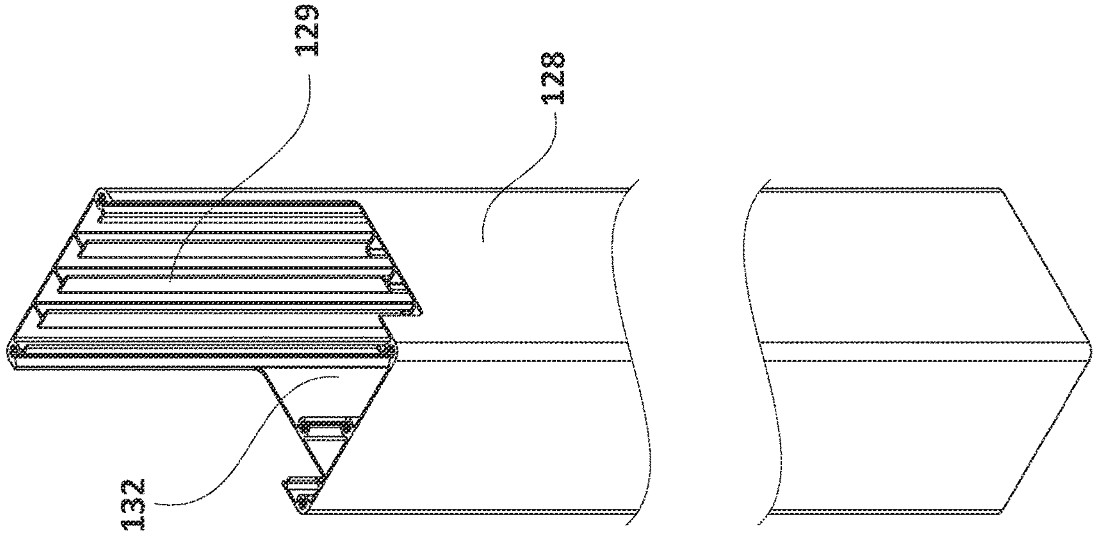
Figure 179:
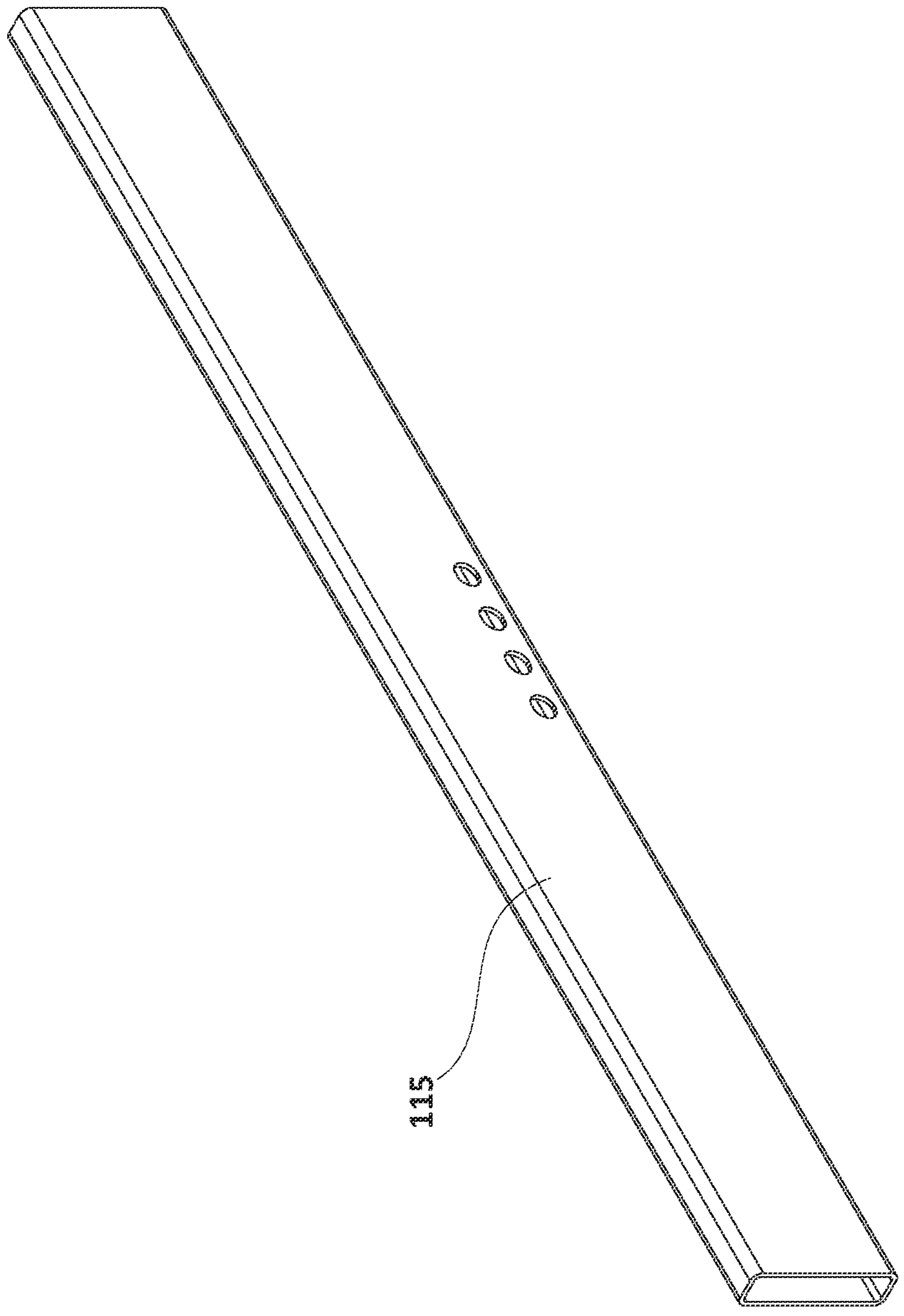
Figure 180:
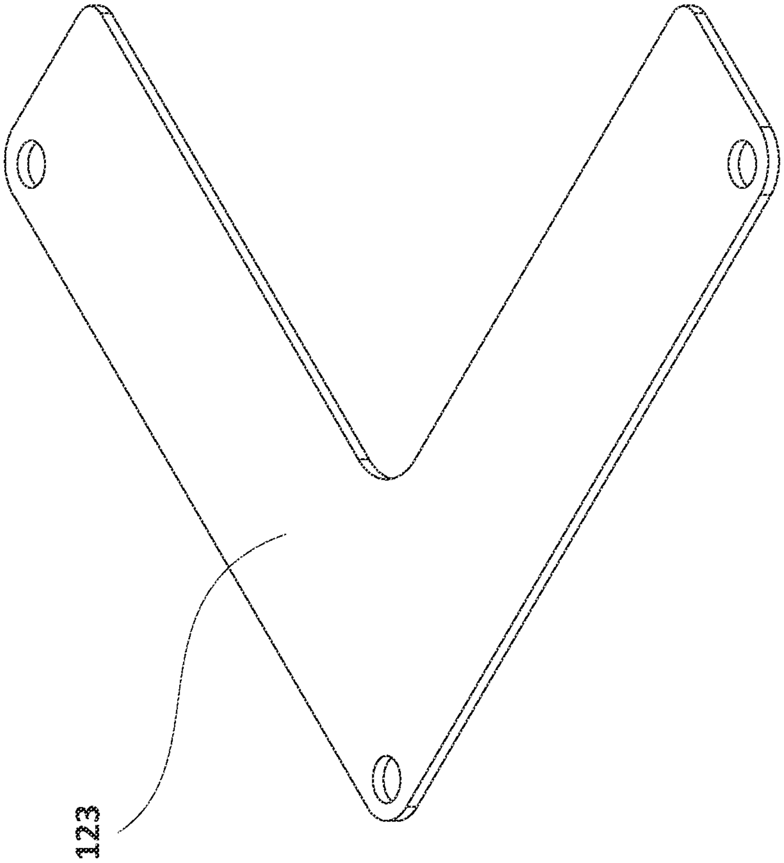
Figure 181:
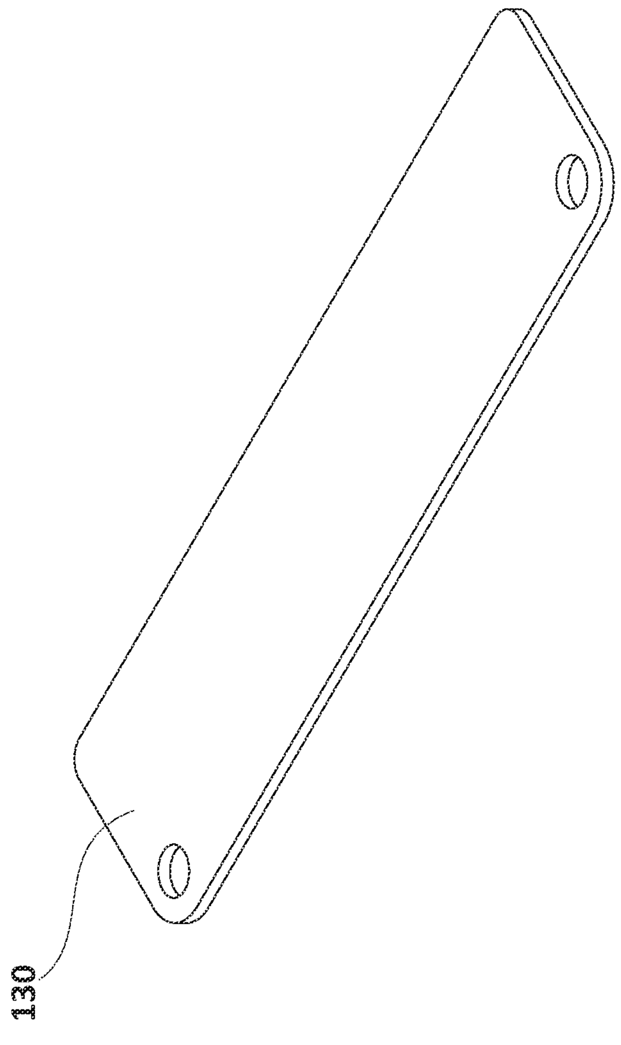
Figure 182A:
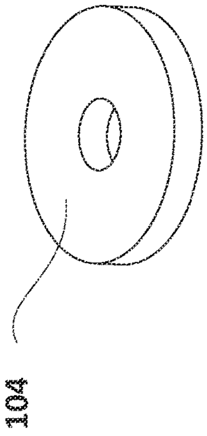
Figure 182B:
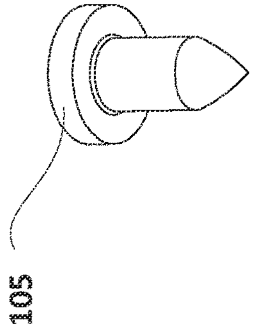
Figure 182C:
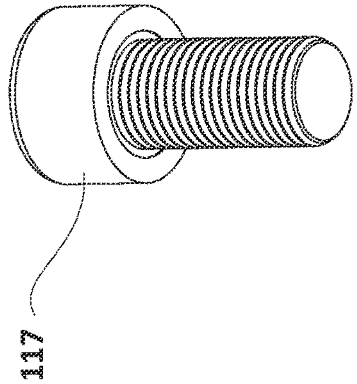
Figure 182D:
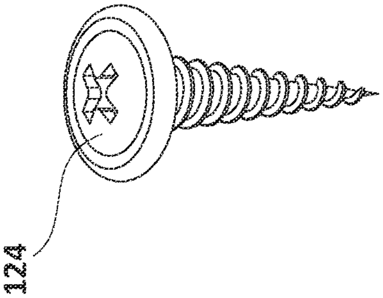
Figure 182E:
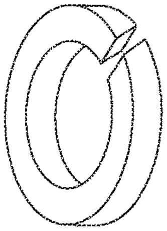
Figure 183:
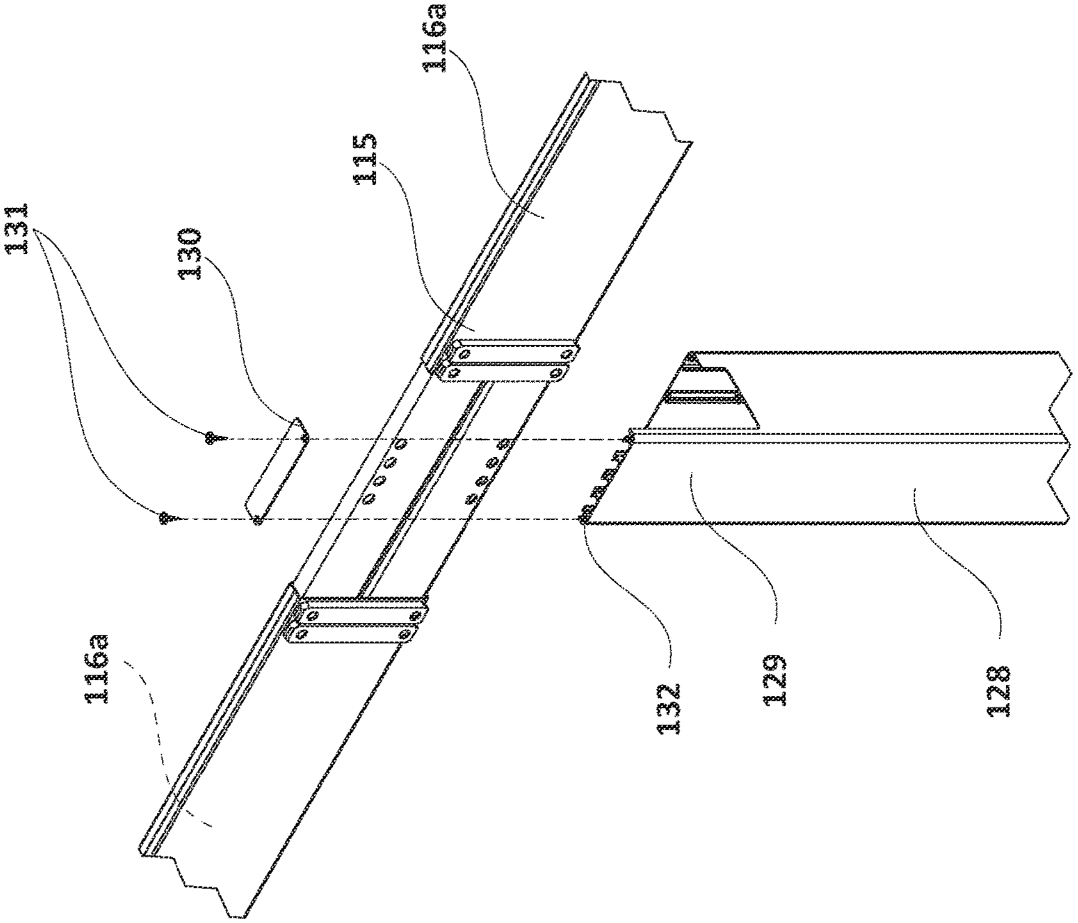
Figure 184:
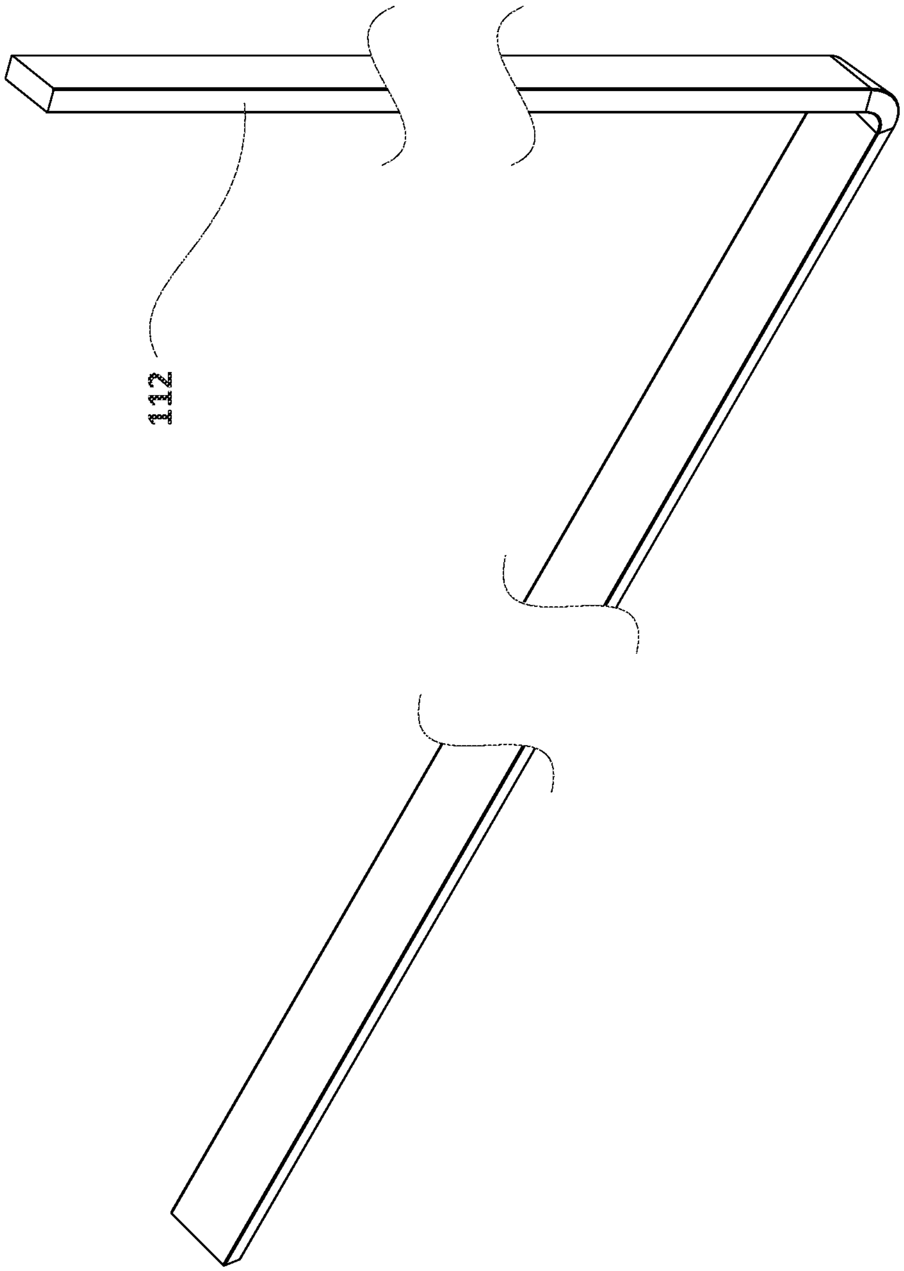
Figure 185:
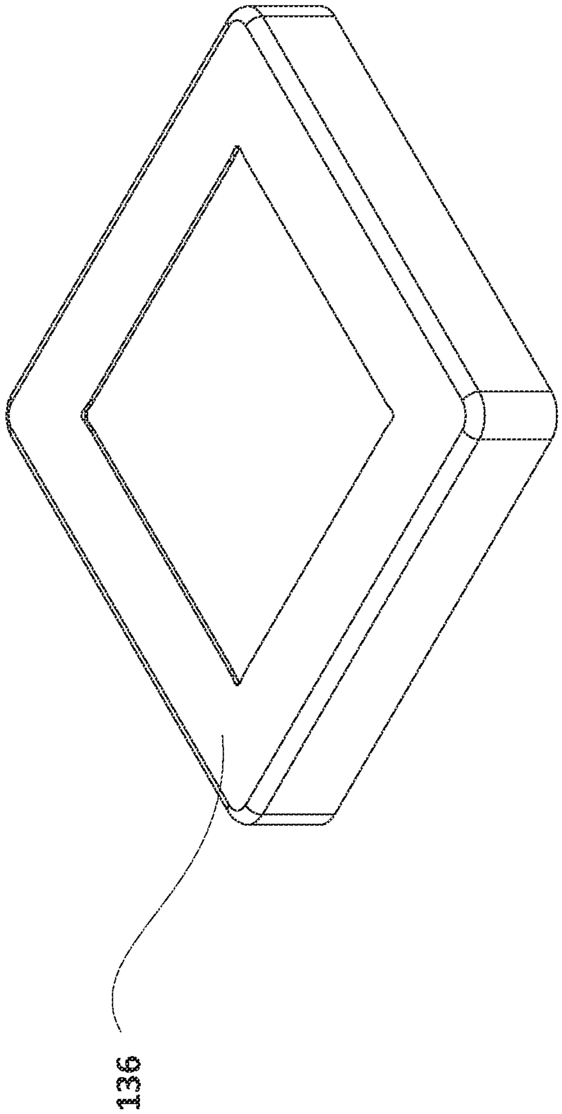
Figure 186B:
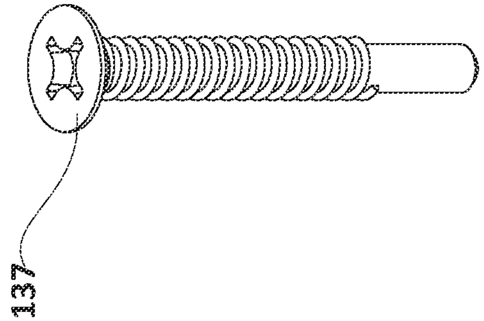
Figure 186A:
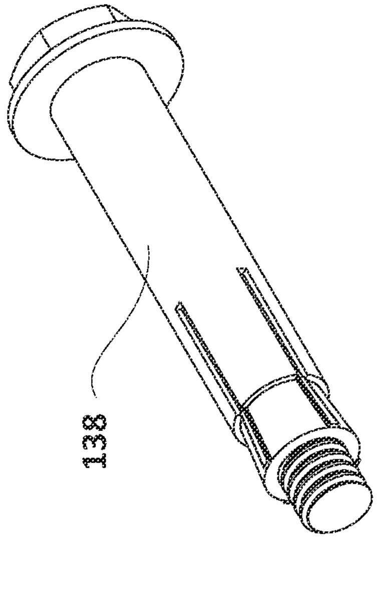
Figure 187:
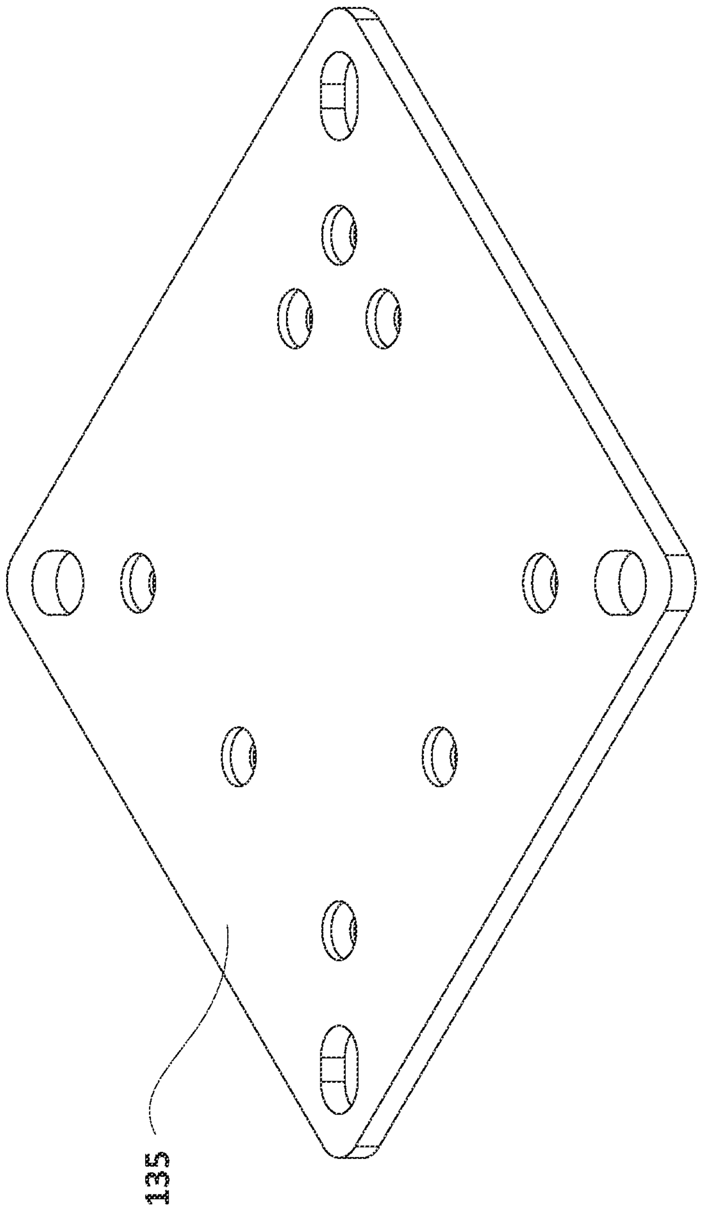
Figure 188:
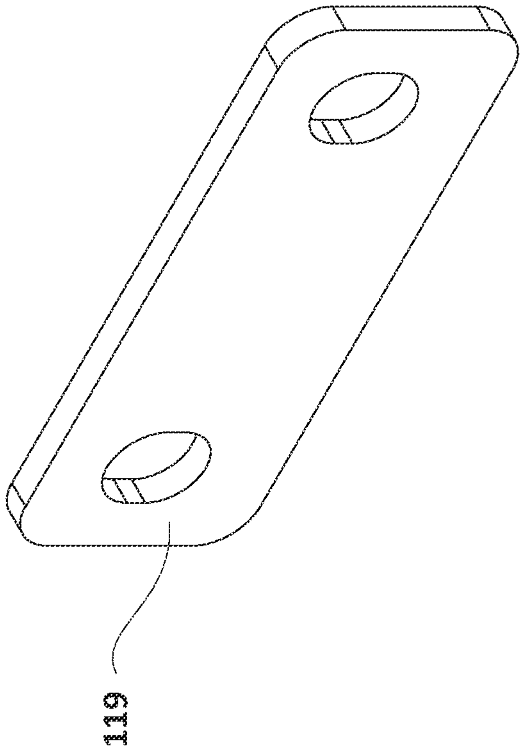
Figure 189:
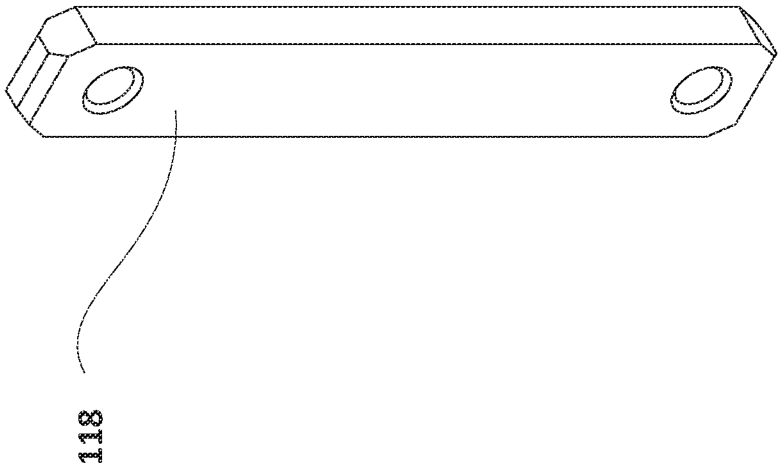
Figure 190:
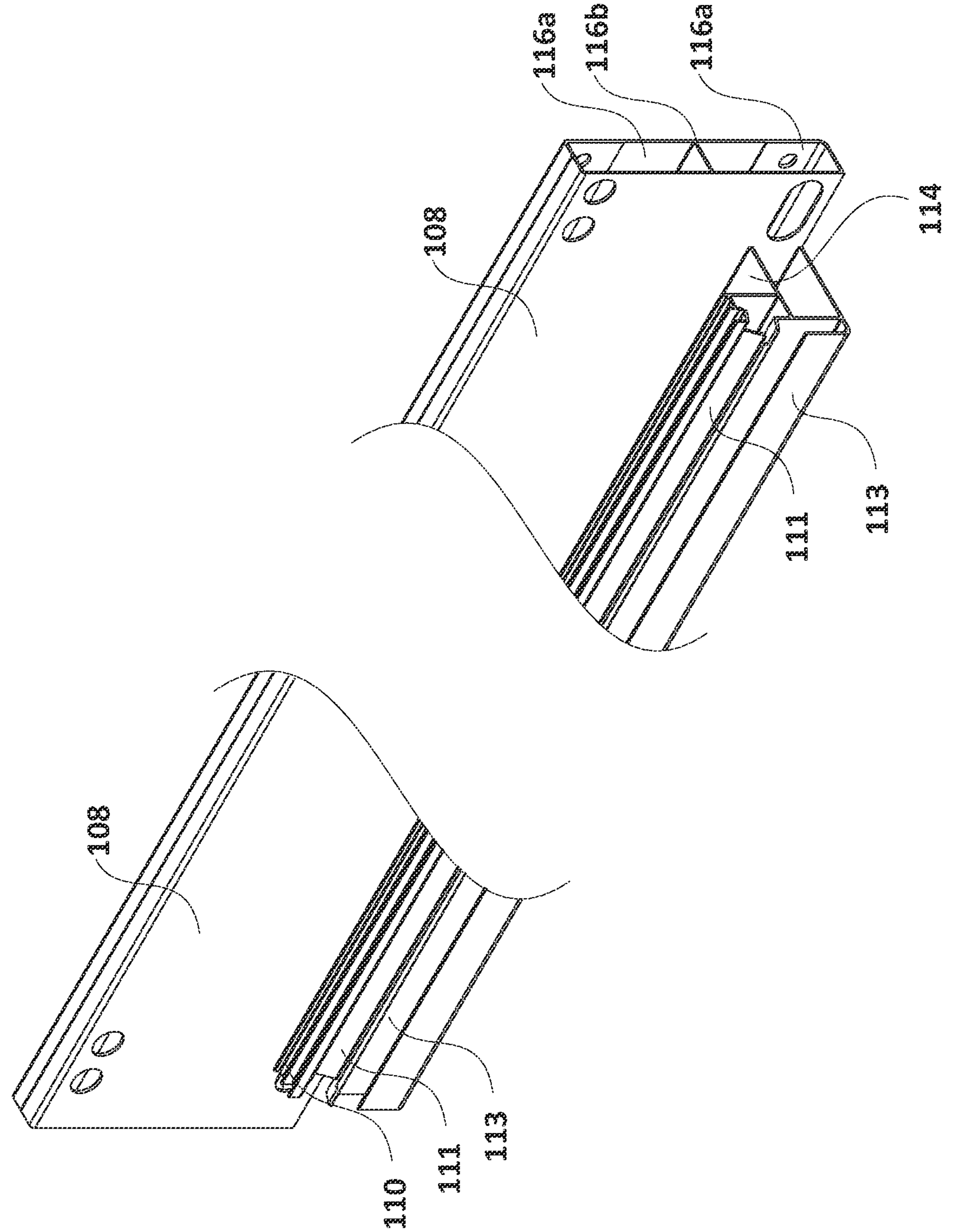
Figure 191:
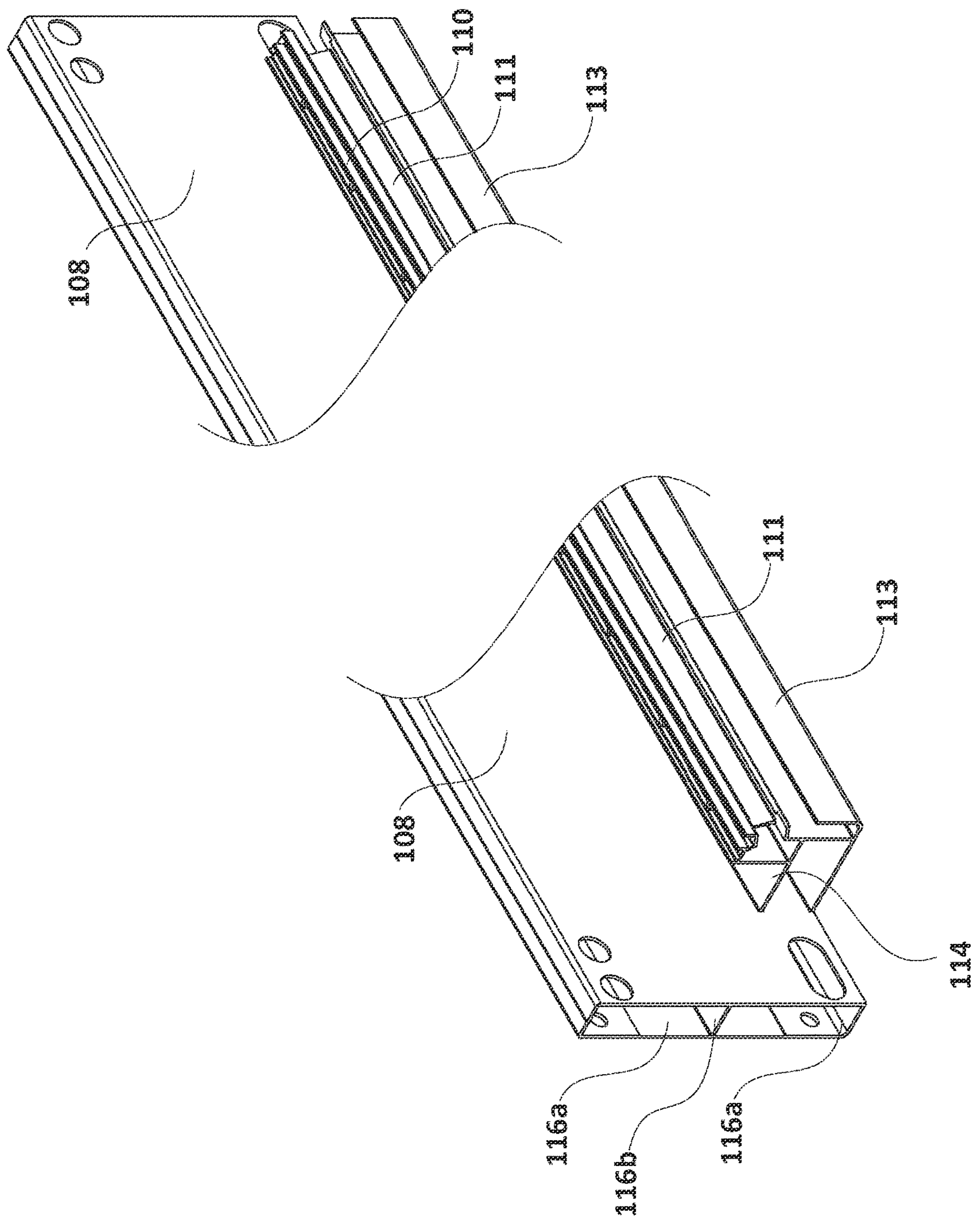
Figure 192:
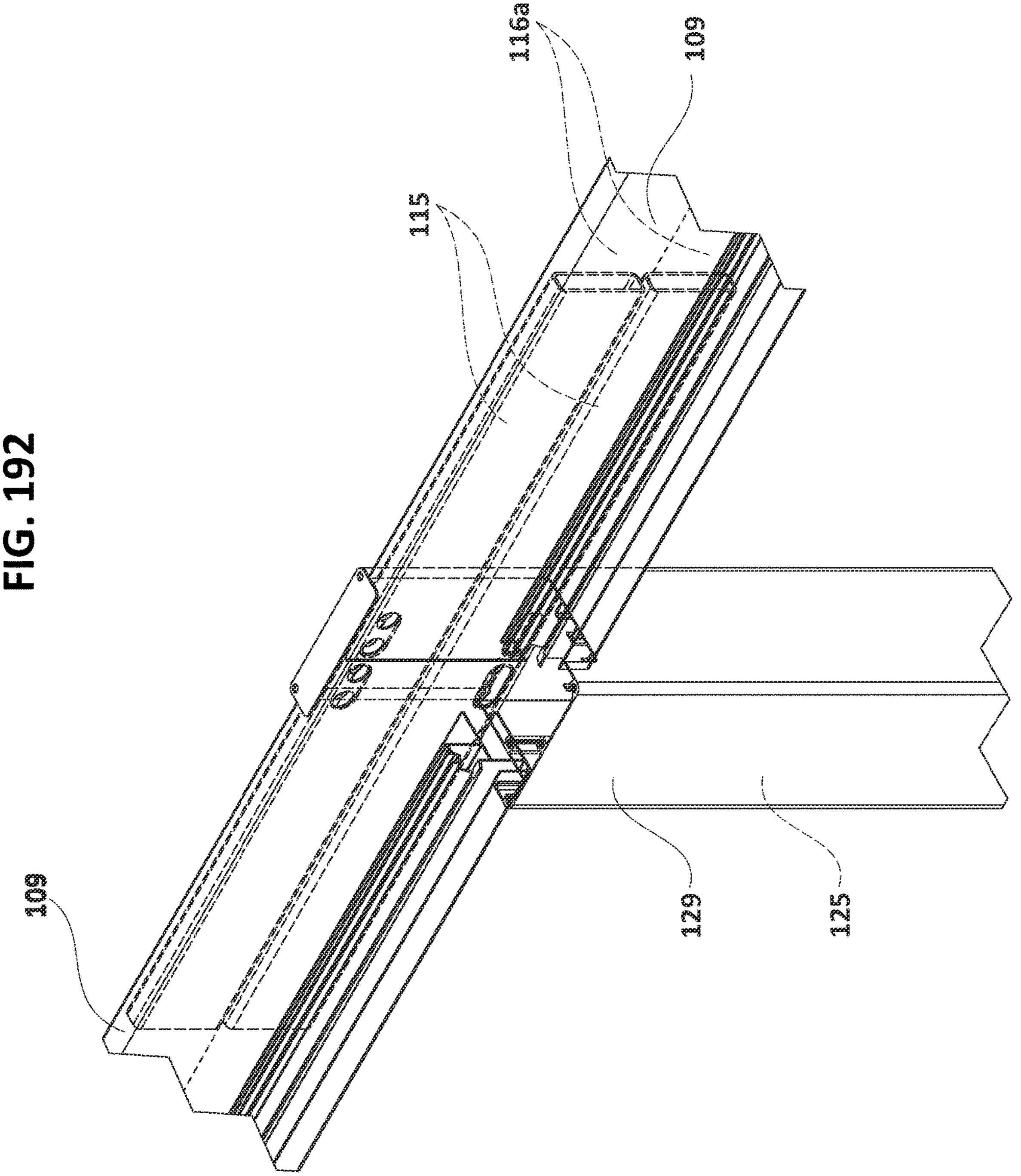
Figure 193:
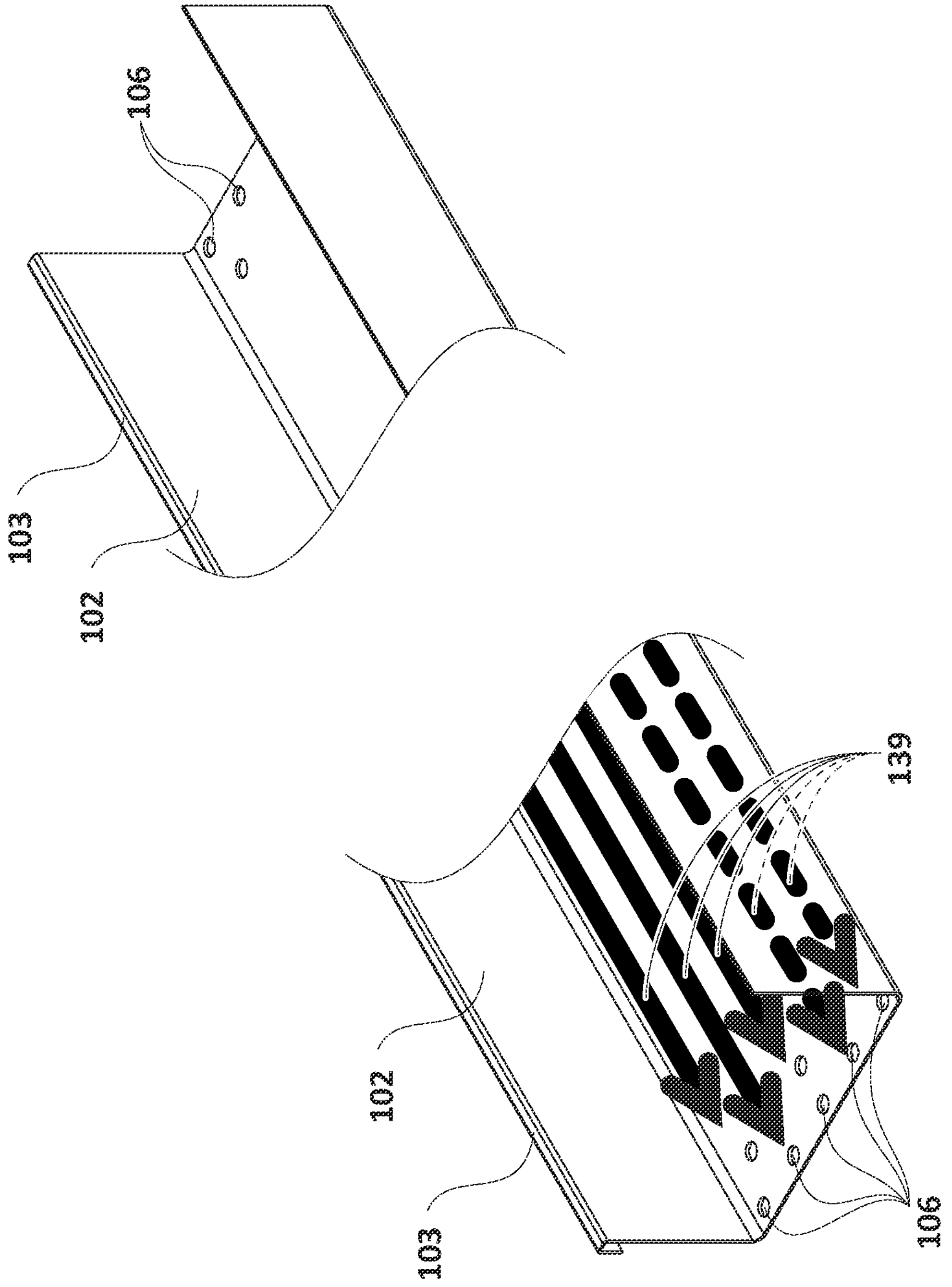
Figure 194:
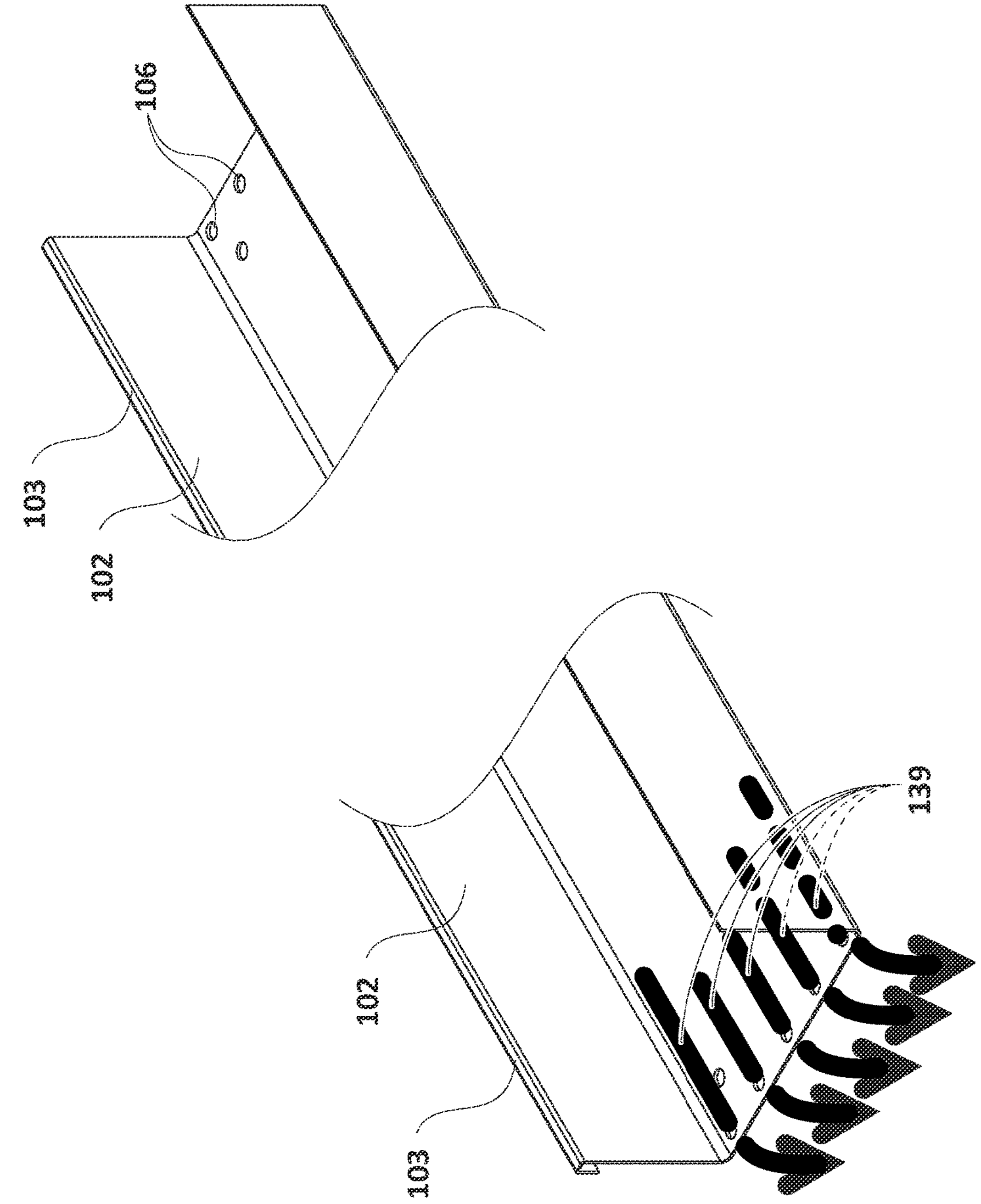
Figure 195:
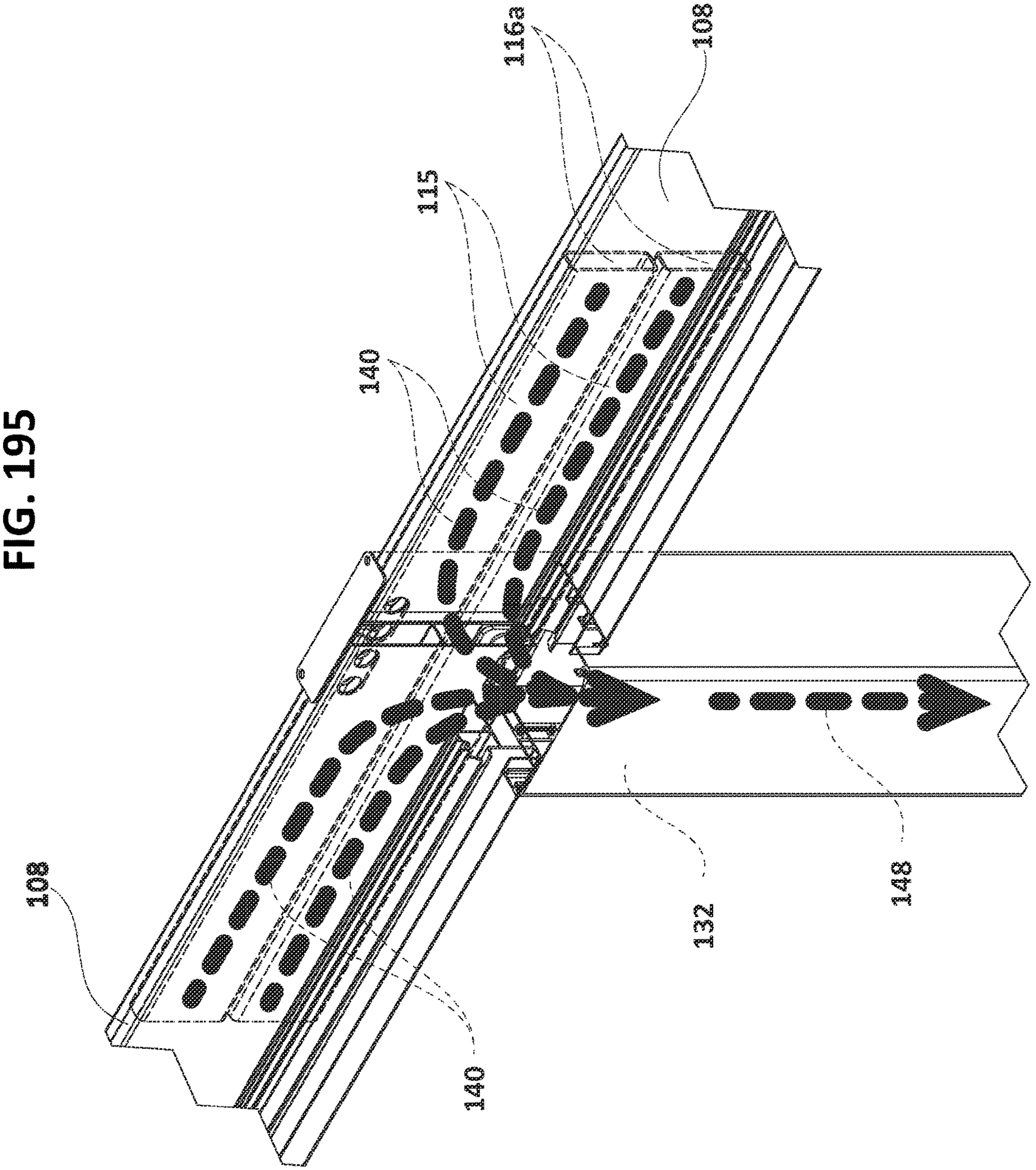
Figure 196B:
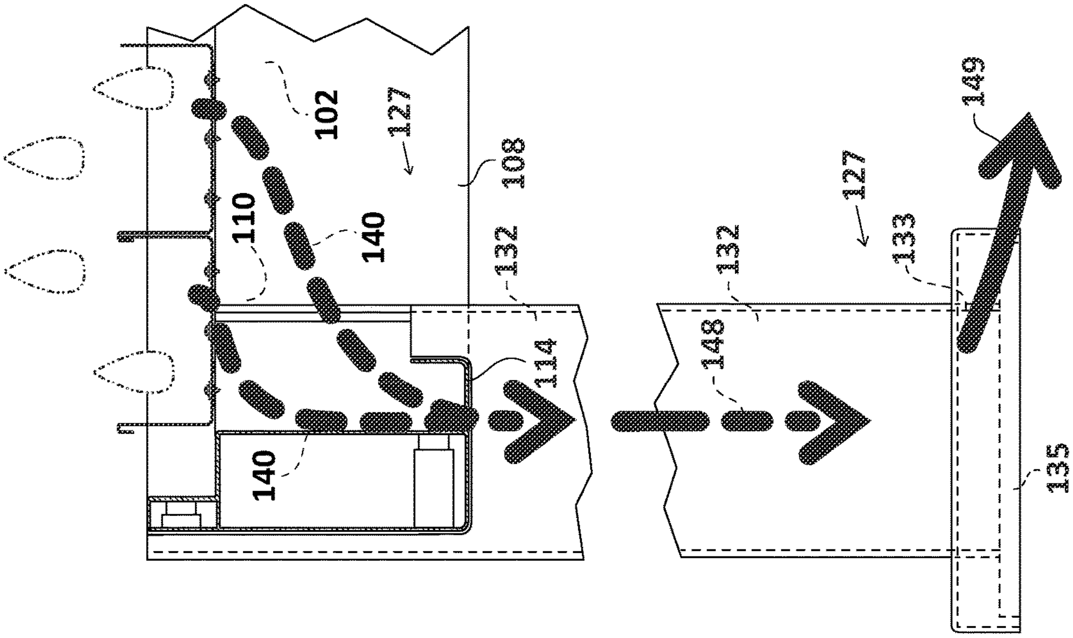
Figure 196A:
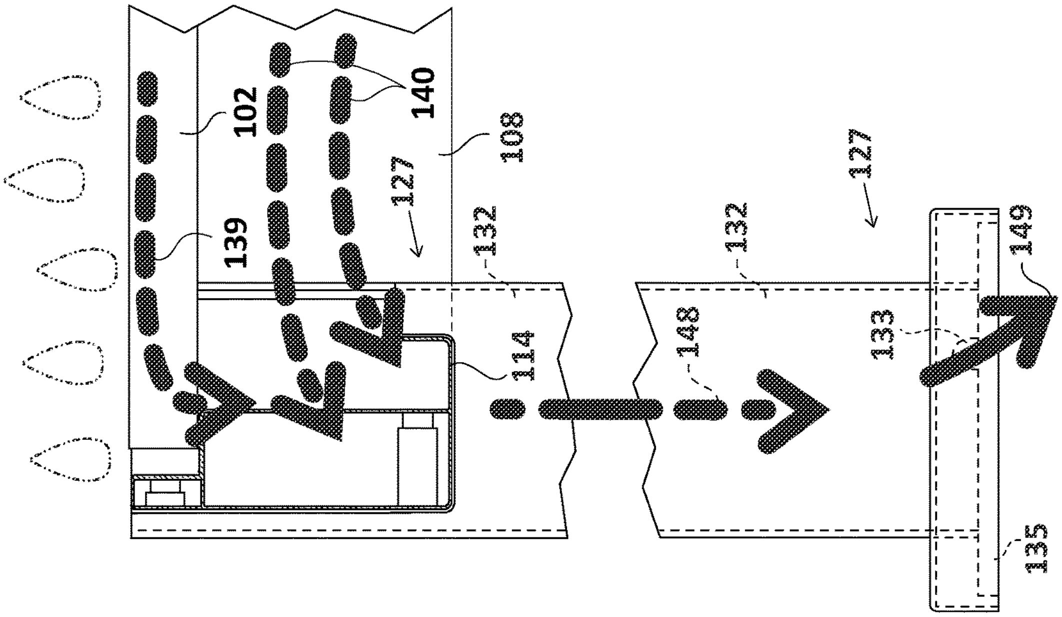
Figure 197:
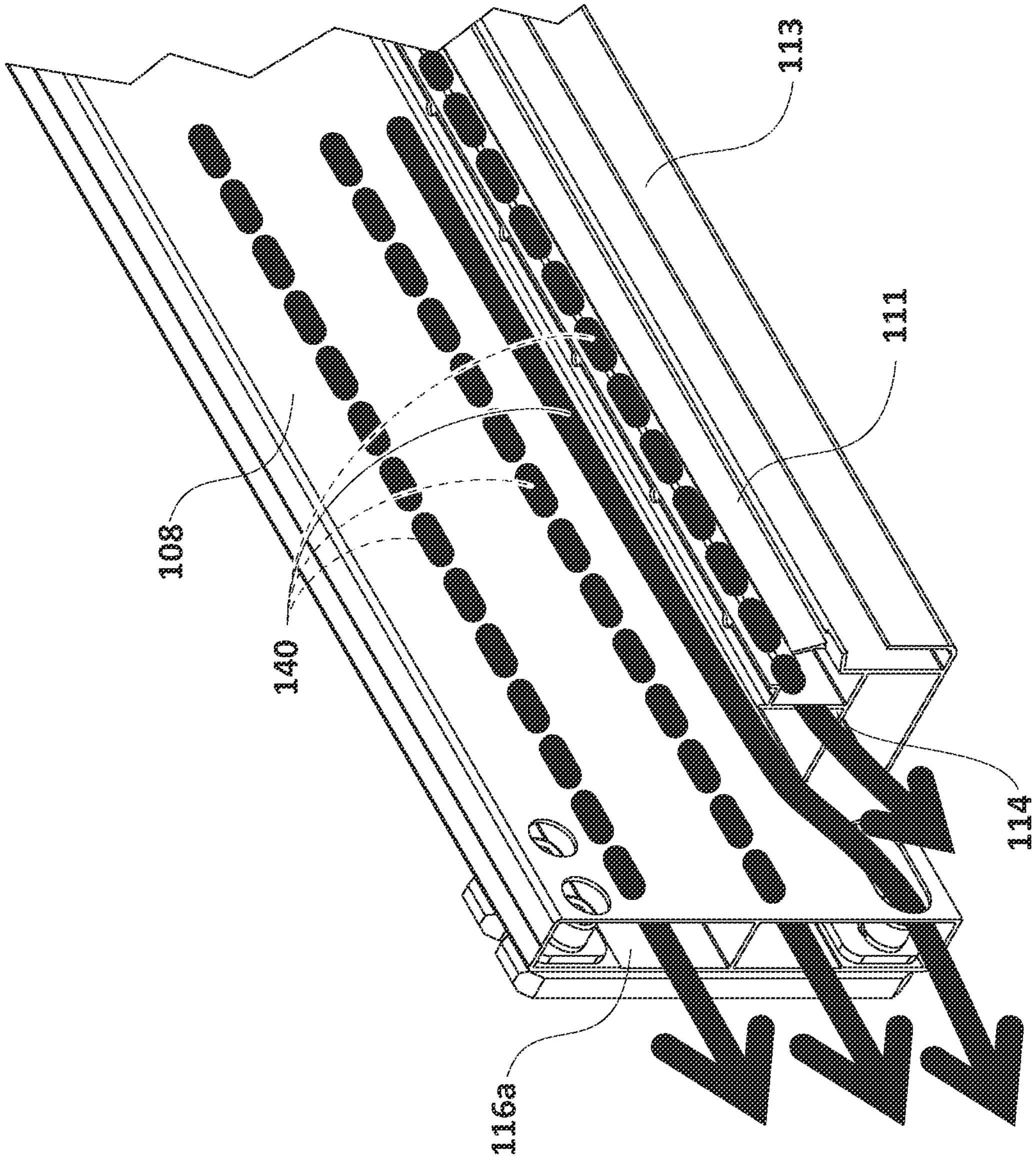
Figure 198:
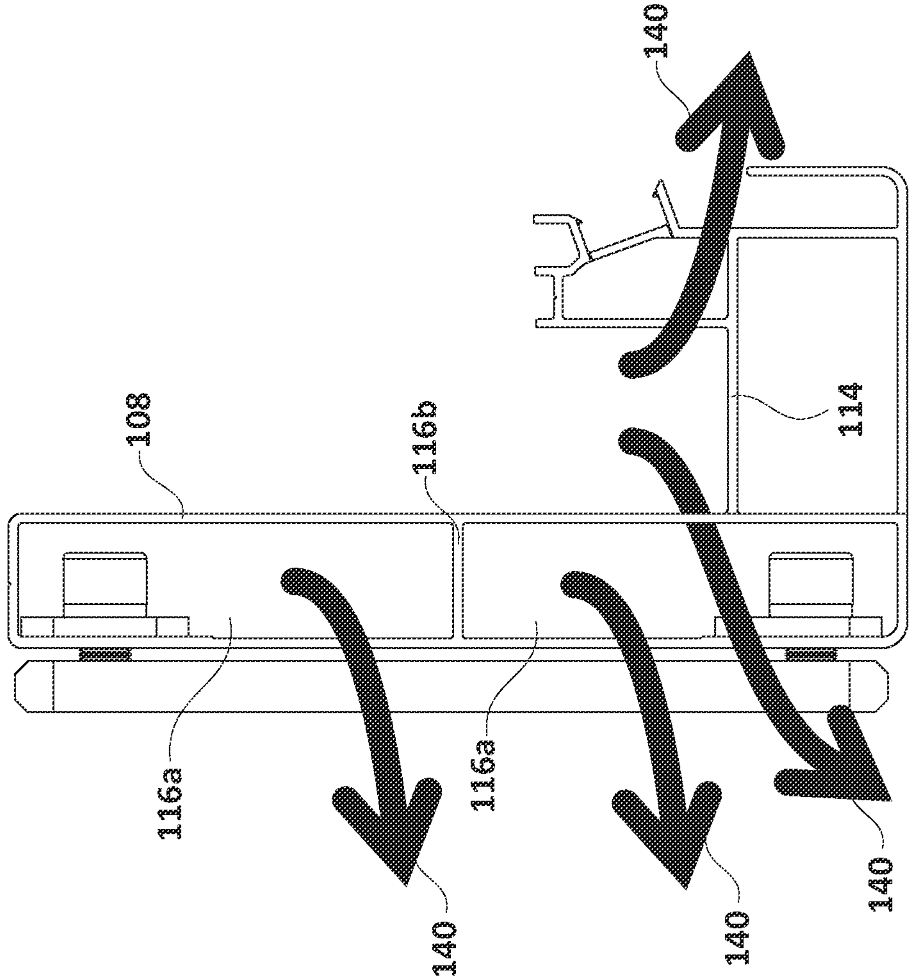
Figure 199:
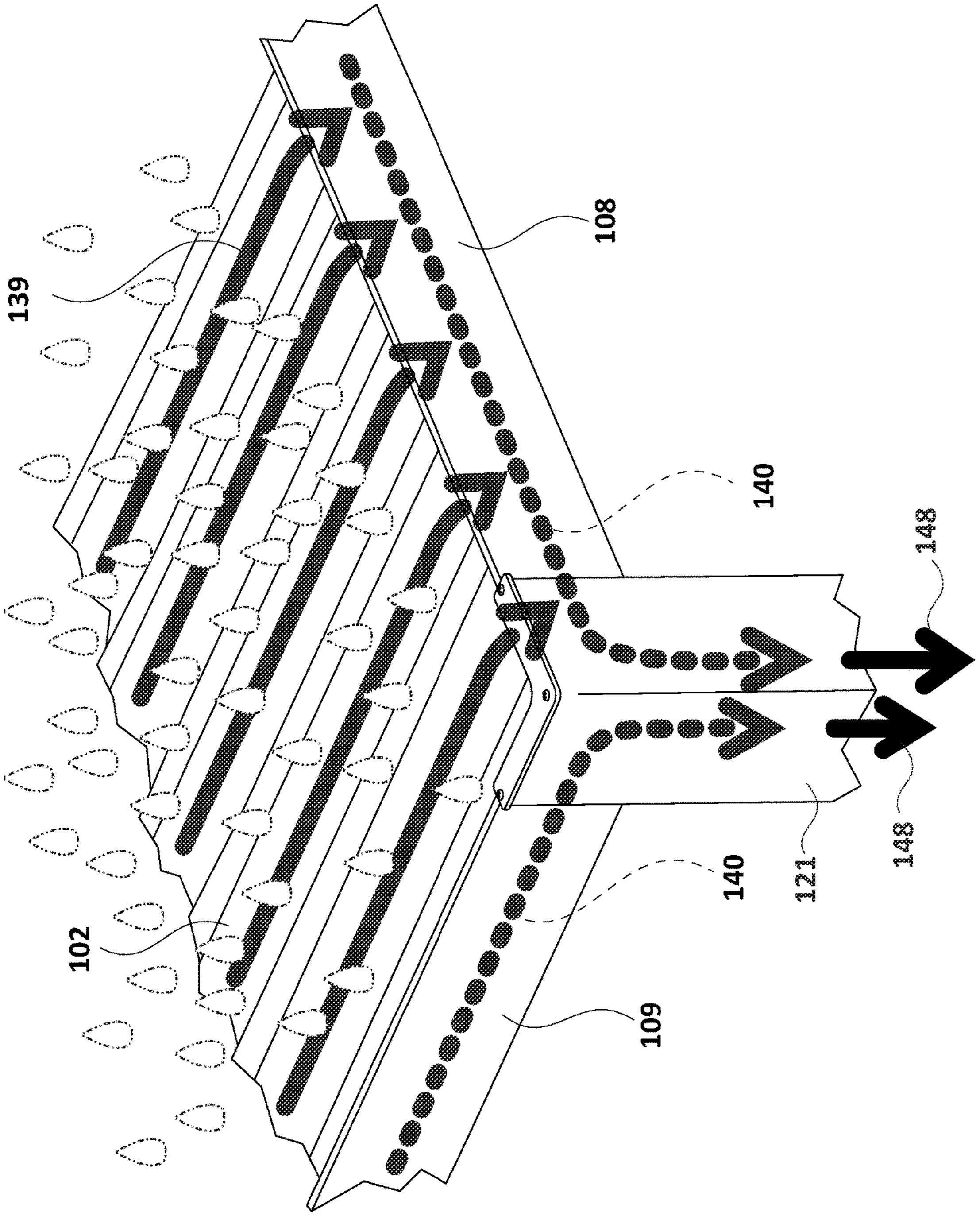
Figure 250:
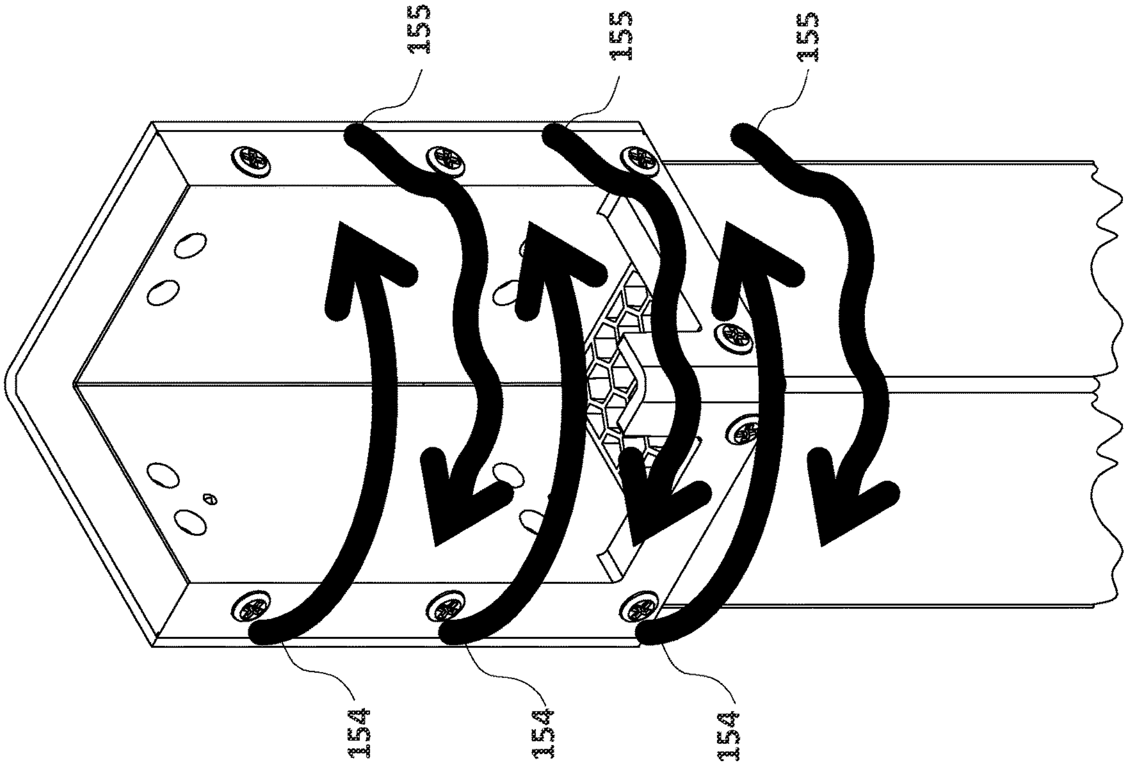
FIG. 250 illustrates a perspective view demonstrating components of an equivalent variation of the anti-twisting and anti-warping capabilities of the five-device-in-one anti-leaking noise-canceling anti-twisting anti-warping anti-vibrating double-locking double-core double-deck double-stacked internal-gutters.

Referring to FIG. 108-FIG. 250: Any component of the five-device-in-one anti-leaking noise-canceling anti-twisting anti-warping anti-vibrating double-locking double-core double-deck double-stacked internal-gutters can have any shape and size. Any component of the five-device-in-one anti-leaking noise-canceling anti-twisting anti-warping anti-vibrating double-locking double-core double-deck double-stacked internal-gutters can be made of any material(s).

Figure 200:
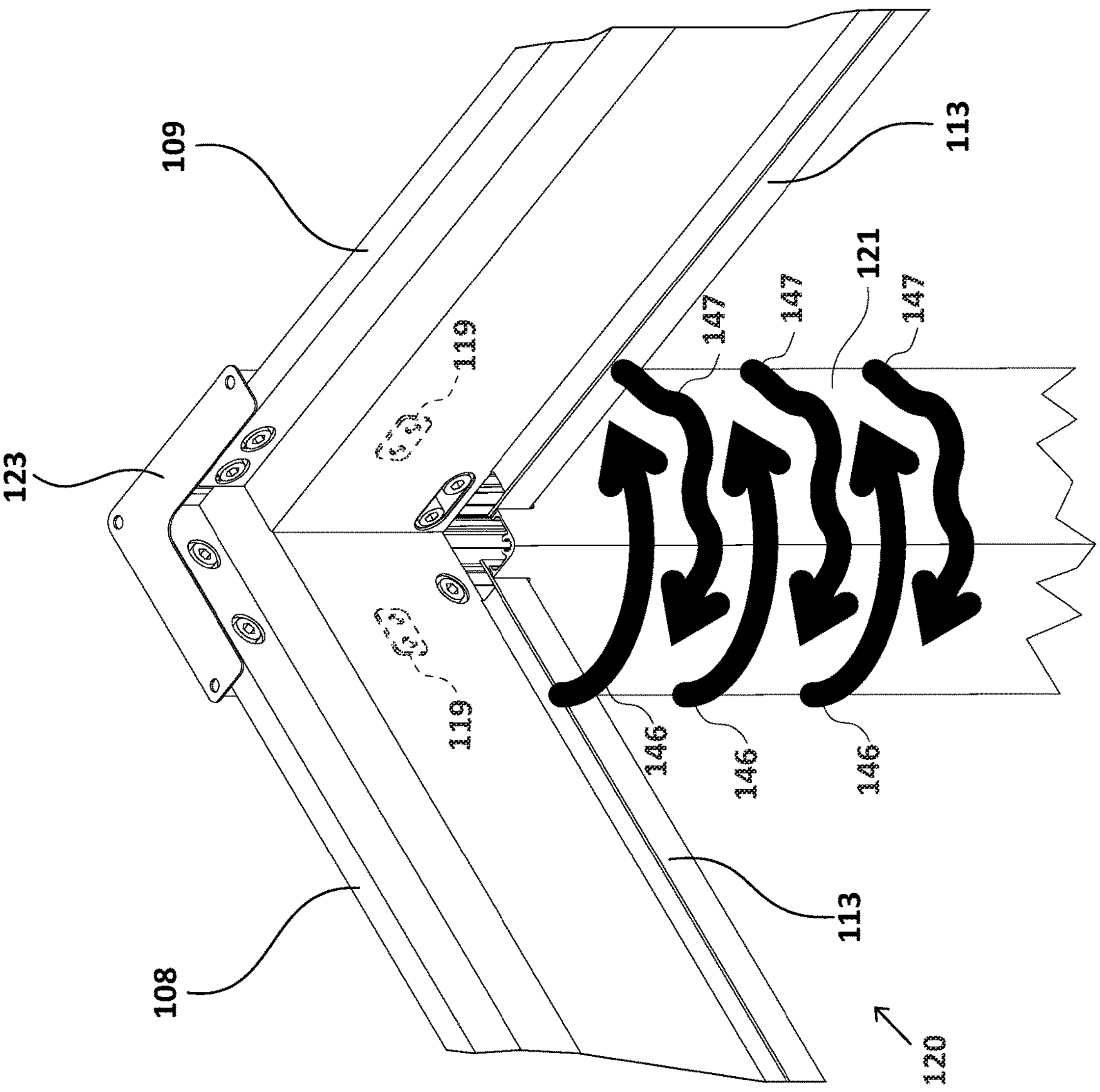
Figure 201:
FIG. 201-FIG. 220 illustrate perspective, top, and side views of demonstrating equivalent variations of components of the five-device-in-one anti-leaking noise-canceling anti-twisting anti-warping anti-vibrating double-locking double-core double-deck double-stacked internal-gutters.
Figure 202:
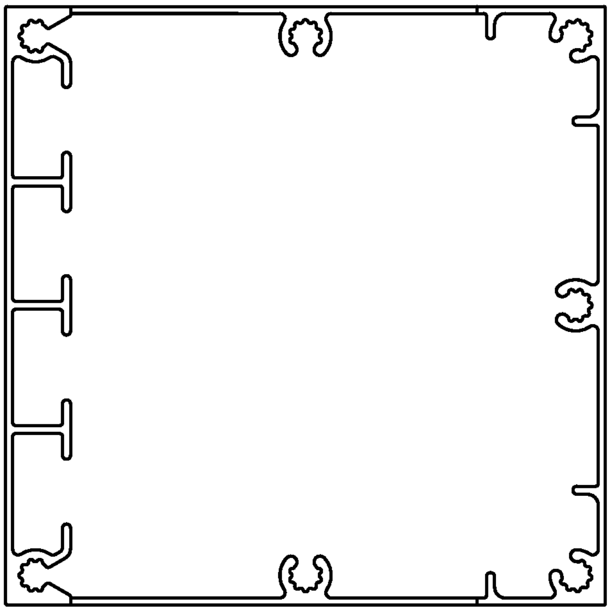
Figure 203:
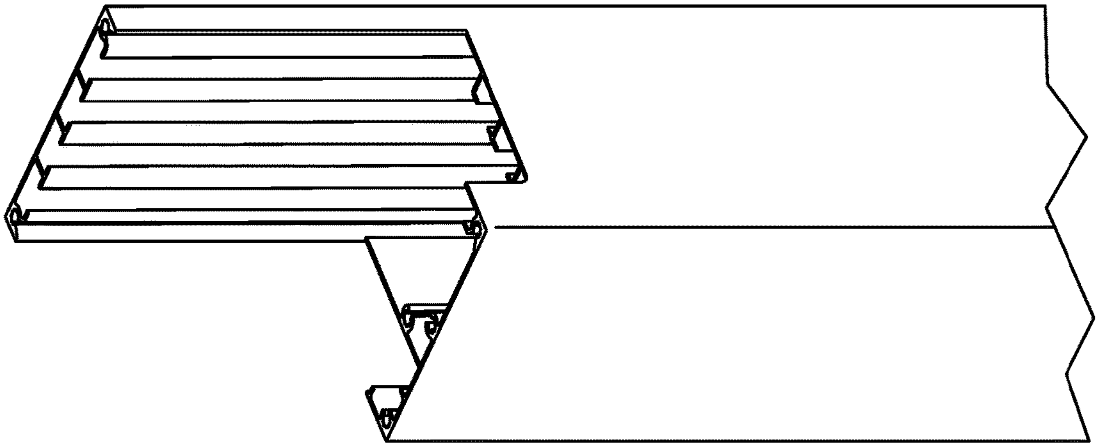
Figure 204:
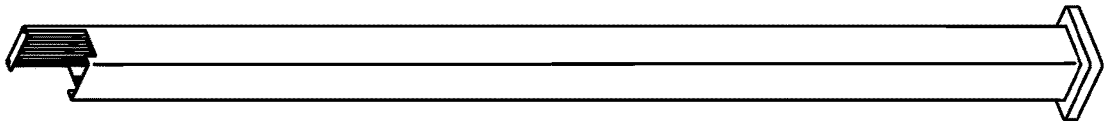
Figure 205:
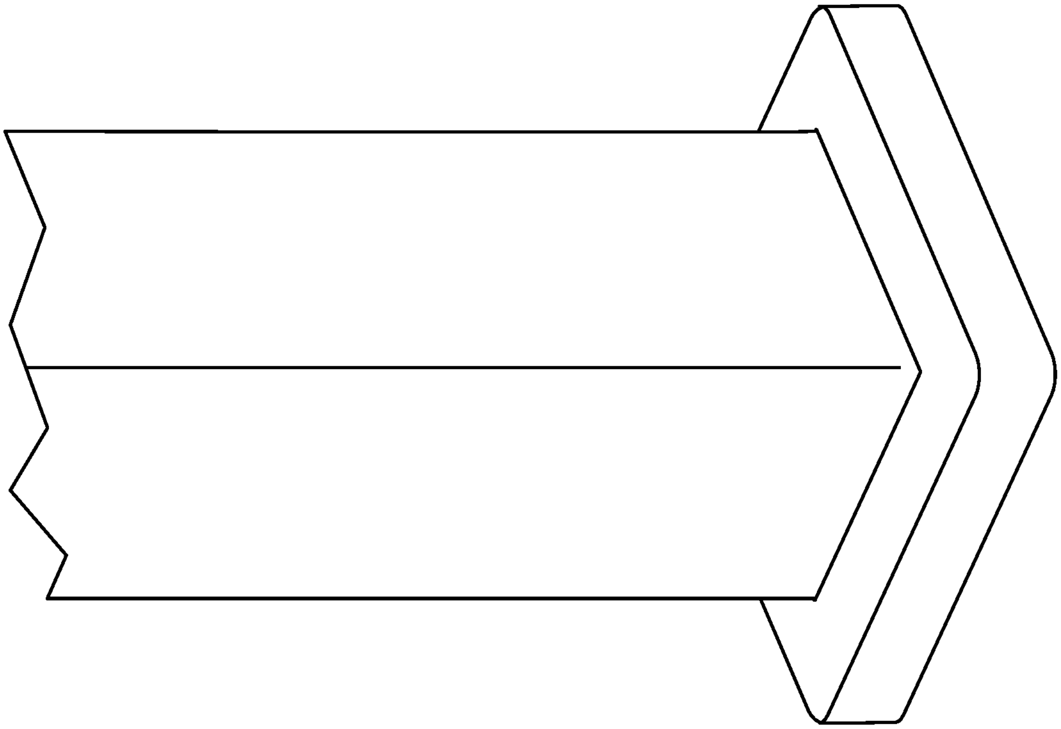
Figure 206:
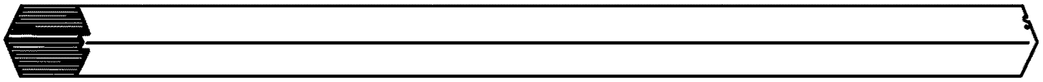
Figure 207:
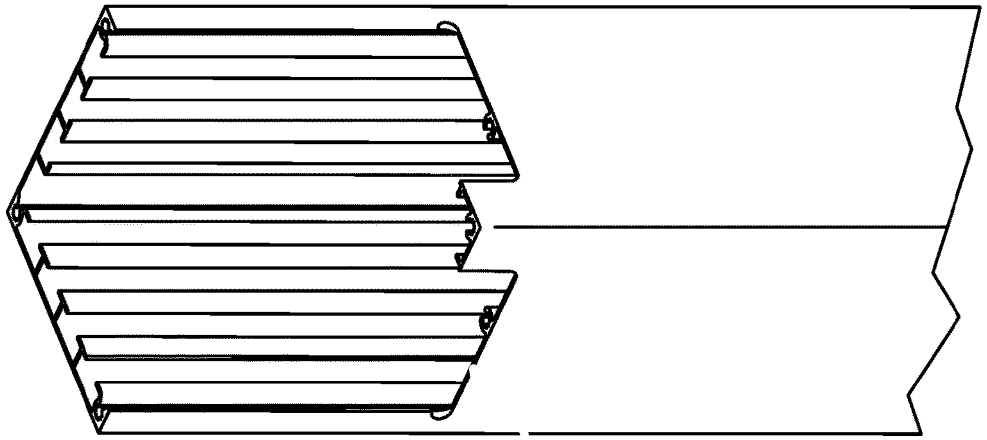
Figure 208:
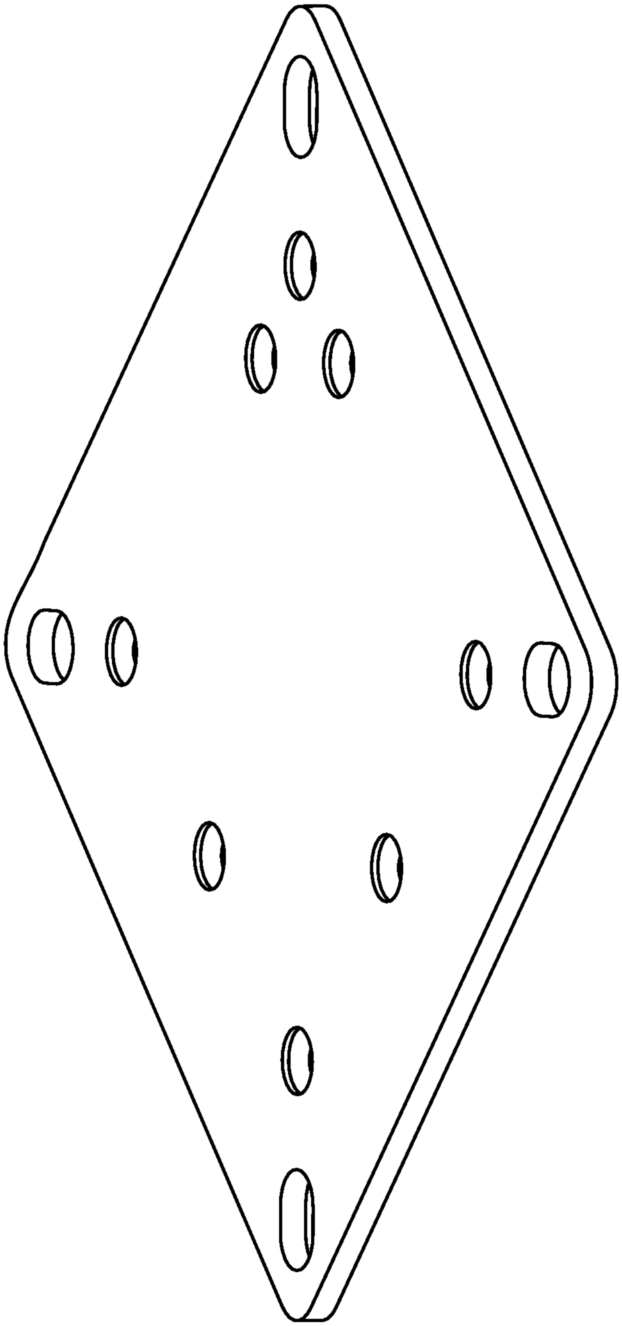
Figure 209:
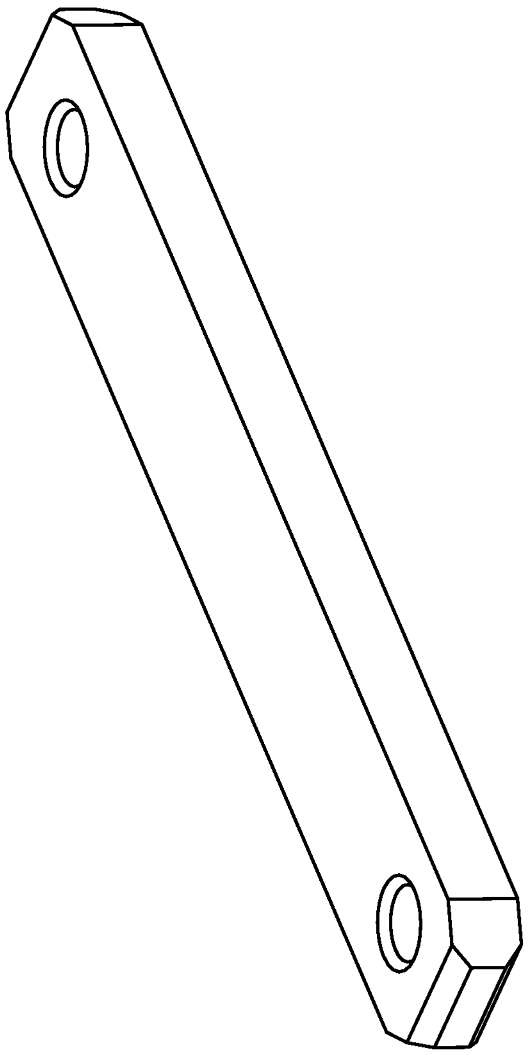
Figure 210:
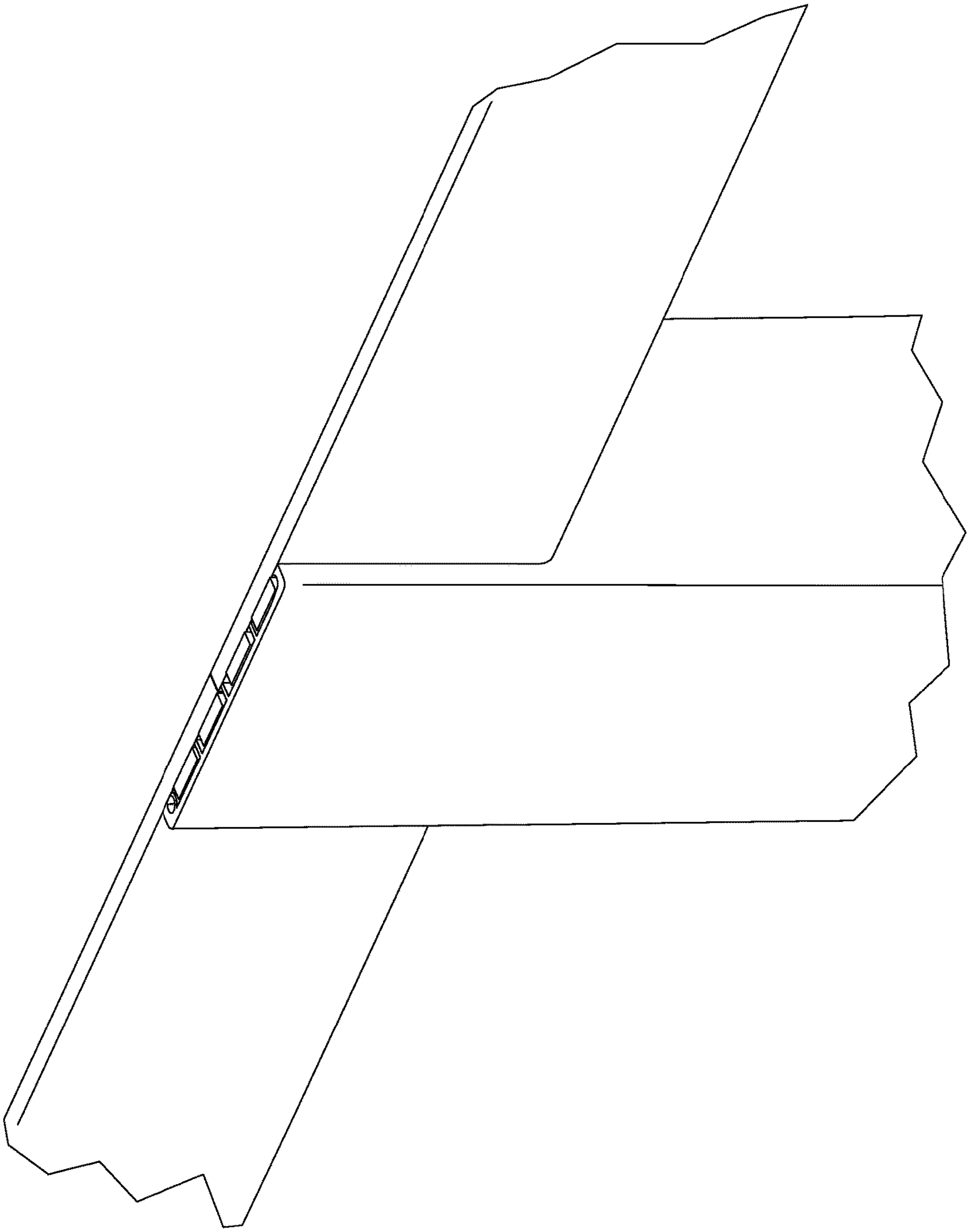
Figure 211:
Figure 212:
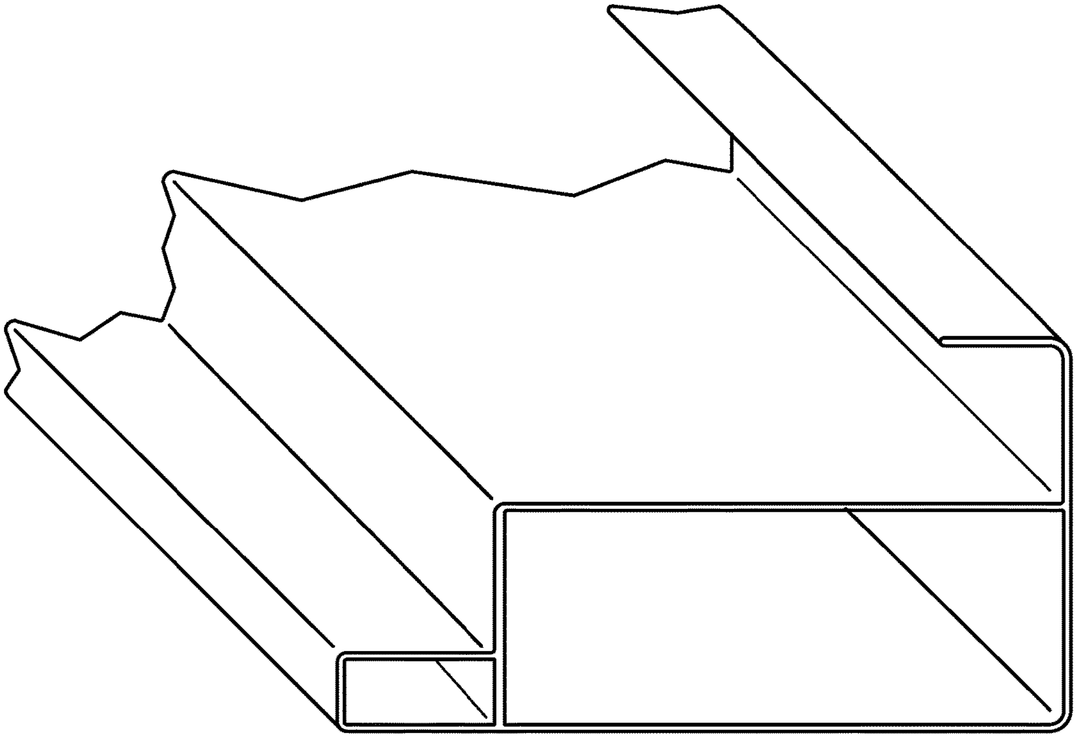
Figure 213:
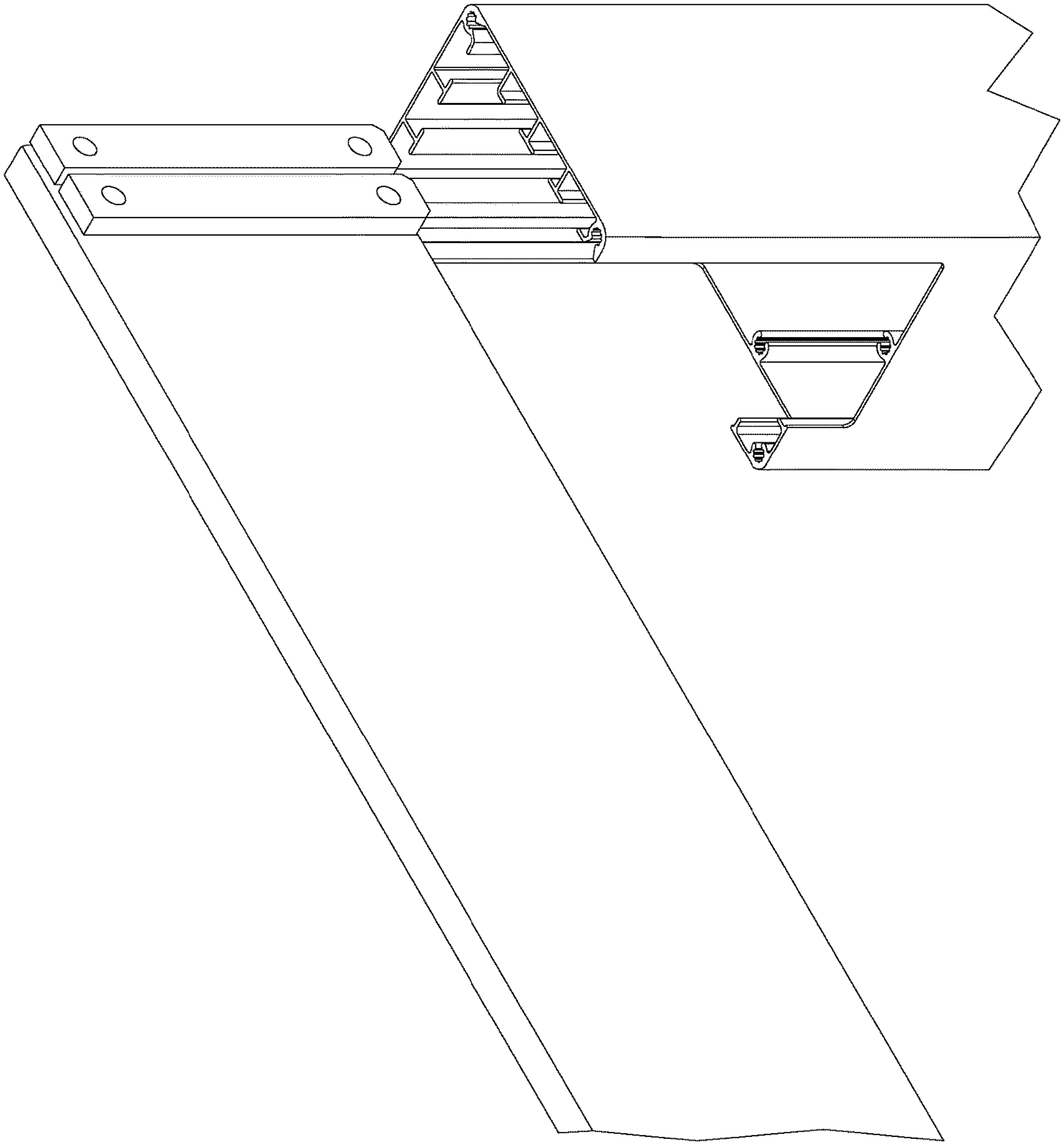
Figure 214:
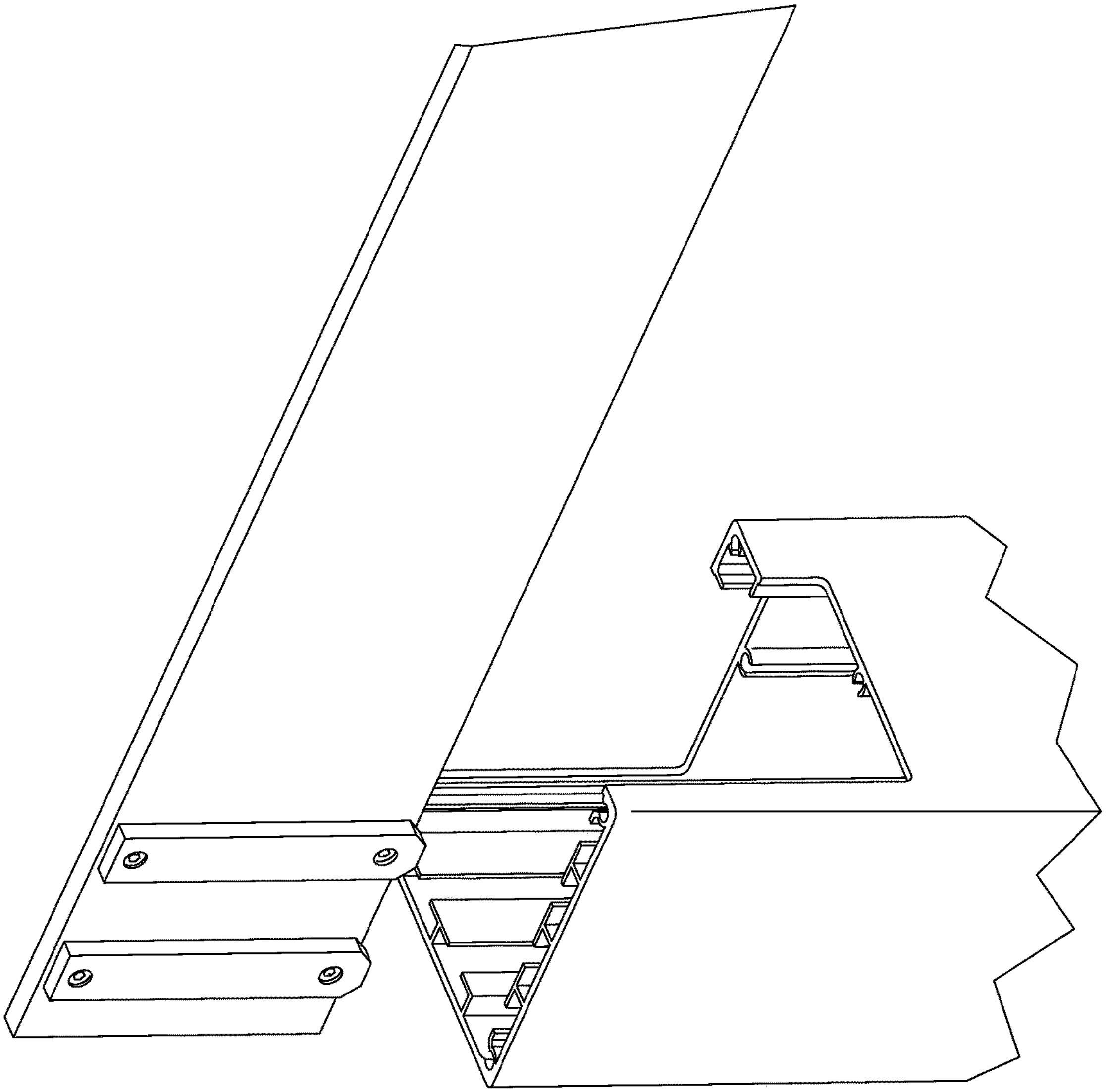
Figure 215:
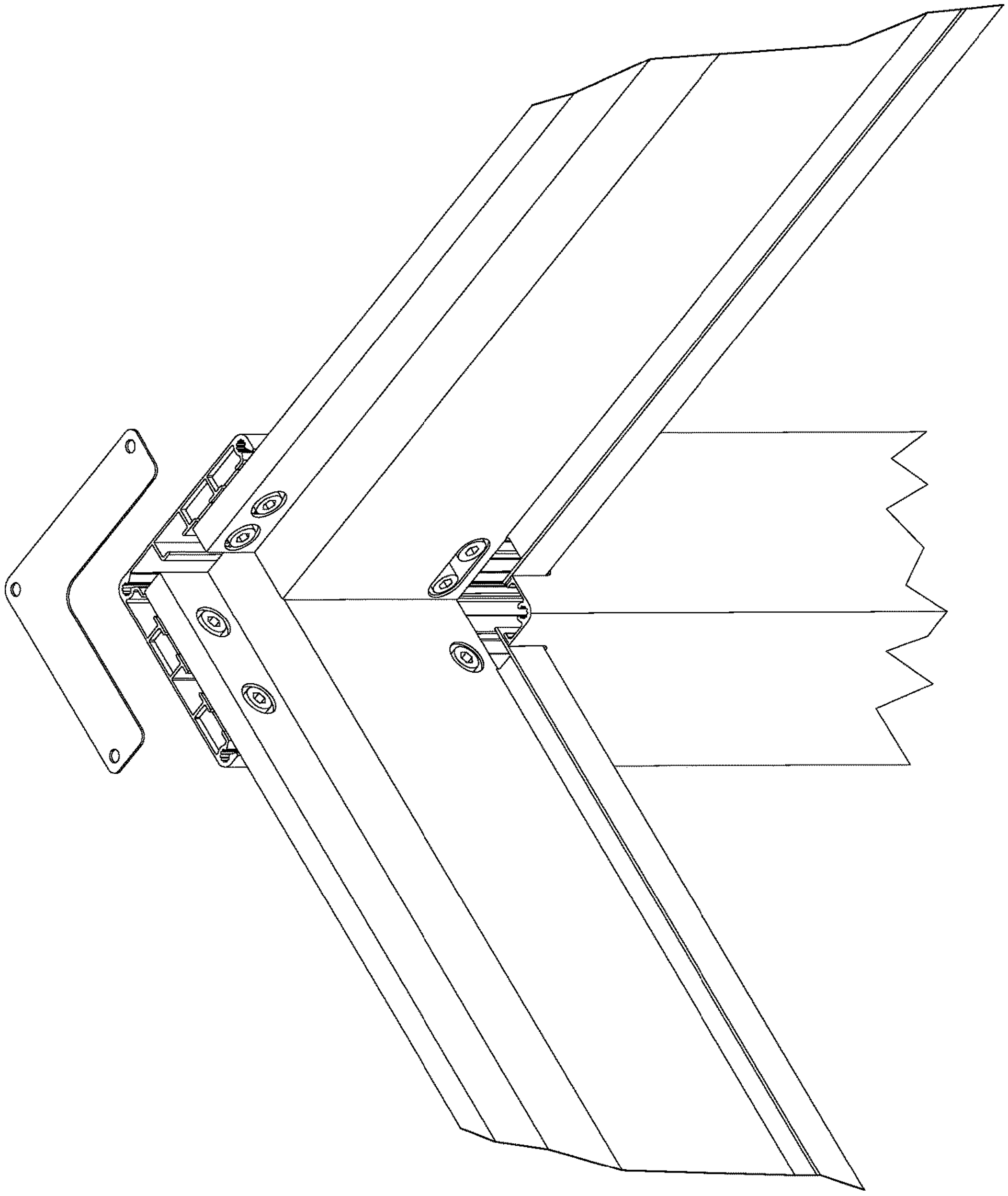
Figure 216:
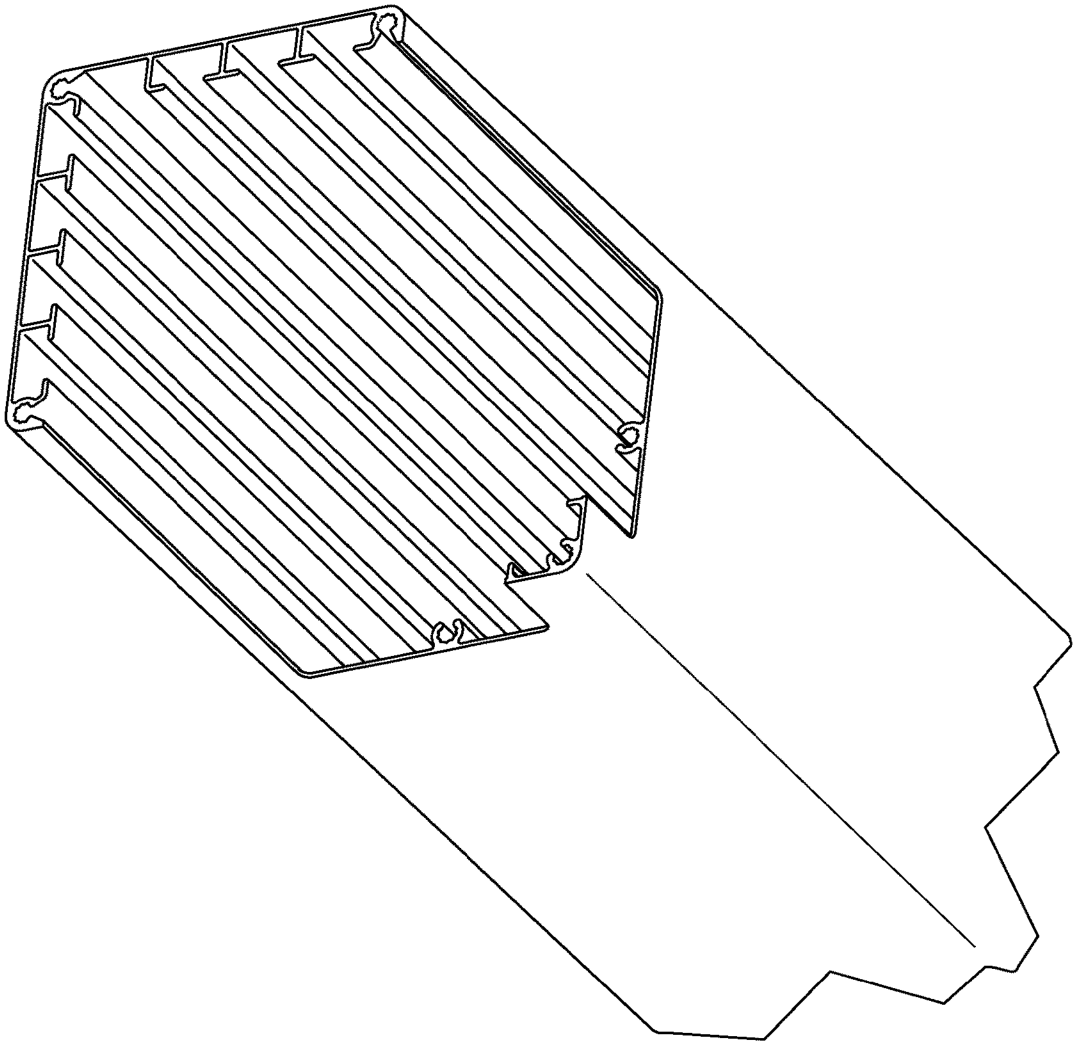
Figure 217:
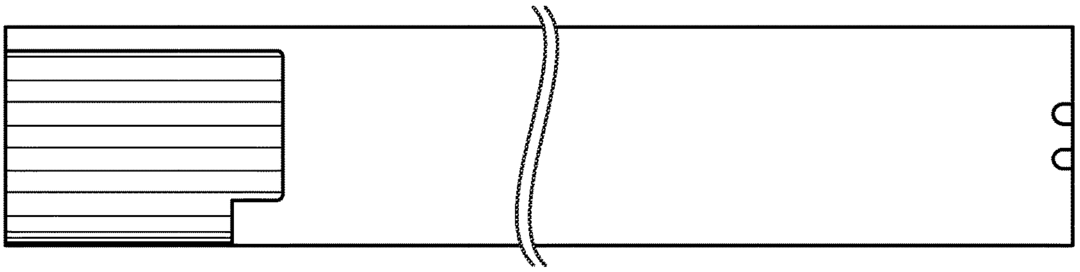
Figure 218:
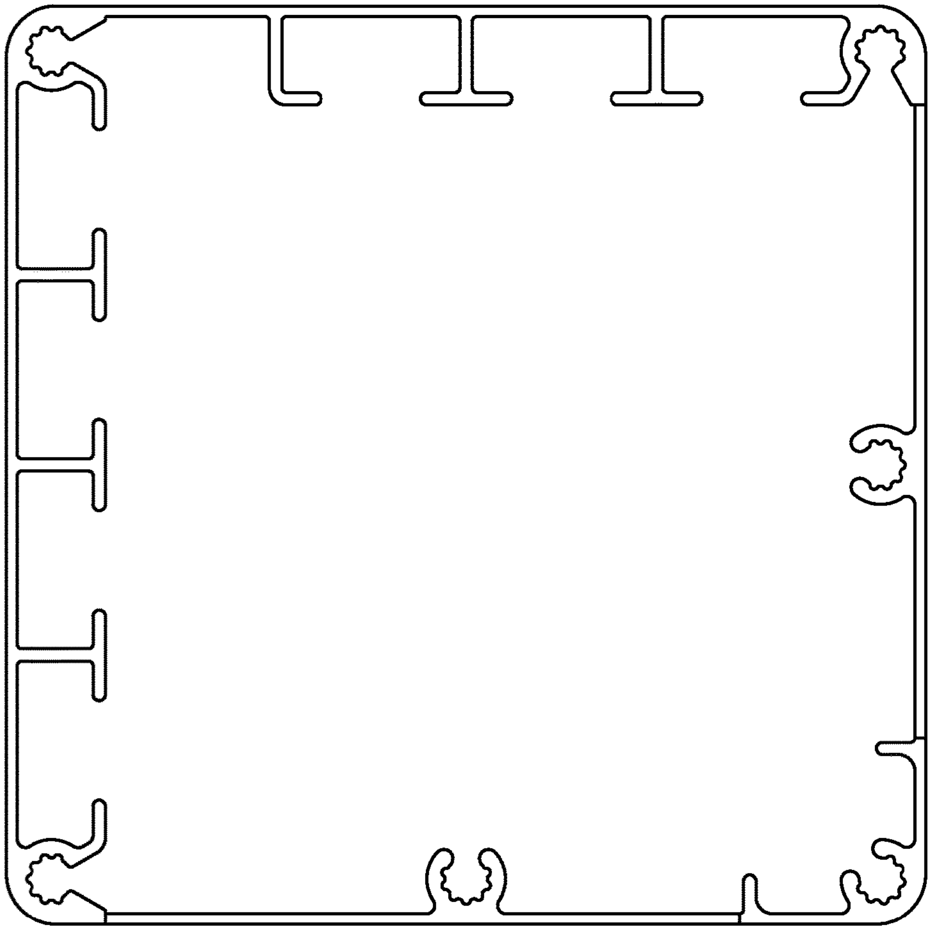
Figure 219:
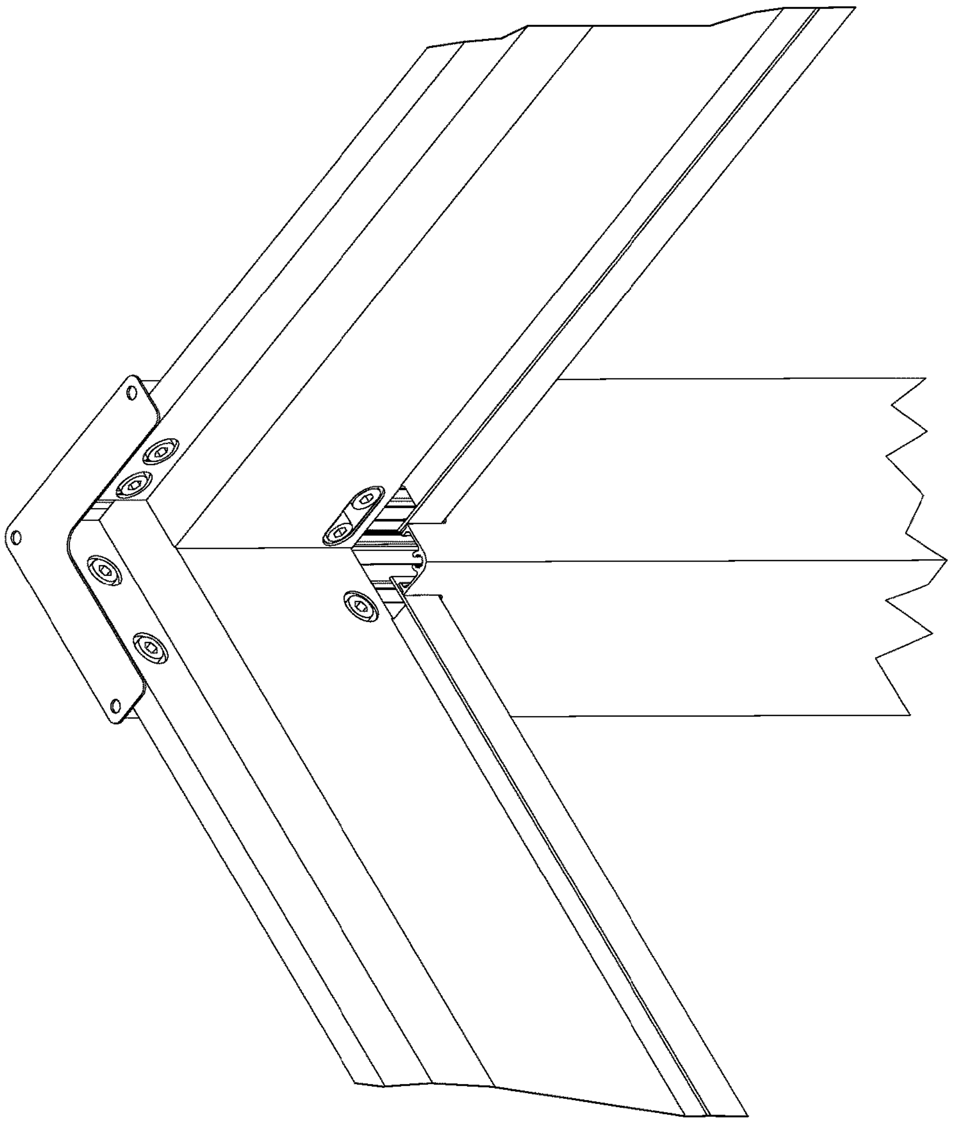
Figure 220:
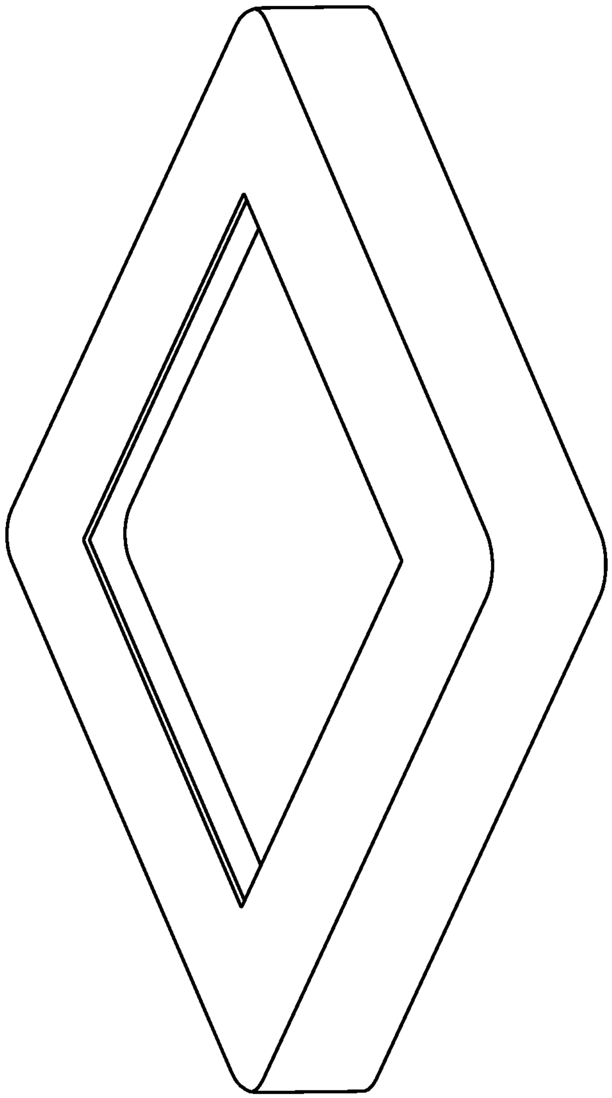
Figure 221:
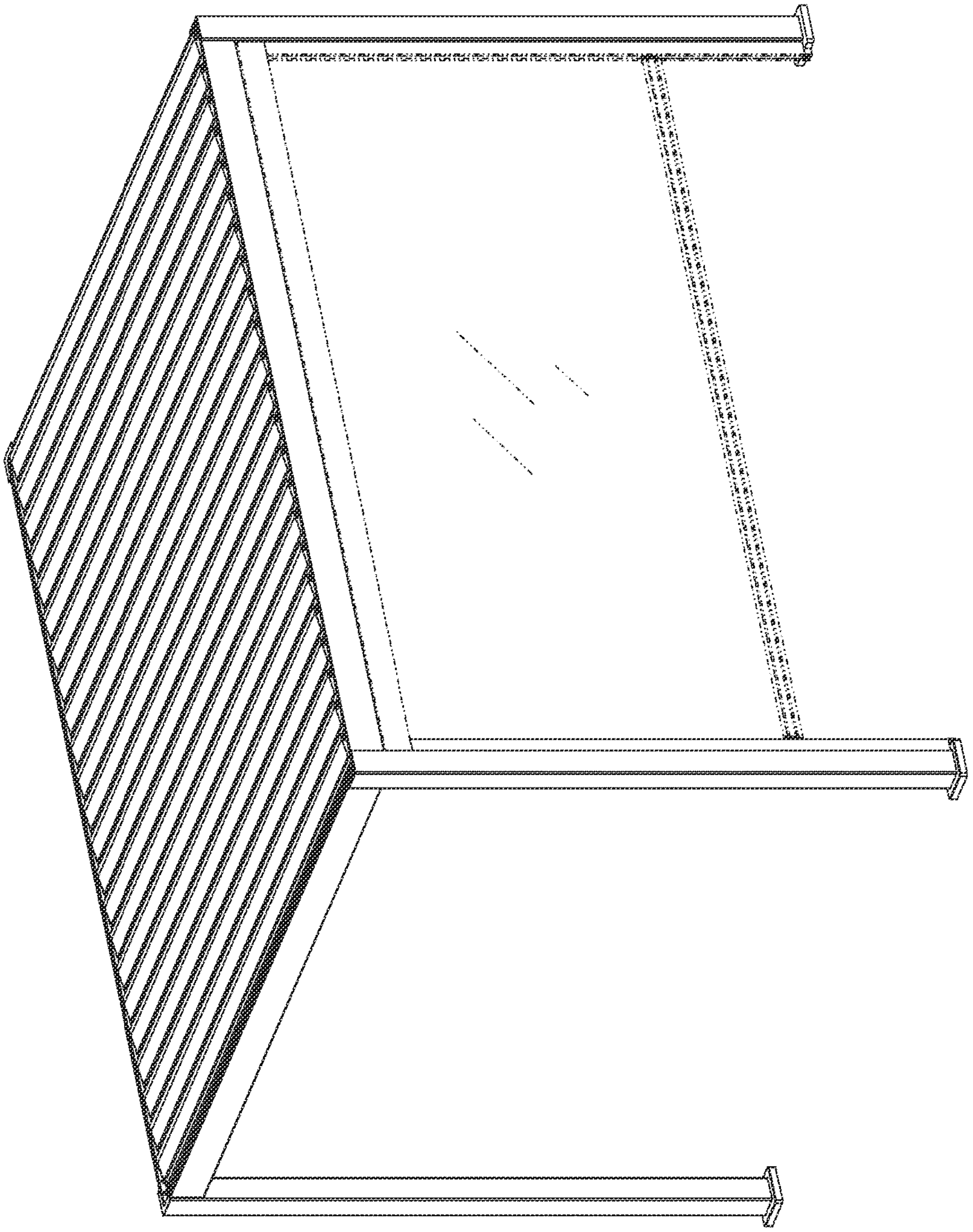
FIG. 221-FIG. 231B illustrate perspective, and side views of demonstrating equivalent variations of components and assemblies of the five-device-in-one anti-leaking noise-canceling anti-twisting anti-warping anti-vibrating double-locking double-core double-deck double-stacked internal-gutters having louvers, blocking shields, hanging curtains, and mosquito screens.
Figure 222:
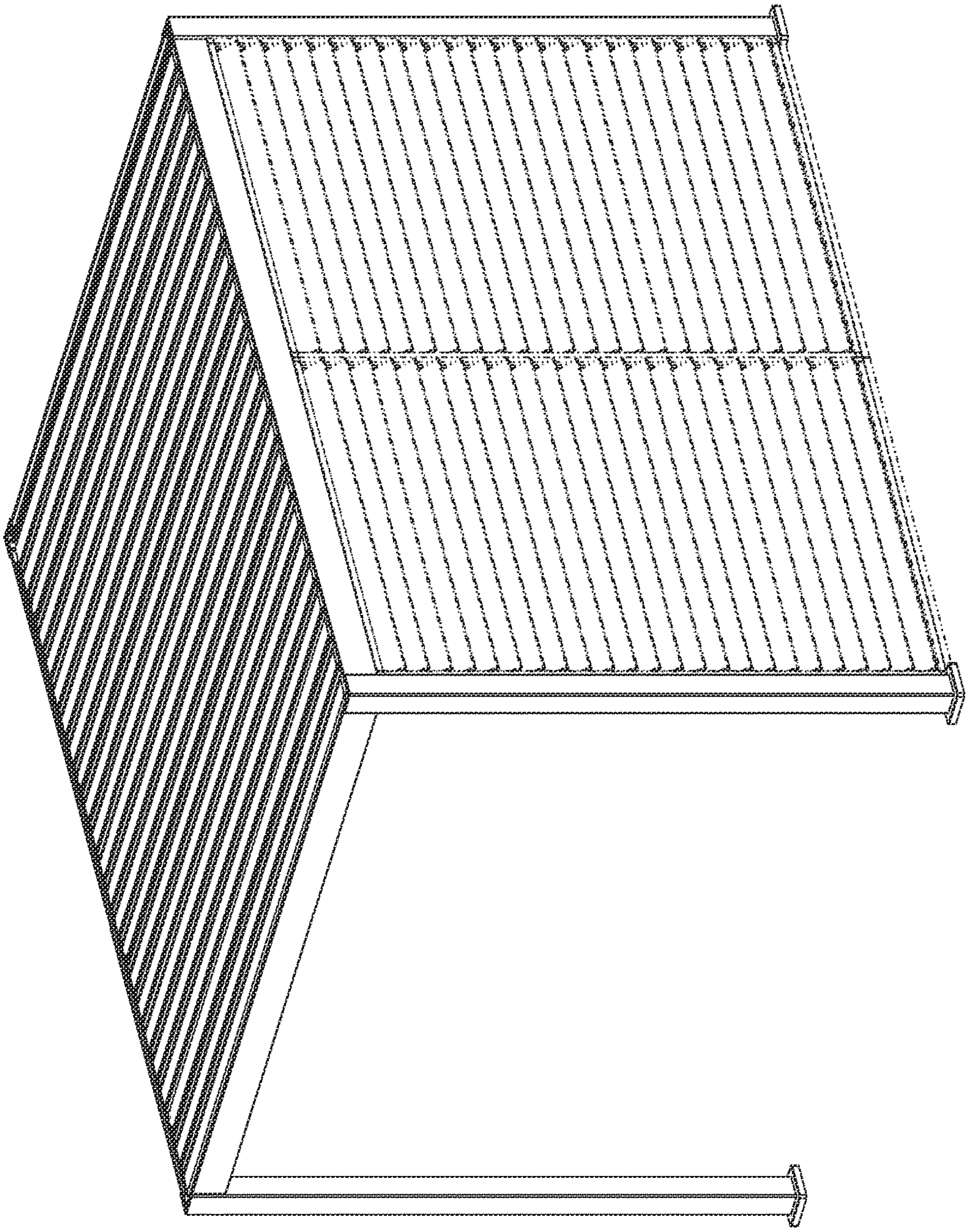
Figure 223:
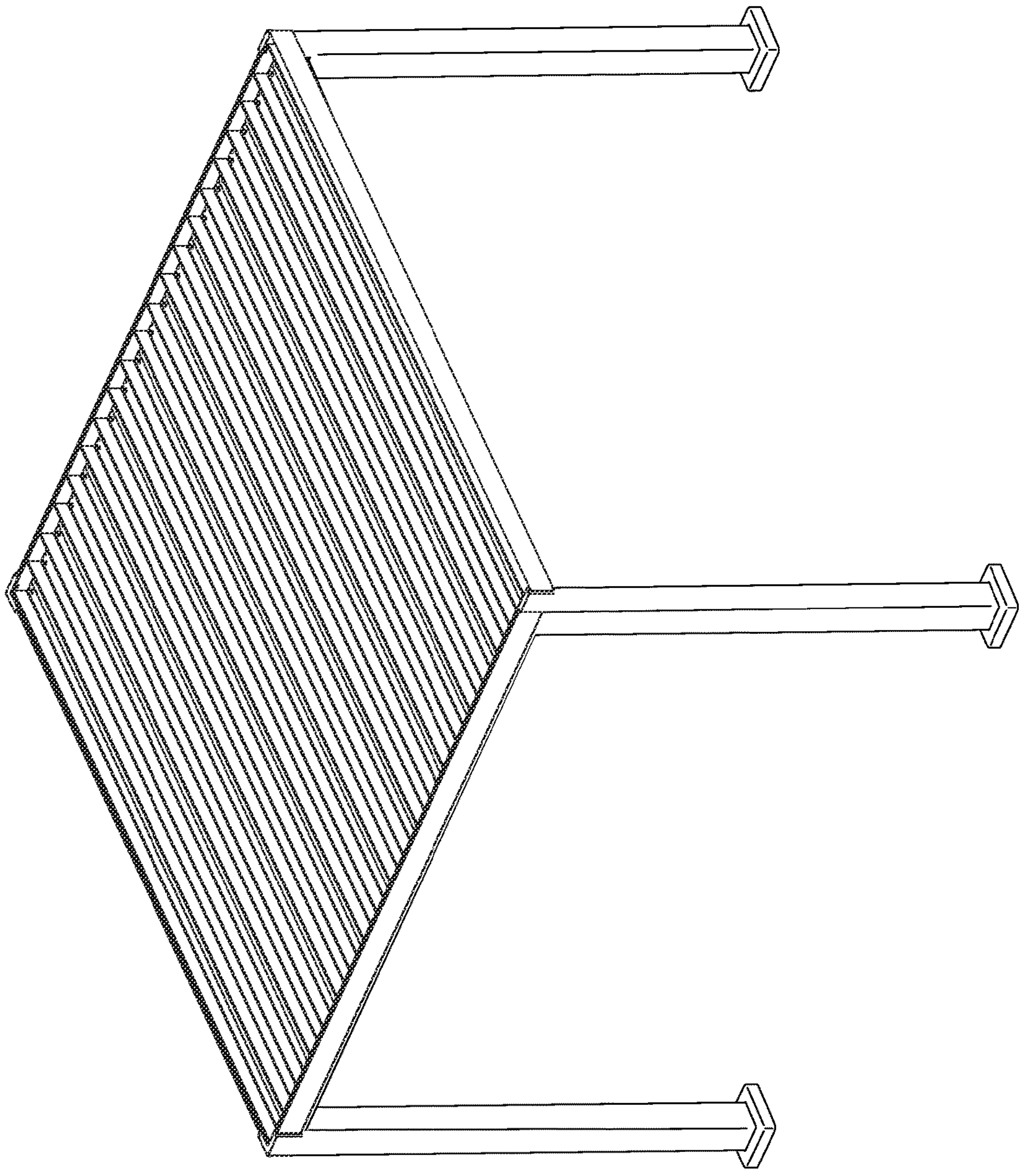
Figure 224:
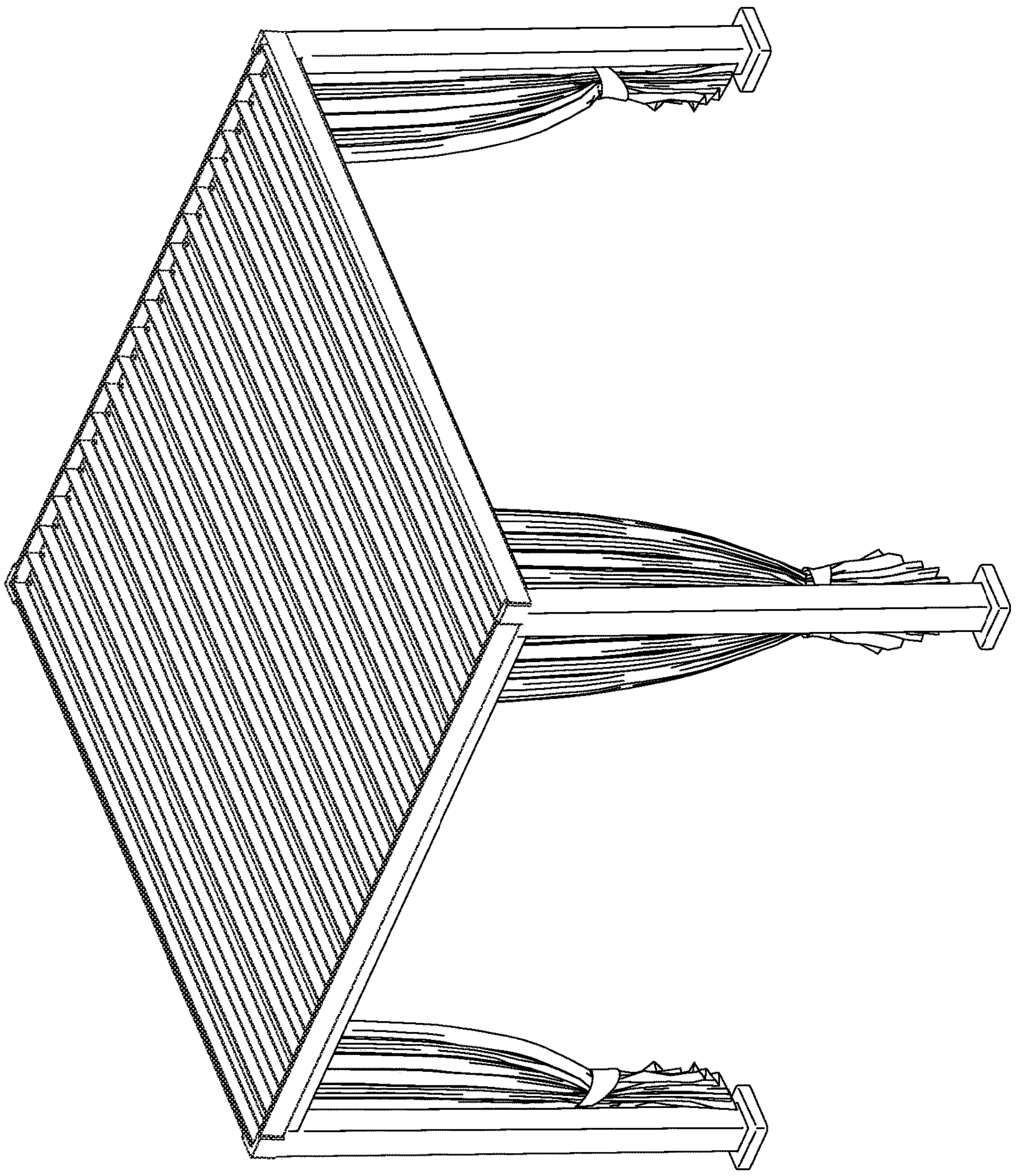
Figure 225B:
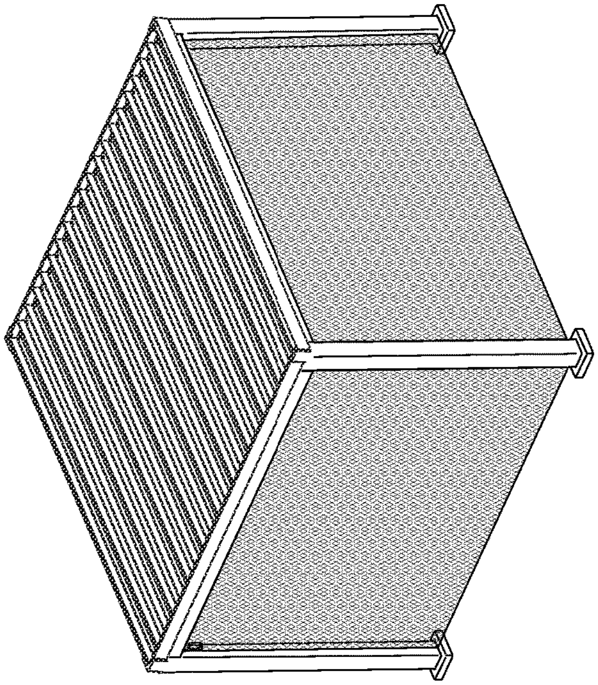
Figure 225A:
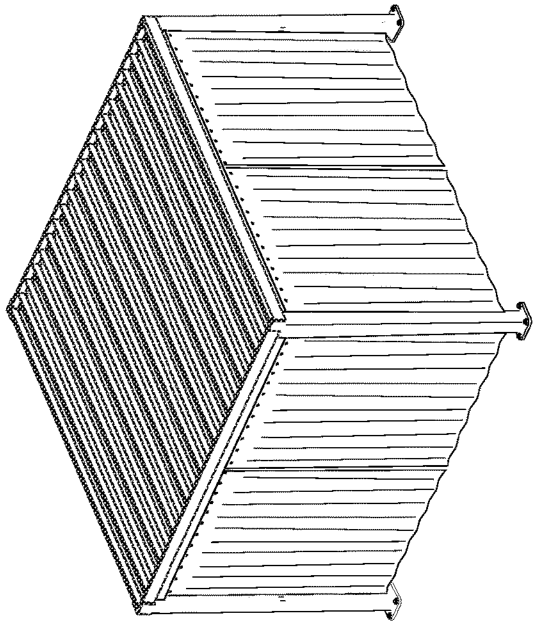
Figure 226B:
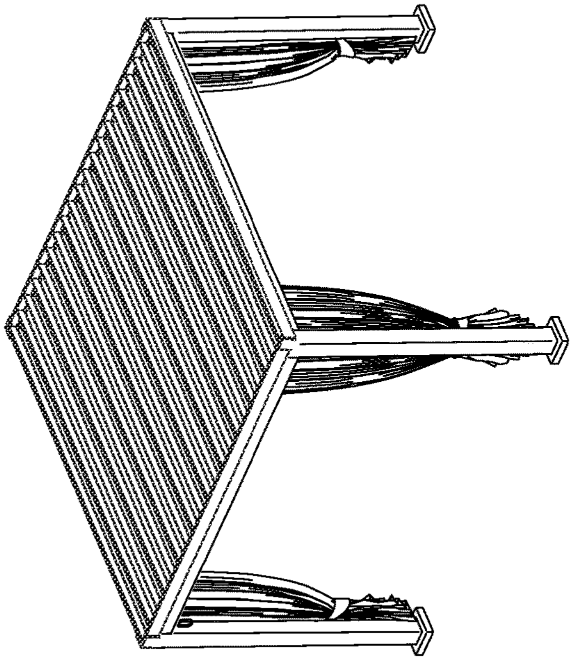
Figure 226A:
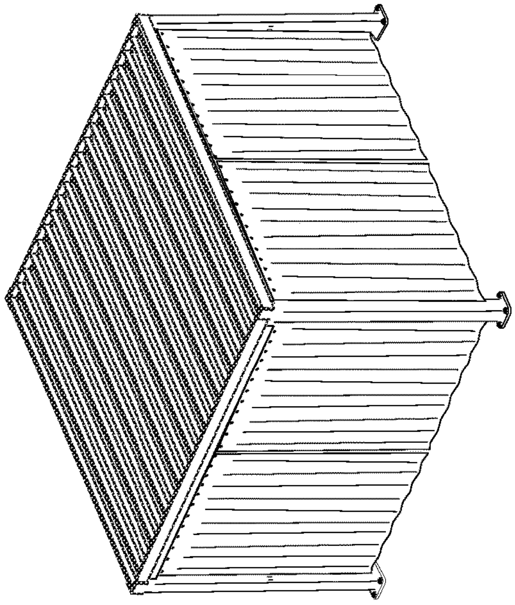
Figure 227B:
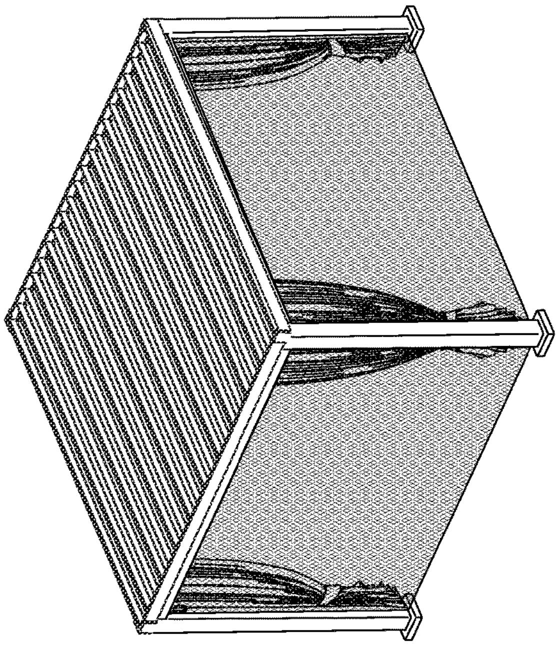
Figure 227A:
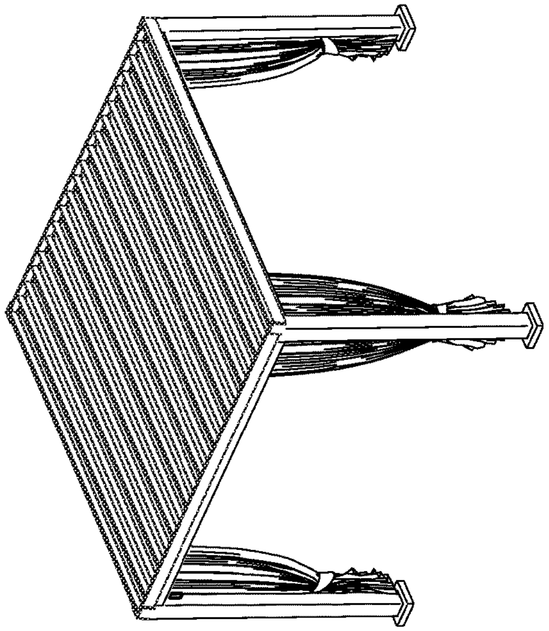
Figure 228B:
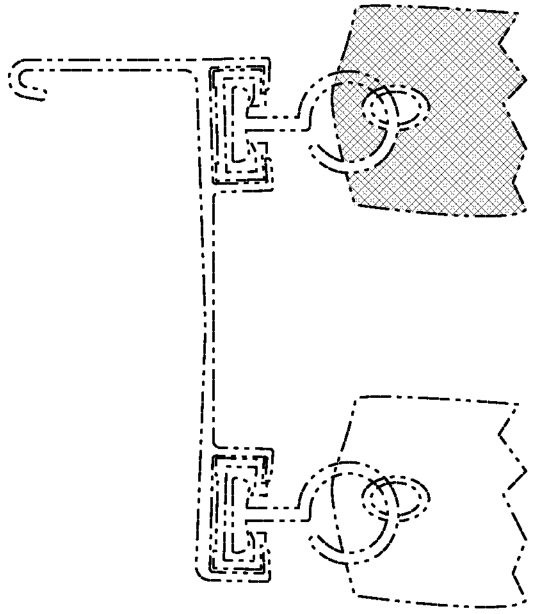
Figure 228A:
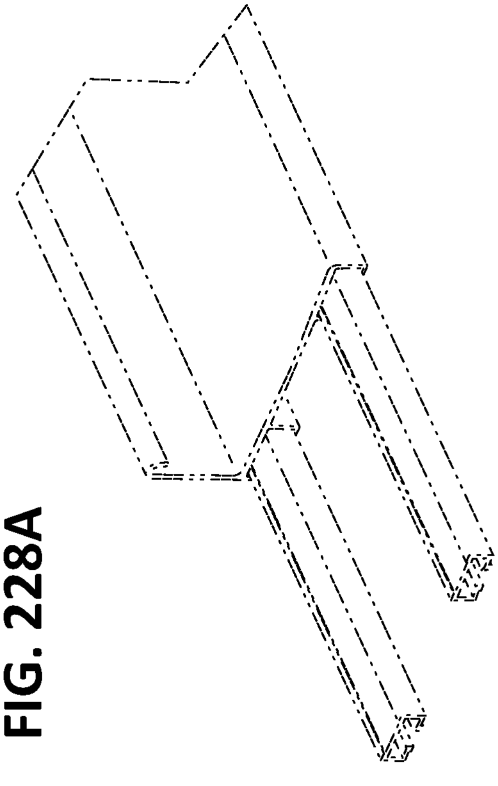
Figure 229:
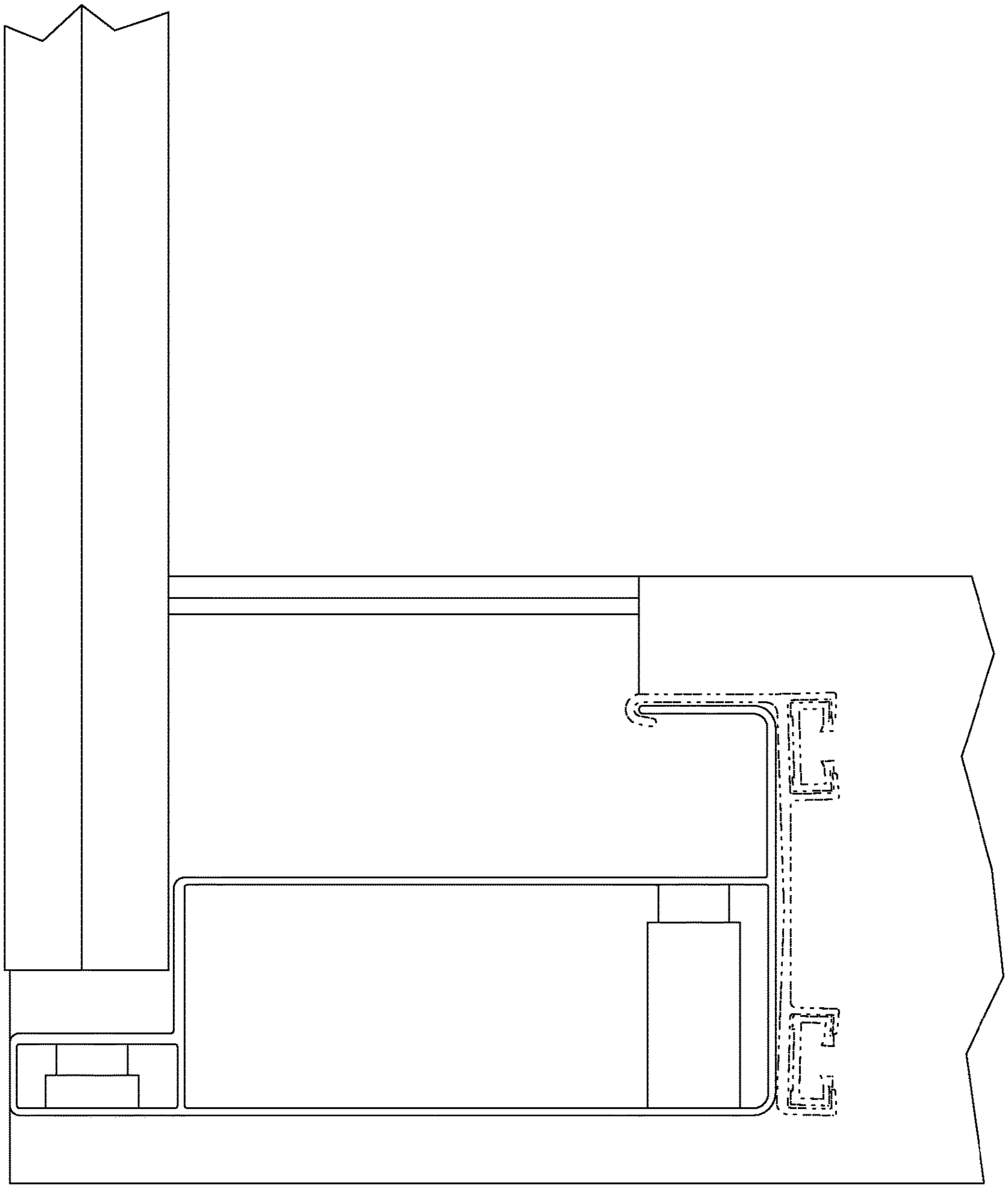
Figure 230A:
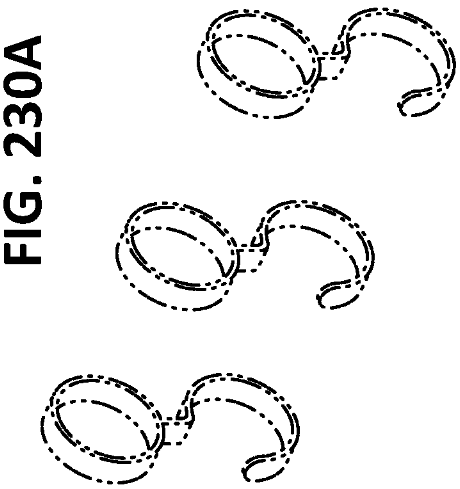
Figure 230B:
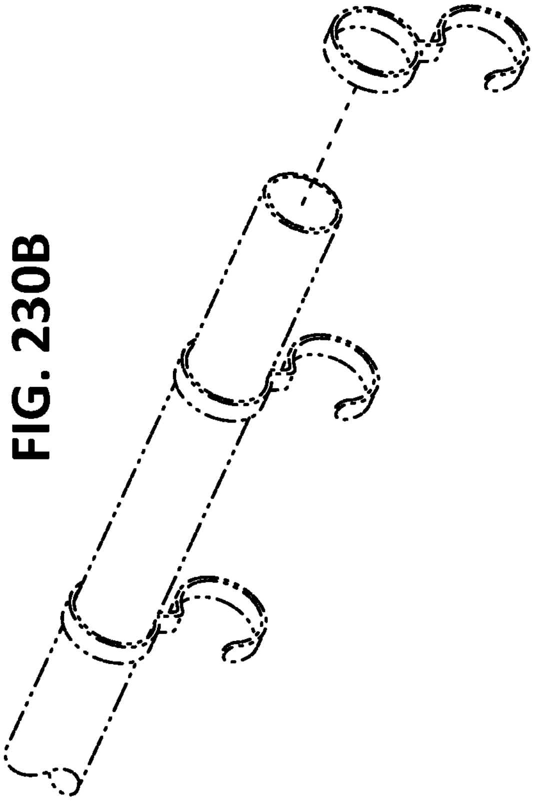
Figure 231B:
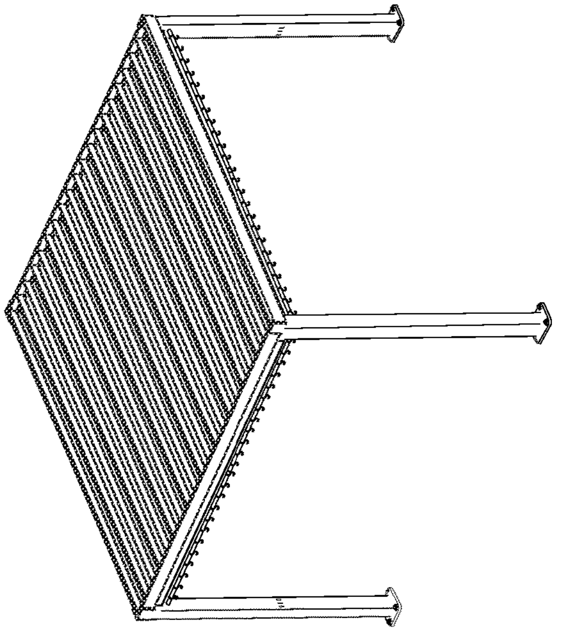
Figure 231A:
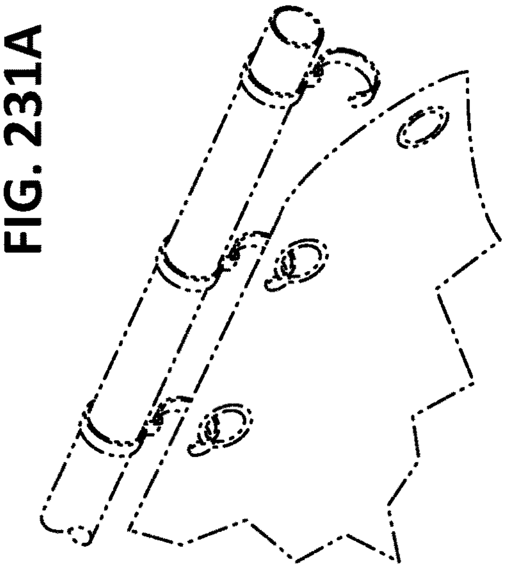
Figure 232:
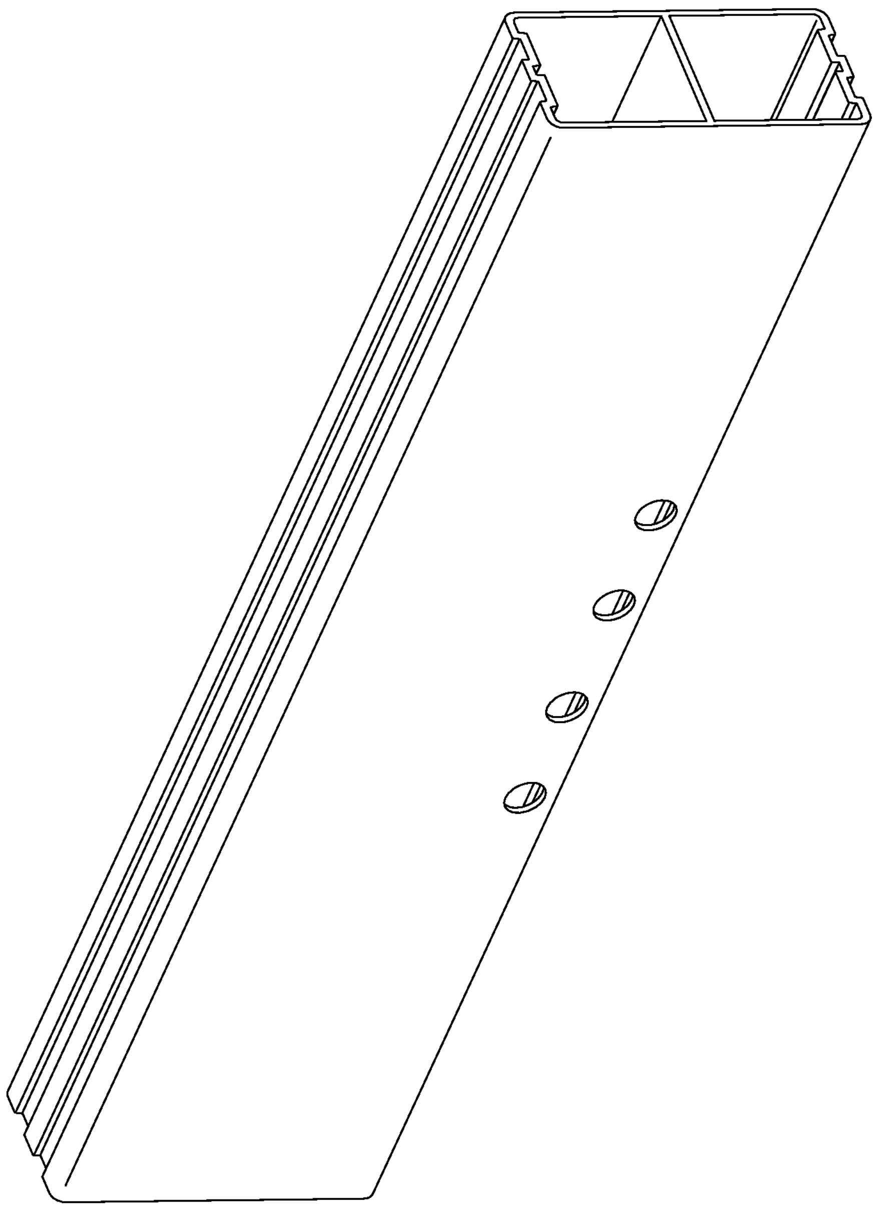
FIG. 232-FIG. 237 illustrate perspective views demonstrating equivalent components and assemblies of the five-device-in-one anti-leaking noise-canceling anti-twisting anti-warping anti-vibrating double-locking double-core double-deck double-stacked internal-gutters.
Figure 233:
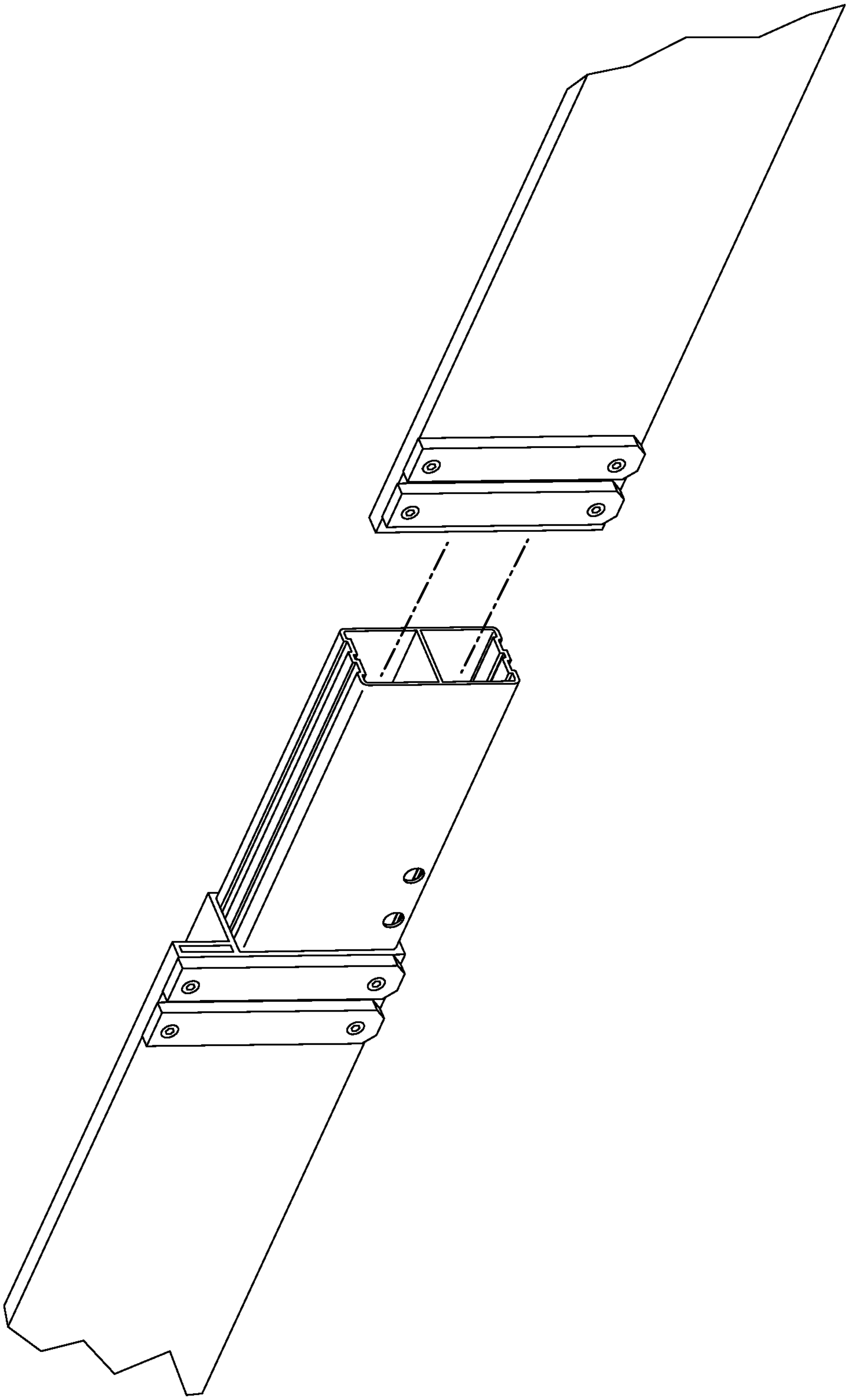
Figure 234:
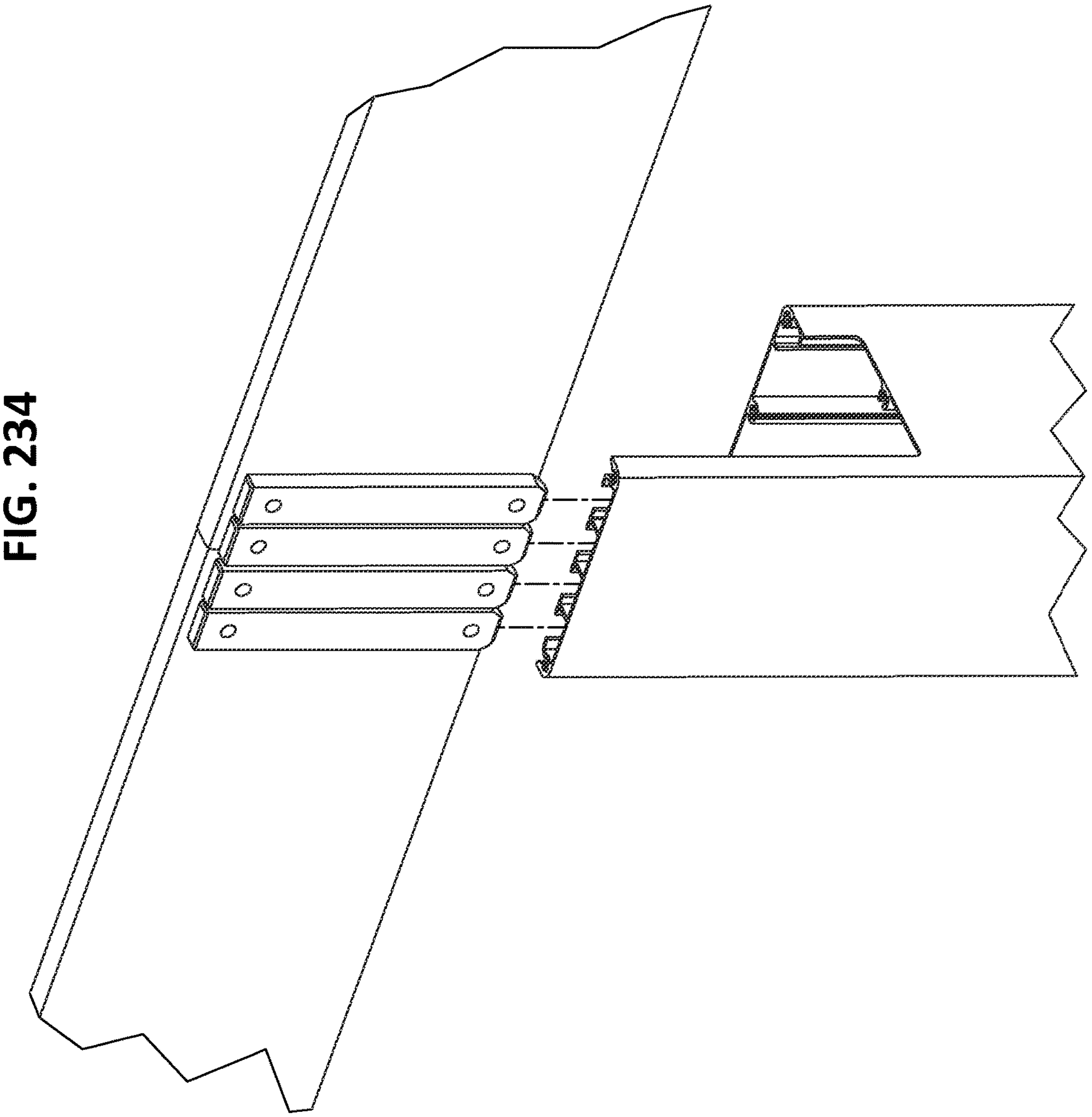
Figure 235:
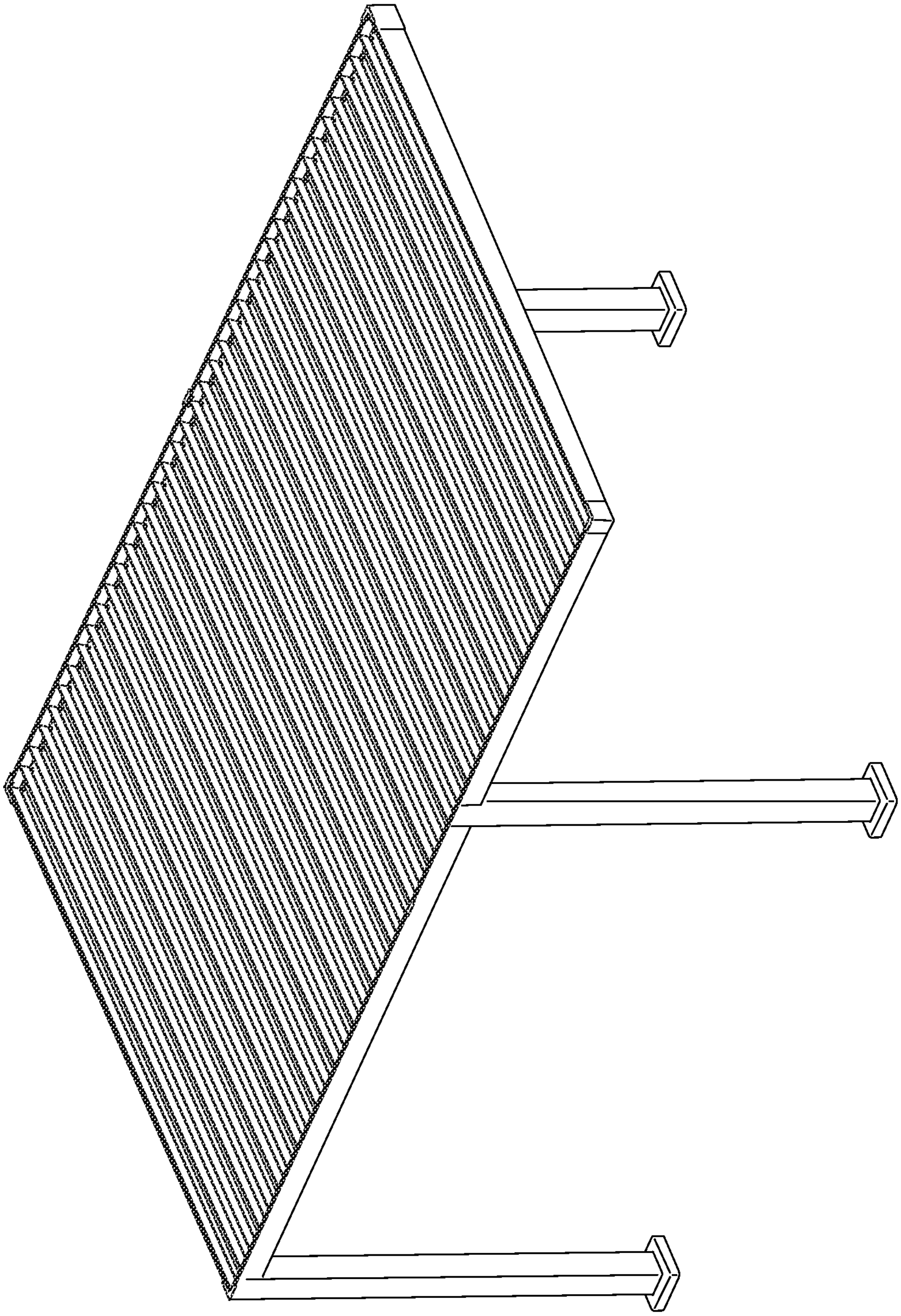
Figure 236:
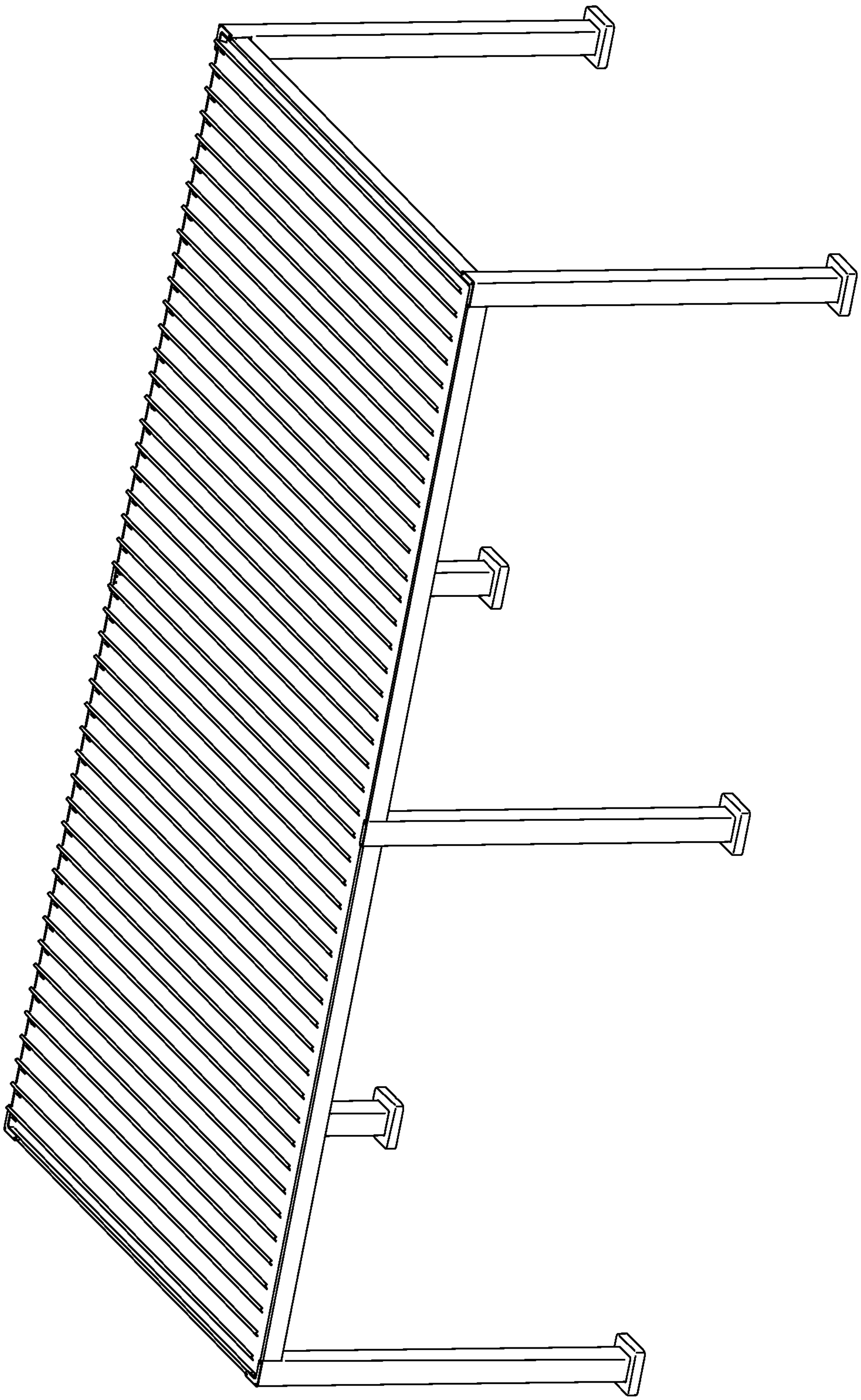
Figure 237:
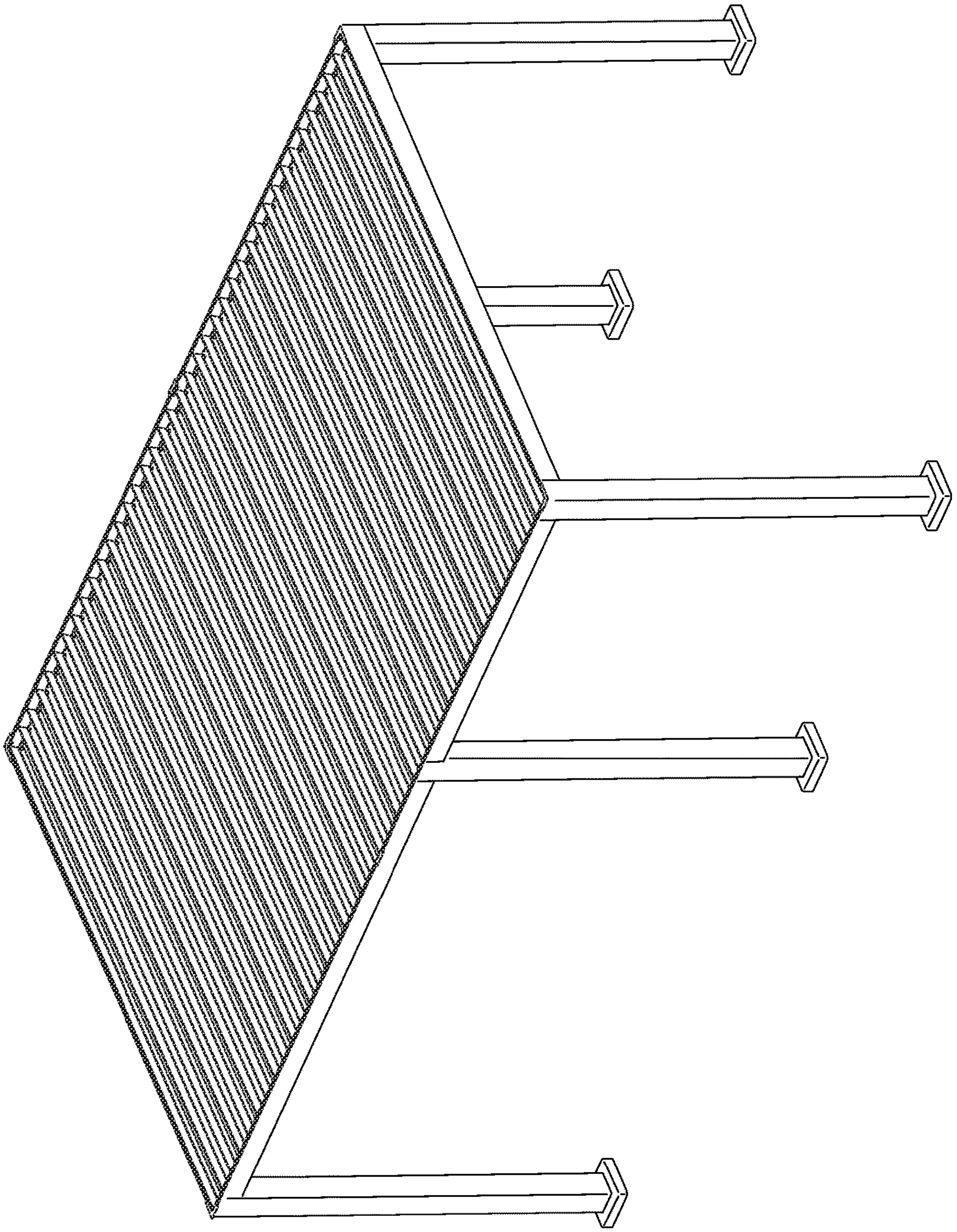
Figure 238:
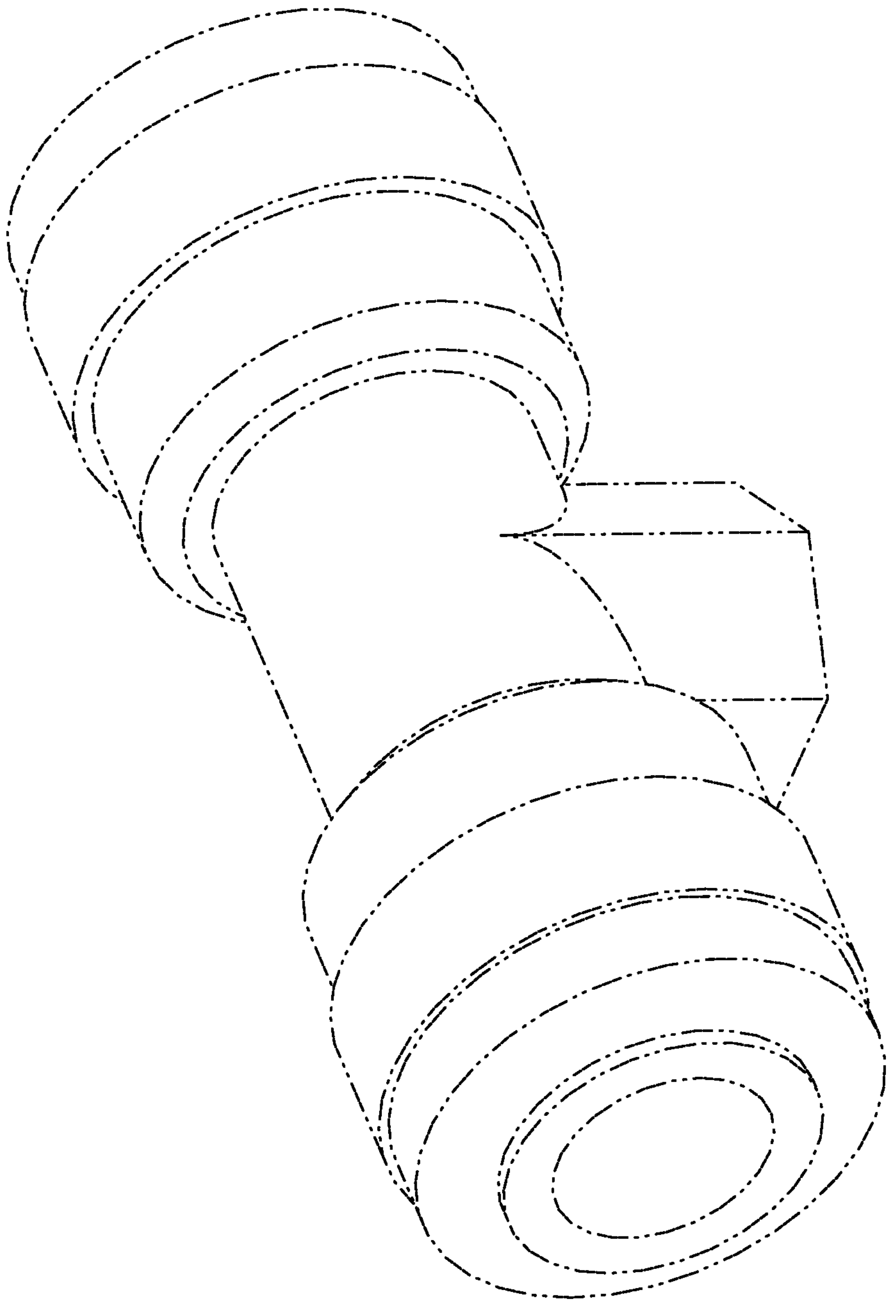
FIG. 238-FIG. 246 illustrate perspective, front, and side views demonstrating equivalent variations of components and assemblies of the five-device-in-one anti-leaking noise-canceling anti-twisting anti-warping anti-vibrating double-locking double-core double-deck double-stacked internal-gutters having a misting system installed into accessory-securing tracks 113.
Figure 239:
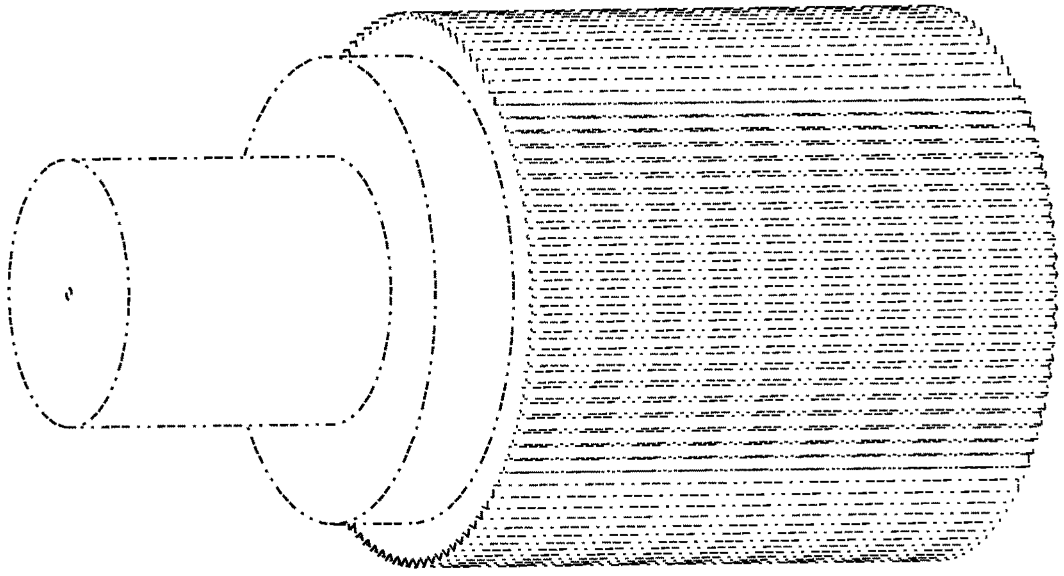
Figure 240:
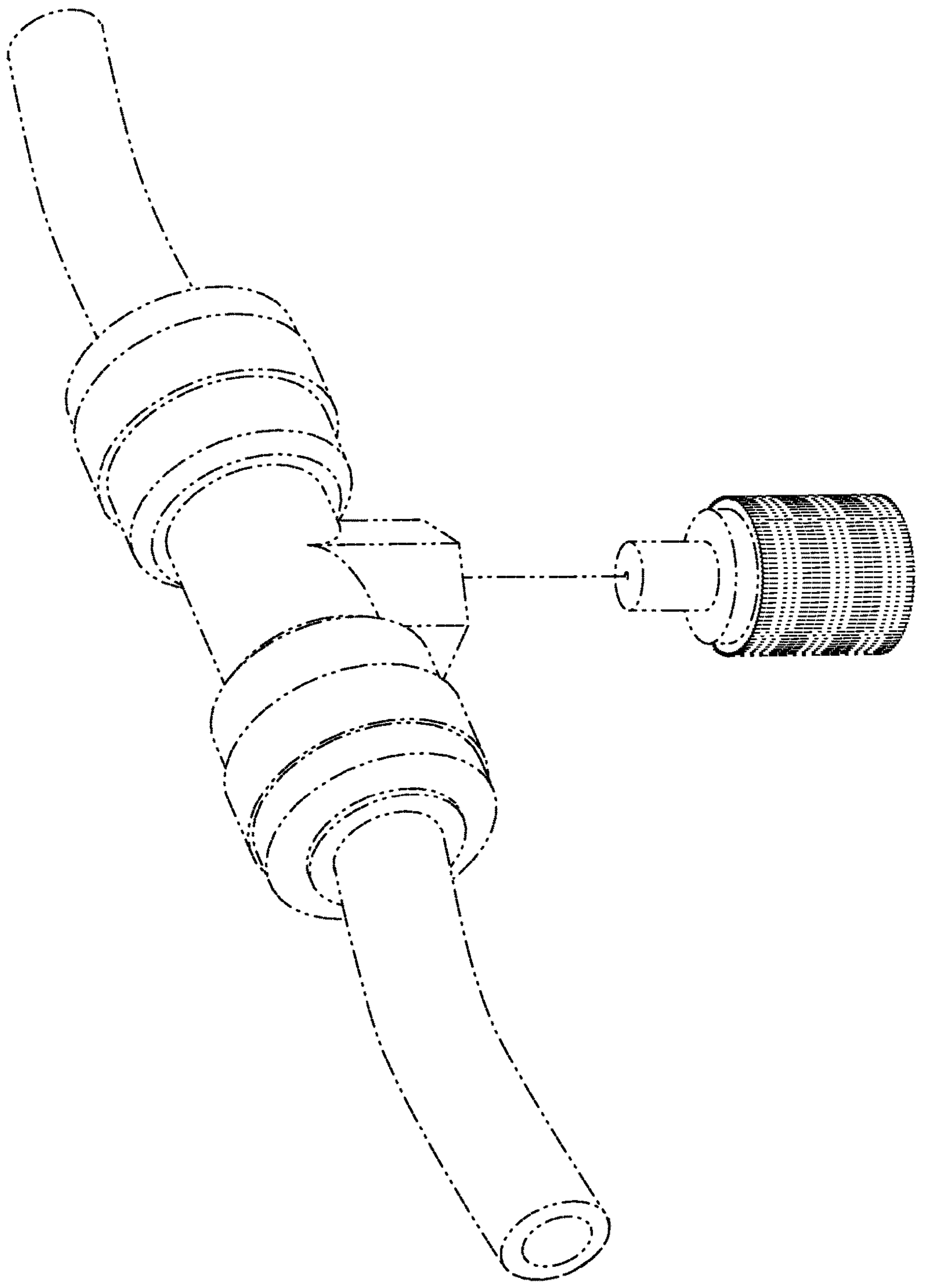
Figure 241:
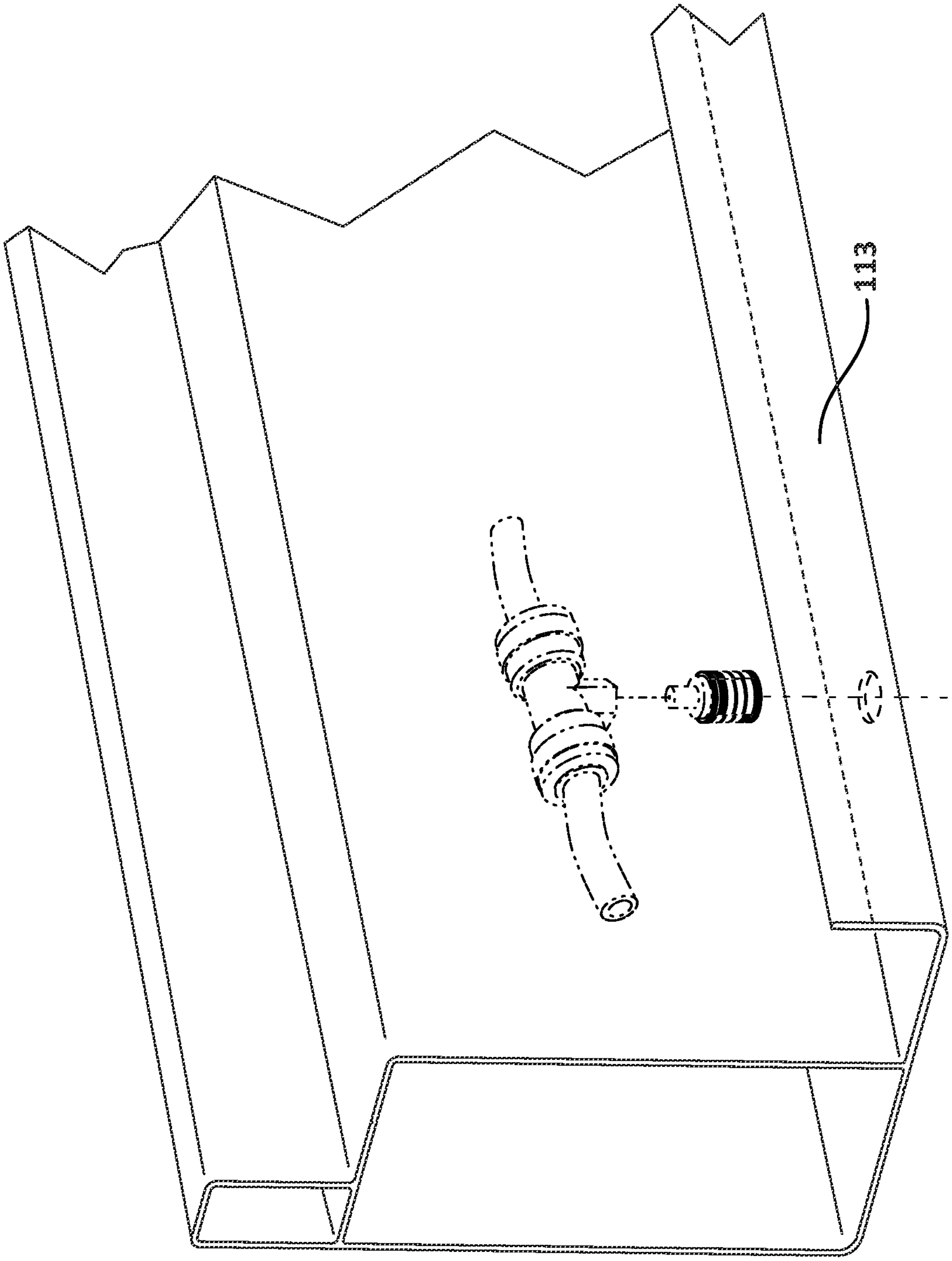
Figure 242:
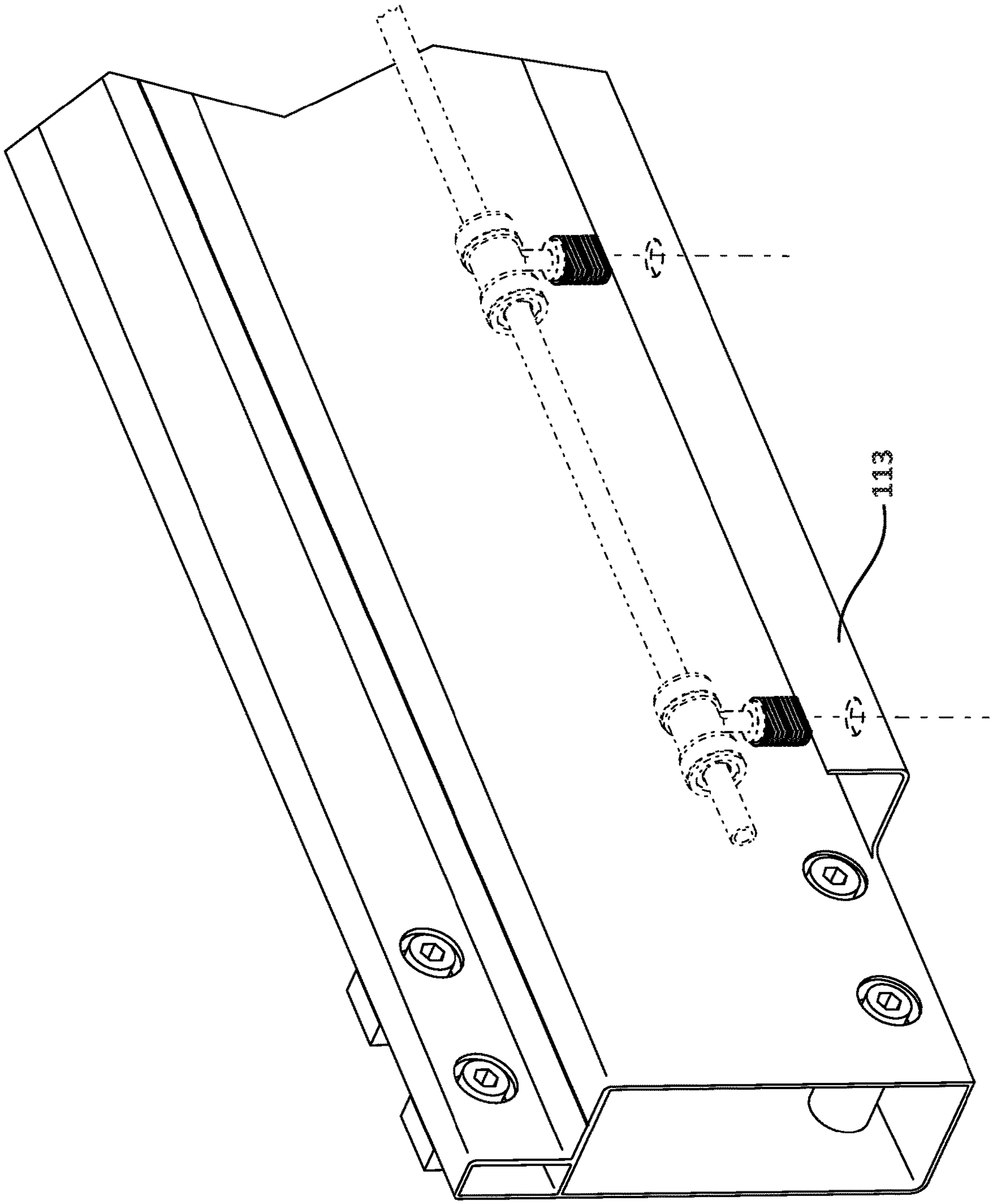
Figure 243:
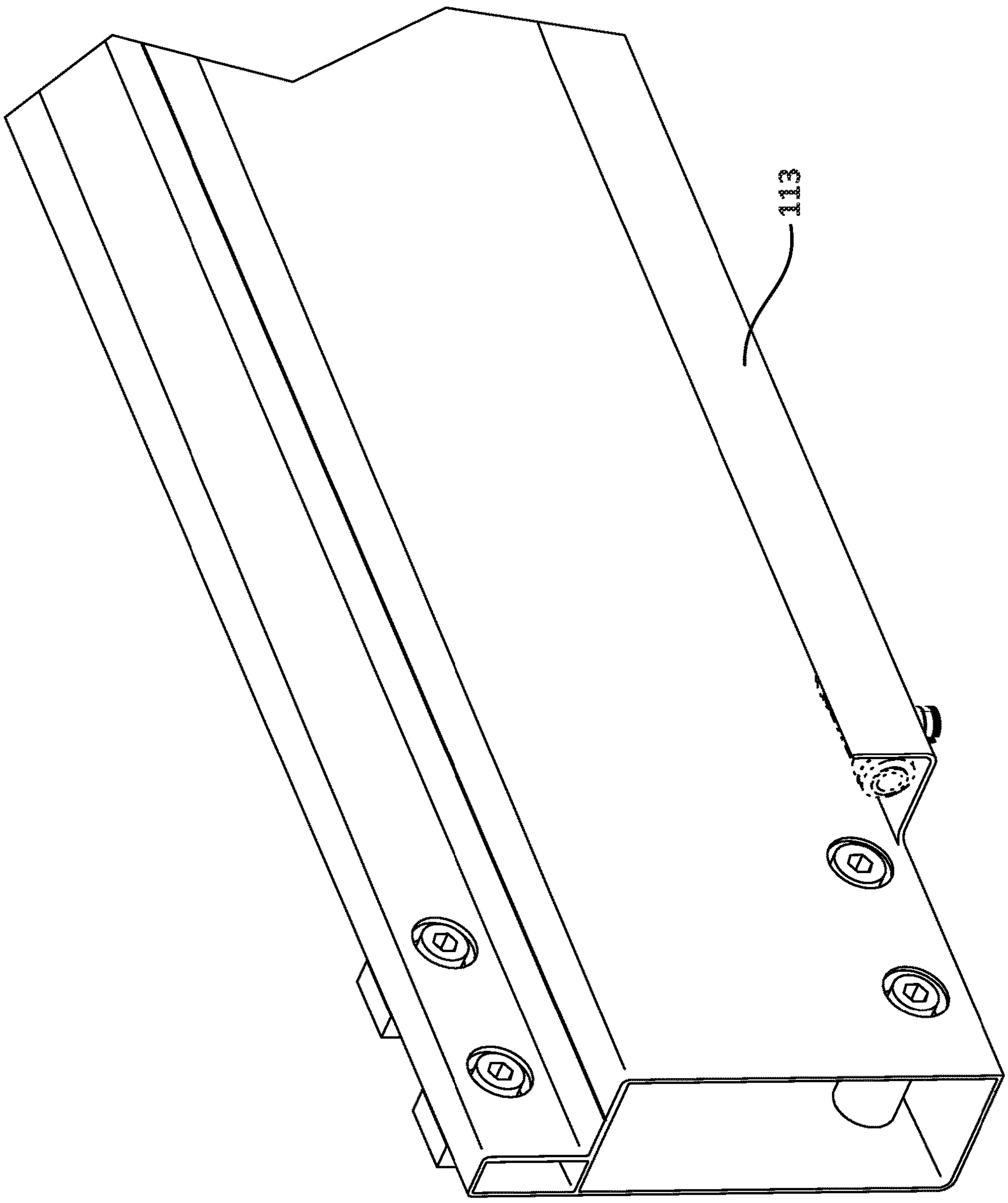
Figure 244B:
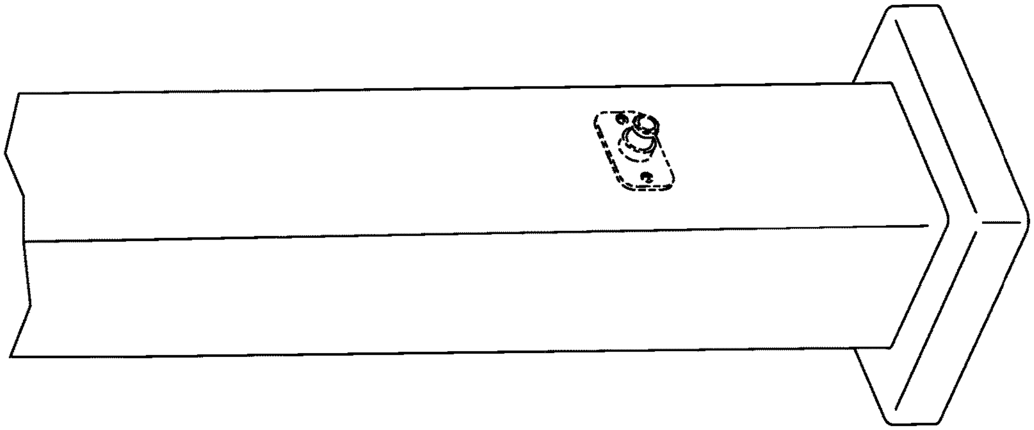
Figure 244A:
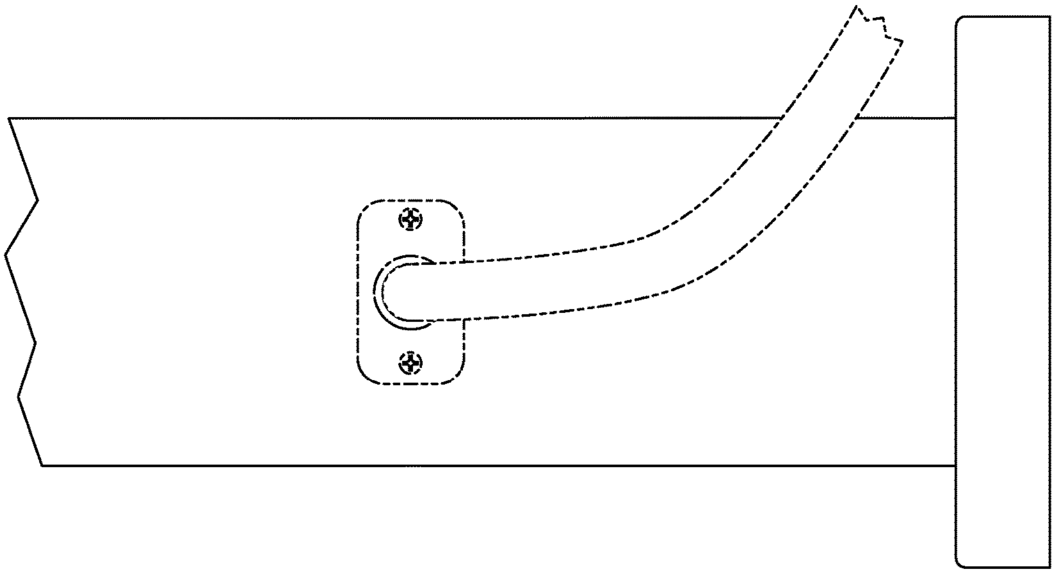
Figure 245:
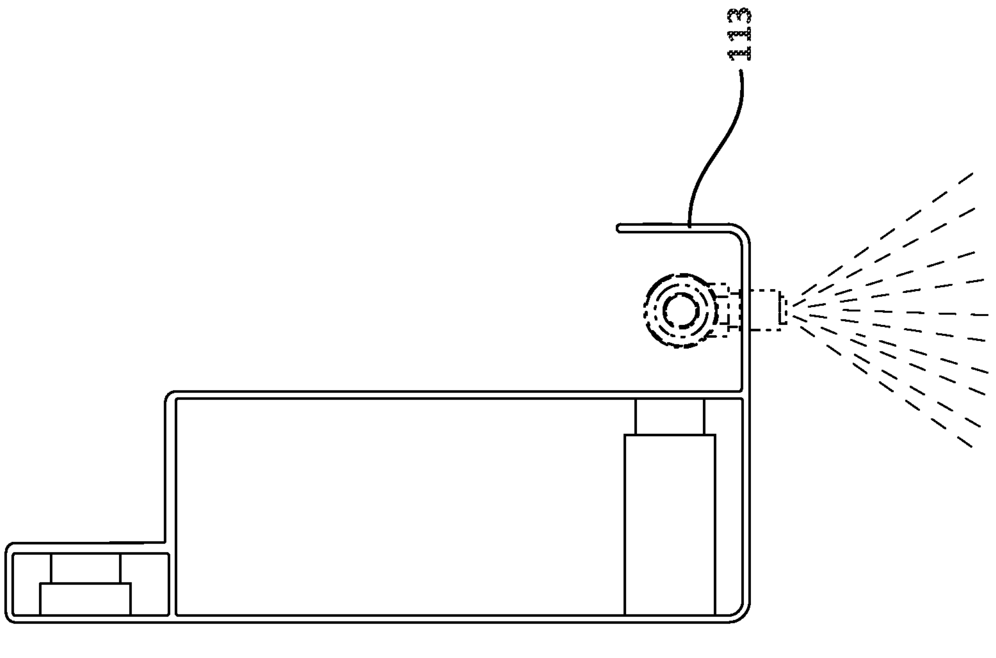
Figure 246:
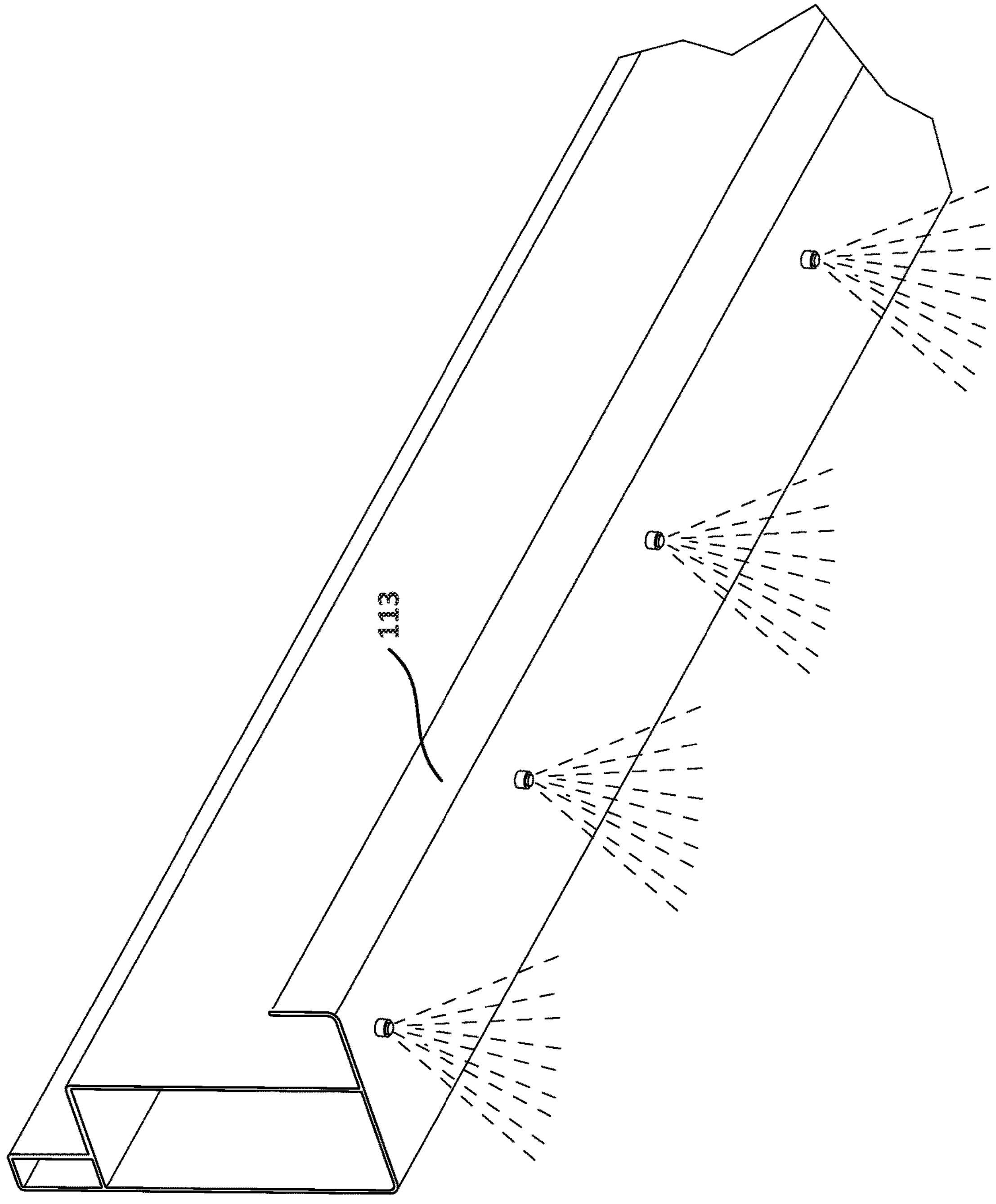

FIG. 108-FIG. 200 illustrate perspective, side, front, back, and top views demonstrating equivalent variations of components, assembly and functions of the five-device-in-one anti-leaking noise-canceling anti-twisting anti-warping anti-vibrating double-locking double-core double-deck double-stacked internal-gutters.

FIG. 201-FIG. 220 illustrate perspective, top, and side views of demonstrating equivalent variations of components of the five-device-in-one anti-leaking noise-canceling anti-twisting anti-warping anti-vibrating double-locking double-core double-deck double-stacked internal-gutters.

FIG. 221-FIG. 231B illustrate perspective, and side views of demonstrating equivalent variations of components and assemblies of the five-device-in-one anti-leaking noise-canceling anti-twisting anti-warping anti-vibrating double-locking double-core double-deck double-stacked internal-gutters having louvers, blocking shields, hanging curtains, and mosquito screens.

FIG. 232-FIG. 237 illustrate perspective views demonstrating equivalent components and assemblies of the five-device-in-one anti-leaking noise-canceling anti-twisting anti-warping anti-vibrating double-locking double-core double-deck double-stacked internal-gutters.

FIG. 238-FIG. 246 illustrate perspective, front, and side views demonstrating equivalent variations of components and assemblies of the five-device-in-one anti-leaking noise-canceling anti-twisting anti-warping anti-vibrating double-locking double-core double-deck double-stacked internal-gutters having a misting system installed into accessory-securing tracks 113.

Figure 247:
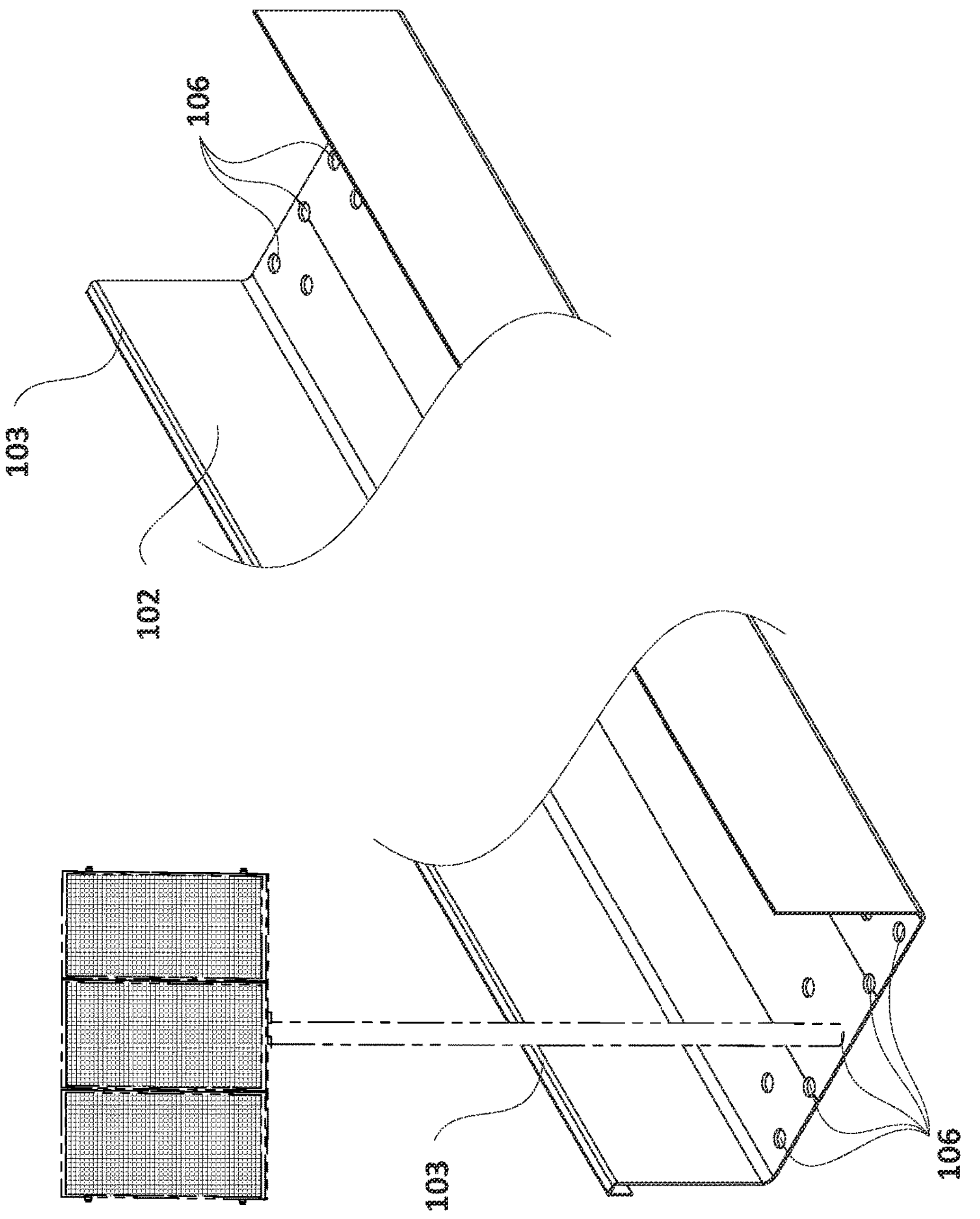
FIG. 247-FIG. 248 illustrate perspective views demonstrating equivalent variations of functionality of the five-device-in-one anti-leaking noise-canceling anti-twisting anti-warping anti-vibrating double-locking double-core double-deck double-stacked internal-gutters having a solar panel or a speaker being installed into anti-clogging rainwater-shedding holes 106.
Figure 248:
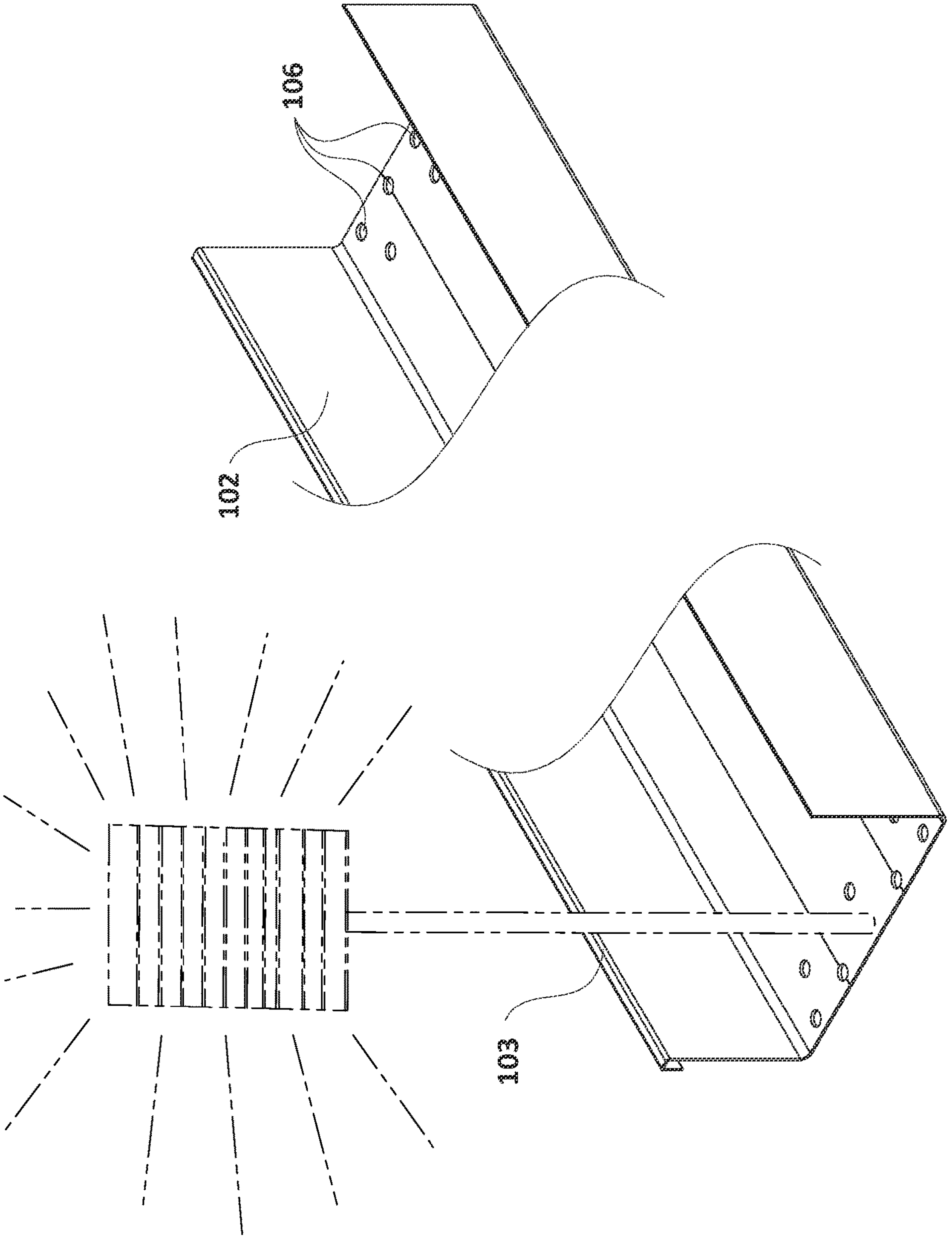

FIG. 247-FIG. 248 illustrate perspective views demonstrating equivalent variations of functionality of the five-device-in-one anti-leaking noise-canceling anti-twisting anti-warping anti-vibrating double-locking double-core double-deck double-stacked internal-gutters having a solar panel or a speaker being installed into anti-clogging rainwater-shedding holes 106.

Figure 249:
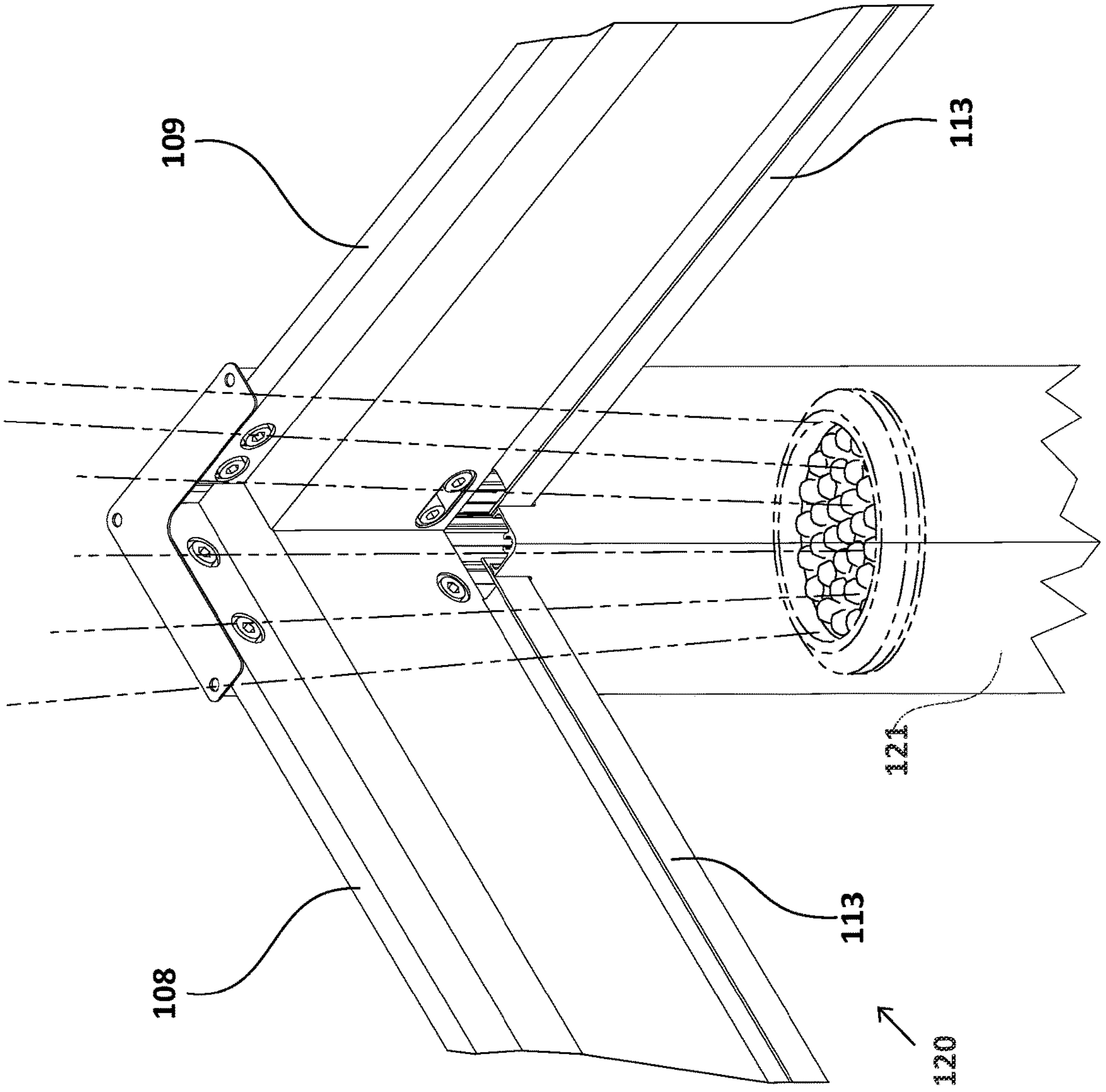
FIG. 249 illustrates a perspective view demonstrating an equivalent variation of functionality of the five-device-in-one anti-leaking noise-canceling anti-twisting anti-warping anti-vibrating double-locking double-core double-deck double-stacked internal-gutters having a small light installed within 4 double-gutter-supporting-and-locking rainwater-draining corner flumes 125.

FIG. 249 illustrates a perspective view demonstrating an equivalent variation of functionality of the five-device-in-one anti-leaking noise-canceling anti-twisting anti-warping anti-vibrating double-locking double-core double-deck double-stacked internal-gutters having a small light installed within 4 double-gutter-supporting-and-locking rainwater-draining corner flumes 125.

FIG. 250 illustrates a perspective view demonstrating components of an equivalent variation of the anti-twisting and anti-warping capabilities of the five-device-in-one anti-leaking noise-canceling anti-twisting anti-warping anti-vibrating double-locking double-core double-deck double-stacked internal-gutters.

Advantages of Some Embodiments

Some embodiments substantially departs from the conventional concepts and designs of the prior art. In doing so, the Some embodiments provides a five-device-in-one anti-leaking noise-canceling anti-twisting anti-warping anti-vibrating double-locking double-core double-deck double-stacked internal-gutters (for being adapted to pergola, RV, house, solar panel, and concert stage), having many new and significant features, functions, and advantages, which overcome all the disadvantages of the prior art, as follows: 1) It is an object of some embodiments to provide the five-device-in-one anti-leaking noise-canceling anti-twisting anti-warping anti-vibrating double-locking double-core double-deck double-stacked internal-gutters, having 4 side-rainwater-guiding quick-release-accessary-adding double-deck double-stacked-internal-gutters 108. Therefore, the five-device-in-one anti-leaking noise-canceling anti-twisting anti-warping anti-vibrating double-locking double-core double-deck double-stacked internal-gutters may be: Capable of guiding rainwater to 4 double-gutter-supporting-and-locking rainwater-draining corner flumes 125 and 2 double-gutter-supporting-and-locking rainwater-draining center flumes 132 to prevent water damage and rust in the direction of arrow 140 (see FIG. 95-FIG. 99); Capable of shedding rainwater away from five-device-in-one anti-leaking noise-canceling anti-twisting anti-warping anti-vibrating double-locking double-core double-deck double-stacked internal-gutters to prevent water damage and rust in the direction of arrow 140 (see FIG. 95, and FIG. 99); Capable of supporting an RV gutter to shed rainwater from an RV in the direction of arrow 141 (see FIG. 3, and FIG. 103) Capable of supporting a concert stage gutter to shed rainwater from a concert stage in the direction of arrow 142 (see FIG. 4, and FIG. 104); Capable of supporting a house gutter to shed rainwater from a house in the direction of arrow 143 (see FIG. 5, and FIG. 105); Capable of supporting a solar panel gutter to shed rainwater from a solar panel in the direction of arrow 144 (see FIG. 6, and FIG. 106); and Capable of supporting an awning gutter to shed rainwater when attached to a building in the direction of arrow 145 (see FIG. 7, and FIG. 107).

2) It is another object of some embodiments to provide the five-device-in-one anti-leaking noise-canceling anti-twisting anti-warping anti-vibrating double-locking double-core double-deck double-stacked internal-gutters, having 2 end-rainwater-guiding quick-release-accessary-adding double-deck double-stacked-internal-gutters 109. Therefore, the five-device-in-one anti-leaking noise-canceling anti-twisting anti-warping anti-vibrating double-locking double-core double-deck double-stacked internal-gutters may be: Capable of guiding rainwater to 4 double-gutter-supporting-and-locking rainwater-draining corner flumes 125 to prevent water damage and rust in the direction of arrow 140 (see FIG. 95-FIG. 99); Capable of shedding rainwater away from five-device-in-one anti-leaking noise-canceling anti-twisting anti-warping anti-vibrating double-locking double-core double-deck double-stacked internal-gutters to prevent water damage and rust in the direction of arrow 140 (see FIG. 95, and FIG. 99); Capable of supporting an RV gutter to shed rainwater from an RV in the direction of arrow 141 (see FIG. 3, and FIG. 103) Capable of supporting a concert stage gutter to shed rainwater from a concert stage in the direction of arrow 142 (see FIG. 4, and FIG. 104); Capable of supporting a house gutter to shed rainwater from a house in the direction of arrow 143 (see FIG. 5, and FIG. 105); Capable of supporting a solar panel gutter to shed rainwater from a solar panel in the direction of arrow 144 (see FIG. 6, and FIG. 106); and Capable of supporting an awning gutter to shed rainwater when attached to a building in the direction of arrow 145 (see FIG. 7, and FIG. 107).

3) It is still another object of some embodiments to provide the five-device-in-one anti-leaking noise-canceling anti-twisting anti-warping anti-vibrating double-locking double-core double-deck double-stacked internal-gutters, having double-deck-locking double-deck-reinforcing double-cores 115. Therefore, the five-device-in-one anti-leaking noise-canceling anti-twisting anti-warping anti-vibrating double-locking double-core double-deck double-stacked internal-gutters may be: Capable of securely and stackingly joining 2 end-rainwater-guiding quick-release-accessary-adding double-deck double-stacked-internal-gutters 109 together; and Capable of securely and stackingly reinforcing 2 end-rainwater-guiding quick-release-accessary-adding double-deck double-stacked-internal-gutters 109 together.

4) It is a further object of some embodiments to provide the five-device-in-one anti-leaking noise-canceling anti-twisting anti-warping anti-vibrating double-locking double-core double-deck double-stacked internal-gutters r, having double-deck-locking double-core-aligning double-tunnels 116*a*. Therefore, the five-device-in-one anti-leaking noise-canceling anti-twisting anti-warping anti-vibrating double-locking double-core double-deck double-stacked internal-gutters may be: Capable of securely and stackingly providing a location within 2 end-rainwater-guiding quick-release-accessary-adding double-deck double-stacked-internal-gutters 109 for double-deck-locking double-deck-reinforcing double-cores 115 to fit; and Capable of guiding rainwater to 4 double-gutter-supporting-and-locking rainwater-draining corner flumes 125 in the direction of arrow 140 (see FIG. 95-FIG. 99).

5) It is a further object of some embodiments to provide the five-device-in-one anti-leaking noise-canceling anti-twisting anti-warping anti-vibrating double-locking double-core double-deck double-stacked internal-gutters, having double-core-locking double-core-aligning spines 116*b*. Therefore, the five-device-in-one anti-leaking noise-canceling anti-twisting anti-warping anti-vibrating double-locking double-core double-deck double-stacked internal-gutters may be: Capable of aligning double-deck-locking double-deck-reinforcing double-cores 115 within double-deck-locking double-core-aligning double-tunnels 116*a*; Capable of preventing 2 double-deck-locking double-core-aligning double-tunnels 116*a* from rubbing together.

6) It is another further object of some embodiments to provide the five-device-in-one anti-leaking noise-canceling anti-twisting anti-warping anti-vibrating double-locking double-core double-deck double-stacked internal-gutters, having compression-locking gutter-aligning pegs 118. Therefore, the five-device-in-one anti-leaking noise-canceling anti-twisting anti-warping anti-vibrating double-locking double-core double-deck double-stacked internal-gutters may be: Capable of aligning 4 side-rainwater-guiding quick-release-accessary-adding double-deck double-stacked-internal-gutters 108 and 2 end-rainwater-guiding quick-release-accessary-adding double-deck double-stacked-internal-gutters 109 to double-gutter-supporting-and-locking corner parapet-post 121 and double-gutter-supporting-and-locking center parapet-posts 128; Capable of pressure-locking 4 side-rainwater-guiding quick-release-accessary-adding double-deck double-stacked-internal-gutters 108 and 2 end-rainwater-guiding quick-release-accessary-adding double-deck double-stacked-internal-gutters 109 to double-gutter-supporting-and-locking corner parapet-post 121 and double-gutter-supporting-and-locking center parapet-posts 128. It is yet another further object of some embodiments to provide the five-device-in-one anti-leaking noise-canceling anti-twisting anti-warping anti-vibrating double-locking double-core double-deck double-stacked internal-gutters, having anti-twisting anti-warping anti-vibrating 90-degree-double-yokes 119. Therefore, the five-device-in-one anti-leaking noise-canceling anti-twisting anti-warping anti-vibrating double-locking double-core double-deck double-stacked internal-gutters may be: Capable of providing anti-twisting reverse tension to retain the original shape and size of the five-device-in-one anti-leaking noise-canceling anti-twisting anti-warping anti-vibrating double-locking double-core double-deck double-stacked internal-gutters in the directions of arrows 146, and 147 (see FIG. 100, and FIG. 200); Capable of providing anti-warping reverse tension to retain the original shape and size of the five-device-in-one anti-leaking noise-canceling anti-twisting anti-warping anti-vibrating double-locking double-core double-deck double-stacked internal-gutters in the directions of arrows 146, and 147 (see FIG. 100, and FIG. 200); Capable of providing anti-vibration by cushioning gutter-securing screws 117. It is still yet another further object of some embodiments to provide the five-device-in-one anti-leaking noise-canceling anti-twisting anti-warping anti-vibrating double-locking double-core double-deck double-stacked internal-gutters, having double-gutter-supporting-and-locking corner parapet-post 121. Therefore, the five-device-in-one anti-leaking noise-canceling anti-twisting anti-warping anti-vibrating double-locking double-core double-deck double-stacked internal-gutters may be: Capable of supporting an RV gutter to shed rainwater from an RV in the direction of arrow 141 (see FIG. 3 and FIG. 103); Capable of supporting a concert stage gutter to shed rainwater from a concert stage in the direction of arrow 142 (see FIG. 4, and FIG. 104); Capable of supporting a house gutter to shed rainwater from a house in the direction of arrow 143 (see FIG. 5, and FIG. 105); Capable of supporting a solar panel gutter to shed rainwater from a solar panel in the direction of arrow 144 (see FIG. 6, and FIG. 106); and Capable of supporting an awning gutter to shed rainwater when attached to a building in the direction of arrow 145 (see FIG. 7, and FIG. 107).

It is still yet another further object of some embodiments to provide the five-device-in-one anti-leaking noise-canceling anti-twisting anti-warping anti-vibrating double-locking double-core double-deck double-stacked internal-gutters, having double-gutter-supporting-and-locking center parapet-posts 128. Therefore, the five-device-in-one anti-leaking noise-canceling anti-twisting anti-warping anti-vibrating double-locking double-core double-deck double-stacked internal-gutters may be: Capable of supporting an RV gutter to shed rainwater from an RV in the direction of arrow 141 (see FIG. 3 and FIG. 103); Capable of supporting a concert stage gutter to shed rainwater from a concert stage in the direction of arrow 142 (see FIG. 4, and FIG. 104); Capable of supporting a house gutter to shed rainwater from a house in the direction of arrow 143 (see FIG. 5, and FIG. 105); Capable of supporting a solar panel gutter to shed rainwater from a solar panel in the direction of arrow 144 (see FIG. 6, and FIG. 106); and Capable of supporting an awning gutter to shed rainwater when attached to a building in the direction of arrow 145 (see FIG. 7, and FIG. 107).

One or more elements or aspects or steps, or any portion (s) thereof, from one or more of any of the systems and methods described herein may be combined with one or more elements or aspects or steps, or any portion(s) thereof, from one or more of any of the other systems and methods described herein and combinations thereof, to form one or more additional implementations and/or claims of the present disclosure.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to “one embodiment” or “an embodiment” means that a particular feature, structure, or characteristic described in connection with the embodiment is included in at least one embodiment of the invention. The appearances of the phrase “in one embodiment” in various places in the specification are not necessarily all referring to the same embodiment.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The inventions and embodiments described herein are only examples. Each element of the inventions and embodiments described herein may be combined with any other element of the inventions and embodiments described herein unless otherwise indicated.

What is claimed is:

1. A five-device-in-one anti-leaking noise-canceling anti-twisting anti-warping anti-vibrating double-locking double-core double-deck double-stacked internal-gutters comprising:

a plurality of rainwater-shedding rainwater-guiding roof shingles;

an anti-leaking noise-canceling overlapping clamp-shield formed to said rainwater-shedding rainwater-guiding roof shingles;

a plurality of clamp-shingle-securing screws respectively secured to said rainwater-shedding rainwater-guiding roof shingles;

a plurality of rainwater-sealing grommets respectively secured around said clamp-shingle-securing screws;

a plurality of anti-clogging rainwater-shedding holes respectively drilled into said rainwater-shedding rainwater-guiding roof shingles;

four side-rainwater-guiding quick-release-accessory-adding double-deck double-stacked internal-gutters;

two end-rainwater-guiding quick-release-accessory-adding double-deck double-stacked-internal-gutters;

a plurality of roof-shingle-securing shelves respectively formed to said four side-rainwater-guiding quick-release-accessory-adding double-deck double-stacked internal-gutters and said two end-rainwater-guiding quick-release-accessory-adding double-deck double-stacked-internal-gutters;

a plurality of LED-light-securing tracks respectively formed to said four side-rainwater-guiding quick-release-accessory-adding double-deck double-stacked internal-gutters and said two end-rainwater-guiding quick-release-accessory-adding double-deck double-stacked-internal-gutters;

a plurality of LED-light arrays respectively slid into said led-light-securing tracks;

a plurality of accessory-securing tracks respectively formed to said four side-rainwater-guiding quick-release-accessory-adding double-deck double-stacked internal-gutters and said two end-rainwater-guiding quick-release-accessory-adding double-deck double-stacked-internal-gutters;

a plurality of rainwater-guiding troughs respectively formed to said four side-rainwater-guiding quick-release-accessory-adding double-deck double-stacked internal-gutters and said two end-rainwater-guiding quick-release-accessory-adding double-deck double-stacked-internal-gutters;

a plurality of double-deck-locking double-core-aligning double-tunnels respectively formed into said four side-rainwater-guiding quick-release-accessory-adding double-deck double-stacked internal-gutters and said two end-rainwater-guiding quick-release-accessory-adding double-deck double-stacked-internal-gutters;

a plurality of double-deck-locking double-deck-reinforcing double-cores respectively slid into said double-deck-locking double-core-aligning double-tunnels;

a plurality of double-core-locking double-core-aligning spines respectively formed into said four side-rainwater-guiding quick-release-accessory-adding double-deck double-stacked internal-gutters and said two end-rainwater-guiding quick-release-accessory-adding double-deck double-stacked-internal-gutters;

a plurality of compression-locking gutter-aligning pegs;

a plurality of gutter-securing screws respectively secured to said compression-locking gutter-aligning pegs;

a plurality of anti-twisting anti-warping anti-vibrating 90-degree-double-yokes respectively secured around said gutter-securing screws;

a double-gutter-supporting-and-locking corner parapet-post having a corner parapet-post bottom, said double-gutter-supporting-and-locking corner parapet-post secured to said four side-rainwater-guiding quick-release-accessory-adding double-deck double-stacked internal-gutters and said two end-rainwater-guiding quick-release-accessory-adding double-deck double-stacked-internal-gutters;

a cost-saving production-increasing inner corner parapet formed to said double-gutter-supporting-and-locking corner parapet-post;

a plurality of corner-post caps respectively secured to said double-gutter-supporting-and-locking corner parapet-post;

a plurality of corner-post-cap screws respectively secured to said corner-post caps;

four double-gutter-supporting-and-locking rainwater-draining corner flumes respectively formed within said double-gutter-supporting-and-locking corner parapet-post;

four rainwater-draining corner tunnels respectively formed to said corner parapet-post bottom of said double-gutter-supporting-and-locking corner parapet-post;

a plurality of double-gutter-supporting-and-locking center parapet-posts having a center parapet-post bottom, said double-gutter-supporting-and-locking center parapet-posts respectively secured to said four side-rainwater-guiding quick-release-accessory-adding double-deck double-stacked internal-gutters, said two end-rainwater-guiding quick-release-accessory-adding double-deck double-stacked-internal-gutters respectively attached between said double-gutter-supporting-and-locking corner parapet-post and said double-gutter-supporting-and-locking center parapet-posts, said compression-locking gutter-aligning pegs respectively secured to said double-gutter-supporting-and-locking corner parapet-post and said double-gutter-supporting-and-locking center parapet-posts;

a cost-saving production-increasing center parapet formed to said double-gutter-supporting-and-locking center parapet-posts;

a plurality of center-post caps respectively secured to said double-gutter-supporting-and-locking center parapet-posts;

a plurality of center-post-cap screws;

two double-gutter-supporting-and-locking rainwater-draining center flumes respectively formed within said double-gutter-supporting-and-locking center parapet-posts;

two rainwater-draining center tunnels respectively formed to said center parapet-post bottom of said double-gutter-supporting-and-locking center parapet-posts;

six post-feet respectively secured to said corner parapet-post bottom and said center parapet-post bottom;

six-post-feet covers respectively slid around said corner parapet-post bottom and said center parapet-post bottom;

a plurality of post-feet-securing screws respectively secured to said six post-feet; and a plurality of ground-secured expandable foot-locking sleeve-bolts respectively secured through said six post-feet and into a ground surface.

2. The five-device-in-one anti-leaking noise-canceling anti-twisting anti-warping anti-vibrating double-locking double-core double-deck double-stacked internal-gutters of claim 1:

wherein said rainwater-shedding rainwater-guiding roof shingles are each made of metal, plastic, wood, or rubber.

3. The five-device-in-one anti-leaking noise-canceling anti-twisting anti-warping anti-vibrating double-locking double-core double-deck double-stacked internal-gutters of claim 1:

wherein said rainwater-sealing grommets are each made of metal, plastic, wood, or rubber.

4. The five-device-in-one anti-leaking noise-canceling anti-twisting anti-warping anti-vibrating double-locking double-core double-deck double-stacked internal-gutters of claim 1:

wherein said anti-clogging rainwater-shedding holes are each made of empty space.

5. The five-device-in-one anti-leaking noise-canceling anti-twisting anti-warping anti-vibrating double-locking double-core double-deck double-stacked internal-gutters of claim 1:

wherein said double-gutter-supporting-and-locking center parapet-posts are each made of the material of metal, plastic, wood, or rubber.

6. The five-device-in-one anti-leaking noise-canceling anti-twisting anti-warping anti-vibrating double-locking double-core double-deck double-stacked internal-gutters of claim 1:

wherein said compression-locking gutter-aligning pegs are each formed into the shape of a stick with a rectangular cross-section.

7. The five-device-in-one anti-leaking noise-canceling anti-twisting anti-warping anti-vibrating double-locking double-core double-deck double-stacked internal-gutters of claim 1:

wherein said anti-twisting anti-warping anti-vibrating 90-degree-double-yokes are each formed into the shape of two side-by-side rings.

8. The five-device-in-one anti-leaking noise-canceling anti-twisting anti-warping anti-vibrating double-locking double-core double-deck double-stacked internal-gutters of claim 1:

wherein said double-deck-locking double-deck-reinforcing double-cores are each formed into the shape of two stacked tubes with an 8-shaped cross-section.

9. The five-device-in-one anti-leaking noise-canceling anti-twisting anti-warping anti-vibrating double-locking double-core double-deck double-stacked internal-gutters of claim 1:

wherein said double-deck-locking double-core-aligning double-tunnels are each formed into the shape of two stacked tunnels each with a rectangular cross-section.

10. A five-device-in-one double-locking double-core double-deck double-stacked internal-gutters comprising:

a plurality of rainwater-shedding roof shingles;

an overlapping clamp-shield formed to said rainwater-shedding roof shingles;

a plurality of shingle-securing screws respectively secured to said rainwater-shedding roof shingles;

a plurality of rainwater-sealing grommets respectively secured around said shingle-securing screws;

a plurality of rainwater-shedding holes respectively drilled into said rainwater-shedding roof shingles;

four side double-deck double-stacked internal-gutters;

two end double-deck double-stacked-internal-gutters;

a plurality of shingle-securing shelves respectively formed to said four side double-deck double-stacked internal-gutters and said two end double-deck double-stacked-internal-gutters;

a plurality of LED-light tracks respectively formed to said four side double-deck double-stacked internal-gutters and said two end double-deck double-stacked-internal-gutters;

a plurality of LED-light arrays respectively slid into said LED-light tracks;

a plurality of accessory tracks respectively formed to said four side double-deck double-stacked internal-gutters and said two end double-deck double-stacked-internal-gutters;

a plurality of rainwater-guiding troughs
respectively formed to said four side double-deck double-stacked internal-gutters and
said two end double-deck double-stacked-internal-gutters;

a plurality of double-core-aligning double-tunnels
respectively formed into said four side double-deck double-stacked internal-gutters
and said two end double-deck double-stacked-internal-gutters;

a plurality of double-deck-reinforcing double-cores
respectively slid into said double-core-aligning double-tunnels;

a plurality of double-core-aligning spines
respectively formed into said four side double-deck double-stacked internal-gutters
and said two end double-deck double-stacked-internal-gutters;

a plurality of compression-locking pegs;

a plurality of gutter screws
respectively secured to said compression-locking pegs;

a plurality of 90-degree-double-yokes
respectively secured around said gutter screws;

a double-gutter corner parapet-post
having a corner parapet-post bottom,
said double-gutter corner parapet-post secured to said four side double-deck double-stacked internal-gutters and said two end double-deck double-stacked-internal-gutters;

a cost-saving inner corner parapet
formed to said double-gutter corner parapet-post;

a plurality of corner caps
respectively secured to said double-gutter corner parapet-post;

a plurality of corner cap screws
respectively secured to said corner caps;

four double-gutter rainwater-draining corner flumes
respectively formed within said double-gutter corner parapet-post;

four rainwater-draining corner tunnels
respectively formed to said corner parapet-post bottom of said double-gutter corner
parapet-post;

a plurality of double-gutter center parapet-posts
having a center parapet-post bottom,
said double-gutter center parapet-posts respectively secured to said four side double-deck double-stacked internal-gutters,
said two end double-deck double-stacked-internal-gutters respectively attached between said double-gutter corner parapet-post and said double-gutter center parapet-posts,
said compression-locking pegs respectively secured to said double-gutter corner parapet-post and said double-gutter center parapet-posts;

a production-increasing center parapet
formed to said double-gutter center parapet-posts;

a plurality of center caps
respectively secured to said double-gutter center parapet-posts;

a plurality of center cap screws;

two double-gutter rainwater-draining center flumes
respectively formed within said double-gutter center parapet-posts;

two rainwater-draining center tunnels
respectively formed to said center parapet-post bottom of said double-gutter center parapet-posts;

six post-feet
respectively secured to said corner parapet-post bottom and said center parapet-post bottom;

six-post-feet covers
respectively slid around said corner parapet-post bottom and said center parapet-post bottom;

a plurality of post-feet screws
respectively secured to said six post-feet; and a plurality of ground-secured expandable foot-locking sleeve-bolts
respectively secured through said six post-feet and into a ground surface.

11. The five-device-in-one double-locking double-core double-deck double-stacked internal-gutters of claim 10: wherein
said rainwater-shedding roof shingles
are each made of metal, plastic, wood, or rubber.

12. The five-device-in-one double-locking double-core double-deck double-stacked internal-gutters of claim 10: wherein
said rainwater-sealing grommets
are each made of metal, plastic, wood, or rubber.

13. The five-device-in-one double-locking double-core double-deck double-stacked internal-gutters of claim 10: wherein
said rainwater-shedding holes
are each made of empty space.

14. The five-device-in-one double-locking double-core double-deck double-stacked internal-gutters of claim 10: wherein
said double-gutter center parapet-posts
are each made of the material of metal, plastic, wood, or rubber.

15. The five-device-in-one double-locking double-core double-deck double-stacked internal-gutters of claim 10: wherein
said compression-locking pegs
are each formed into the shape of a stick with a rectangular cross-section.

16. The five-device-in-one double-locking double-core double-deck double-stacked internal-gutters of claim 10: wherein
said 90-degree-double-yokes
are each formed into the shape of two side-by-side rings.

17. The five-device-in-one double-locking double-core double-deck double-stacked internal-gutters of claim 10: wherein
said double-deck-reinforcing double-cores
are each formed into the shape of two stacked tubes with an 8-shaped cross-section.

18. The five-device-in-one double-locking double-core double-deck double-stacked internal-gutters of claim 10: wherein
said double-core-aligning double-tunnels
are each formed into the shape of two stacked tunnels each with a rectangular cross-section.

19. A five-device-in-one double-core double-stacked internal-gutters comprising:

a plurality of roof shingles;

a plurality of shedding holes
respectively drilled into said roof shingles;

a plurality of side internal-gutters;

a plurality of end internal-gutters;

a plurality of rainwater troughs respectively formed to said side internal-gutters and said end internal-gutters;
a plurality of aligning tunnels
respectively formed into said side internal-gutters and said end internal-gutters;
a plurality of reinforcing cores
respectively slid into said aligning tunnels;
a plurality of locking pegs;
a plurality of gutter screws
respectively secured to said locking pegs;
a corner post
having a corner-post bottom,
said corner post secured to said side internal-gutters and said end internal-gutters;
a plurality of corner caps
respectively secured to said corner post;
a plurality of center posts
having a center-post bottom,
said center posts respectively secured to said side internal-gutters,
said end internal-gutters respectively attached between said corner post and said center posts,
said locking pegs respectively secured to said corner post and said center posts;
a plurality of center caps
respectively secured to said center posts;
a plurality of post-feet
respectively secured to said corner-post bottom and said center parapet-post bottom;
a plurality of post-feet covers
respectively slid around said corner-post bottom and said center-post bottom;
a plurality of post-feet screws
respectively secured to said post-feet; and
a plurality of ground-secured bolts
respectively secured through said post-feet and into a ground surface.

20. The five-device-in-one double-core double-stacked internal-gutters of claim 19:
wherein
said roof shingles
are each made of metal, plastic, wood, or rubber.

* * * * *